United States Patent
Parker et al.

(10) Patent No.: US 9,909,044 B2
(45) Date of Patent: *Mar. 6, 2018

(54) PROTEIN-CONTAINING EMULSIONS AND ADHESIVES, AND MANUFACTURE AND USE THEREOF

(71) Applicant: Evertree, Paris (FR)

(72) Inventors: Anthony A. Parker, Newtown, PA (US); Joseph J. Marcinko, West Deptford, NJ (US)

(73) Assignee: Evertree, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,238

(22) Filed: Mar. 11, 2016

(65) Prior Publication Data

US 2016/0298012 A1    Oct. 13, 2016

Related U.S. Application Data

(63) Continuation of application No. 13/951,710, filed on Jul. 26, 2013, now Pat. No. 9,309,444, which is a
(Continued)

(51) Int. Cl.

| | |
|---|---|
| C09J 189/00 | (2006.01) |
| C08H 1/00 | (2006.01) |
| C08G 18/10 | (2006.01) |
| C08G 18/64 | (2006.01) |
| C08G 18/70 | (2006.01) |
| C08L 97/02 | (2006.01) |

(Continued)

(52) U.S. Cl.
CPC ............ *C09J 189/00* (2013.01); *C08G 18/10* (2013.01); *C08G 18/6446* (2013.01); *C08G 18/706* (2013.01); *C08H 1/00* (2013.01); *C08L 97/02* (2013.01); *C09J 5/00* (2013.01); *C09J 175/08* (2013.01); *C08L 23/0853* (2013.01); *Y10T 428/31515* (2015.04); *Y10T 428/31551* (2015.04); *Y10T 428/31768* (2015.04)

(58) Field of Classification Search
None
See application file for complete search history.

(56) References Cited

U.S. PATENT DOCUMENTS

| | | | |
|---|---|---|---|
| 1,460,757 | A | 7/1923 | Johnson et al. |
| 2,271,620 | A | 2/1942 | Brier et al. |

(Continued)

FOREIGN PATENT DOCUMENTS

| | | | |
|---|---|---|---|
| CN | 001418562 | A | 5/2003 |
| CN | 001698453 | A | 11/2005 |

(Continued)

OTHER PUBLICATIONS

U.S. Appl. No. 15/076,861, Protein-Containing Foams, Manufacture and Use Thereof, filed Mar. 22, 2016.
(Continued)

*Primary Examiner* — Peter A Salamon
(74) *Attorney, Agent, or Firm* — Goodwin Procter LLP

(57) ABSTRACT

This invention provides emulsions and adhesives comprising proteins that can be isolated from a variety of sources including renewable plant biomass, and methods of making and using such emulsions and adhesives.

44 Claims, 21 Drawing Sheets

Related U.S. Application Data continuation of application No. 12/719,521, filed on Mar. 8, 2010, now Pat. No. 8,519,031.

(60) Provisional application No. 61/246,208, filed on Sep. 28, 2009, provisional application No. 61/157,944, filed on Mar. 6, 2009.

(51) Int. Cl.
  *C09J 5/00* (2006.01)
  *C09J 175/08* (2006.01)
  *C08L 23/08* (2006.01)

(56) References Cited

U.S. PATENT DOCUMENTS

| | | | |
|---|---|---|---|
| 2,381,407 A | 8/1945 | Levinson et al. | |
| 2,431,256 A | 11/1947 | Keil et al. | |
| 2,727,869 A | 12/1955 | Ash et al. | |
| 2,810,657 A | 10/1957 | Preusser et al. | |
| 2,881,076 A | 4/1959 | Sair | |
| 3,053,784 A | 9/1962 | Herrick et al. | |
| 3,075,930 A * | 1/1963 | Stewart et al. | 521/102 |
| 3,258,436 A | 6/1966 | Stephens | |
| 3,441,528 A | 4/1969 | Dede, Jr. | |
| 3,450,651 A | 6/1969 | Carstensen | |
| 3,489,633 A | 1/1970 | Holmquist | |
| 3,629,162 A | 12/1971 | Richardson et al. | |
| 3,658,731 A | 4/1972 | Richardson et al. | |
| 3,805,532 A | 4/1974 | Kistner | |
| 3,897,581 A | 7/1975 | Nakatsuka et al. | |
| 3,931,088 A | 1/1976 | Sakurada et al. | |
| 3,965,051 A | 6/1976 | Markusch et al. | |
| 3,965,056 A | 6/1976 | Stout et al. | |
| 3,966,658 A | 6/1976 | Robitschek et al. | |
| 3,966,971 A | 6/1976 | Morehouse et al. | |
| 3,981,831 A | 9/1976 | Markusch et al. | |
| 3,983,081 A | 9/1976 | Dieterich et al. | |
| 4,052,347 A | 10/1977 | Dieterich et al. | |
| 4,097,422 A | 6/1978 | Markusch | |
| 4,097,423 A | 6/1978 | Dieterich | |
| 4,098,645 A | 7/1978 | Hartdegen et al. | |
| 4,105,594 A | 8/1978 | Dieterich et al. | |
| 4,109,057 A * | 8/1978 | Nakamura et al. | 428/528 |
| 4,129,696 A | 12/1978 | Markusch et al. | |
| 4,144,205 A | 3/1979 | Hartman et al. | |
| 4,153,764 A | 5/1979 | Blount | |
| 4,170,697 A | 10/1979 | Blount | |
| 4,185,147 A | 1/1980 | Blount | |
| 4,211,848 A | 7/1980 | Blount | |
| 4,220,757 A | 9/1980 | Blount | |
| 4,226,982 A | 10/1980 | Blount | |
| 4,241,194 A | 12/1980 | Blount | |
| 4,243,757 A | 1/1981 | Blount | |
| 4,246,360 A | 1/1981 | Brown et al. | |
| 4,247,657 A | 1/1981 | Blount | |
| 4,251,638 A | 2/1981 | Reischl | |
| 4,283,311 A | 8/1981 | Blount | |
| 4,293,456 A | 10/1981 | Reischl | |
| 4,316,745 A | 2/1982 | Blount | |
| 4,320,208 A * | 3/1982 | Reischl et al. | 521/102 |
| 4,322,364 A | 3/1982 | Hughes et al. | |
| 4,327,195 A * | 4/1982 | Cioca et al. | 521/102 |
| 4,336,340 A | 6/1982 | Blount | |
| 4,339,366 A | 7/1982 | Blount | |
| 4,367,326 A | 1/1983 | Blount | |
| 4,376,173 A | 3/1983 | Blount | |
| 4,377,646 A | 3/1983 | Blount | |
| 4,377,659 A | 3/1983 | Blount | |
| 4,377,674 A | 3/1983 | Blount | |
| 4,380,592 A | 4/1983 | Blount | |
| 4,382,136 A | 5/1983 | Blount | |
| 4,383,049 A | 5/1983 | Blount | |
| 4,383,089 A | 5/1983 | Blount | |
| 4,390,450 A | 6/1983 | Gibson et al. | |
| RE31,340 E | 8/1983 | Blount | |
| 4,451,638 A | 5/1984 | Blount | |
| 4,478,938 A | 10/1984 | Freedman | |
| 4,497,862 A | 2/1985 | Cioca et al. | |
| 4,528,154 A | 7/1985 | Nguyen et al. | |
| 4,609,690 A * | 9/1986 | Gruber et al. | 523/334 |
| RE32,476 E | 8/1987 | Kistner | |
| 4,689,381 A * | 8/1987 | Krinski et al. | 527/201 |
| 4,711,911 A | 12/1987 | Blount | |
| 5,015,677 A | 5/1991 | Benedict et al. | |
| 5,035,902 A | 7/1991 | Bilinski et al. | |
| 5,130,404 A | 7/1992 | Freeland | |
| 5,133,991 A | 7/1992 | Norman et al. | |
| 5,273,773 A | 12/1993 | Katayama et al. | |
| 5,348,760 A | 9/1994 | Parker et al. | |
| 5,366,550 A | 11/1994 | Schad | |
| 5,506,285 A * | 4/1996 | Timm et al. | 524/13 |
| 5,523,293 A | 6/1996 | Jane et al. | |
| 5,607,633 A | 3/1997 | Sleeter et al. | |
| 5,648,420 A | 7/1997 | Fujiwara et al. | |
| 5,656,689 A | 8/1997 | Fujiwara et al. | |
| 5,681,505 A | 10/1997 | Phillips et al. | |
| 5,703,157 A | 12/1997 | Fujiwara et al. | |
| 5,710,190 A | 1/1998 | Jane et al. | |
| 5,719,301 A | 2/1998 | Sleeter | |
| 5,766,331 A | 6/1998 | Krinski et al. | |
| 5,962,541 A | 10/1999 | Peterson et al. | |
| 5,968,995 A | 10/1999 | Rizk et al. | |
| 6,033,654 A | 3/2000 | Stedronsky et al. | |
| 6,080,405 A | 6/2000 | Ishibashi et al. | |
| 6,176,891 B1 | 1/2001 | Komoriya et al. | |
| 6,194,512 B1 | 2/2001 | Chen et al. | |
| 6,231,985 B1 * | 5/2001 | Chen et al. | 428/425.1 |
| 6,291,559 B1 | 9/2001 | Krinski et al. | |
| 6,306,997 B1 | 10/2001 | Kuo et al. | |
| 6,335,043 B1 | 1/2002 | Jiang et al. | |
| 6,352,661 B1 | 3/2002 | Thompson et al. | |
| 6,365,650 B1 | 4/2002 | Chen et al. | |
| 6,420,443 B1 | 7/2002 | Clark et al. | |
| 6,465,569 B1 | 10/2002 | Kurth | |
| 6,489,391 B1 | 12/2002 | Schilling et al. | |
| 6,495,056 B2 | 12/2002 | Kubo et al. | |
| 6,497,760 B2 | 12/2002 | Sun et al. | |
| 6,518,387 B2 | 2/2003 | Kuo et al. | |
| 6,649,667 B2 | 11/2003 | Clatty | |
| 6,730,299 B1 | 5/2004 | Tayot et al. | |
| 6,797,318 B2 | 9/2004 | Takeuchi et al. | |
| 6,841,101 B2 | 1/2005 | Nakos et al. | |
| 6,852,407 B2 | 2/2005 | Yasue | |
| 6,866,880 B2 | 3/2005 | Bhattacharya et al. | |
| 6,884,756 B2 | 4/2005 | Lynch et al. | |
| 6,893,579 B2 | 5/2005 | Espiard et al. | |
| 7,049,269 B2 | 5/2006 | Hara | |
| 7,060,798 B2 | 6/2006 | Li et al. | |
| 7,071,248 B2 | 7/2006 | Chen et al. | |
| 7,081,159 B2 | 7/2006 | Thames et al. | |
| 7,153,812 B2 | 12/2006 | Hara | |
| 7,175,701 B2 | 2/2007 | Oyasato et al. | |
| 7,226,615 B2 | 6/2007 | Yuksel et al. | |
| 7,252,735 B2 | 8/2007 | Li | |
| 7,253,244 B2 | 8/2007 | Gruenewaelder et al. | |
| 7,265,169 B2 | 9/2007 | Li et al. | |
| 7,285,583 B2 | 10/2007 | Stumphauzer et al. | |
| 7,345,136 B2 | 3/2008 | Wescott et al. | |
| 7,387,795 B2 | 6/2008 | Hollenberg et al. | |
| 7,393,930 B2 | 7/2008 | Li et al. | |
| 7,410,744 B2 | 8/2008 | Watanabe et al. | |
| 7,416,598 B2 | 8/2008 | Sun et al. | |
| 7,625,441 B2 | 12/2009 | Gagnon et al. | |
| 7,704,537 B2 | 4/2010 | Lopez et al. | |
| 7,722,712 B2 | 5/2010 | Li | |
| 7,736,559 B2 | 6/2010 | Rivers et al. | |
| 7,772,313 B2 | 8/2010 | Stumphauzer et al. | |
| 7,781,501 B2 | 8/2010 | Dopico et al. | |
| 7,785,440 B2 | 8/2010 | Li | |
| 7,789,932 B2 | 9/2010 | Anderson et al. | |
| 7,803,855 B2 | 9/2010 | Kintzley et al. | |
| 8,057,892 B2 | 11/2011 | Yang et al. | |
| 8,147,968 B2 | 4/2012 | Brady et al. | |

(56) References Cited

U.S. PATENT DOCUMENTS

| | | |
|---|---|---|
| 8,378,010 B2 | 2/2013 | Browning et al. |
| 8,399,544 B2 | 3/2013 | Varnell et al. |
| 8,465,581 B2 | 6/2013 | Wescott et al. |
| 8,519,031 B2 | 8/2013 | Parker et al. |
| 8,623,931 B2 | 1/2014 | Parker et al. |
| 8,916,668 B2 | 12/2014 | Parker et al. |
| 9,309,444 B2 | 4/2016 | Parker et al. |
| 9,416,303 B2 | 8/2016 | Parker et al. |
| 2002/0005251 A1 | 1/2002 | Sun et al. |
| 2002/0010233 A1 | 1/2002 | Yasue |
| 2003/0148084 A1 | 8/2003 | Trocino |
| 2003/0203136 A1 | 10/2003 | Takeuchi |
| 2003/0212227 A1* | 11/2003 | Stroobants et al. .......... 527/301 |
| 2003/0219615 A1 | 11/2003 | Kikuchi et al. |
| 2003/0224179 A1 | 12/2003 | Skinner et al. |
| 2004/0007156 A1 | 1/2004 | Thames et al. |
| 2004/0025657 A1 | 2/2004 | Hosoi et al. |
| 2004/0170670 A1 | 9/2004 | Smith et al. |
| 2005/0070635 A1 | 3/2005 | Breyer et al. |
| 2005/0113257 A1 | 5/2005 | Lynch et al. |
| 2005/0165220 A1 | 7/2005 | Barker et al. |
| 2005/0166796 A1 | 8/2005 | Sun et al. |
| 2005/0222358 A1 | 10/2005 | Wescott et al. |
| 2005/0234156 A1 | 10/2005 | Thames et al. |
| 2005/0250900 A1 | 11/2005 | Stofko |
| 2005/0257905 A1* | 11/2005 | Shoseyov ................. 162/72 |
| 2005/0272892 A1 | 12/2005 | Hse et al. |
| 2005/0277733 A1 | 12/2005 | Wescott et al. |
| 2005/0282988 A1 | 12/2005 | Li |
| 2006/0116288 A1 | 6/2006 | Mori et al. |
| 2006/0135368 A1 | 6/2006 | Anderson et al. |
| 2006/0156954 A1 | 7/2006 | Li et al. |
| 2006/0194010 A1 | 8/2006 | Hiscock |
| 2006/0231968 A1 | 10/2006 | Cowan et al. |
| 2007/0020476 A1 | 1/2007 | Kintzley et al. |
| 2007/0128542 A1 | 6/2007 | Watanabe et al. |
| 2007/0148339 A1 | 6/2007 | Wescott et al. |
| 2007/0180877 A1 | 8/2007 | Anderson et al. |
| 2007/0244300 A1 | 10/2007 | Schweizer et al. |
| 2007/0281145 A1 | 12/2007 | Khabbaz |
| 2008/0021187 A1 | 1/2008 | Wescott et al. |
| 2008/0027159 A1 | 1/2008 | Rivers et al. |
| 2008/0050602 A1 | 2/2008 | Spraul et al. |
| 2008/0063759 A1 | 3/2008 | Raymond et al. |
| 2008/0063760 A1 | 3/2008 | Raymond et al. |
| 2008/0064852 A1 | 3/2008 | Ddamulira et al. |
| 2008/0095914 A1 | 4/2008 | Deak et al. |
| 2008/0125577 A1 | 5/2008 | Gosnell et al. |
| 2008/0213597 A1 | 9/2008 | Li |
| 2008/0234458 A1 | 9/2008 | West |
| 2008/0255333 A1 | 10/2008 | Trocino |
| 2008/0281069 A1* | 11/2008 | Jennissen ................. 527/200 |
| 2008/0287635 A1 | 11/2008 | Sun et al. |
| 2008/0292886 A1 | 11/2008 | Allen et al. |
| 2009/0013482 A1 | 1/2009 | Kennedy |
| 2009/0013743 A1 | 1/2009 | Lynch et al. |
| 2009/0081468 A1 | 3/2009 | Mortensen |
| 2009/0098387 A1 | 4/2009 | Brady et al. |
| 2009/0197036 A1 | 8/2009 | Hwang et al. |
| 2010/0048875 A1 | 2/2010 | Segall et al. |
| 2010/0063255 A1 | 3/2010 | Logie et al. |
| 2010/0069533 A1 | 3/2010 | Brady et al. |
| 2010/0069534 A1 | 3/2010 | Wescott et al. |
| 2010/0093896 A1 | 4/2010 | Spraul et al. |
| 2010/0240805 A1 | 9/2010 | Miller et al. |
| 2010/0258033 A1 | 10/2010 | Yang et al. |
| 2010/0285295 A1 | 11/2010 | Wang et al. |
| 2010/0305227 A1 | 12/2010 | Parker et al. |
| 2010/0310877 A1 | 12/2010 | Parker et al. |
| 2011/0048280 A1 | 3/2011 | Wescott et al. |
| 2011/0132551 A1 | 6/2011 | Klapdohr et al. |
| 2011/0293934 A1 | 12/2011 | Allen et al. |
| 2011/0311833 A1 | 12/2011 | Parker et al. |
| 2012/0115992 A1 | 5/2012 | Khabbaz et al. |
| 2012/0183794 A1 | 7/2012 | Guo et al. |
| 2013/0065012 A1 | 3/2013 | Parker et al. |
| 2013/0131231 A1 | 5/2013 | Bouguettaya et al. |
| 2013/0224482 A1 | 8/2013 | Brady et al. |
| 2013/0252007 A1 | 9/2013 | Khabbaz |
| 2014/0178695 A1 | 6/2014 | Parker et al. |
| 2014/0235737 A1 | 8/2014 | Parker et al. |
| 2015/0044483 A1 | 2/2015 | Parker et al. |
| 2015/0203730 A1 | 7/2015 | Parker et al. |
| 2015/0267095 A1 | 9/2015 | Parker et al. |
| 2016/0230057 A1 | 8/2016 | Parker et al. |
| 2016/0298012 A1 | 10/2016 | Parker et al. |
| 2016/0304688 A1 | 10/2016 | Parker et al. |
| 2017/0066952 A1 | 3/2017 | Parker et al. |

FOREIGN PATENT DOCUMENTS

| | | |
|---|---|---|
| CN | 101130678 A | 2/2008 |
| EP | 0161043 A2 | 11/1985 |
| EP | 0973640 A1 | 1/2000 |
| EP | 1268702 A2 | 1/2003 |
| EP | 1268702 B1 | 1/2003 |
| EP | 1588628 A1 | 10/2005 |
| EP | 1742542 A2 | 1/2007 |
| EP | 0973640 B1 | 9/2007 |
| EP | 1900642 A1 | 3/2008 |
| EP | 1900650 A1 | 3/2008 |
| EP | 2046880 A1 | 4/2009 |
| EP | 1268702 B2 | 9/2009 |
| EP | 2163590 A1 | 3/2010 |
| EP | 2236578 A1 | 10/2010 |
| EP | 1742542 B1 | 1/2011 |
| GB | 0480097 A | 2/1938 |
| GB | 1065015 A | 4/1967 |
| GB | 2001331 A | 1/1979 |
| JP | 51-73097 | 6/1976 |
| JP | S61217 A | 1/1986 |
| JP | S61233 A | 1/1986 |
| JP | H04-502416 A | 5/1992 |
| JP | H04214475 | 8/1992 |
| JP | H05-507925 A | 11/1993 |
| JP | 2002-249987 A | 9/2002 |
| RU | 2252238 C1 | 5/2005 |
| RU | 2325419 C1 | 5/2008 |
| SU | 064311 A1 | 11/1944 |
| SU | 192330 A | 11/1967 |
| WO | WO-1990006094 A1 | 6/1990 |
| WO | WO-1991019470 A1 | 12/1991 |
| WO | WO-1993019125 A1 | 9/1993 |
| WO | WO-1998043813 A1 | 10/1998 |
| WO | WO-2001059026 A2 | 8/2001 |
| WO | WO-2002062866 A1 | 8/2002 |
| WO | WO-2003075673 A1 | 9/2003 |
| WO | WO-2005035665 A1 | 4/2005 |
| WO | WO-2005072260 A2 | 8/2005 |
| WO | WO-2005099477 A2 | 10/2005 |
| WO | WO-2005100451 A2 | 10/2005 |
| WO | WO-2005113700 A1 | 12/2005 |
| WO | WO-2006041469 A1 | 4/2006 |
| WO | WO-2006112672 A1 | 10/2006 |
| WO | WO-20061327850 A2 | 12/2006 |
| WO | WO-2007008385 A1 | 1/2007 |
| WO | WO-2007033481 A1 | 3/2007 |
| WO | WO-2007064970 A1 | 6/2007 |
| WO | WO-2007086632 A1 | 8/2007 |
| WO | WO-2008011455 A1 | 1/2008 |
| WO | WO-2008024444 A2 | 2/2008 |
| WO | WO-2008118741 A1 | 10/2008 |
| WO | WO-2009013482 A2 | 1/2009 |
| WO | WO-2009048598 A2 | 4/2009 |
| WO | WO-2009086141 A2 | 7/2009 |
| WO | WO-2010031165 A1 | 3/2010 |
| WO | WO-2010065758 A2 | 6/2010 |
| WO | WO-2010102284 A2 | 9/2010 |
| WO | WO-2010102297 A2 | 9/2010 |
| WO | WO-2010120356 A1 | 10/2010 |
| WO | WO-2011025911 A1 | 3/2011 |
| WO | WO-2011097364 A1 | 8/2011 |
| WO | WO-2011150203 A2 | 12/2011 |
| WO | WO-2011156380 A2 | 12/2011 |

(56) References Cited

FOREIGN PATENT DOCUMENTS

| WO | WO-2012076566 A2 | 6/2012 |
|---|---|---|
| WO | WO-2013036739 A1 | 3/2013 |
| WO | WO-2013036774 A1 | 3/2013 |

OTHER PUBLICATIONS

U.S. Appl. No. 15/205,214, Protein-Containing Adhesives, and Manufacture and Use Thereof, filed Jul. 8, 2016.
U.S. Appl. No. 15/711,272, Protein-Containing Adhesives, and Manufacture and Use Thereof, filed Sep. 21, 2017.
U.S. Appl. No. 14/343,521, Protein-Containing Adhesives, and Manufacture and Use Thereof, filed Aug. 22, 2014.
U.S. Appl. No. 14/964,856, Protein-Containing Adhesives, and Manufacture and Use Thereof, filed Dec. 10, 2015.
U.S. Appl. No. 14/417,358, Protein Adhesives Containing an Anhydride, Carboxylic Acid, and/or Carboxylate Salt Compound and Their Use, filed Jan. 26, 2015.
Chinese Office Action dated Oct. 10, 2013 for Chinese Patent Application No. 201080019599.3 (14 pages).
Deanin et al., "Synthetic Resins and Plastics," *Handbook of Industrial Chemistry and Biotechnology*, (11$^{TH}$ Ed, 2007), JA Kent (Ed), Springer Publishing Co. US, New York, NY (Publ), pp.607-9.
English Language Translation of CN1418562 (2003) (3 pages).
English Language Translation of Japanese Patent No. JP2002249987 (2002) (24 pages).
English Language Translation of the Abstract of CN1698453 (2005) (1 page).
International Preliminary Report on Patentability and Written Opinion for International Application No. PCT/US2010/026526, dated Sep. 6, 2011. (11 pages).
International Preliminary Report on Patentability and Written Opinion for International Application No. PCT/US2010/026553, dated Sep. 6, 2011. (7 pages).
International Search Report and Written Opinion for International Application No. PCT/IB2013/02188 dated Mar. 19, 2014 (8 pages).
Pizzi, (2006), "Recent Developments in Eco-Efficient Bio-Based Adhesives for Wood Bonding: Opportunities and Issues," J Adhes Sci Technol, 20(8):829-46.
Kent et al., "Handbook of Industrial Chemistry and Biotechnology," Eleventh Edition, vol. 1, pp. 607-609 (2007).
Nanofil product literature downloaded on Apr. 16, 2017 from http://zeus.plmsc.psu.edu/~manias/news/sud-chemie_nanofil_flier.pdf.
Osman et al."Polyurethane Adhesive Nanocomposites as Gas Permeation Barrier," *Macromolecules* (2003) vol. 36, No. 26, pp. 9851-9858.
Yang, In, et al. "Development of adhesive resins formulated with rapeseed flour akali hydrolyzates for plywood panels," *Journal of the Korean Wood Science and Technology* 38.4 (2010): 323-332 (Jul. 2010).
English-language translation of Yang, In, et al. "Development of adhesive resins formulated with rapeseed flour akali hydrolyzates for plywood panels," *Journal of the Korean Wood Science and Technology* 38.4 (2010): 323-332 (Jul. 2010). (Translation is 31 pages).
Particle Size Conversion Table, http://www.sigmaaldrich.com/chemistry/stockroom-reagents/learning-center/technical-library/particle-size-conversion.html, downloaded on Jun. 22, 2017.
Allen et al. (2010) "Investigations of the Molecular Interactions of Soy-Based Adhesives," Forest Products Journal 60(6):534-540.
Derwent abstract of JPH04214475A (published 1992) (2 pages).
Hettiarachchy et al. (1995) "Alkali-Modified Soy Protein with Improved Adhesive and Hydrophobic Properties," *J. Am. Oil Chem. Soc.* 72(12):1461-1464.
Hettiarachchy et al. (1996) "Preparation and Functional Properties of a Protein Isolate from Defatted Wheat Germ," Cereal Chem. 73(3):364-367.

International Search Report of International Patent Application No. PCT/US2010/026526, dated Mar. 15, 2011 (6 pages).
International Search Report of International Patent Application No. PCT/US2010/026553, dated Nov. 16, 2010 (4 pages).
Javni et al. (2003) "Effect of Different Isocyanates on the Properties of Soy-Based Polyurethanes," Journal of Applied Polymer Science 88:2912-2916.
Kretschmer et al.(1957) "Infrared Spectroscopy and Optical Rotatory Dispersion of Zein, Wheat Gluten and Gliadin," *J. Phys. Chem.* 61:1627-1631.
Kumar et al. (2002) "Adhesives and plastics based on soy protein products," Industrial Crops and Products 16:155-172.
Lambuth, A.L., Soybean Glues, in *Handbook of Adhesives*, 2nd ed., Van Nostrand Reinhold, New York, 1977, pp. 172-180.
Lin et al. (1996) "Physical, Mechanical and Thermal Properties of Water-Blown Rigid Polyurethane Foam Containing Soy Protein Isolate," Cereal Chem 73(2):189-196.
Lin et al. (1997) "Water-Blown Flexible Polyurethane Foam Extended with Biomass Materials," Journal of Applied Polymer Science 65(4):695-703.
Mo et al. (1999) "Effects of Molding Temperature and Pressure on Properties of Soy Protein Polymers," Journal of Applied Polymer Science 73:2595-2602.
Park et al. (1999) "Physical and Mechanical Properties of Soy Protein-Based Plastic Foams," *J. Am. Oil Chem. Soc.* 76:1201-1205.
Shih (1994) "Interaction of Soy Isolate with Polysaccharide and Its Effect on Film Properties," *J. Am. Oil Chem. Soc.* 71(11):1281-1285.
Swain et al. (2005) "Biodegradable Polymers. Part II. Thermal degradation of biodegradable plastics cross-linked from formaldehyde-soy protein concentrate," J. Therm. Anal. Cal. 79:33-38.
Wang et al. (2007) "Soy Protein Adhesion Enhanced by Glutaraldehyde Crosslink," Journal of Applied Polymer Science 104:130-136.
Wang et al. (2009) "Improved Water Resistance of Soy Protein Adhesive at Isoelectric Point," Transactions of the ASABE 52(1):173-177.
Weimer et al. "Wood adhesives prepared from lucerne fiber fermentation residues of *Ruminococcus albus* and *Clostridium thermocellum*," *Appl. Microbiol. Biotechnol.*, vol. 66, pp. 635-640, 2005.
Wu et al. (2001) "Effects of the Molecular Weight on the Properties of Thermoplastics Prepared from Soy Protein Isolate," Journal of Applied Polymer Science 82:3373-3380.
Zhang et al. (2003) "Ways of Strengthening Biodegradable Soy-Dreg Plastics," Journal of Applied Polymer Science 88:422-427.
Zhong et al. (2001) "Properties of soy protein isolate/polycaprolactone blends compatibilized by methylene diphenyl diisocyanate," Polymer 42:6961-6969.
Zhong et al. (2007) "Isoelectric pH of Polyamide-Epichlorohydrin Modified Soy Protein Improved Water Resistance and Adhesion Properties," Journal of Applied Polymer Science 103:2261-2270.
International Preliminary Report on Patentability and Written Opinion of the International Searching Authority of International Patent Application No. PCT/US2011/039453, dated Dec. 10, 2012 (11 pages).
International Search Report and Written Opinion dated Feb. 5, 2013 for International Application No. PCT/US12/54116, International Filing Date Sep. 7, 2012 (9 pages).
International Search Report and Written Opinion dated Feb. 7, 2012 for International Application No. PCT/US2011/039453, International Filing Date Jun. 7, 2011 (20 pages).
International Search Report and Written Opinion dated Nov. 26, 2012 for International Application No. PCT/US12/54124, International Filing Date Sep. 7, 2012 (9 pages).
Lorenz et al., "Analysis of Soy Flour/Phenol-Formaldehyde Adhesives for Bonding Wood", Wood Adhesives Convention 2005, San Diego, CA, Nov. 2-4, 2005: Technical Forum (Poster) Session, p. 501-505, Forest Products Society, Peachtree, GA (Publ).
Mehta, "Proteins Extracted from Oilseed Rape (Canola), Soy or Castor Meals Using a New Technique are Yielding Formaldehyde-free Structural Adhesives Suitable for Use in Wood Composites, Say

(56) References Cited

OTHER PUBLICATIONS

Scientists at Advanced Biopolymer Technologies, in Mantua, USA", Wood Focus Magazine, p. 1-4, (2010).
Paulson et al., "Emulsification Properties of Succinylated Canola Protein Isolate", Journal of Food Science, vol. 53, No. 3, p. 817-820, (1988).
Paulson et al., "Functionality of Modified Plant Proteins in Model Food Systems", J. Inst. Can. Sci. Technol. Aliment., vol. 17, No. 4, p. 202-208, (1984).
Wescott et al., "Durable Soy-Based Adhesive Dispersions", Wood Adhesives Convention 2005, San Diego, CA, Nov. 2-4, 2005: Session 3A—Bio-Based Adhesives, p. 263-269, Forest Products Society, Peachtree, GA (Publ).
Lorenz et al., "Analysis of Soy Flour/Phenol-Formaldehyde Adhesives for Bonding Wood", Wood Adhesives 2005: Technical Forum (Poster) Session, p. 501-505, (2005).

\* cited by examiner

PROTEIN-CONTAINING EMULSIONS AND ADHESIVES, AND MANUFACTURE AND USE THEREOF

CROSS-REFERENCE TO RELATED APPLICATIONS

This application is a continuation of U.S. patent application Ser. No. 13/951,710, filed Jul. 26, 2013, which is a continuation of U.S. patent application Ser. No. 12/719,521, filed Mar. 8, 2010, now U.S. Pat. No. 8,519,031, which claims the benefit of and priority to U.S. Provisional Patent Application No. 61/246,208, filed Sep. 28, 2009, and U.S. Provisional Patent Application No. 61/157,944, filed Mar. 6, 2009, the entire contents each of which is hereby incorporated by reference herein in its entirety.

FIELD OF THE INVENTION

The invention relates to isolated proteins, emulsions and adhesives containing such proteins, and to methods of making and using such proteins, emulsions and adhesives.

BACKGROUND

The use of organic polyisocyanate, epoxy, urea formaldehyde (UF), and phenol formaldehyde resole resins (PF resins), and various combinations of these adhesives is well known for the production of consolidated wood composites such as chipboard, fiberboard, and related composite wood products as well as in making engineered lumber composites. The cure of these resins often is accelerated in these end-use applications by using heated presses with press temperatures exceeding 100° C., and often 200° C. In some specialized structural (or engineered) lumber applications it is often impractical to use heat to drive the cure of the adhesive because the engineered wood composite structures are too large for adequate heat transfer. In these structural applications, adhesives that cure at ambient temperatures are preferable. The challenge in formulating all of these resins is to achieve an adequate balance between the need for rapid cure at elevated or near-ambient temperatures, and to maintain a suitably long working time (or pot life).

Moreover, recent environmental concerns recognized the need for replacing UF and PF resins with more environmentally friendly resins that have the bond strength obtained with the UF resins, while eliminating formaldehyde and providing similar or better moisture resistance for the final product. Although polyisocyanates, for example, PMDI, are capable of providing these characteristics, to-date, many attempts to commercially use PMDI in replacing UF have failed due to cost and processing concerns.

There is still a need in the wood products industry for high performance, lower cost and environmentally cleaner adhesives that perform as well as polyisocyanates. Various attempts have been made to blend polyisocyanate adhesives with other kinds of adhesives but none have had significant commercial success in the certain industries, for example, the commodity wood products industry. The use of isocyanate-functional prepolymers has been extensively studied. Unfortunately, in many cases, the prepolymers simply dilute the performance of the isocyanate. It is, therefore, desirable to have a modifying agent or prepolymerizable species that can be combined with a polyisocyanate or another similar resin in order to reduce the cost of the latter by reducing the amount of polyisocyanate, which is needed without reducing performance such as bond strength and moisture resistance.

SUMMARY OF THE INVENTION

The invention provides emulsions and adhesives, for example, thermosetting adhesives, that contain a polypeptide fraction that can be isolated from variety of starting materials, including renewable plant biomass. An important component that provides the emulsions and adhesives with their advantages is the isolated polypeptide composition. The plant biomass generally is a waste by-product of the agricultural industry and, therefore, the invention provides commercially useful emulsions and adhesives that are environmentally friendly.

Certain of the isolated polypeptide fractions described herein can be use to disperse or emulsify an oil-in-water or water-in-oil. As a result, the polypeptide fractions can be used to disperse oils commonly used in the manufacture of adhesives. Depending upon the formulation chosen, the resulting adhesives perform as well or better than conventional, commercially available high performance adhesives. In addition, the invention provides both one-part adhesives (a single mixture that, without the addition of other components, functions as an adhesive) or two- or multi-part adhesives (adhesives created by mixing together two or more parts, which when mixed together function as an adhesive). In addition, the polypeptides can be used to disperse or emulsify oils during the clean up of oil spills or during tertiary oil recovery. Certain of the isolated polypeptide fractions described herein comprise water-soluble proteins, which can be used to produce water-soluble adhesives. The resulting water-soluble adhesives can be used, for example, to stick paper onto glass. The water-soluble protein can also be cross-linked using conventional cross-linking agents to produce water-resistant adhesives.

In one aspect, the invention provides an adhesive composition comprising: (a) from about 5% to about 90% (w/w) of a reactive prepolymer; and (b) from about 10% to about 99% (w/w) of an isolated polypeptide composition capable of dispersing the reactive prepolymer in an aqueous medium, for example, water or a water-based solution. The water-based solution can contain a plurality of dissolved components and/or can contain a dispersed or emulsified latex polymer.

In certain circumstances, the reactive prepolymer is a polyisocyanate-based prepolymer, an epoxy-based prepolymer, a latex prepolymer, or is a combination thereof. Depending upon the components of the adhesive, the prepolymer and isolated polypeptide composition can be mixed and stored as a mixture until use (for example, when an activator or catalyst is added to the mixture, or where the mixture is stored under conditions so that curing does not occur). Alternatively, when no other additives are needed to initiate a reaction between the reactive prepolymer and the isolated polypeptide composition, the reactive prepolymer and the polypeptide composition are mixed immediately prior to use.

In another aspect, the invention provides a two-part adhesive composition comprising: (a) a first part (Part A) comprising from about 5% to about 90% (w/w) of a reactive prepolymer, wherein the reactive prepolymer is a polyisocyanate-based prepolymer, an epoxy-based prepolymer, or a combination thereof; and (b) a second part (Part B) comprising from about 10% to about 99% (w/w) of an isolated polypeptide composition capable of dispersing the reactive prepolymer in an aqueous medium.

Depending upon the composition of Part A and Part B, Parts A and B are mixed immediately prior to use. In one embodiment, the adhesive, when cured, comprises from about 1% to about 95% (w/w) of non-volatile moieties of Part A and from about 5% to about 99% (w/w) of non-volatile moieties of Part B. Furthermore, depending upon the application and functionality of the adhesive composition, the weight ratio of solids in Part B to the prepolymer can be in the range of from 100:0.1 to 0.1:100.

In each of the foregoing aspects, the polyisocyanate-based prepolymer can be an organic polyisocyanate; or a reaction product between an organic polyisocyanate and, for example, a polypeptide, a polyol, an amine based polyol, an amine containing compound, a hydroxy containing compound, or a combination thereof. Furthermore, in each of the foregoing aspects, the adhesive composition can further comprise a catalyst.

The epoxy-based prepolymer can be an epoxide containing compound. Alternatively, the epoxy-based prepolymer can be a reaction product between an epoxy and, for example, a polypeptide, a polyol, an amine based polyol, an amine containing compound, a hydroxy containing compound, or a combination thereof. The epoxy can be selected from the group consisting of a diglycidyl ether of bisphenol-A, a diglycidyl ether of bisphenol-A alkoxylate, an epoxy novolac resin, expoxidized soy oil, epoxidized linseed oil, epichlorohydrin, a glycidyl ether-type epoxy resin derived from a polyphenol by reaction with epichlorohydrin, and a combination thereof.

In another aspect, the invention provides an adhesive composition comprising: (a) from about 5% to about 90% (w/w) of a reactive prepolymer selected from the group consisting of an organic polyisocyanate, a reaction product between an organic polyisocyanate and a polypeptide, a polyol, an amine based polyol, an amine containing compound, a hydroxy containing compound, or a combination thereof (b) from about 10% to about 99% (w/w) of an isolated polypeptide composition capable of dispersing the reactive prepolymer in an aqueous medium; and (c) an optional catalyst.

In each of the foregoing aspects of the invention, the isolated polypeptide composition is capable of dispersing the reactive prepolymer in the aqueous medium to produce a stable dispersion or a stable emulsion. The dispersion or emulsion exhibits substantially no phase separation by visual inspection for at least 5 minutes after mixing the polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, or 6 hours or more after mixing the polypeptide composition with the reactive prepolymer.

In another aspect, the invention provides an adhesive composition comprising (a) from about 5% to about 90% (w/w) of a reactive prepolymer; and (b) from about 10% to about 90% (w/w) of an isolated water-soluble polypeptide composition comprising one or more of the following features: (a) an amide-I absorption band between about 1633 $cm^{-1}$ and 1680 $cm^{-1}$, as determined by solid state Fourier Transform Infrared Spectroscopy (FTIR); (b) an amide-II band between approximately 1522 $cm^{-1}$ and 1560 $cm^{-1}$, as determined by solid state FTIR; (c) two prominent 1° amide N—H stretch absorption bands centered at about 3200 $cm^{-1}$ and at about 3300 $cm^{-1}$, as determined by solid state FTIR; (d) a prominent cluster of protonated nitrogen nuclei defined by $^{15}N$ chemical shift boundaries at about 94 ppm and at about 100 ppm, and $^1H$ chemical shift boundaries at about 7.6 ppm and at about 8.1 ppm, as determined by solution state, two-dimensional proton-nitrogen coupled NMR; (e) an average molecular weight of between about 600 and about 2,500 Daltons; (0 an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing (See Example 34). Such adhesives optionally contain a catalyst, and the reactive prepolymer can be a polyisocyanate-based prepolymer, an epoxy-based prepolymer, a latex prepolymer, or a combination thereof. The adhesive can be a water-soluble adhesive that facilitates the adherence of, for example, paper to solid support. Once wetted, the paper can be removed from the solid support.

In each of the foregoing aspects of the invention, the organic polyisocyanate can be selected from the group consisting of polymeric diphenylmethane diisocyanate (PMDI), 4,4'-methylenediphenyl, diisocyanate (4,4'-MDI), 2,4-methylenediphenyl, diisocyanate (2,4-MDI), or a combination thereof. Under certain circumstances, the polyisocyanate-based reactive prepolymer is a polymer comprising one or more terminal reactive isocyanate groups.

The polyol in the prepolymer composition can be an amine alkoxylate, poly oxypropylene glycol, polyoxyethylene glycol, polytetramethylene glycol, poly ethylene glycol, propylene glycol, propane diol, glycerin, or a mixture thereof.

When a catalyst is used, the catalyst can be a primary amine, a secondary amine, a tertiary amine, an organometallic compound, or a combination thereof. Exemplary primary amines include, for example, methylamine, ethylamine, propylamine, cyclohexylamine, and benzylamine. Exemplary secondary amines include, for example, dimethylamine, diethylamine, and diisopropylamine. Exemplary tertiary amines include, for example, diazabicyclooctane (Dabco), triethylamine, dimethyl benzylamine, bis-dimethylaminoethyl ether, tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine, N,N,N,N-tetramethylhexane-1, 6-diamine, 2,2'-dimorpholinodiethyl ether (DMDEE), or a mixture thereof. Exemplary organometallic compounds include, for example, di-n-octyl tin mercaptide, dibutyl tin maleate, diacetate, dilaurate, dichloride, bis-dodecyl mercaptide, tin(II)acetate, ethyl hexoate and diethyl hexoate, $Fe^{+3}$ 2,4-pentanedionate (FeAcAc), or lead phenyl ethyl dithiocarbamate. Further exemplary organometallic compounds include, for example, a transition metal acetylacetonates, e.g., an acetylacetonate compound comprising iron, copper, or nickel.

In each of the aspects of the invention, the isolated polypeptide composition can be derived from renewable agricultural biomass. The starting material for the isolated polypeptide composition, which can be a meal or a protein isolate, can be derived from one or more of corn, wheat, sunflower, cotton, rapeseed, canola, castor, soy, camelina, flax, jatropha, mallow, peanuts, algae, sugarcane bagasse, tobacco, whey, or a combination thereof.

Depending upon the processing steps employed, the polypeptide composition can comprise digested or hydrolyzed protein. Digestion can be facilitated using one or more enzymes, and hydrolysis can be facilitated using one or more chemicals, for example, acid- or alkali-based hydrolysis. With regard to enzymatic hydrolysis, a number of enzymes may be used including, for example, serine-, leucine-, lysine-, or arginine-specific proteases.

In certain embodiments, the isolated polypeptide composition is a water-insoluble/water dispersible protein fraction. However, depending upon the method of isolation, the isolated polypeptide composition can also contain water-soluble proteins. A water-insoluble/water dispersible protein fraction useful in making adhesives of the invention, in particular, moisture resistant adhesives, comprises one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons, (iv) two protonated nitrogen clusters defined by $^{15}N$ chemical shift boundaries at about 86.2 ppm and about 87.3 ppm, and $^{1}H$ chemical shift boundaries at about 7.14 ppm and 7.29 ppm for the first cluster, and $^{1}H$ chemical shift boundaries at about 6.66 ppm and 6.81 ppm for the second cluster, as determined by solution state, two-dimensional proton-nitrogen coupled NMR, and (v) is capable of dispersing an oil-in-water or water-in-oil to produce a homogeneous emulsion that is stable for least 5 minutes.

In certain embodiments, the water-insoluble polypeptide composition is dispersible in water or other solvent and facilitates the dispersion of oil-in-water or water-in-oil to produce a stable dispersion or a stable emulsion. The dispersion or emulsion exhibits substantially no phase separation by visual inspection for at least 5 minutes after mixing the polypeptide composition with the oil. In certain embodiments, the dispersion or emulsion exhibits substantially no phase separation by visual inspection for at least 10, 15, 20, 25, or 30 minutes, or even 1, 2, 3, 4, 5, or 6 hours or more after mixing the polypeptide composition with the oil. Exemplary oils that can be emulsified or dispersed by the isolated polypeptide fraction include, for example, an organic polyisocyanate (for example, PMDI, 4,4'-methylenediphenyl, diisocyanate (4,4'-MDI), 2,4-methylenediphenyl, diisocyanate (2,4-MDI), 2,2-methylenediphenyl diisocyanate (2,2-MDI), monomeric MDI, or PMDI that has been reacted with a hydroxyl-functional compound such as a polyol), mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, tributyl o-acetylcitrate, linseed oil, an adipate ester, a sebacate ester, a phthalate ester, and a citrate ester. Further exemplary oils that can be emulsified or dispersed by the isolated polypeptide fraction include, for example, an azelaic ester, a benzoate ester, a glycol derivative, an epoxy derivative, a phosphate ester. In an exemplary assay, 14 parts (by weight) of a protein sample of interest is mixed with 86 parts (by weight) of water and the resulting solution or dispersion is mixed with 14 parts (by weight) of oil, for example, PMDI (see Example 34). Under these conditions, the water-insoluble protein fraction facilitates the creation of a dispersion or emulsion that exhibits substantially no phase separation by visual inspection for at least 5 minutes after mixing the polypeptide composition with the oil. The same assay can be conducted using the other oils.

The adhesive compositions of the invention, in addition to containing a water-insoluble/water dispersible protein fraction can also include a water-soluble protein fraction. Depending upon the composition of the adhesive, the ratio of the water-soluble protein fraction to the water-insoluble/water dispersible polypeptide fraction ranges from 0:1 to 3:2 (w/w). Alternatively, the weight ratio of the water-insoluble/water dispersible polypeptide fraction to the water-soluble protein fraction can be at least 1:1.

In another aspect, the invention provides an isolated polypeptide composition comprising a plurality of water-insoluble polypeptides derived from a variety of starting materials including, for example, castor, soy, canola, corn, wheat, sunflower, cotton, rapeseed, camelina, flax, jatropha, mallow, peanuts, algae, sugarcane bagasse, tobacco or whey, or a combination thereof. Where appropriate, the starting material can be a meal or a protein isolate derived from each of the foregoing. The isolated polypeptide composition is capable of dispersing or emulsifying an oil in water or water in oil. The oil can be selected from the group consisting of an organic polyisocyanate (for example, PMDI, 4,4'-methylenediphenyl, diisocyanate (4,4'-MDI), 2,4-methylenediphenyl, diisocyanate (2,4-MDI), 2,2-methylenediphenyl, diisocyanate (2,2-MDI), monomeric MDI, or PMDI that has been reacted with a hydroxyl-functional compound such as a polyol), mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, tributyl o-acetylcitrate, linseed oil, an adipate ester, a sebacate ester, a phthalate ester, and a citrate ester. The isolated water-insoluble/water dispersible polypeptide composition has a variety of applications, which include, for example, dispersing an oil-based prepolymer in the manufacture of an adhesive or binder, dispersing an oil or plasticizer in the manufacture of a thermoplastic or thermosetting material, dispersing an oil for use in cosmetics or pharmaceuticals, or dispersing oils after an oil spill or during tertiary oil recovery.

The water-insoluble/water dispersible polypeptide composition comprises one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}N$ chemical shift boundaries at about 86.2 ppm and about 87.3 ppm, and $^{1}H$ chemical shift boundaries at about 7.14 ppm and 7.29 ppm for the first cluster, and $^{1}H$ chemical shift boundaries at about 6.66 ppm and 6.81 ppm for the second cluster, as determined by solution state, two-dimensional proton-nitrogen coupled NMR, and (v) is capable of emulsifying oil in water to produce a homogeneous emulsion that is stable by visual inspection for least 5 minutes.

In certain embodiments, the water-insoluble polypeptide composition is capable of dispersing oil in water to produce a homogeneous emulsion or dispersion that is stable, by visual inspection, for at least 5 minutes. In certain embodiments, the dispersion or emulsion exhibits substantially no phase separation by visual inspection for at least 10, 15, 20, 25, or 30 minutes, or even 1, 2, 3, 4, 5, or 6 hours after mixing the polypeptide composition with the oil. The polypeptide composition is isolated by extraction under neutral or basic conditions, by enzyme digestion, or a combination thereof. Furthermore, the polypeptide composition is substantially free of primary amines, carboxylic acids, amine salts, and carboxylate salts.

One or more of the isolated polypeptide composition can be used to make an adhesive composition, as described herein. Depending upon the protein fractions used and/or the inclusion of certain additives, the resulting adhesives can be water-soluble or moisture resistant.

The adhesive composition can further include one or more compounds selected from the group consisting of an organic polyisocyanate; a reaction product between an organic polyisocyanate and, for example, a polypeptide, a polyol, an amine based polyol, an amine containing compound, a hydroxy containing compound, or a combination thereof, an epoxy containing compound, a reaction product between an epoxy containing compound and, for example, a polypeptide, a polyol, an amine based polyol, an amine containing compound, a hydroxy containing compound, or a combination thereof; an organosilane; a polymer latex; a polyurethane; and a mixture thereof.

In another aspect, the invention provides a method of producing a water-insoluble polypeptide composition capable of dispersing or emulsifying an oil in water or a water in oil. The method comprising the steps of (a) incubating an aqueous solution comprising a dissolved or dispersed starting material, for example, canola meal, canola protein isolate, castor meal, castor protein isolate, soy meal, or soy protein isolate, or a combination thereof, at a pH in the range from about 6.5 to about 13 for at least 5 minutes; (b), after step (a), reducing the pH to about 4.0-5.0 thereby to precipitate both a portion of water soluble protein and water insoluble protein; (c) harvesting the protein precipitated in step (b); and (d) washing the protein harvested in step (c) thereby to produce an isolated polypeptide composition.

In certain embodiments, the method further comprises one or more of the following steps: enzymatically digesting the meal or protein isolate before step (a), after step (a), or both before and after step (a); enzymatically digesting the precipitate produced in step (b); enzymatically digesting the polypeptide composition isolated in step (c); and enzymatically digesting the polypeptide composition isolated in step (d). In addition, the polypeptide composition can be used as is after preparation or dried and stored until use. In addition, the invention provides an isolated polypeptide composition produced by each of the foregoing methods.

Furthermore, water-soluble protein, which can also be used in the adhesives of the invention, can be produced, for example, from the supernatant produced in step (a), in step (b), etc.

In another aspect, the invention provides a stable emulsion or dispersion, for example, an aqueous emulsion or dispersion, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion or dispersion optionally comprises from about 1% to about 50% (w/w) of oil and from about 1% to about 99% (w/w) of the isolated polypeptide composition. The isolated protein composition is capable of being dispersed in water and comprises one or more of the following features: (i) an amide-I absorption band between about 1620 cm-1 and 1632 cm-1 and an amide-II band between approximately 1514 cm-1 and 1521 cm-1, as determined by solid state FTIR, (ii) a prominent 2° amide N—H stretch absorption band centered at about 3272 cm-1, as determined by solid state FTIR, (iii) an average molecular weight of between about 600 and about 2,500 Daltons (determined using, for example, MALDI mass spectrometry), (iv) two protonated nitrogen clusters defined by $^{15}$N chemical shift boundaries at about 86.2 ppm and about 87.3 ppm, and $^1$H chemical shift boundaries at about 7.14 ppm and 7.29 ppm for the first cluster, and $^1$H chemical shift boundaries at about 6.66 ppm and 6.81 ppm for the second duster, as determined by solution state, two-dimensional proton-nitrogen coupled NMR, and (v) is capable of dispersing an oil in water to produce a homogeneous emulsion that is stable for least 5 minutes. The oil can be selected from the group consisting of an organic polyisocyanate (for example, PMDI, 4,4'-methylenediphenyl, diisocyanate (4,4'-MDI), 2,4-methylenediphenyl, diisocyanate (2,4-MDI), 2,2-methylenediphenyl, diisocyanate (2,2-MDI), monomeric MDI, or PMDI that has been reacted with a hydroxyl-functional compound such as a polyol), mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, tributyl o-acetylcitrate, linseed oil, an adipate ester, a sebacate ester, a phthalate ester, and a citrate ester.

In certain embodiments, the polypeptide composition has a polydispersity index (PDI) of between about 1 and 1.15. In certain other embodiments, the polypeptide composition has a polydispersity index (PDI) of between about 1 and 1.75, or between about 1 and 3. In certain embodiments, the emulsion exhibits substantially no phase separation by visual inspection for at least 5 minutes after mixing the polypeptide composition with the oil. In addition, the invention provides an adhesive composition comprising the stable emulsions described herein.

In another aspect, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first surface to the second surface. The method optionally also comprises the step of, after step (b), permitting the adhesive composition to cure, which can be facilitated by the application of pressure, heat or both pressure and heat.

In another aspect, the invention provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article or both the first and second articles are lignocellulosic materials, or composite materials containing lignocellulosic material. The first article, the second article or both the first and second articles can comprise a metal, a resin, a ceramic, a polymer, a glass or a combination thereof. The first article, the second article, or both the first article and the second article can be a composite. In addition, the invention provides an article produced by each of the foregoing methods of manufacture.

In addition, the invention provides an article comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. The invention provides an article (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, extruded wood, or fiberglass. The composite can be a thermosetting composite or a thermoplastic composite.

In certain embodiments, the article comprises a lignocellulosic component. Furthermore, the article can comprise paper, wood, glass, fiberglass, wood fiber, ceramic, ceramic powder, or a combination thereof. In certain embodiments, the adhesive can comprise an organic polyisocyanate, for example, from about 30% to about 70% (w/w) of an organic polyisocyanate. In certain embodiments, polyisocyanate forms a polyurethane that comprises from about 1% to about 25% (w/w) of the article.

Depending upon the adhesive used, the resulting article can have one or more of the following features: the article is moisture resistant; the article remains intact after boiling in water for 5 minutes; two or more components of the article remain bonded after boiling in water for 5 minutes; the article, when boiled in water for 5 minutes, displays less than a 20% increase in volume relative to the article prior to exposure to the water; and when the article (for example, a composite material, laminate, or a laminate containing a composite material) contains a lignocellulosic material in the composite material or laminate, the article exhibits no less than 50%, optionally no less than 75%, cohesive failure of the lignocellulosic component when the article is placed under a loading stress sufficient to break the article. In certain embodiments, the article exhibits no less than 50% cohesive failure of the lignocellulosic component when the article is placed under a loading stress sufficient to break the article.

These and other aspects and features of the invention are described in the following detailed description and claims.

BRIEF DESCRIPTION OF THE DRAWINGS

The foregoing and other objects, features and advantages of the invention will become apparent from the following description of preferred embodiments, as illustrated in the accompanying drawings. Like referenced elements identify common features in the corresponding drawings. The drawings are not necessarily to scale, with emphasis instead being placed on illustrating the principles of the present invention, in which.

DETAILED DESCRIPTION

The invention provides emulsions, dispersions and adhesives that contain a polypeptide composition (protein fraction) isolatable from a variety of starting materials, including, for example, renewable plant biomass. An important component that facilitates production of the emulsions, dispersions, and adhesives is the particular polypeptide composition isolated from the plant biomass. Because the starting material for the polypeptide composition generally is a waste by-product from the agricultural industry that typically is incinerated or discarded, the invention provides commercially useful emulsions, dispersions, and adhesives that also are environmentally friendly.

Certain polypeptide compositions described herein, for example, the isolated water-insoluble/water dispersible protein fractions, can be used to disperse or emulsify oils in water or water in oil. As a result, such polypeptide compositions can be used to disperse oils commonly used in the manufacture of adhesives and, as such, can provide significant benefits to the adhesive industry as well as to industries that use large volumes of adhesive. Up till now, it has been difficult to cost effectively produce large volumes of non-formaldehyde containing, high performance glues, such as urea formaldehyde and phenol formaldehyde adhesives. Although it has been possible to produce high performance glues using isocyanates, the cost associated with such adhesives has prevented their widespread adoption into industries that use large volumes of adhesives, for example, the wood composite industry. The polypeptide fractions described herein, however, address this long felt need because, under certain circumstances, they permit the manufacture of high performance adhesives that use much less isocyanate than currently available isocyanate-based high performance glues. Furthermore, an additional advantage is that the polypeptide fractions described herein permit the dispersion of isocyanates, for example, PMDI, into large volumes that make it easy to apply the resulting adhesives over large surfaces, which may be needed, for example, in the wood composite industry.

In addition, the isolated water-soluble protein fractions can be used to manufacture water-soluble adhesives. These adhesives are particularly useful when it is desirable to dissolve the adhesive and permit the separation of previously bonded articles. In one embodiment, the water-soluble adhesives can be used to stick paper onto a solid support, for example, glass (for example, a bottle or jar).

The invention provides both single-pot, one-part adhesives (a single mixture that, without the addition of other components, functions as an adhesive) or two- or multi-part adhesives (adhesives created by mixing together two or more parts, which when mixed together function as an adhesive).

Figure 1:
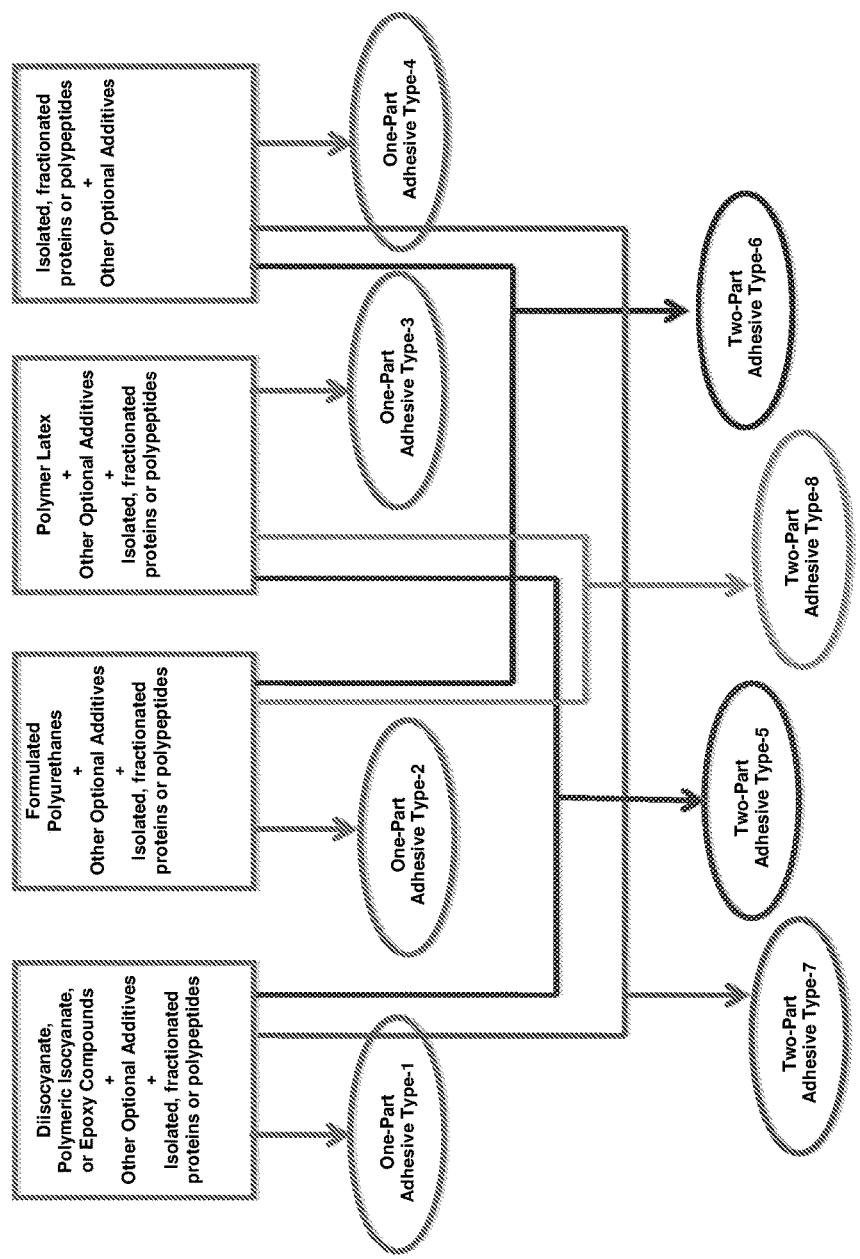
FIG. 1 is a flow chart showing adhesives that can be produced using the isolated polypeptide fractions described herein.

FIG. 1 shows a variety of one-part and two-part adhesives that can be produced using the water-insoluble/water dispersible protein fractions described herein.

For example, a first type of one-part adhesive (denoted a Type-1 adhesive) can be produced by mixing either i) isolated, fractionated water-insoluble/water dispersible proteins, or ii) isolated, fractionated, water-soluble proteins, or iii) a mixture of thereof, with a diisocyanate-based prepolymer, a polymeric isocyanate-based prepolymer, an epoxy-based prepolymer or a combination thereof in the presence of other optional additives (for example, a catalyst). For example, such one-part adhesives can be made by reacting PMDI with a polypeptide composition described above. As described in more detail below, these one-part adhesives can further comprise a polyol that is co-reacted with the PMDI and the polypeptide at the same time in one pot, or reacted in sequence by sequential addition into a single pot. Such compositions can serve as stand-alone one-part adhesives, or can be used as the Part-A component in a two-part system. A second type of one-part adhesive (denoted a Type-2 adhesive) can be produced by mixing either i) isolated, fractionated water-insoluble/water dispersible proteins, or ii) isolated, fractionated, water-soluble proteins, or iii) a mixture of thereof, with a formulated polyurethane in the presence of other optional additives. A third type of one-part adhesive (denoted a Type-3 adhesive) can be produced by mixing either i) isolated, fractionated water-insoluble/water dispersible proteins, or ii) isolated, fractionated, water-soluble proteins, or iii) a mixture of thereof, with a latex polymer in the presence of other optional additives. A fourth type of one-part adhesive (denoted a Type-4 adhesive) can be produced by mixing either i) isolated, fractionated water-insoluble/water dispersible proteins, or ii) isolated, fractionated, water-soluble proteins, or iii) a mixture of thereof, with other optional additives. One embodiment of a Type-4 adhesive is a water-soluble adhesive that contains the water-soluble protein composition with other optional additives. These adhesives can be used, for example, to adhere paper to glass. Another embodiment of a Type-4 adhesive is a water-insoluble adhesive that contains the water-soluble protein composition with other optional additives. Depending upon their composition, each of the one-part adhesives (i.e., each of the Type-1, Type-2, Type-3, or Type-4 adhesives) can be used as an adhesive without the addition of other components.

However, two-part adhesives, for example, as shown in FIG. 1, can be prepared by mixing together two or more of the one-part adhesives. The one-part adhesives used in these applications are stable on their own but when mixed with second, different one-part adhesive, the resulting mixture creates an adhesive composition. Exemplary two-part adhesives, as shown in FIG. 1, can be created by combining (i) the Type 1 and Type 3 adhesives to produce a fifth type of adhesive (denoted Type-5 adhesive), (ii) the Type 2 and Type 4 adhesives to produce a sixth type of adhesive (denoted Type-6 adhesive); (iii) the Type 1 and Type 4 adhesives to produce a seventh type of adhesive (denoted Type-7 adhesive), and (iv) the Type 2 and Type 3 adhesives to produce an eight type of adhesive (denoted Type-8 adhesive).

As will be discussed in more detail below, the adhesives described herein can be used in the production of a variety of wood based products including composite materials, laminates, and laminates that contain composite materials. For example, the adhesives can be used in the production of consolidated wood composites, for example, chipboard (also known as OSB), fiberboard, and related composite wood products, as well as in the in the production of engineered lumber composites, for example, I-beams (I-joists), laminated veneer lumber (LVL), and other types of structural lumber composites.

By way of example, the adhesives described herein, for example, the polyisocyanate containing adhesives, have a number of important advantages in the production of wood-based (lignocellulosic) composites relative to other commonly used wood adhesives. The advantages include higher moisture tolerance and the lack of formaldehyde emissions. Unfortunately, polyisocyanate-based resins generally are more expensive than formaldehyde-based resins. As a result, the cost penalty has limited the penetration of isocyanate-based adhesives into major sectors of the commodity wood products industry, which include the particleboard sector, the plywood sector, or the fiberboard sector. The adhesives described herein, by including high concentrations of the water-insoluble/water dispersible protein and a lower amount of polyisocyanate, permit the manufacture of adhesives that perform as well as or better than conventional adhesives that contain higher amounts of polyisocyanate. As a result, the resulting adhesives permit high adhesive loading without adversely affecting overall costs of the final product.

Furthermore, in addition to their use in adhesives, the water-insoluble/water dispersible proteins described herein can be used to disperse or emulsify oils during the clean up of oil spills or during tertiary oil recovery. In addition, the water-insoluble protein fractions can also be used in the cosmetic, food and pharmaceutical industries in applications that require the emulsification or dispersion of oils.

The following sections describe the isolation and characterization of polypeptide compositions useful in making emulsions, dispersions and adhesives, the choice of suitable prepolymers and other additives that can be combined with the polypeptide compositions, methods for making emulsions, dispersions and adhesives, as well as certain applications and uses of the emulsions, dispersions and adhesives described herein.

I. Isolation and Characterization of Polypeptide Fractions

Different protein fractions derivable from renewable plant biomass have different compositions, and as a result can be used in a variety of different applications. For example, the water-insoluble/water dispersible protein fractions can be used to disperse or emulsify an oil in water or water in oil. As a result, these protein fractions can be used to disperse conventional oils (for example, reactive oils, or an organic polyisocyanate, which is a reactive prepolymer) that are used to make water and moisture resistant adhesives. These protein fractions can also be used alone or with optional additives such as polymer latexes to form moisture resistant adhesives (such as to adhere a paper label to a glass bottle or jar). Alternatively, the water soluble protein fractions can also be used to make water soluble adhesives that dissolve in water. Such adhesives, as described below, can optionally contain additives. As a result, these adhesives can be used to, for example, adhere paper to glass (for example, to adhere a paper label to a glass bottle or glass jar, or to adhere an inspection sticker to a windshield). In addition, the water-insoluble/water-dispersible protein fraction as well as the water-soluble protein fraction can be used in the synthesis of foams, which are described in detail in U.S. patent application having 12/719,721, filed on Mar. 8, 2010, the disclosure of which is incorporated by reference herein.

The terms "protein" and "polypeptide" are used synonymously and refer to polymers containing amino acids that are joined together, for example, via peptide bonds or other bonds, and may contain naturally occurring amino acids or modified amino acids. The polypeptides can be isolated from natural sources or synthesized using standard chemistries. The polypeptides may be modified or derivatized by either natural processes, such as post-translational processing, or by chemical modification techniques well known in the art. Modifications or derivatizations may occur anywhere in the polypeptide, including, for example, the peptide backbone, the amino acid side-chains and the amino or carboxyl termini. Modifications include, for example, cyclization, disulfide bond formation, demethylation, deamination, formation of covalent cross-links, formation of pyroglutamate, formylation, gamma-carboxylation, glycosylation, GPI anchor formation, hydroxylation, iodination, methylation, myristolyation, oxidation, pegylation, proteolytic digestion, phosphorylation, etc. As used throughout, the term "isolated" refers to material that is removed from its original environment (e.g., the natural environment if it is naturally occurring).

The starting material for producing the isolated polypeptide compositions (which can be a meal or a protein isolate) can be derived from one or more of corn, wheat, sunflower, cotton, rapeseed, canola, castor, soy, camelina, flax, jatropha, mallow, peanuts, algae, sugarcane bagasse, tobacco, or whey. It is understood that the water-insoluble/water dispersible protein fraction can be produced by a number of approaches, which are described in detail throughout the Examples. A crude water-insoluble/water dispersible protein fraction can be isolated from caster meal by washing with water to remove water-soluble proteins and water-soluble components from the mixture (see Example 29). Alternatively, a crude water-insoluble/water dispersible protein fraction can be isolated from, for example, soy protein isolate or from soy flour by washing with water to remove water-soluble proteins and water-soluble components from the respective soy protein isolate or the water-flour mixture. Although the crude water-insoluble/water dispersible protein fraction can disperse a number of oils (see Example 29), depending upon the particular application it can be advantageous to isolate a more pure form of the water-insoluble/water dispersible protein fraction (see Example 34). One approach for preparing the water-insoluble/water dispersible protein fraction is shown schematically in FIG. 2.

Figure 2:
FIG. 2 is a flow chart showing the steps of an exemplary method for producing isolated polypeptide compositions useful in the practice of the invention.
Figure 3:
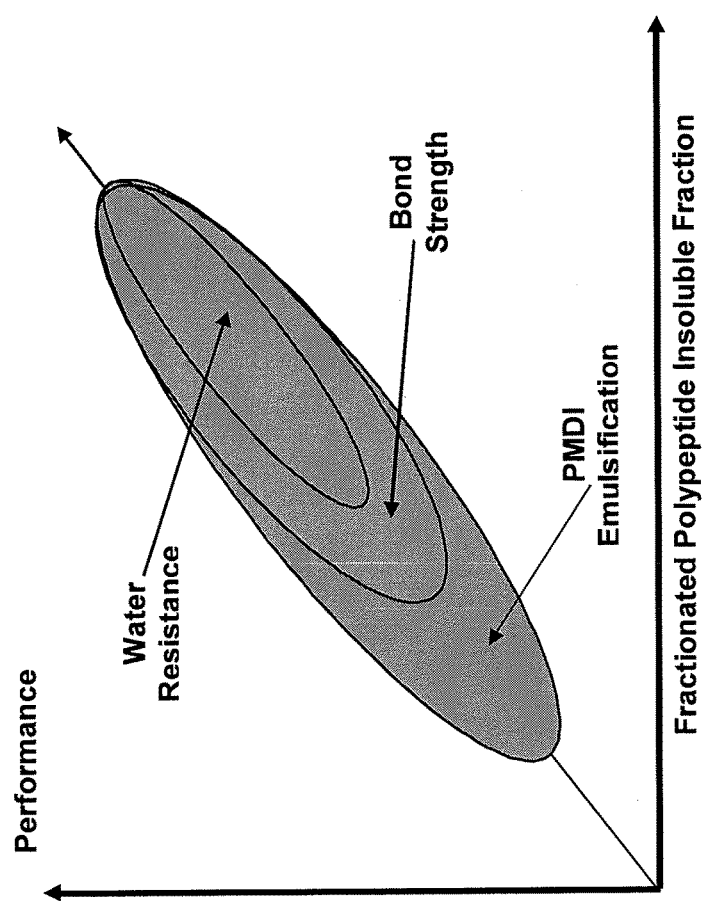
FIG. 3 is a graph showing the relationship between the concentration of the water-insoluble/water dispersible protein and the performance of an adhesive (or binder) produced using the protein.

As shown in FIG. 2, the starting material (for example, ground meal) is dispersed in alkaline, aqueous media at pH 6.5-13 for at least 5 minutes, at least 20 minutes, at least 40 minutes or at least 1 hour, to form a mixture. Starting materials include, for example, canola meal, canola protein isolate, castor meal, castor protein isolate, soy meal, or soy protein isolate, or a combination thereof. Then, the pH of the mixture is lowered by the addition of acid (to provide a mixture with a pH in the range of, for example, 4.0-5.0) to precipitate both a portion of water-soluble proteins and water-insoluble proteins. Then, the water-insoluble material (i.e., the precipitate) is harvested. The harvested material is washed with water and the remaining water-insoluble/water dispersible material is harvested. An exemplary large scale procedure is exemplified Example 31. In addition, as shown in FIG. 2, the water-soluble proteins can be harvested at a number of places, for example, after the starting material is mixed in aqueous media, after neutralization, and as a supernatant from the washing steps. The resulting protein can be used as is or dried using drying techniques known in the art.

It is understood that the process can also include one or more enzyme digestion and/or chemical hydrolysis steps. Digestion can be facilitated using one or more enzymes, and hydrolysis can be facilitated using one or more chemicals, for example, acid- or alkali-based hydrolysis. For example, the starting material (for example, the ground meal) can be exposed to enzymatic digestion before or after, or both before and after the incubation of the starting material in the alkaline aqueous media. Alternatively, or in addition, an enzymatic digestion step can be performed on the material following addition of acid to provide a mixture with a pH in the range of 4.0 to 5.0. Alternatively, or in addition, the harvested water-insoluble/water dispersible material after harvesting can be exposed to enzymatic digestion prior to washing. Alternatively, or in addition, the material harvested after washing can be exposed to enzymatic digestion. Chemical hydrolysis, however, can occur with or replace the enzymatic digestion steps noted above.

Under certain circumstances residual basic species and alkali metals present in chemically digested proteins are not compatible with polyisocyanates and can cause trimerization of the isocyanate groups, leading to stability problems in the final polyisocyanate compositions. Enzymatic digestion, however, can be used to avoid or reduce isocyanate stability problems associated with some chemical hydrolysis steps.

It is understood that enzymes useful in the digestion of the protein fractions include endo- or exo-protease of bacterial, fungal, animal or vegetable origin or a mixture of thereof. Useful enzymes include, for example, a serine-, leucine-, lysine-, or arginine-specific protease. Exemplary enzymes include trypsin, chymotrypsins A, B and C, pepsin, rennin, microbial alkaline proteases, papain, ficin, bromelain, cathepsin B, collagenase, microbial neutral proteases, carboxypeptidases A, B and C, camosinase, anserinase, V8 protease from *Staphylococcus aureus* and many more known in the art. Also combinations of these proteases may be used.

Also commercially available enzyme preparations such as, for example, Alcalase®, Chymotrypsine 800s, Savinase®, Kannase®, Everlase®, Neutrase®, Flavourzyme® (all available from Novo Nordisk, Denmark), Protex 6.0L, Peptidase FP, Purafect®, Purastar OxAm®, Properase® (available from Genencor, USA), Corolase L10 (Rohm, Germany), Pepsin (Merck, Germany), papain, pancreatin, proleather N and Protease N (Amano, Japan), BLAP and BLAP variants available from Henkel, K-16-like proteases available from KAO, or combinations thereof. Table 1 describes the amino acid specificity of certain useful endonucleases.

TABLE 1

| No | Amino Acid | Notation | Commercial Endopeptidase(s) |
|---|---|---|---|
| 1 | Alanine | A | Pronase ®; Neutrase ®: |
| 2 | Cysteine | C | Papain |
| 3 | Aspartic | D | Fromase ®; |
| 4 | Glutamic | E | Alcalase ®; |
| 5 | Phenylalanine | F | Neutrase ®: Fromase ® |
| 6 | Glycine | G | Flavorzyme ®; Neutrase ®: |
| 7 | Histidine | H | Properase ®; |
| 8 | Isoleucine | I | Neutrase ®: |
| 9 | Lysine | K | Alcalase ®; Trypsin; Properase ® |
| 10 | Leucine | L | Alcalase ®; Esperase ®; Neutrase ®: |
| 11 | Methionine | M | Alcalase ®; Neutrase ®: |
| 12 | Asparigine | N | Savinase ®; Flavourzyme ®; Duralase ®; |
| 13 | Proline | P | Pronase ®; Neutrase ®: |
| 14 | Glutamine | Q | Alcalase ® |
| 15 | Arginine | R | Trypsin; Properase ®; |
| 16 | Serine | S | Savinase ®; Flavourzyme ®; Duralase ®; |
| 17 | Threonine | T | Savinase ®; Flavourzyme ®; Duralase ®; |
| 18 | Valine | V | Neutrase ®: |
| 19 | Tryptophane | W | Neutrase ®: Fromase ® |
| 20 | Tyrosine | Y | Alcalase ®; Esperase ®; Fromase ® |

Depending upon the choice enzyme(s), enzymatic digestion usually is conducted under aqueous conditions at the appropriate pH conditions (for example, depending upon the enzyme or enzyme mixture at neutral or at low pH). In certain digestion systems, the digestion optimally occurs at a pH less than 9, or less than 8. For certain applications the pH of the aqueous protein digestion system is in the range of 3-9, 4-8 or 5-7.5.

Once digestion has proceeded to the desired extent, the resulting product optionally is washed and used as is or dried to form a powder. The drying can be performed by techniques known in the art, including spray drying, freeze drying, oven drying, vacuum drying, or exposure to desiccating salts (such as phosphorous pentoxide or lithium chloride).

The water-insoluble/water dispersible material produced according to the preferred method in FIG. 2 can disperse or emulsify oil in water or water in oil. The physical and chemical properties of the water-soluble/water dispersible fraction are described in more detail below. The resulting water-soluble protein fraction can be used as a water-soluble adhesive, for example, attaching paper to a substrate, for example, a glass jar or bottle (see Example 21). The physical and chemical properties of the water-soluble protein fraction are described in more detail below.

In certain embodiments, the proteins in the isolated protein fractions are further derivatized. Suitable processes for derivatization of the polypeptide fractions are provided in the literature. The nature and extent of modification will depend in large part on the composition of the starting material. The derivative can be produced by, for example, replacing at least a portion of primary amine groups of said isolated protein with hydroxyl groups, deaminating the protein, or replacing a portion of amide groups of the protein with carboxyl groups, etc. In other embodiments, the isolated polypeptide compositions described herein are obtained by reacting the protein with protein modifying agents, for example, nitrous oxide, nitrous acid, salts of nitrous acid, or a combination thereof.

A. Characterization of the Water-Insoluble/Water Dispersible Protein Fraction

As discussed, one of the unexpected properties of the water-insoluble/water dispersible protein fraction is that it is capable of dispersing oil in water or water in oil (see Examples 30, 33 and 34). The protein fraction that has these properties generally includes one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}N$ chemical shift boundaries at about 86.2 ppm and about 87.3 ppm, and $^1H$ chemical shift boundaries at about 7.14 ppm and 7.29 ppm for the first cluster, and $^1H$ chemical shift boundaries at about 6.66 ppm and 6.81 ppm for the second cluster, as determined by solution state, two-dimensional proton-nitrogen coupled NMR.

As described above, water-insoluble/water dispersible fraction is capable of suspending or emulsifying oil in water or water in oil to produce a homogeneous suspension or emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, 24 hours after mixing the polypeptide composition with the oil. As shown in Example 34, the water-insoluble/water dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water dispersible protein fraction produces a dispersion or emulsion exhibits substantially no phase separation by visual inspection for at least 5 minutes after mixing the polypeptide composition with the oil. The assay can be performed with the other oils.

In certain embodiments, the water-insoluble/water dispersible fraction is substantially free of primary amines, carboxylic acids, amine salts, and carboxylate salts.

The water-insoluble/water dispersible protein fraction can act as a surfactant to an organic polyisocyanate (e.g., PMDI), lowering interfacial tension to the point where the water insoluble organic polyisocyante is readily emulsified with minimal energy input, creating an oil-in-water or water-in-oil emulsion. When the source material is a whole meal or a protein isolate derived from soy, castor or canola, a stable emulsion can be obtained using undigested substantially insoluble (fractionated) protein. In certain embodiments, a stable emulsion of polyisocyanate (e.g., PMDI) in water can be achieved when the isolated fractionated polypeptide is comprised of a water-insoluble/water dispersible fraction, either alone, or in combination with a water soluble component. The acceptable level of the water-soluble component will depend in large part upon the adhesive performance characteristics that are needed for the end-use application. The best overall combination of adhesive performance properties (in terms of PMDI emulsification, bond strength, and water resistance) is achieved when the level of the water-soluble fraction is minimized, and when the level of the water-insoluble dispersible fraction is maximized. For example, where high bond strengths and high degrees of moisture resistance are simultaneously desired from an adhesive formulation as provided herein, the water-insoluble/water dispersible fraction comprises between about 50%-100%, 50%-80%, 60%-100%, or 60%-90% (w/w) of the entire isolated polypeptide composition that is incorporated into the adhesive formulation.

In applications where achieving high bond strengths and oil (e.g., PMDI) dispersibility in water are more important than maximizing moisture resistance, the water-insoluble/water dispersible fraction optionally comprises no less than about 45% of the isolated polypeptide composition that is incorporated into the adhesive formulation. Under certain circumstances, for example, an adhesive prepared with digested castor protein extracted from castor meal, the process of isolating and digesting a protein can lead to a polypeptide composition that implicitly contains both water-soluble and water-insoluble fractions at ratios sufficient to simultaneously disperse oil in water while yielding high bond strength adhesives. The process of digesting a whole meal can lead to a mixture that includes a polypeptide composition that implicitly contains both water-soluble and water-insoluble fractions at ratios sufficient to simultaneously disperse oil in water while yielding high bond strength adhesives (an example includes adhesives prepared with digested whole castor meal). Where the process of digestion or extraction does not lead to a polypeptide composition that implicitly comprises both water-soluble and water-insoluble fractions at ratios which are sufficient to simultaneously disperse oil in water while yielding high bond strength adhesives, an additional fractionation step can be used to isolate sufficient levels of the water-insoluble/water dispersible fraction from the polypeptide composition, so that the ratio of the water-insoluble fraction to the water-soluble fraction can be adjusted in the formulated adhesive for the purpose of achieving the desired combination of end-use properties.

In certain embodiments, the polypeptide fractions used in the compositions and methods provided herein, can have a weight average molecular weight of between about 500 and 25,000 Daltons. Useful polypeptide fractions can have a weight average molecular weight of between about 500 and 2,500 Daltons, between about 700 and 2,300 Da., between about 900 and 2,100 Da., between about 1,100 and 1,900 Da., between about 1,300 and 1,700 Da., or between about 1,000 and 1,300 Da., between about 2,000 and 2,500 Da., or between about 1,000 and 2,500 Da.

The isolated polypeptide composition can be used to make adhesive compositions, as described herein, by combining them with a reactive prepolymer. Reactive prepolymers can be selected from the group consisting of an organic polyisocyanate; a reaction product between an organic polyisocyanate and a polypeptide, a polyol, an amine based polyol, an amine containing compound, a hydroxy containing compound, or a combination thereof; an epoxy containing compound; a reaction product between an epoxy containing compound and a polypeptide, a polyol, an amine based polyol, an amine containing compound, a hydroxy containing compound, or a combination thereof; an organosilane; a polymer latex; a polyurethane; and a mixture thereof.

When making the adhesives, the isolated polypeptide composition, in certain embodiments, is capable of dispersing the reactive prepolymer in the aqueous medium to produce a stable dispersion or a stable emulsion. The dispersion or emulsion exhibits substantially no phase separation by visual inspection for at least 5 minutes after mixing the polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, 6, 9, 12, 18, 24 hours after mixing the polypeptide composition with the reactive prepolymer.

In certain embodiments, the water-insoluble/water dispersible protein fraction provides a stable emulsion, dispersion or suspension, for example, an aqueous emulsion, dispersion or suspension, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion, dispersion or suspension optionally comprises from about 1% to about 50% (w/w) of oil and from about 1% to about 99% (w/w) of the isolated polypeptide composition. The term "stable" when used in reference to the emulsions, suspensions and dispersions refers to the ability of the polypeptide fraction described herein to create a kinetically stable emulsion for the duration of the intended application of the dispersion or emulsion. The terms "emulsion," "dispersion," and "suspension" are used interchangeably herein.

In certain embodiments, the polypeptide composition has a polydispersity index (PDI) of between about 1 and 1.15. In certain embodiments, the PDI of the adhesives provided created using the polypeptides described herein is between about 1 and about 3, between 1 and 1.5, between 1.5 and 2, between 2 and 2.5, between 2.5 and 3, between 1 and 2, between 1.5 and 2.5, or between 2 and 3.

B. Characterization of Water-Soluble Protein Fraction

The water-soluble protein fractions, for example, the water-soluble protein fractions isolated pursuant to the protocol set forth in FIG. 2, are substantially or completely soluble in water.

The water-soluble protein fractions have one or more of the following six features. (i) An amide-I absorption band between about 1633 $cm^{-1}$ and 1680 $cm^{-1}$, as determined by solid state FTIR. (ii) An amide-II band between approximately 1522 cm$^{-1}$ and 1560 cm$^{-1}$, as determined by solid state FTIR. (iii) Two prominent 1° amide N—H stretch absorption bands centered at about 3200 cm$^{-1}$, and at about 3300 cm$^{-1}$, as determined by solid state FTIR. (iv) A prominent cluster of protonated nitrogen nuclei defined by $^{15}$N chemical shift boundaries at about 94 ppm and about 100 ppm, and $^1$H chemical shift boundaries at about 7.6 ppm and 8.1 ppm, as determined by solution state, two-dimensional proton-nitrogen coupled NMR. (v) An average molecular weight of between about 600 and about 2,500 Daltons, for example, as determined by MALDI. (vi) An inability to stabilize an oil-in-water or water-in-oil dispersion or emulsion, where the water and oil components of the mixture form an unstable suspension that macroscopically phase separates under static conditions within five minutes after mixing. This can be tested by dissolving or dispersing 14 parts (by weight) of a protein sample of interest in 86 parts (by weight) of water and then mixing the resulting solution with 14 parts (by weight) of oil, for example, PMDI. Under these conditions, a water-soluble protein is characterized by an inability to stabilize an oil-in-water emulsion, where the oil and water components form an unstable suspension that macroscopically phase separates under static conditions within five minutes after mixing.

II. Prepolymer Considerations

When making suitable emulsions, dispersions, and adhesives, the protein fractions described hereinabove can be combined with a reactive prepolymer. The term "prepolymer" is understood to mean a compound, material or mixture that is capable of reacting with a polypeptide fraction described herein to form an adhesive polymer. Exemplary prepolymers include, for example, isocyanate-based prepolymers, epoxy-based prepolymers, and latex prepolymers. Further, for illustration, the term "prepolymer" includes full prepolymers and partial prepolymers (referred to as semi-prepolymers, pseudoprepolymers, or quasiprepolymers in certain embodiments). One example of a quasi prepolymer is a NCO-terminated product prepared from a diisocyanate and polyol in which the prepolymer is a mixture of (i) a product prepared from the diisocyanate and polyol, and (ii) unreacted diisocyanate. On the other hand, an example of a full prepolymer is the product formed by reacting an isocyanate with a particular polyol blend so that there are substantially no residual monomeric isocyanates in the finished product.

An isocyanate-based prepolymer can be an organic polyisocyanate, which can be (i) a polyisocyanate (or monomeric diisocyanate) that has not been reacted with another compound, (ii) a polyisocyanate modified by various known self-condensation reactions of polyisocyanates, such as carbodiimide modification, uretonimine modification, trimer (isocyanurate) modification or a combination thereof, so long as the modified polyisocyanate still contains free isocyanate groups available for further reaction, or (iii) the product formed by reaction of a polyisocyanate base with a compound having nucleophilic functional groups capable of reacting with an isocyanate group. Exemplary compounds containing a nucleophilic functional group capable of reacting with an isocyanate group include a polypeptide (for example, one or more of the protein fractions described herein), a polyol, an amine based polyol, an amine containing compound, a hydroxy containing compound, carboxylic acid containing compound, carboxylate salt containing compound, or a combination thereof. The term "polyisocyanate" refers to difunctional isocyanate species, higher functionality isocyanate species, and mixtures thereof.

One desirable feature of an isocyanate-based prepolymer is that the prepolymer remain stable enough for storage and use, desirably liquid and of reasonable viscosity at ambient temperatures (25° C.), and contains free isocyanate (—NCO) groups which can participate in forming adhesive bonds.

As noted above, the organic polyisocyanate can be prepared from a "base polyisocyanate." The term "base isocyanate" as used herein refers to a monomeric or polymeric compound containing at least two isocyanate groups. The particular compound used as the base polyisocyanate can be selected so as to provide an adhesive having certain desired properties. For example, base polyisocyanate can be selected based on the number-average isocyanate functionality of the compound. For example, in certain embodiments, the base polyisocyanate can have a number-average isocyanate functionality of 2.0 or greater, or greater than 2.1, 2.3 or 2.4. In certain embodiments, the reactive group functionality of the polyisocyanate component ranges from greater than 1 to several hundred, 2 to 20, or 2 to 10. In certain other embodiments, the reactive group functionality of the polyisocyanate component is at least 1.9. In certain other embodiments, the reactive group functionality of the polyisocyanate component is about 2. Typical commercial polyisocyanates (having an isocyanate group functionality in the range of 2 to 3) may be pure compounds, mixtures of pure compounds, oligomeric mixtures (an important example being polymeric MDI), and mixtures of these.

Useful base polyisocyanates have, in one embodiment, a number average molecular weight of from about 100 to about 5,000 g/mol, from about 120 to about 1,800 g/mol, from about 150 to about 1,000 g/mol, from about 170 to about 700 g/mol, from about 180 to about 500 g/mol, or from about 200 to about 400 g/mol. In certain other embodiments, at least 80 mole percent or, greater than 95 mole percent of the isocyanate groups of the base polyisocyanate composition are bonded directly to an aromatic group. In certain embodiments, the adhesives described herein have a concentration of free organically bound isocyanate (—NCO) groups in the range of from about 5% to 35% (wt/wt), about 7% to 31% (wt/wt), 10% to 25% (wt/wt), 10% to 20% (wt/wt), 15% to 27% (wt/wt).

In certain embodiments, the base polyisocyanate is an aromatic polyisocyanate, such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. In certain embodiments, polymethylene polyphenyl polyisocyanates (MDI series polyisocyanates) having a number averaged functionality greater than 2 are utilized as the base polyisocyanate.

In certain embodiments, the MDI base polyisocyanate comprises a combined 2,4'-MDI and 2,2'-MDI content of less than 18.0%, less than 15.0%, less than 10.0%, or less than 5.0%.

In certain other embodiments, the MDI diisocyanate isomers, mixtures of these isomers with tri- and higher functionality polymethylene polyphenyl polyisocyanates, the tri- or higher functionality polymethylene polyphenyl polyisocyanates themselves, and non-prepolymer derivatives of MDI series polyisocyanates (such as the carbodiimide, uretonimine, and/or isocyanurate modified derivatives) are utilized as polyisocyanates for use as the base polyisocyanate. In certain other embodiments, the base polyisocyanate composition comprises an aliphatic polyisocyanate (e.g., in a minor amount), e.g., an aliphatic polyisocyanate comprising an isophorone diisocyanate, 1,6-hexamethylene diisocyanate, 1,4-cyclohexyl diisocyanate, or saturated analogues of the above-mentioned aromatic polyisocyanates, or mixtures thereof.

In certain other embodiments, the base polyisocyanate comprises a polymeric polyisocyanate, e.g., a polymeric diphenylmethane diisocyanate (polymethylene polyphenyl polyisocyanate) species of functionality 3, 4, 5, or greater. In certain embodiments, the polymeric polyisocyanates of the MDI series comprise RUBINATE-M® polyisocyanate, or a mixture of MDI diisocyanate isomers and higher functionality oligomers of the MDI series. In certain embodiments, the base polyisocyanate product has a free —NCO content of about 31.5% by weight and a number averaged functionality of about 2.7.

In certain embodiments, the isocyanate group terminated prepolymers are urethane prepolymers. These can be produced by reaction of a hydroxyl-functional compound with an isocyanate functional compound. In certain other embodiments, allophanate prepolymers are utilized. Allophanate prepolymers typically require higher temperatures (or allophanate catalysts) to facilitate reaction of the polyol with the polyisocyanate to form the allophanate prepolymer.

Polyisocyanates used in the compositions described can have the formula $R(NCO)_n$ where n is 2 and R can be an aromatic, a cycloaliphatic, an aliphatic, each having from 2 to about 20 carbon atoms. Examples of polyisocyanates include, but are not limited to, diphenylmethane-4,4'-diisocyanate (MDI), toluene-2,4-diisocyanate (TDI), toluene-2,6-diisocyanate (TDI), methylene bis(4-cyclohexylisocyanate) ($Hi_2MDI$), 3-isocyanatomethyl-3,5,5-trimethyl-cyclohexylisocyanate (IPDI), 1,6-hexane diisocyanate (HD1), naphthalene-1,5-diisocyanate (NDI), 1,3- and 1,4-phenylenediisocyanate, triphenylmethane-4,4',4"-triisocyanate, polymeric diphenylmethane diisocyanate (PMDI), m-xylene diisocyanate (XDI), 1,4-cyclohexyl diisocyanate (CHDI), isophorone diisocyanate, isomers, dimers, trimers and mixtures or combinations of two or more thereof. The term "PMDI" encompasses PMDI mixtures in which monomeric MDI, for example 4,4'-, 2,2'- and/or 2,4'-MDI, is present. PMDI is, in one embodiment, prepared by phosgenation of the corresponding PMDA in the presence of an inert organic solvent. PMDA is in turn obtained by means of an acid aniline-formaldehyde condensation which can be carried out industrially either continuously or batchwise. The proportions of diphenylmethanediamines and the homologous polyphenylpolymethylenepolyamines and their positional isomerism in the PMDA are controlled by selection of the ratios of aniline, formaldehyde and acid catalyst and also by means of a suitable temperature and residence time profile. High contents of 4,4'-diphenylmethanediamine together with a simultaneously low proportion of the 2,4' isomer of diphenylmethanediamine are obtained on an industrial scale by the use of strong mineral acids such as hydrochloric acid as catalyst in the aniline-formaldehyde condensation.

The epoxy-based prepolymer can be an epoxide containing compound. Alternatively, the epoxy-based prepolymer can be a reaction product between an epoxy and a polypeptide, a polyol, an amine based polyol, an amine containing compound, a hydroxy containing compound, or a combination thereof.

In certain embodiments, the composition is an epoxy resin comprising free epoxy groups. Alternatively, the epoxy resin composition is prepared by combining a precursor epoxy resin composition with the isolated and fractionated polypeptide compositions described herein. The epoxy resin composition can comprise derivatives of digested proteins as described herein.

Epoxy resins refer to molecular species comprising two or more epoxide (oxirane) groups per molecule. Epoxy resins can contain mono-epoxides as reactive diluents, but the main constituents by weight of such resins are still di and/or higher functionality species (containing two or more epoxide groups per molecule).

Epoxy resins useful as precursor epoxy resins can include those which comprise difunctional epoxide and/or higher functionality polyepoxide species. Precursor epoxy resins include but are not limited to diglycidyl ether of bisphenol-A, diglycidyl ethers of bisphenol-A alkoxylates, epoxy novolac resins, expoxidized soy oil, epoxidized linseed oil, epichlorohydrin, a glycidyl ether type epoxy resin derived from a polyphenol by reaction with epichlorohydrin, and combinations thereof. In another embodiment, precursor epoxy resins are modified by combining them with the polypeptide compositions described herein, either in bulk or in aqueous suspension.

The modified epoxy resins can be used in multi-part mixing-activated adhesive formulations. Alternatively, multi-part formulations can comprise polyisocyanates and/or known amine based epoxy curatives as additional components. Alternatively, modified epoxy resins can be used with any cure catalysts or other additives known in the epoxy resin art. The polypeptide compositions described herein contain functional groups which react with epoxide groups in the epoxy resin. The extent of this reaction depends upon the preparative conditions, use or non-use of catalysts, the specific resins and fractionated and isolated polypeptide compositions described herein selected, etc.

An important subset of epoxy resins can be made by reacting a precursor polyol with an epihalohydrin, such as epichlorohydrin. The products of the reaction are called glycidyl ethers (or sometimes as polyglycidyl ethers or diglycidyl ethers). In certain embodiments, all the hydroxyl groups in the precursor polyols are converted to the corresponding glycidyl ethers.

An important class of glycidyl ether type epoxy resins are derived from polyphenols, by reaction with epichlorohydrin. The starting polyphenols are di- or higher functionality phenols. Industrially important examples of this type of epoxy resin comprise, for example, diglycidyl ether of bisphenol-A (also known as DGEB-A); diglycidyl ether of 2,6,2',6'-tetrachloro bisphenol A; diglycidyl ether of bisphenol-F (DGEB-F); epoxidized novolac resins; mixtures of these, and the like.

Partially or fully saturated (hydrogenated) analogs of these epoxy resins may also be used. A non limiting example of a known saturated epoxy resin of this type is DGEB-H, which is the fully hydrogenated (ring saturated) aliphatic analog of DGEB-A.

Amines, which contain active hydrogen atoms may also be reacted with epichlorohydrin to form epoxy resins. Examples of these types of resins include, for example, N,N,N',N'-tetraglycidyl diphenylmethane diamine (such as the 4,4' isomer); p-glycidyloxy-N,N-diglycidylaniline; N,N-diglycidylaniline; mixtures of these; and the like.

Heterocyclic nitrogen compounds that contain active hydrogen atoms may likewise be converted into the corresponding epoxy resins by reaction with epichlorohydrin. Non limiting examples of such resins include, for example, N,N',N"-triglycidyl isocyanurate; N,N'-diglycidyl-5,5-dimethylhydantoin; mixtures of these; and the like.

Many other kinds of epoxy resins are known which are not made by reaction of an active hydrogen precursor with an epihalohydrin. Non-limiting examples of these types of epoxy resins, known in the art, include, for example, dicyclopentadiene diepoxide (also known as DCPD dioxide), vinycyclohexene diepoxide (dioxide), epoxidized polyunsaturated vegetable oils (such as epoxidized linseed oil, epoxidized soy oil, etc.), epoxidized polydiene resins (such as epoxidized polybutadienes), 3,4-epoxy-6-methyl cyclohexylmethyl-3,4-epoxy-6-methyl cyclohexane carboxylate, mixtures of these, and the like. In principle, any precursor molecule which contains two or more units of reactive aliphatic "C=C" unsaturation per molecule might be converted into an epoxy resin.

It should be understood that any of the base epoxy resins known in the art, such as those listed above, are frequently modified with diluents, flexibilizers, and/or other additives. The optional possibility of using one or more known art modifiers or additives, in addition to the required protein derivatives, is within the level of skill in the art. Those skilled in the art of formulating adhesive systems using epoxy resins will appreciate how and when to use known optional additives and modifiers.

In addition, the prepolymers can include one, two or more polyol compounds. Exemplary polyol compounds include an amine alkoxylate, polyoxypropylene glycol, propylene glycol, polyoxyethylene glycol, polytetramethylene glycol, polyethylene glycol, propane diol, glycerin, or a mixture thereof.

Polyols useful in preparing the adhesives described herein include all known polyols, for example, polyols used in the polyurethanes art. In certain embodiments, the polyol comprises primary and/or secondary hydroxyl (i.e., —OH) groups. In certain other embodiments, the polyol comprises at least two primary and/or secondary hydroxyl (i.e., —OH) groups per molecule. Mono functional alcohols (such as aliphatic alcohols, aromatic alcohols, or hydroxyl functional monomers such as hydroxyl functional acrylates (to yield UV or thermally curable materials) can be used to cap an isocyanate group. In certain other embodiments, the polyol comprises a hydroxyl (i.e., —OH) group functionality between 1.6 and 10, between 1.7 to 6, between 2 to 4, or between 2 to 3. In certain other embodiments, the weight average molecular weight range for the optional polyols is from 100 to 10,000 g/mol, from 400 to 6,000 g/mol, or from 800 to 6,000 g/mol.

In certain other embodiments, useful polyols are polyester polyols or polyether polyols, such as an aliphatic polyether polyol. One exemplary aliphatic polyether polyol is polyoxypropylene glycol, with a number average molecular weight in the range of from 1,500 to 2,500 g/mol.

In certain embodiments, the total amount of all polyol, or polyols, in the isocyanate reactive component is from 1% to 80%, or from 3% to 70%, or from 5% to 60% by weight of the total.

In certain other embodiments, alkanolamines comprising primary, secondary, and/or tertiary amine groups can be used.

In certain embodiments, useful water dispersible polymer latexes can include latexes of polymethylmethacrylate and its copolymers, latexes of polymethacrylate and its copolymers, latexes of polyvinylchloride and its copolymers, latexes of polyvinylacetate and its copolymers, polyvinyl alcohol and its copolymers, etc.

Further, as discussed above, the prepolymer species can comprise a terminated isocyanate. Here, for example, a polyol is reacted with the base polyisocyanate composition prior to or during mixing with the polypeptide fractions herein. Those skilled in the art will recognize many variations on the use of optional prepolymers in preparing wood adhesive compositions.

The amount of reactive prepolymer used in the adhesive compositions can be selected based on the desired properties of the adhesive composition. For example, when optimizing the viscosity of a one-part adhesive, the ratio of prepolymer (e.g., PMDI, Epoxy and the like) to isolated polypeptide composition can be from about 10:1 and 4:1 in order to form an adhesive composition that is relatively less viscous. Alternatively, for a two-part adhesive, the ratio of prepolymer (e.g., PMDI, Epoxy and the like) to isolated polypeptide composition can be from about 1:20 to 3:2.

III. Additional Additives

It is understood that the polypeptide fraction, the prepolymer, or mixtures formed from these components can be mixed with one or more additives depending upon the intended use. Exemplary additives include catalysts, extenders, fillers, viscosifying agents, surfactants, adhesion promoters, antioxidants, antifoaming agents, antibacterial agents, fungicides, pigments, inorganic particulates, gelling agents, and cross-linking agents.

Exemplary catalysts include, for example, a primary amine, a secondary amine, a tertiary amine, an organometallic compound, or a combination thereof. Exemplary primary amines include, for example, methylamine, ethylamine, propylamine, cyclohexylamine, and benzylamine. Exemplary secondary amines include, for example, dimethylamine, diethylamine, and diisopropylamine. Exemplary tertiary amines include, for example, diazabicyclooctane (Dabco), triethylamine, dimethyl benzylamine, bis-dimethylaminoethyl ether, tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine, N,N,N,N-tetramethyl hexane-1, 6-diamine, 2,2'-dimorpholinodiethyl ether (DMDEE), or a mixture thereof. Exemplary organometallic compounds include, for example, di-n-octyl tin mercaptide, dibutyl tin maleate, diacetate, dilaurate, dichloride, bis-dodecyl mercaptide, tin(II)acetate, ethyl hexoate and diethyl hexoate, $Fe^{+6}$ 2,4-pentanedionate (FeAcAc), or lead phenyl ethyl dithiocarbamate.

In certain other embodiments, the catalyst is a transition metal acetylacetonates, e.g., an acetylacetonate compound comprising iron, copper, or nickel). In certain embodiments, the transition metal acetylacetonate comprises a tertiary amine, e.g., 2,2'-dimorpholino diethyl ether).

The amount of catalyst used in the adhesive composition can be varied in order to optimize the features of the adhesive. In certain embodiments, the catalyst is present in less than 1% (wt/wt), 0.5% (wt/wt), or 0.1% (wt/wt) of the adhesive composition. In certain other embodiments, the catalyst is present in a range from 0.001% (wt/wt) to 0.75% (wt/wt), 0.001% (wt/wt) to 0.01% (wt/wt), 0.01% (wt/wt) to 0.05% (wt/wt), or 0.05% (wt/wt) to 0.5% (wt/wt) of the adhesive composition.

Exemplary extenders include, for example, inert extenders or active extenders. In certain embodiments, the inert extender is vegetable particulate matter, vegetable oil, mineral oil, dibasic esters, propylene carbonate, non-reactive modified aromatic petroleum hydrocarbons, and in general any non-active hydrogen containing liquid that can be incorporated into an isocyanate based adhesive. The active extender can be a pyrrolidone monomer or polymers, an oxizolidone monomer or polymers, an epoxidized oil, or an unsaturated oil, such as linseed oil.

Exemplary surfactants include, for example, monomeric types, polymeric types, or mixtures thereof. Exemplary adhesion promoters include, for example, organosilanes and titanates. Other additives include, for example, antioxidants, antifoaming agents, anti-bacterial agents, fungicides, pigments, viscosifying agents, gelling agents, aereosolozing agents, inorganic particulates (e.g., titanium dioxide, yellow iron oxide, red iron oxide, black iron oxide, zinc oxide, aluminum oxide, aluminum trihydrate, calcium carbonate), clays such as montmorillonite, wetting agents, and the like.

In certain embodiments, the additive is a water-dispersible additive or a water-soluble additive. Water-soluble additives include hydroxyl-functional or amine-functional compounds (such as glycerin, urea, propylene glycol, polypropylene glycol, polyethylene glycol, trimethylol propane and its adducts, phenols, polyphenols, etc.) capable of reacting with a polymeric isocyanate, e.g., PMDI.

In other embodiments, the additive can be a crosslinking agent, for example, a crosslinking agent that can be used to bond lignocellulosic material to glass. Exemplary crosslinking agents include an organosilane, such as dimethyldichlorosilane (DMDCS), alkyltrichlorosilane, methyltrichlorosilane (MTCS), N-(2-aminoethyl)-3-aminopropyl trimethoxysilane (AAPS), or a combination thereof. In other embodiments the polypeptide fractions are combined with an organosilane to form an adhesive for bonding one or more substrates together in any combination, said substrates including glass, paper, wood, ceramic, steel, aluminum, copper, brass, etc. The term "organosilane" refers to any group of molecules including monomers, hydrolyzed monomers, hydrolyzed dimers, oligomers, and condensation products of a trialkoxysilane having a general formula:

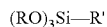

where R is preferably a propyl, ethyl, methyl, isopropyl, butyl, isobutyl, sec-butyl, t-butyl, or acetyl group, and R' is an organofunctional group where the functionality may include an aminopropyl group, an aminoethylaminopropyl group, an alkyl group, a vinyl group, a phenyl group, a mercapto group, a styrylamino group, a methacryloxypropyl group, a glycidoxy group, an isocyante group, or others.

In certain other embodiments, the additive is a non-volatile (e.g., having a boiling point of greater than about 180° C. at 760 mmHg), inert viscosity-reducing diluent.

Similarly, a bis-trialkoxysilane having the general formula $(RO)_3Si—R'—Si(OR)_3$ can also be employed as an "organosilane" either alone or in combination with a trialkoxysilane, where R is preferably a propyl, ethyl, methyl, isopropyl, butyl, isobutyl, sec-butyl, t-butyl, or acetyl group, and R' is a bridging organofunctional residue which may contain functionality selected from the group consisting of amino groups, alky groups, vinyl groups, phenyl groups, mercapto groups, and others. Similarly, a tetraalkoxysilane having the general formula $(RO)_4Si$ can also be employed as an "organosilane" either alone or in combination with a trialkoxysilane, or a bis-trialkoxysilane, where R is preferably a propyl, ethyl, methyl, isopropyl, butyl, isobutyl, sec-butyl, t-butyl, or acetyl group.

IV. Adhesive Compositions

It is understood that a variety of adhesives can be prepared using the methods and compositions described herein. The adhesives can be one-part adhesives or two-part adhesives, as shown in FIG. 1.

In one aspect, the invention provides an adhesive composition comprising: (a) from about 5% to about 90% (w/w) of a reactive prepolymer; and (b) from about 10% to about 99% (w/w) of an isolated polypeptide composition capable of dispersing the reactive prepolymer in an aqueous medium, for example, water or a water-based solution.

A. One-Part Adhesives

The invention provides a variety of stand alone or one-part adhesives, as shown in FIG. 1. The one-part adhesives can be produced using the polypeptide compositions, prepolymers and additives discussed hereinabove. In their simplest form, the one-part adhesives do not require any additional additives to cure and form an adhesive material.

In one embodiment, the invention provides an adhesive composition comprising: (a) from about 5% to about 90% (w/w) of a reactive prepolymer selected from the group consisting of an organic polyisocyanate, a reaction product between an organic polyisocyanate and a polypeptide, a polyol, an amine based polyol, an amine containing compound, a hydroxy containing compound, or a combination thereof; (b) from about 10% to about 99% (w/w) of an isolated polypeptide composition capable of dispersing the reactive prepolymer in an aqueous medium; and (c) an optional catalyst. In certain other embodiments, the adhesive composition contains 10% to 99.9% of the polypeptide compositions, and is free of reactive isocyanate compounds. Such compositions optionally comprise one or more additives, e.g., a water-soluble polymer, water-dispersible latex polymer, organosilane, or other water-soluble or water-dispersible material.

In certain embodiments, isocyanate reactive component formulations are one-part adhesives. The one-part adhesives desirably are a liquid at 25° C. and stable to storage for at least one week (7 days) at 25° C., at least two weeks at 25° C., at least one month at 25° C., or at least three months at 25° C.

The adhesives can be cured by allowing the adhesive to stand under ambient conditions, or the adhesive may be cured by exposing the adhesive to heat, pressure, or both. Exemplary one-part adhesives are described, for example, in Examples 1-8. Furthermore, in certain embodiments, these adhesives are stable but can cure when exposed to the moisture in air.

In certain embodiments, the one-part adhesive composition comprises no less than about 2%, 5%, 10%, or 15% by weight of the isolated and fractionated polypeptide described herein (based on the dry weight of the isolated and fractionated polypeptide described herein), relative to the total polyisocyanate composition weight. The maximum loading of the isolated and fractionated polypeptide can be based on the amount of free isocyanate (—NCO) groups in the final composition, as well as optimizing stability and viscosity sufficiently. In certain embodiments, the total concentration of isolated and fractionated polypeptide composition may be of up to 35% (wt/wt). Higher viscosity compositions formed from higher weight percentages of the isolated and fractionated polypeptide described herein can be beneficial in applications where it is desirable for the uncured adhesive to exhibit cold-tack, flow resistance, sag resistance, and gap-filling characteristics.

B. Two- or Multi-Part Adhesives

In addition, the invention provides a variety of two- or multi-part adhesives as shown in FIG. 1. The two-part adhesives can be formed using the polypeptide compositions, prepolymers and additives discussed above.

The two-part adhesives require mixing two or more stable materials (mixtures) that upon mixing together produce an adhesive material. Such compositions are generally used within a short time period after mixing because the components may begin to react upon mixing. In one embodiment, the invention provides a two-part adhesive composition comprising: (a) a first component (Part A) comprising from about 5% to about 90% (w/w) of a reactive prepolymer, wherein the reactive prepolymer is a polyisocyanate-based prepolymer, an epoxy-based prepolymer, or a combination thereof; and (b) a second component (Part B) comprising from about 10% to about 99% (w/w) of an isolated polypeptide composition capable of dispersing the reactive prepolymer in an aqueous medium.

Depending upon the composition of Part A and Part B, Parts A and B are mixed immediately prior to use. In one embodiment, the adhesive, when cured, comprises from about 1% to about 95% (w/w) of non-volatile moieties of Part A and from about 5% to about 99% (w/w) of non-volatile moieties of Part B. In certain embodiments, Part A comprises PMDI together with a catalyst. In certain other embodiments, part of the diphenylmethane 4,4'-diisocyanate, known as MMDI, present in the PMDI is recovered by means of a suitable technological operation such as distillation or crystallization.

Figure 4:
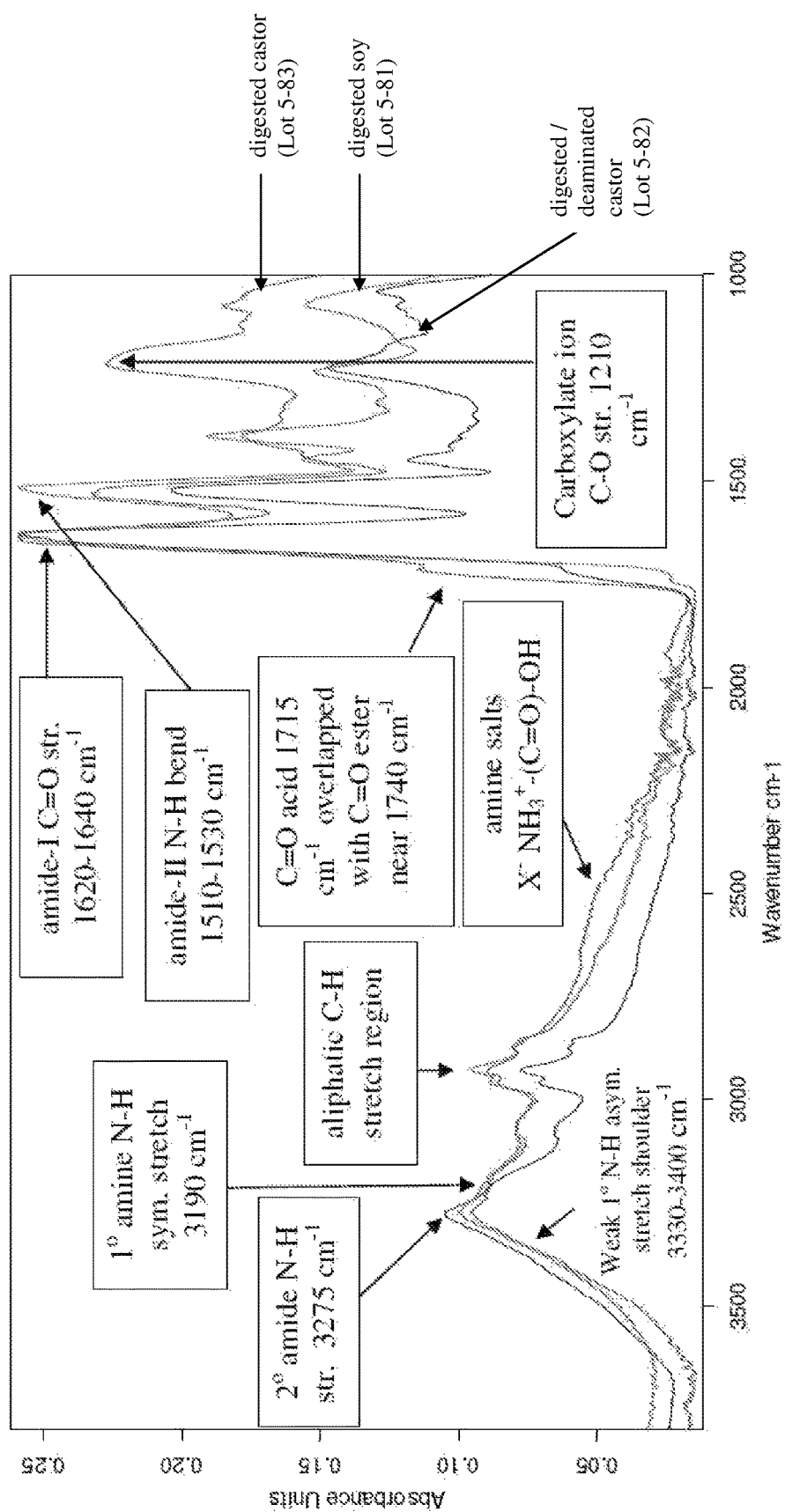
FIG. 4 shows overlaid solid state FTIR spectra for protein materials used in Example 18; namely digested and deaminated castor protein lot 5-82, digested castor lot 5-83, and digested soy protein lot 5-81.

The qualitative impact of the relative level of the water-insoluble dispersible fraction on the performance characteristics of a two-part adhesive like those described herein is set forth in FIG. 4 (see also Example 18). It is understood that the amount of polypeptide composition (and the type of polypeptide composition) can be adjusted to optimize properties of the adhesive composition, e.g., viscosity, bond-strength, gap-filing capability, pot life, moisture resistance, and cost. To illustrate, adhesive compositions formed from certain whey protein derivatives have a short pot life, whereas adhesive compositions formed from certain castor protein have a longer pot life. To optimize the viscosity of the adhesive composition, the skilled artisan can adjusted the amount of solid protein in the adhesive composition. For example, higher levels of solid protein in the adhesive composition can provide an adhesive composition having a higher viscosity. Such higher viscosity adhesive compositions can be used for gap filing applications. To optimize the moisture resistance of the adhesive, the skilled artisan can adjust the amount of water-insoluble/dispersible protein relative to the amount of water-soluble protein used to form the adhesive composition. In certain instances, the adhesive compositions contain a larger percentage by weight of the water-insoluble/dispersible protein than to the amount of water-soluble protein.

Various components of the activatable multi-part adhesive systems can include, for example, a polypeptide containing compound; and an isocyanate reactive composition as a separate component. The isocyanate reactive component can optionally comprise a protein that contains residual peptide linkages.

In certain embodiments, the multi-part system further comprises either an ethylene copolymer resin, a hydroxyl functionalized polymer, or mixtures thereof. Non limiting examples of suitable ethylene copolymer resins include ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, and ethylene vinyl alcohol (EVOH) resins. Non-limiting examples of hydroxyl functionalized polymers include water soluble or partially water soluble polymers such as polyvinylalcohol, polyvinylbutyral-co-vinylalcohol, polyvinylacetate-co-vinylalcohol and the like; and carbohydrates such as carboxymethylcellulose, ethylmethylcellulose, etc.

The ethylene copolymer can be used as a water dispersion (i.e., an EVA latex). The dispersion can be a polymer latex containing a carboxylated vinyl acetate-ethylene terpolymer stabilized with poly-(vinyl alcohol), commercially known as AIRFLEX 426° from Air Products, Inc. (63% solids by weight). The ethylene copolymer can be used at a level of from 5% to 50% by weight, from 10% to 40% by weight, or from 15% or 30% by weight of the total isocyanate reactive component (the level of ethylene copolymer is expressed on a solids basis, and does not include the level of water in the latex).

It is understood that the isocyanate reactive compositions (Part-B) of a two-part adhesive kit can contain other optional ingredients, including hydroxy-functional compounds (examples including amine-functional compounds, e.g., urea, and including polyols such as polyethylene glycol, glycerin, polypropylene glycol, carbohydrates, starches, polyvinyl alcohol and copolymers thereof, trimethylolpropane, branched polyols such as trimethylolpropane ethoxylate, aromatic alcohols or polyols, pentaerythritol and its polyol adducts, etc.). These types of optional hydroxy-functional compounds can either be blended together with the proteins and the other ingredients during the preparation of the Part-B component, or they can be optionally added to the proteins themselves during or after any of the process steps that are used to prepare and isolate the proteins (e.g., during protein isolation or extraction from meal, during digestion, during derivatization, etc; or after spray drying, after freeze drying, after isolation of a water-based paste of water-insoluble/dispersible protein, etc.). When the optional hydroxyl-functional compounds are used in this way, the preferred range of addition spans from about 0.1% to 10% by weight of the protein, and more preferably, from about 0.5% to 2% by weight of the protein.

In certain embodiments, the isocyanate reactive composition further comprises water. In certain embodiments, the water is present in an amount ranging from about 30% to 75% (wt/wt), about 40% to 70% (wt/wt), or about 50% to 60% (wt/wt). In certain other embodiments, the isocyanate reactive composition further comprises from about 1% to 30% (wt/wt), about 10 to 30% (wt/wt), about 10% to 20% (wt/wt), about 1% to 10% (wt/wt), or about 3% to 10% (wt/wt) polyol.

In embodiments where the isocyanate reactive composition comprises at least 20% (wt/wt), 25%, or 27% (wt/wt) polypeptide. The polypeptide can be an enzyme digested native protein, derivatized enzyme digested protein, or mixture thereof. In certain embodiments, the isocyanate reactive composition comprises derivatized enzyme digested protein. In certain embodiments, the derivatized enzyme digested protein is at least 50% (wt/wt), 60% (wt/wt), or 70% (wt/wt) of the polypeptide composition contained in the isocyanate reactive composition. In certain embodiments, the polypeptides contained in the isocyanate reactive composition are obtained from the same native protein source, or from different native protein sources. In certain embodiments, the isocyanate reactive composition remains a liquid and homogeneous upon storage or processing.

In another embodiment, a multi-part is created by mixing two or more liquid streams, which are stable by themselves, and convert quickly into a cured polymer under relatively mild conditions (relative to one-part adhesive systems). The two-part adhesives can cure by standing at ambient conditions, or can be cured by exposure to heat, pressure, or both.

It is understood that, for certain applications, the adhesive compositions, in addition to containing a water-insoluble protein fraction can also include a water-soluble polypeptide fraction. Depending upon the composition of the adhesive, the ratio of the water-soluble polypeptide fraction to the water-insoluble polypeptide fraction ranges from 0:1 to 3:2 (w/w). Alternatively, the weight ratio of the water-insoluble polypeptide fraction to the water-soluble polypeptide fraction can be at least 1:1.

With regard to the two-part adhesives, the percent of solids in Part B can range from about 5% to about 30%, from about 8% to about 20%, or from about 10% to about 20% by weight of solids. Furthermore, depending upon the application, the weight ratio of solids in Part B to the prepolymer can range from 100:0.1 to 0.1:100, from 50:1 to 1:50, from 20:1 to about 1:20 or from 10:1 to about 1:10.

A variety of two-part adhesives are described in Examples 10-19.

General Considerations

It is understood that varying the reaction between the polypeptide compositions and the reactive prepolymers can be done to optimize stability, shelf life, viscosity, and bonding performance that is necessary for the final application.

In certain embodiments, the viscosity of all the types of polyisocyanate compositions as described herein, is no more than (NMT) 50,000 cps, NMT 25,000 cps, NMT 10,000 cps, or NMT 5,000 cps as measured at 25° C. until the polyisocyanate composition is cured.

Furthermore, the viscosity of the adhesive can be designed with a particular application in mind. In one embodiment, where gap filling adhesives are required, the minimum viscosity of the adhesive (polyisocyanate composition) should be no less than (NLT) 2000 cps, 3000 cps, or NLT 4000 cps, as measured at 25° C. The viscosity of the polyisocyanate compositions can be optimized by adjusting the level of isolated and fractionated polypeptide described herein and/or the conditions used for preparing the composition. Typical conditions are in the range from 25 to 100° C. at ambient pressure, with agitation of the mixture until a sufficiently homogeneous composition is achieved.

Certain of the adhesives described herein are liquids having viscosities low enough to render them pourable, sprayable, or curtain-coatable. Alternatively, certain of the adhesives described herein are non-pourable, extrudable, spreadable gels or pastes. Non-pourable, extrudable, spreadable gels, or pastes may become pourable, sprayable, or curtain-coatable liquids at elevated temperature, and may optionally revert to non-pourable, extrudable or spreadable gels or pastes upon cooling.

In certain other embodiments, the polypeptide containing adhesives described herein are liquids, gels, or pastes stable enough to be stored for at least one week, at least two weeks, at least one month, or at least three months at ambient temperature (25° C.), and protected from moisture. The term "stable" in connection with the viscosity of the polyisocyanate composition refers to a viscosity that does not increase by more than 10%, 25%, or 30%, from its initial value.

In addition, the polypeptide composition and the adhesive composition can be designed to have a polydispersity index. The term "polydispersity index" refers to the ratio between the weight average molecular weight $\overline{M_w}$ and the number average molecular weight $$\overline{M_n}: PDI = \frac{\overline{M_w}}{\overline{M_n}}$$

The terms "number average molecular weight," denoted by the symbol Mn and "weight average molecular weight," denoted by the symbol Mw, are used in accordance with their conventional definitions as can be found in the open literature. The weight average molecular weight and number average molecular weight can be determined using analytical procedures described in the art, e.g., chromatography techniques, sedimentation techniques, light scattering techniques, solution viscosity techniques, functional group analysis techniques, and mass spectroscopy techniques (e.g., MALDI mass spectroscopy). For instance, as illustrated in Example 28, average molecular weight and number average molecular weight of the polypeptide composition was determined by MALDI mass spectroscopy.

Further, it is contemplated that polypeptide compositions having different molecular weights may provide adhesive compositions having different properties. As such, the weight average molecular weight, number average molecular weight, and polydispersity index can be an important indicator when optimizing the features of the adhesive composition. In particular, it is contemplated that the ability to optimize the molecular weight characteristics of the polypeptide compositions provides advantages when preparing an adhesive composition for a particular use. Further advantages include obtaining adhesive compositions with similar properties even though the polypeptide composition may be obtained from a different source (e.g., soy vs. castor) or when similar protein sources are harvested during different seasons, over varying periods of time, or from different parts of the world. For example, proteins isolated from soy and castor (each having different molecular weight distributions) can be made to have similar molecular weight distributions through digestion and fractionation processes described herein (see Example 28). Accordingly, the ability to measure and control the consistency of molecular weight distributions is contemplated to be beneficial when optimizing various features of the adhesive composition, e.g., long-term reproducibility of physical properties and process characteristics of formulated adhesives. The molecular weight characteristics of the polypeptide composition can be altered by subjecting the proteins therein to enzymatic digestion or fractionation according to the procedures described herein.

In certain embodiments, the PDI of the adhesives provided herein is from about 1 to about 3, from 1 to 1.5, from 1.5 to 2, from 2 to 2.5, from 2.5 to 3, from 1 to 2, from 1.5 to 2.5, or from 2 to 3.

Furthermore, a moisture-resistant adhesive can be prepared by using the water-insoluble/water dispersible extract alone, or optionally including a plasticizer (for example, a water insoluble plasticizer), an organosilane, and/or together with a lower-$T_g$ polymer. The term "plasticizer" refers to any substance capable of increasing the free volume (i.e. the molecular volume not occupied by the polypeptide molecules or their bonds) of the water-insoluble/dispersible extract. The term "Tg" refers to the glass transition temperature of the polymer, i.e., the temperature at which free volume of the polymer is large enough to allow translational relaxation and self diffusion of the minimal critical segment length of the polymer or molecule. In addition, moisture resistance can be imparted by means of crosslinking using a broad variety of crosslinking agents, for example, amine compounds, organosilane compounds, epoxy compounds, or epichlorhydrin-type materials. A moisture-resistant pressure-sensitive adhesive can be prepared by using the water-insoluble/water dispersible extract blended in combination with a plasticizer, optionally together with a low-$T_g$ polymer or a high-Tg polymer.

Furthermore, the tack or bond strength of the pressure sensitive adhesives (PSA) can be controlled through a number of means, such as shifting the glass transition ($T_g$) to higher or lower temperatures (by controlling the levels of monomeric and/or polymeric plasticizers) or incorporating flatting agents such as silicas, glass spheres, clays, and the like; by adjusting the crosslink density to higher or lower levels; by increasing or decreasing the plasticizer concentration; by blending with higher or lower molecular weight polymers; or by employing some combination of these techniques.

It is understood that when evaluating the tack or bond strength of a composite formed using an adhesive, the maximum achievable strength of the composite is dictated by the cohesive strength of the wood itself. To illustrate, if the adhesive is cohesively stronger than the wood, then wood failure will be the outcome. Further, it is contemplated that the adhesive composition may be tailored to provide a bond strength appropriate for particular applications by selecting particular polypeptide fractions, prepolymers, catalysts, and/or other additives. For example, an adhesive composition containing a DMDEE catalyst provided superior bond strength in one application (see Example 6).

Depending upon the application, the resulting adhesives may comprise from about 20% to about 80%, from about 30% to about 70%, from about 40% to about 60% (w/w) of prepolymer in the total adhesive (binder) composition.

Furthermore, depending upon the application, the resulting cured article can comprise from about 0.05% to about 5.0%, from about 0.1% to about 4.0%, from about 0.2% to about 3.0%, from about 0.3% to about 2.0% (w/w) of prepolymer. In certain embodiments, the cured article can comprise from about 0.05% to about 2.5% (w/w) of prepolymer.

Furthermore, an article fabricated from one or more of the adhesives described herein can contain from about 1% to about 15%, or from about 2% to about 10%, or from about 3% to about 8%, or from about 4% to about 7%, or from about 3% to about 6% (w/w) of binder (adhesive) per cured article. In certain embodiments, the article fabricated from the adhesive may contain greater than 5% (w/w) of binder per cured article. In certain other embodiments, the article comprises from about 1.5% to about 2.5% of binder per cured article.

Composite materials can contain from about 5% to about 85% (w/w), about 15% to about 75% (w/w), about 30% to about 65% (w/w), about 1% to about 10%, about 10% to about 20%, or about 20% to about 70% (w/w) binder. Laminate materials can contain from about 0.1% to about 10% (w/w), about 0.5% to about 5%, about 1% to about 3% (w/w), about 1% to about 10%, about 20% to about 30%, or about 30% to about 70% (w/w) binder.

In certain embodiments, the adhesives described herein can be used in the manufacture of particle board. With regard to the preparation of moisture-resistant cured particle board composites, the composites can comprise a total binder level ranging from about 2.5% to about 4.5% (w/w) of the cured composite, wherein the binder includes a water-insoluble/water dispersible polypeptide fraction or a water-insoluble/water dispersible polypeptide-containing fraction and a PMDI fraction with an optional catalyst. The amount of PMDI can range from about 30% to about 70% by weight of the cured binder, and the PMDI fraction can comprise between from about 1.3% to about 2.3% (w/w) of the cured composite (see Example 30).

In another embodiment, a moisture resistant composites can be prepared with a total binder level ranging from about 1.5% to about 2.5% (w/w) of the cured composite, wherein the binder includes a water-insoluble/dispersible polypeptide fraction or a water-insoluble/dispersible polypeptide-containing fraction and a PMDI fraction with an optional catalyst, The PMDI fraction can comprises from about 0.3% to about 1.4% (w/w) of the cured composite (see Example 31).

In another embodiment, a moisture-resistant cured particle board composite can be prepared containing a total binder level ranging from about 2.5% to about 3.1% by weight of the cured composite, wherein the binder comprises a water-insoluble/water dispersible polypeptide fraction or a water-insoluble/water dispersible polypeptide-containing fraction, an optional polymer latex fraction, and a PMDI fraction with optional catalyst. The PMDI comprises from about 5% to about 65% by weight of the cured binder and from about 0.3% to about 2% by weight of the cured composite. The optional polymer latex is an EVA latex polymer comprising from about 0% to about 45% by weight of the cured binder and from about 0% to about 1.2% by weight of the cured composite (see Example 32).

In another embodiment, a moisture-resistant cured particle board composite can be prepared with a total binder level ranging from about 1.2% to about 2.5% by weight of the cured composite. The binder comprises a water-insoluble/water dispersible polypeptide fraction or a water-insoluble/water dispersible polypeptide-containing fraction, an optional polymer latex fraction, and a PMDI fraction with optional catalyst. The PMDI fraction comprises from about 0.1% to about 1.1% by weight of the cured composite (see Example 32).

In the event that moisture-resistance is not a requirement for the end-use application, cured composites can also be prepared with a total binder level of less than approximately 5% by weight of the cured composite, wherein the binder comprises a water-insoluble/water dispersible polypeptide fraction or a water-insoluble/dispersible polypeptide fraction and a PMDI fraction with an optional catalyst. The PMDI fraction can comprise from about 0.05% to about 2.5% (w/w) of the cured composite. Depending upon the level of water that can be tolerated during the manufacture of the composite, binder levels of greater than 5% can also be employed, wherein the PMDI fraction comprises at least 0.05% by weight of the cured composite.

With regard to the two-part adhesives, the level of water that can be used to disperse the ingredients and to fabricate a composite can be adjusted for the specific application by virtue of controlling the % solids in the Part-B component, the weight ratio of the Part-B solids ingredients to PMDI, and the total binder level in the finished composite (on a solids basis). Depending on the level of water that is required to fabricate the composite, the % solids in the Part-B component will preferably range from approximately 5% to 30% by weight solids, and more preferably from about 9% to about 20% by weight solids. Similarly, the Part-B solids to PMDI weight ratio preferably ranges from approximately 20:1 to 1:20, and more preferably from about 10:1 to 1:10. The total percentage of binder in the cured composite (on a solids basis) preferably ranges from approximately 1% to 15% by weight of the cured composite, and more preferably from about 2% to 10% by weight.

Similar formulation considerations apply to the fabrication and manufacture of plywood composites. For example, moisture-resistant cured plywood assemblies can be laminated with bondline adhesive levels ranging from approximately 0.008 pounds/ft.$^2$ up to approximately 0.056 pounds/ft.$^2$, wherein the adhesive includes a water-insoluble/dispersible polypeptide-fraction or a water-insoluble/dispersible polypeptide-containing fraction, an optional polymer latex fraction, and a PMDI fraction with an optional catalyst. The PMDI can comprise from about 20% to about 70% (w/w) of the cured adhesive. The optional polymer latex can be an EVA polymer latex comprising between about 0% and 45% of the cured binder. It is contemplated that plywood composites prepared with these types of adhesive compositions will be capable of withstanding boiling water and hence will be extremely moisture resistant.

In the event that moisture-resistance is not a requirement for the end-use application, cured plywood composites can also be prepared with bondline adhesive levels of less than approximately 0.056 pounds/ft.$^2$, wherein the adhesive includes a water-insoluble/dispersible polypeptide fraction or a water-insoluble/dispersible polypeptide-containing fraction and a PMDI fraction with an optional catalyst. The PMDI fraction comprises less than approximately 20% by weight of the cured adhesive.

The level of water that may be used to disperse the ingredients and to fabricate a plywood composite can be adjusted for the specific application by virtue of controlling the % solids in the Part-B component, the weight ratio of the Part-B solids ingredients to PMDI, and the total bondline application level in the finished composite (on a solids basis). Depending on the level of water that is required to fabricate the composite, the % solids in the Part-B component will preferably range from approximately 5% to 30% by weight solids, and more preferably from about 8% to 20% by weight solids. Similarly, the Part-B solids to PMDI weight ratio preferably ranges from approximately 20:1 to 1:20, and more preferably from about 10:1 to 1:10.

In certain embodiments, both the one-part, the two-part and the multi-part type adhesives are cold curable. In certain embodiments, the adhesives include a cure catalyst (for example, DMDEE in the case of adhesives containing a polyisocyanate) that facilitates curing in the absence of applied heat. In certain embodiments, the adhesives (for example, the polyisocyanate containing adhesives) are cured in the presence of moisture at a temperature of about 10° C. to about the ambient temperature range (25° C., to as high as 30° C.). In certain other embodiments, the cold cure temperature ranges from 20° C. to 27° C. In other embodiments, the adhesives are hot cured, at temperatures greater than 30° C. Hot curing may at temperatures in the range from 50° C. to 300° C., or from 90° C. to 275° C., or from 110° C. to 250° C.

V. Applications of Adhesive Compositions

The adhesive compositions described herein can be used in a variety of different applications, which include, for example, bonding together many different types of substrates and/or creating composite materials.

Accordingly, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first surface to the second surface. The method optionally also comprises the step of, after step (b), permitting the adhesive composition to cure, which can be facilitated by the application of pressure, heat or both pressure and heat.

The adhesive compositions can be applied to the surfaces of substrates in any conventional manner. Alternatively, the surfaces can be coated with the composition by spraying, or brushing, doctor blading, wiping, dipping, pouring, ribbon coating, combinations of these different methods, and the like. Many of the Examples describe bonding two articles together. In addition, Example 23 describes the production of laminates using the adhesives described herein.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adherend" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied may be in the range of from about 5 to about 50 grams per square foot, from about 8 to about 60 grams per square foot, from about 10 to about 30 grams per square foot, from about 20 to about 50 grams per square foot, from about 15 to about 40 grams per square foot, of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particleboard, fiberboard, fiberglass, composite wooden I-beams (I-joists), and the like. The manufacture of fiberglass using the adhesives described herein is described in more detail in Example 36.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass. The composite can be a thermosetting composite or a thermoplastic composite. The manufacture of particle board using the adhesives described here is described in more detail in Examples 24 and 30-32. The manufacture of plywood using the adhesives described herein is described in Example 23.

In certain embodiments where two-part adhesives are used, Part-A and/or Part-B can be premixed with cellulosic components such as wood fiber, sawdust, or other components, and then mixed together and permitted to cured to create a composite material. Alternatively, Parts A and B can be mixed together before or during the addition of cellulosic components. The resulting mixture is then permitted to cure to create a composite material. Mixing can be accomplished using conventional mixers such as paddle mixers, static mixers and the like, currently known in the art.

Premixed components can be added to a sawdust cellulosic component via spraying application or dripping application, followed by rigorous mixing. Alternatively, each adhesive component can be added to the sawdust sequentially ("sequential addition"), simultaneously, in tandem ("tandem addition") without premixing, and then the mixture is rigorously blended. Blending can be achieved via any conventional mixing process including high speed paddle mixing (e.g., with a Littleford blender or a Henchel-type mixer), sigma-blade mixing, ribbon blending, etc. Additional materials can also blended concurrently or sequentially with the mixture including fillers such as calcium carbonate, aluminosilicates, clays fumed silica, nano-sized inorganic particulates, latex polymers, or antimicrobial compounds, etc.

Viscosity, sprayability, and/or spreadability of the adhesive components can be controlled by adjusting the amount of water added to the Part-B component before it is premixed with Part-A, or by adding water after the two components have been premixed. When premixing is not employed (e.g., if tandem or sequential mixing is employed), water can be added to the mixture as needed for the purpose of influencing viscosity and sawdust-particle surface coverage.

In another approach, for a two-part adhesive, Part-A and/or Part-B can be mixed together along with cellulosic components such as wood fiber, sawdust, or other components; blended with optional polymeric components (e.g., virgin or recycled) plasticizers, stabilizers, and other additives in liquid, pelletized, or powdered form; and then extruded via single screw or twin screw extrusion methods to create cured composite products such as rail ties, fencing posts, fining strips, decking, etc. The extrudate can be used to feed an injection molding machine for the purpose of fabricating molded parts such as garage door panels, car door panels, cabinet doors, toilet seats, and the like.

Under certain circumstances, pressure and/or heat can be used to facilitate curing. The amount of pressure and the time period for which the pressure is applied are not limited and specific pressures and times will be evident to one skilled in the art from the present disclosure (see the various Examples). In certain embodiments, a pressure of approximately 10 to 250 psi is applied from about 10 minutes to about 2 hours, or from about 10 minutes to about 30 minutes (depending on the temperature). The pressure, heating, or application of both pressure and heat decreases the viscosity of the polypeptide-containing adhesives described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

Depending upon the adhesive used, the resulting article can be moisture resistant. Furthermore, the article may remain intact after boiling in water for 5 minutes, 10 minutes, 30 minutes, 1 hour, 2 hours, or 3 hours. Furthermore, two or more components of the article may remain bonded after boiling in water for 5 minutes, 10 minutes, 30 minutes, 1 hour, 2 hours or 3 hours. Furthermore, the article when boiled in water for 5 minutes, 10 minutes or 30 minutes, may display less than a 20% increase, or less than a 10% increase in volume relative to the article prior to exposure to the water.

Furthermore, when the article (for example, a composite material, a laminate, or a laminate containing a composite material) contains a lignocellulosic material, the article exhibits no less than 75% cohesive failure of the lignocellulosic component when the article is placed under a loading stress sufficient to break the article. In certain embodiments, when an article (resulting product) contains a lignocellulosic material, the article has a block shear strength as measured under the D905 and D2559 ASTM standards of greater than 3,000 lbs., 4,000 lbs., 5,000 lbs. or 6,000 lbs.

Throughout the description, where compositions and articles are described as having, including, or comprising specific components, or where processes and methods are described as having, including, or comprising specific steps, it is contemplated that, additionally, there are compositions and articles of the present invention that consist essentially of, or consist of, the recited components, and that there are processes and methods according to the present invention that consist essentially of, or consist of, the recited processing steps.

Practice of the invention will be more fully understood from the foregoing examples, which are presented herein for illustrative purposes only, and should not be construed as limiting the invention in any way.

EXAMPLES

Example 1

One-Part Adhesive Comprising Polymeric Isocyanate, Polyol, and a Polypeptide Composition Derived from Whey Digested whey protein (lot 5-72, referred to herein as digested whey protein pH 6.5) was obtained as an experimental sample from Prof. S. Braun, the Laboratory of Applied Biology at the Hebrew University of Jerusalem, Israel, and was prepared as follows; Whey protein (WPI-95® Whey Protein Isolate; Nutritteck, 24 Seguin Street, Rigaud, QC, Canada J0P 1P0) was suspended in water at a ratio of 1:6 (w/w). The pH of the suspension was adjusted to pH 7 with 5N NaOH, and was heated to 55° C. while stirring. FLAVOURZYME 500MG® (from NOVOZYMES') then was added at a ratio of 20 g per kg of whey protein, and the mixture was stirred at the same temperature for 4 hours. The resulting aqueous mixture was pH 6.5. The resulting mixture then was spray-dried to yield digested whey protein as a pale yellow powder.

A prepolymer (JM30-1) was prepared by reacting 73.81 parts of a polymeric MDI (PMDI), RUBINATE-M isocyanate from Huntsman Corp., with 16.19 parts of a polyoxypropylene glycol of 2000 molecular weight (JEFFOL PPG- 2000 polyol from Huntsman Corp.), and with 10 parts of a digested and dried whey protein (weight basis).

The prepolymer ingredients were mixed together simultaneously in a one-step process under a nitrogen atmosphere at a temperature of 95° C., and were allowed to react for 2 hours. The resulting homogeneous solution then was allowed to cool to 25° C. under static ambient conditions. Upon cooling, phase separation was observed. A loose sediment settled to the bottom of the glass container and a cloudy supernatant remained on top. The sediment was readily redispersed with stirring, under nitrogen. The resulting prepolymer (a viscous liquid dispersion) then was used to prepare a series of one-part moisture-curable and thermally-curable adhesives with different catalyst types and catalyst levels. The catalysts included iron acetylacetonate (Fe(III) 2,4-pentanedionate (FeAcAc), CAS Number 14024-18-1, obtained from Alfa Aesar Inc.), and a morpholine derivative (JEFFCAT DMDEE catalyst from Huntsman Corp.).

Each sample was prepared by mixing the catalysts with the prepolymer under nitrogen, and by then heating the mixtures in sealed containers in a gravity oven at a temperature of 80° C. for approximately 1.5 hours (with periodic removal for shaking by hand). Upon heating, the dispersed components were observed to become soluble as evidenced by the improved clarity of the solutions. Upon cooling (after the samples were removed from the oven), the solutions became cloudy, but they remained stable with no settling even after several weeks of prolonged storage under ambient conditions (25° C.). The compositions of the adhesives are given in Table 2.

TABLE 2

Adhesive Compositions and Bond Strengths

| Sample | Catalyst type and level (phr)* | Bond Strength (peak load at failure) in pounds (+/−S.D.) |
| --- | --- | --- |
| 1-17A | 0.5 phr DMDEE + 0.1 phr FeAcAc | 4990 (+/−780) |
| 1-17B | 0.5 phr DMDEE | 5510 (+/−750) |
| 1-17C | 0.35 phr DMDEE | 5400 (+/−1070) |
| 1-17D | 0.2 phr DMDEE | 5800 (+/−1160) |
| 1-17E | 0.1 phr FeAcAc | 3230 (+/−1090) |

*"phr" refers to the number of parts of a particular substance per one hundred parts adhesive The bond strength of the one-part adhesives to Lodgepole Pine (moisture content approximately 10%) was evaluated via a compressive shear test (ASTM D905), which is also described in ASTM D2559. 2"×2"×¾" surface-sanded blocks were separated into pairs, and were pre-conditioned for 24 hours under ambient laboratory conditions (23° C., at approximately 45% RH). Each of the adhesives in Table 2 was used to coat the inner surface of matched wood block pairs (replicates of 6 pairs per adhesive). 0.4 to 0.6 g of each adhesive was applied with a plastic pipette and was spread with a spatula onto a 2"×1¾" section of a treated-face (only one block per pair was coated with adhesive). The adhesive-coated surface then was sandwiched with the second treated-block of the pair, so that the treated surfaces were in contact with the adhesive over a 2"×1¾" contact area. This allowed ¼" of each block to overhang in a "lap-shear" type geometry, similar to that described in ASTM D2559. The sandwiched specimens then were cured under pressure (214 psi) for 30 minutes using a Carver press with platen temperatures set at 200° C. During the assembly of the samples (prior to their exposure to the press cycle), the adhesives that were prepared with the DMDEE catalyst were observed to foam when exposed to the wood surfaces. The samples prepared with the Fe catalyst alone remained uncured (no foaming) until after the press cycle. After pressing, all of the adhesives were cured as evidenced by the rigid foam-like characteristics of the excess material that was squeezed out from the bondline area. The average compressive shear bond strength of each sample set is also given in Table 2.

The results illustrate that high bond strengths to wood can be achieved using adhesives containing isocyanate compounds and whey protein derivatives. Moreover, the catalyst choices can include those that favor long staging times under ambient conditions (long open times) such as FeAcAc, those that favor more rapid moisture cure such as DMDEE, and mixtures thereof. Adhesives with FeAcAc require thermal activation, whereas those made with DMDEE can be cold cured under ambient conditions. Thus, a wide variety of one-part adhesives can be formulated to meet the needs of a variety of end-use processes and applications.

In order to assess the reproducibility of these procedures, two additional sets of specimens (6 block shear specimens per set) were prepared using a freshly prepared mixture of the 17-1E adhesive. The average block shear strengths for the two sets were determined to be 3,660 pounds (+/−930), and 3,570 pounds (+/−850), respectively. The pooled average and standard deviation of the three data sets (n=18) was determined to be 3480+/−920 pounds.

Example 2

One-Part Adhesive Comprising Polymeric Isocyanate and a Protein Derived from Whey The procedures for prepolymer preparation, adhesive preparation, and block-shear sample preparation were identical to those reported in Example 1.

A prepolymer was prepared (JM39-1) using the same PMDI and the same digested whey protein (pH 6.5). This prepolymer was analogous to the prepolymer used in Example 1 (JM30-1) with one exception: the polyol component was omitted and was replaced with an equivalent level of the same digested whey protein. The final composition was approximately 75/25 (w/w) PMDI/protein. An adhesive (54-1) then was made with 0.1 phr FeAcAc to determine the effect of the presence or absence of polyol on bond strength. The average block-shear bond strength of Lodgepole Pine samples made with the 54-1 adhesive was determined to be approximately 3,700 pounds (+/−980). This result was very similar to that obtained for the analogous adhesive in Example 1 which contained a polyol component (1-17E). This result shows that the use of a polyol in a 1-part adhesive is optional, and that the choice of whether or not to employ a polyol component in the adhesive depends on end-use performance. As will be shown in subsequent Examples, this choice can depend on wood type, protein type, and other process-related attributes such as viscosity, and dispersion stability.

A second prepolymer sample (JM26-3) was analogously made using a PMDI/protein ratio (w/w) of 87/13. An analogous adhesive was also prepared with 0.1 phr FeAcAc (52-1) and was tested with Lodgepole Pine to yield an average block shear strength of approximately 1,300 (+/−1300) pounds. Thus, although adhesives can be prepared with a broad range of PMDI/protein ratios, the performance in terms of shear strength can be affected by the level of protein in the adhesive. In the present example, the adhesive bond strength to Lodgepole Pine was improved when the digested whey protein (pH 6.5) was used at ratios exceeding 13% by weight of the prepolymer. Prepolymers containing lower ratios of PMDI/digested whey protein (pH 6.5) were also prepared (PMDI/protein w/w<75/25). However, unlike JM39-1, these prepolymers were more viscous and could not be as easily mixed or poured under ambient conditions. Such materials conceivably can be used to make adhesives (e.g., caulkable adhesives and sealants). However, if pourable adhesives are desirable (low enough in viscosity to be pourable at 25° C.), the digested whey protein level should be less than 25% by weight of the prepolymer. Higher levels of protein can still be used to achieve pourable adhesives if either a reactive or non-reactive diluent is formulated with the adhesive to lower its viscosity.

Example 3

Effect of pH on the Reactivity of Digested Whey Protein

A prepolymer sample was made having the same PMDI/protein ratio as sample JM39-1 from Example 2 (approximately 75/25 PMDI/protein) using the same synthetic methods as outlined in Example 1. However, in this example, a different type of digested whey protein was employed.

The protein derivative was obtained as an experimental sample (lot 5-80, referred to herein as digested whey protein pH 3.5) from the Laboratory of Applied Biology at the Hebrew University of Jerusalem, Israel, and was prepared as follows. Whey protein (WPI-95® Whey Protein Isolate; Nutritteck, 24 Seguin Street, Rigaud, QC, Canada J0P 1P0) was suspended in water at the ratio of 1:6 (w/w). The pH of the suspension was adjusted to pH 7 with 5N NaOH. Flavourzyme 500MG® (NOVOZYMES') was then added at a ratio of 20 g per kg of whey protein, and the mixture was stirred at ambient temperature for 18 hours. The pH of the resulting mixture was then lowered by the addition of concentrated HCl to pH 3.5, and it was spray-dried to yield a pale yellow powder.

During the synthesis of the prepolymer, significant foaming was observed, and the resulting product became a thermoset solid. Thus, unlike the digested whey protein (pH 6.5), the more acidic digested protein (pH 3.5) produced a rigid solid when it reacted with PMDI. Although such a material could find use in many applications (e.g., as a 2-part reactive system for use as an adhesive, or as a 2-part reaction injection molding system for use in fabricating molded thermoset materials), this result demonstrates that in order to prepare a pourable 1-part adhesive with high levels of the digested whey protein, it is preferred that the digested whey protein be prepared under near-neutral conditions.

Example 4

One-Part Adhesive Comprising Polymeric Isocyanate and a Protein Derived from Whey: Southern Yellow Pine (SYP) Vs. Lodgepole Pine In a subsequent test, the 54-1 adhesive from Example 2 was used to prepare block shear samples with southern yellow pine (SYP) rather than Lodgepole Pine. The wood was planed, cut to size, and sanded as noted in Example 1. In addition, the SYP was conditioned at 21° C. and 65% relative humidity for at least 24 hours in an environmental chamber to achieve a moisture content in the wood of approximately 12%. Block shear samples were assembled using procedures as outlined in Example 1. Six block-shear pairs then were cured under pressure (250 psi) for 30 minutes using a Carver press with platen temperatures set at 205° C. The samples were tested for average compressive shear strength as outlined in Example 1.

The average compressive shear strength (peak load) at failure for the SYP specimens was determined to be only 100 (+/−45) pounds. Thus, the strength of the joint with SYP was significantly less than that which was observed for the Lodgepole Pine specimens that were tested in Example 2 (3,700 pounds). Thus, although the specific protein in this example (digested whey, pH 6.5) can be used to formulate strong adhesives, the bond strength as illustrated here has the potential to vary according to the type of wood that is employed as the adherend.

Example 5

Testing of SYP with One-Part Adhesives Comprising Polymeric Isocyanate and Various Proteins Derived from Whey The protein derivatives in this Example included digested whey pH 6.5 (lot 5-72, see Example 1 for the digestion procedure), digested whey pH=3.5 (lot 5-80, see Example 3 for the digestion procedure), and a third protein derivative from whey (a digested and deaminated protein from whey). The digested and deaminatined protein was produced by reacting the enzyme digested whey protein (pH 6.5), described above, with nitrous acid.

The specific digested and deaminated whey protein for this Example was obtained as an experimental sample (lot 5-75) from Prof. S. Braun, the Laboratory of Applied Biology at the Hebrew University of Jerusalem, Israel, and was prepared as follows. Whey protein (WPI-95® Whey Protein Isolate; Nutritteck, 24 Seguin Street, Rigaud, QC, Canada J0P 1P0) was suspended in water at a ratio of 1:6 w/w. The pH of the suspension was adjusted to pH 7 with 5N NaOH. Flavourzyme 500MG® (NOVOZYMES') then was added at the ratio of 20 g per kg of whey protein, and the mixture was stirred at ambient temperature for 18 hours. L-lactic acid (90%, 120 g per kg whey protein) then was added to bring the pH to 4.4 followed by gradual addition (over a 20 hour period) of sodium nitrite solution in water (0.4 kg/l, 0.4 liter per kg whey protein) while stirring. The reaction then was left to stand at ambient temperature for 40 hours. $Na_2S_2O_5$ (0.2 kg per kg whey protein) then was added; and then the reaction was heated to 60° C. and stirred for 15 minutes. After cooling to ambient temperature, the reaction was brought to pH 2.0 with concentrated HCl. The reaction mixture was then left at 10° C. for 18 hours and the precipitate was collected by centrifugation for 15 minutes at 24,000×g. The precipitate was re-suspended in 10 mm citric acid (3 vol. per vol. precipitate), and then was collected and subsequently freeze-dried to yield a pale yellow powder.

The adhesives in this Example were prepared by mixing the whey protein derivatives with a premixed solution containing RUBINATE-M PMDI from Huntsman Corp. and 0.1% FeAcAc by weight. The proteins were stirred into the PMDI solution under ambient conditions while maintaining a blanket of nitrogen over the mix. The resulting dispersions then were used to prepare SYP block-shear specimens in accord with the procedures outlined in Example 4. The compositions of the adhesives and the resulting average block shear strengths are given in Table 3.

TABLE 3

Adhesive Compositions and Average SYP Block Shear Strengths

| Sample | Protein Type | Weight % Protein | Bond Strength (peak load at failure) in pounds (+/− S.D.) |
|---|---|---|---|
| 56-1 | Flavourzyme digested whey, pH 6.5 (lot 5-72) | 15 | 230 +/− 110 |
| 56-2 | Flavourzyme digested whey, pH 3.5 (lot 5-80) | 15 | 620 +/− 620 |
| 56-3 | Washed digested and deaminated whey protein (lot 5-75) | 15 | 5440 +/− 1260 |
| 56-4 | Flavourzyme digested whey, pH 6.5 (lot 5-72) | 25 | 90 +/− 70 |
| 56-5 | No protein | 0 | 4500 +/− 760 |

These results show that the strength of the adhesive is dependent on the method that is used to prepare the protein derivatives. In fact, with the exception of the digested and deaminated whey protein, the other proteins actually had a deleterious effect on adhesion strength. Thus, when preparing a 1-part adhesive for SYP from whey-based proteins, the preferred protein appears to be the digested and deaminated whey protein. A similar preference was observed for castor-based proteins that were synthesized via a 1-step reaction process (see Example 7).

Example 6

Testing of SYP with One-Part Adhesives Containing Polymeric Isocyanate and Protein Derived from Castor The adhesives in this Example contained 15 parts by weight of an Everlase digested protein from castor that was obtained as an experimental sample (lot 5-83, referred to herein as "digested castor") from Prof. S. Braun, the Laboratory of Applied Biology at the Hebrew University of Jerusalem, Israel. The digested castor was prepared as follows.

Castor meal protein was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at the ratio of 10 g per kg of castor meal protein, and the mixture was stirred at the same temperature for 4 hours. The resulting mixture then was brought to a pH 3.5 with citric acid and was spray-dried to yield a tan powder.

The enzyme digested castor protein was mixed together with either (1) 85 parts by weight of neat Rubinate-M PMDI; (2) 85 parts by weight of a premixed solution of Rubinate PMDI containing 0.1% FeAcAc, or (3) 85 parts by weight of a 90/10 (w/w) PMDI/PPG2000 prepolymer that was pre-formulated with 0.1% FeAcAc (JM62-2). The JM62-2 prepolymer was synthesized via the same procedures outlined in Example 1 for other prepolymers.

The adhesives were prepared by hand-mixing aliquots of the protein into the isocyanate-based solutions with a spatula under a blanket of nitrogen at 23° C. The resulting dispersions then were sealed under nitrogen and were placed into a static gravity oven at a temperature of 80° C. for a period of 2 hours. The dispersions were initially characterized as having relatively low viscosities. Upon removal from the oven, there was evidence of foaming, and it was apparent that the dispersions had become more viscous. Upon opening the jars, the reaction products were observed to be viscous, but were still easily dispensable and could be readily spread with a spatula. The dispersions were also shelf-stable with no evidence of settling under ambient conditions after several weeks of observation.

In certain cases, DMDEE catalyst was then added to the adhesives (i.e., after the 2 hour period at 80° C.) at a concentration of 0.13 parts per hundred parts adhesive (phr). The adhesives were used to prepare SYP block shear specimens in accord with the procedures outlined in Example 4. The compositions of the adhesives and resulting average block shear strengths are given in Table 4. In addition, the failed wood specimens were analyzed for % wood failure in accord with the D905 and D2559 ASTM standards.

TABLE 4

Adhesive Compositions and SYP Block Shear Strength Comparisons

| Sample | Protein Type (15% by weight) | PMDI-based component (85% by weight) | Additional Catalyst (phr) | Average % wood failure (+/−S.D.) | Average Bond Strength (peak load at failure in pounds) (+/−S.D.) |
|---|---|---|---|---|---|
| 61-2 | Everlase digested castor (lot 5-83) | PMDI + 0.1% FeAcAc | 0 | 1 (1) | 200 (80) |
| 62-1 | Everlase digested castor (lot 5-83) | 90/10 (w/w) PMDI/PPG 2000 | 0.13 DMDEE | 97 (3) | 6070 (380) |
| 62-2 | Everlase digested castor (lot 5-83) | JM62-2 90/10 (w/w) PMDI/PPG 2000 + 0.1% FeAcAc | 0 | 79 (17) | 4710 (1050) |
| 62-3 | Everlase digested castor (lot 5-83) | JM62-2 90/10 (w/w) PMDI/PPG 2000 + 0.1% FeAcAc | 0.13 DMDEE | 100 (0) | 6000 (1050) |
| 62-4 | none | JM62-2 90/10 (w/w) PMDI/PPG 2000 + 0.1% FeAcAc | 0 | 98 (2) | 5800 (1600) |

Sample 61-2 was observed to exhibit poor bond strength to SYP, much like the 56-1 sample from Example 5. In both cases, the adhesives were formulated with 85/15 (w/w) of PMDI/digested protein (derived from whey in Example 5, and derived from castor in the present example). However, the bond strength was observed to improve dramatically when a fraction of the PMDI was replaced by a polyol (62-2), and even more so when an additional catalyst was added (62-3). The performance also appeared to depend on the choice of catalyst, particularly when the adhesive was formulated with protein. For example, sample 62-4 which contained no protein, was noted to out-perform the protein-containing sample 62-2, even though both adhesives employed FeAcAc as a catalyst. Surprisingly, when DMDEE was added to the formulation, the strength of the adhesive bond was observed to exceed the cohesive strength of the wood itself, independent of whether the DMDEE was added in the presence of FeAcAc (62-3), or in the absence of FeAcAc (62-1).

These results demonstrate that high bond strengths to SYP can be achieved with isocyanate-based adhesives containing digested castor proteins, particularly when the adhesive contains a polyol component which had been pre-reacted with PMDI prior to the addition of the protein to the formula. Further enhancements can be achieved by varying the nature of the catalysts that are employed.

The attributes of these adhesives are potentially advantageous for certain adhesive applications, particularly those that may require long staging times prior to pressing, as is sometimes the case for laminated veneer lumber (LVL) manufacturing processes. When staging times exceed several minutes, low-viscosity liquid adhesives may tend to bleed into the wood veneers. This can sometimes lead to bond-line starvation, and to insufficient bond strength after pressing. Also, many one-part isocyanate systems are designed to cure with moisture, and hence may cure prematurely during staging periods. This can also lead to the deterioration of final bond strength after pressing.

Adhesives like those developed in the present Example have the advantage of being high enough in viscosity to maintain a bond line for prolonged periods of time without bleeding. In addition, premature reaction with moisture can be conveniently avoided by one of several mechanisms including: (1) the omission of moisture-activated catalysts; (2) the use of thermally-activated catalysts; (3) the use of minimal amounts of moisture-activated catalysts together with thermally activated catalysts, and (4) the maintenance of a high enough viscosity during staging so as to mitigate moisture diffusion into the adhesive.

Example 7

One-Part Adhesives Containing Polymeric Isocyanate and Proteins Derived from Castor: 1-Step Vs. 2-Step Synthesis Adhesives in this Example were prepared with the same digested castor protein described in Example 6, and separately with another castor protein derivative, digested and deaminated castor protein. This derivative was obtained as an experimental sample (lot 5-82) from Prof. S. Braun, the Laboratory of Applied Biology at the Hebrew University of Jerusalem, Israel. The digested and deaminated castor protein derivative was produced by reacting the enzyme-digested castor protein, described above, with at least one member selected from the group consisting of nitrous oxide, nitrous acid, and salts of nitrous acid.

The specific preparation procedure for the digested and deaminated castor protein that was used in this example (lot 5-82) was as follows. Castor meal protein was suspended in water at a ratio of 1:10 (w/w). Calcium chloride was added at an effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at a ratio of 10 g per kg of castor meal protein, and the mixture was stirred at the same temperature for 4 hours. L-lactic acid (90%, 120 g per kg castor protein) then was added to bring the mixture to pH 4.4 followed by gradual addition (over a 20 hour period) of sodium nitrite solution in water (0.4 kg/l, 0.4 liter per kg castor protein) while stirring. The reaction then was left to stand at ambient temperature for 40 hours. $Na_2S_2O_5$ (0.2 kg per kg castor protein) was then added, and the reaction was heated to 60° C. and stirred for 15 minutes. After cooling to ambient temperature, the reaction was brought to pH 2.0 with concentrated HCl. It was then left at 10° C. for 18 hours, and the resulting precipitate was separated by centrifugation for 15 minutes at 24,000×g. The precipitate was re-suspended in 10 mM citric acid (3 vol. per vol. precipitate), and then it was collected and subsequently freeze-dried to yield a tan powder.

For comparative purposes, adhesives were also made with a digested soy protein that was obtained as an experimental sample (lot 5-81) from Prof. S. Braun, the Laboratory of Applied Biology at the Hebrew University of Jerusalem, Israel. The digested soy protein was prepared as follows. Soy protein isolate (Soy protein isolate SOLPRO 958® Solbar Industries Ltd, POB 2230, Ashdod 77121, Israel) was suspended in water at a ratio of 1:10 (w/w). The pH of the suspension was adjusted to pH 7 with 10N NaOH, and was then heated to 55° C. while stirring. Neutrase 0.8 L® (NOVOZYMES') then was added at a ratio of 20 g per kg of soy protein, and the mixture was stirred at the same temperature for 4 hours. The resulting mixture (pH 6.5) was spray-dried to yield a light tan powder.

The synthetic method as described in Example 1 (a 1-step method) was used to make the prepolymers for this example. Each of the prepolymers contained 15 parts by weight of a protein derivative chosen either from castor, whey, or soy (the complete prepolymer compositions are provided in Table 5). The protein derivatives were reacted with one of three combinations of additional ingredients: (1) 76.5 parts by weight of Rubinate-M PMDI with 8.5 parts by weight of PPG 2000 polyol; (2) 85 parts by weight Rubinate-M PMDI alone; or (3) 76.5 parts by weight of Rubinate-M PMDI with 4.25 parts by weight of PPG 2000 polyol and 4.25 parts by weight castor oil (Pale Pressed Castor Oil from Alnor Oil Company, Inc.). In each case, the ingredients were simultaneously mixed under a nitrogen atmosphere at a temperature of 95° C., and were allowed to react for 2 hours. The reaction products then were allowed to cool to 25° C. under ambient conditions.

During the prepolymer synthesis, a color change was observed for the samples containing the castor protein derivatives (JM63-1, JM63-2, JM64-1, JM64-2). This color change occurred at approximately 75° C. The color of the reaction mixture changed from a cloudy tan dispersion to a dark brown translucent dispersion. There was a slight color change for the samples containing the soy protein and the whey protein, but not nearly as significant as that observed for the castor-based prepolymers. In addition, slight foaming was observed for the soy and whey prepolymers, which was not observed for the castor-containing prepolymers.

TABLE 5

| Pre-polymer | PMDI Level (parts by wt.) | Polyol Type & level (parts by wt.) | Protein Type | Clarity during synthesis | Dispersion stability after synthesis |
|---|---|---|---|---|---|
| JM64-1 | 76.5 | 8.5 PPG 2000 | Everlase digested castor (lot 5-83) | Translucent | Minimal sedimentation |
| JM63-1 | 85 | None | Everlase digested castor (lot 5-83) | Translucent | Minimal sedimentation |
| JM63-2 | 85 | None | Digested and deaminated castor protein (lot 5-82) | Translucent | Minimal sedimentation |
| JM64-2 | 76.5 | 4.25 PPG 2000 + 4.25 castor oil | Everlase digested castor (lot 5-83) | Translucent | Minimal sedimentation |
| JM66-1 | 76.5 | 8.5 PPG 2000 | Digested soy protein (lot 5-81) | Opaque | Large amount of sediment |
| JM66-2 | 76.5 | 8.5 PPG 2000 | Digested whey protein (lot 5-80; pH = 3.5) | Opaque | Large amount of sediment |

After each prepolymer reaction was complete (2 hours at 95° C.), the heat of the reactor was turned off, and a catalyst (the same FeAcAc as used in previous Examples) was added to each formulation at a concentration of 0.1 phr to yield the adhesives shown in Table 6. The solutions were stirred for 30 minutes under a nitrogen blanket. Upon cooling, loose sediment was observed to settle to the bottom of the glass containers, and a cloudy supernatant remained on top. The degree of sedimentation was the greatest for the soy and whey proteins. The sediments were readily redispersed with stirring (under nitrogen).

The bond strengths of the one-part adhesives to SYP were evaluated via a compressive shear test as described in the previous Examples. 2"×2"×¾" blocks (planed and then surface-sanded) were separated into pairs, and were pre-conditioned for at least 24 hours at 21° C. and at 65% relative humidity in an environmental chamber to achieve a bulk-wood moisture content of approximately 12%. Each of the adhesives in Table 6 was used to coat the inner surface of matched wood block pairs (replicates of 6 pairs per adhesive). 0.4 to 0.6 g of each adhesive was applied with a plastic pipette, and was then spread with a spatula onto a 2" x 1¾" section of a treated-face (only one block per pair was coated with adhesive). The adhesive-coated surface then was sandwiched with the second block of the pair, so that the surfaces were in contact with the adhesive over a 2"×1¾" contact area. This allowed ¼" of each block to overhang in "lap-shear" fashion, similar to that described in ASTM D2559. The sandwiched specimens then were cured under pressure (250 psi) for 30 minutes using a Carver press with platen temperatures set at 208° C. During the assembly of the samples (prior to their exposure to the press cycle), the adhesives remained uncured (no foaming). After pressing, all of the adhesives were cured as evidenced by rigid foam-like characteristics of the excess material that was squeezed out from the bondline area. The average compressive shear bond strength and % wood failure for each sample set is given in Table 6.

TABLE 6

| Adhesive | Prepolymer | Average % wood failure (+/−S.D.) | Average Bond Strength (peak load at failure in pounds) (+/−S.D.) |
|---|---|---|---|
| 64-1 | JM64-1 | 21 (+/−20) | 870 (+/−450) |
| 64-2 | JM63-1 | 10 (+/−7) | 910 (+/−570) |
| 64-3 | JM63-2 | 84 (+/−15) | 4860 (+/−1500) |
| 64-4 | JM64-2 | 9 (+/−7) | 630 (+/−470) |
| 64-5 | JM66-1 | 79 (+/−18) | 4280 (+/−1550) |
| 64-6 | JM66-2 | 0 (+/−0) | 130 (+/−40) |

These results from Table 6 reveal that the adhesive made with the digested and deaminated castor protein derivative (64-3) performed much better than the analogous adhesive made with the digested derivative from castor (64-2). Thus, when a 1-step synthetic method was employed to make a 1-part adhesive (i.e., when PMDI was simultaneously mixed and reacted with the protein derivative), the preferred protein derivative was digested and deaminated protein. An analogous result was observed for 1-part systems made with whey derivatives (see Example 5). These results collectively demonstrate that the bond-strength performance can be influenced by the method used to prepare the protein derivatives. Also, based on trends from previous examples, it is worth noting that further performance-enhancements could be possible through the incorporation of an additional catalyst component (i.e., DMDEE), and/or through the incorporation of an additional polyol component.

It should be noted that when an adhesive with digested castor was made via a 1-step process (64-1), the bond strength to SYP was significantly less than the bond strength that was observed when the same adhesive was made via a 2-step process (62-2 from Example 6). This result demonstrates that the method of prepolymer synthesis (1-step vs. 2-step) also appears to have a pronounced influence on bond strength performance. Thus, when digested castor is used to make a 1-part adhesive, the preferred method of synthesis is a 2-step method (see Example 6), where the PMDI is first reacted with PPG 2000 to yield an intermediate prepolymer, and where the intermediate prepolymer then is subsequently reacted with the digested castor in a second step to yield the final, preferred prepolymer.

Example 8

Epoxy-Based Protein Adhesive

The castor protein derivatives that were used in this example were the same derivatives that were used in Example 7. A thermally curable epoxy adhesive was prepared by first mixing 1.98 parts of the digested castor together with 28.57 parts of the digested and deaminated castor protein into 69.45 parts water (on a weight basis) to yield a 30.55% solids dispersion (63B1). Next, an epoxy, glycidyl end-capped poly(bisphenol A-co-epichlorohydrin) (CAS Number 25036-25-3, from Sigma-Aldrich Chemical, Inc.) was mixed with 63B1 at a ratio of 63B1 to epoxy of 4.22/1 (w/w) (1.29/1 w/w on a solids basis). The resulting dispersion was a stable paste that was easily spread with a spatula.

Six pairs of conditioned SYP block shear specimens were prepared and pressed at a pressure of 250 psi, and at a temperature of 208° C. for a 30 minute dwell time using procedures as described in Example 7. Upon removal from the press, the adhesive was noted to have cured as evidenced by the rigidity of a small amount of excess material that had squeezed out from the bondline.

The average block shear strength of the specimens was evaluated using the procedures reported in Example 7. The average bond strength was determined to be 620 pounds. Inspection of the failed samples revealed that the failure mechanism was predominantly cohesive failure of the bulk adhesive within the bondline. Further inspection revealed that the bondline adhesive itself was on the order of 0.010" to 0.015" in thickness. This result indicates that the adhesive did not flow extensively during the pressing operation, either because of a fast cure reaction, or due to a high melt viscosity prior to cure. Either way, because of the thickness of the adhesive in the bondline, and because it failed cohesively at a high force value, it is apparent that the material itself adhered well to wood, and that it was inherently strong. These attributes would render the adhesive as useful in applications where gap-filling characteristics are required. Note that this adhesive can optionally be mixed in 2-part fashion with isocyanate-based prepolymers and optionally with primary or secondary amines to achieve enhanced strength (via known epoxy-amine curing mechanisms).

Example 9

Ambient Cure Conditions

The JM64-1 prepolymer that was synthesized for Example 7 was mixed with 0.5% by weight DMDEE catalyst. Six pairs of conditioned SYP block shear specimens were prepared as outlined in Example 7, and were pressed at 250 psi for a dwell time of 90 minutes at a platen temperature of 28° C. The samples then were tested for block-shear strength as outlined in Example 7. The average strength was determined to be 2,040 pounds. This result shows that the protein-based adhesives can be selectively formulated for use in applications that require ambient cure.

Example 10

Two-Part Adhesive Based on Protein Derivatives from Whey

A two-part curable adhesive according to the invention was formulated by separately preparing and then mixing two components, a "Part-A" component, and a "Part-B" component.

The Part-A component in this example was the JM30-1 prepolymer described in Example 1, formulated with 0.1 phr FeAcAc. The composition of the Part-B component is shown in Table 7.

TABLE 7

| Part-B Composition | Level (weight %) |
|---|---|
| Water | 61.8 |
| 1,2 Propane diol (PPD) | 3.2 |
| Digested whey protein (pH = 6.5) (lot 5-72) | 1.8 |
| Digested and deaminated whey protein (lot 5-41) | 33.2 |

The Part-B mixture formed a stable, creamy dispersion (stable for weeks at 23° C.). In separate experiments, it was determined that the viscosity of the cream was largely dictated by the level of non-soluble digested and deaminated whey protein (PPD and the digested protein were soluble in water at the levels that were employed). Although a range of compositions for Part-B could potentially have been employed, this particular composition with approximately 35% protein facilitated the formulation of a 2-part system that not only had a high protein content (this is cost-advantageous), it had the potential of allowing the adhesive to become gap filling (as was observed for the epoxy-protein system in Example 8). Of course, higher solids levels are possible, but this can come at the expense of increasing the viscosity (which still could be desirable in some applications). Lower solids levels could also be employed, but this could come at the expense of diminishing the adhesive's gap filling capability (which could also be desirable in some applications).

In order to prepare the two part adhesive, 1.455 g of Part-A was vigorously mixed with 15.23 g Part-B under ambient conditions (about 23° C.), which equates to a w/w ratio of B/A of approximately 4/1 (excluding the volatile water component). The resulting dispersion was used within 6 minutes of mixing to prepare six block shear specimens with Lodgepole Pine using procedures employed in Example 1. The sandwiched specimens were cured under pressure (214 psi) for 25 minutes using a Carver press with platen temperatures set at 200° C.

Shortly after mixing, the viscosity was qualitatively observed to increase with time. In order to test the pot-life of the mixture, two subsequent sets of samples were prepared at approximately 36 minute intervals (note that sample preparation time was approximately 6 minutes). By the time the third set of specimens was prepared at approximately 78 minutes after mixing, the mixture had become a thick paste. Within approximately 3 hours, the mixture had formed a solid mass under ambient conditions. The resulting average block-shear strength values versus time after mixing are given in Table 8.

TABLE 8

| Sample | Approximate time lapse between mixing and sample preparation (minutes) | Average Bond Strength (peak load at failure in pounds) (+/−S.D.) |
|---|---|---|
| 47-1 | 6 | 3490 (+/−350) |
| 47-2 | 42 | 290 (+/−200) |
| 47-3 | 78 | 189 (+/−40) |

The results in Table 8 demonstrate that the resulting two-part reactive mixture (prepared with whey proteins) has a limited pot-life. However, the initial bond strength of the mixture was as good as the comparable one-part adhesive 1-17E (see Example 1) in spite of its overall higher protein content (approximately 75% protein by weight vs. 10% by weight protein in 1-17E). Thus, in addition to being water-based (low VOC), gap-filling, and tough when cured, this type of two-part adhesive facilitates the use of a significantly higher level of protein than would otherwise be possible with a one-part system (based on limitations discussed in the previous examples).

Example 11

Two-Part Adhesive Based on Protein Derivatives from Whey

All procedures in this Example, according to the invention, were identical to those employed in Example 10. The composition of the Part-B component is shown in Table 9.

TABLE 9

| Part-B Composition | Level (weight %) |
|---|---|
| Water | 63.2 |
| 1,2 Propane diol (PPD) | 8.0 |
| Digested whey protein (pH = 6.5) | 1.5 |
| Digested and deaminated whey protein (lot 5-75) | 27.3 |

36.90 g of Part-B was mixed with 5.03 g the JM30-1 prepolymer as the Part-A (formulated with 0.1 phr FeAcAc) under ambient conditions (about 23° C.), which equates to a w/w ratio of B/A of approximately 2.7/1 (excluding the volatile water component). The resulting dispersion was used within 6 minutes of mixing to prepare six block shear specimens with Lodgepole Pine using procedures identical to those employed in Example 10.

Shortly after mixing, the viscosity was qualitatively observed to increase with time. In order to test the pot-life of the mixture, two subsequent sets of samples were prepared at approximately 36 minute intervals (note that sample preparation time was approximately 6 minutes). By the time the third set of specimens was prepared at approximately 78 minutes after mixing, the mixture had become a thick paste. Within approximately 3 hours, the mixture had formed a solid mass under ambient conditions. The resulting average block-shear strength values as a function of time after mixing are given in Table 10.

TABLE 10

| Sample | Approximate time lapse between mixing and sample preparation (minutes) | Average Bond Strength (peak load at failure in pounds) (+/−S.D.) |
|---|---|---|
| 48-1 | 6 | 3500 (+/−390) |
| 48-2 | 42 | 2220 (+/−1370) |
| 48-3 | 78 | 800 (+/−1000) |

The results in Table 10 show that the resulting two-part reactive mixture has a longer pot-life than the formula used in Example 10; however, the pot-life was still limited. Nevertheless, the initial bond strength of the mixture was as good as the comparable one-part adhesive 1-17E (see Example 1) in spite of its overall higher protein content (approximately 60% protein by weight vs. 10% by weight protein in 1-17E). Thus, in addition to being water-based, low VOC, gap-filling, and tough when cured, this type of two-part adhesive facilitates the use of a significantly higher level of protein than would otherwise be possible with a one part system (based on limitations discussed in the previous Examples).

Example 12

Two-Part Adhesive Based on Protein Derivatives from Whey

All procedures in this Example, according to the invention, were the same as those employed in Example 10. The composition of the Part-B component is shown in Table 11.

TABLE 11

| Part-B Composition | Level (weight %) |
|---|---|
| Water | 64.2 |
| 1,2 Propane diol (PPD) | 7.8 |
| Digested whey protein (pH 6.5) | 1.4 |
| Digested and deaminated whey protein (lot 5-75) | 26.6 |

37.90 g of Part-B was mixed with 9.69 g of the JM30-1 prepolymer as Part-A (formulated with 0.1 phr FeAcAc) under ambient conditions (about 23° C.), which equates to a w/w ratio of B/A of approximately 1.4/1 (excluding the volatile water component). The resulting dispersion was used within 6 minutes of mixing to prepare six block shear specimens with Lodgepole Pine using procedures identical to those employed in Example 10.

Shortly after mixing, the viscosity was qualitatively observed to increase with time. The viscosity of the mixture was observed to increase more quickly than the mixtures used in Examples 10 and 11. For this reason, only two sets of samples were prepared, the second set was prepared approximately 36 minutes after the first set. By the end of the second set's press cycle (t=78 minutes after mixing), the mixture had solidified, and could no longer be used. The resulting average block-shear strength values as a function of time after mixing are given in Table 12.

TABLE 12

| Sample | Approximate time lapse between mixing and sample preparation (minutes) | Average Bond Strength (peak load at failure in pounds) (+/−S.D.) |
|---|---|---|
| 49-1 | 6 | 4900 (+/−680) |
| 49-2 | 42 | 2710 (+/−900) |

In spite of the short pot-life, the initial bond strength of the mixture was better than the comparable one-part adhesive 1-17E (see Example 1). This was surprising when one considers that the 2-part system in its cured state has a projected protein content of approximately 50% vs. 10% by weight protein in 1-17E. Thus, in addition to being water-based, low VOC, gap-filling, and tough when cured, this type of two-part adhesive facilitates the use of a significantly higher level of protein than would otherwise be possible with a one part system (based on limitations discussed in the previous Examples).

Example 13

Two-Part Adhesive Based on Protein Derivatives from Whey and EVA (Thermoset and Thermoplastic Types)

All sample preparation procedures in this Example were the same as those employed in Example 10 with one exception: the block shear specimens were pressed at a pressure of 250 psi for 30 minutes using a Carver press with platen temperatures set at 200° C. (6 pairs per cycle).

The "Part-A" component in this example was the JM30-1 prepolymer formulated with 0.1 phr FeAcAc from Example 1 (comprised of 73.81 parts PMDI, 16.19 parts PPG 2000, 10 parts of Flavourzyme digested whey protein (weight basis), and formulated with 0.1 phr FeAcAc).

The Part-B component in this Example was also formulated with an additional ingredient: poly(ethylene-co-vinyl acetate-co-methacrylic acid), commercially known as Airflex 426 (obtained from Air Products) and herein referred to as "EVA." The latex was gravimetrically determined to be 63% solids by weight. The percentage of water in the latex was taken into account when determining the total level of water in the formula. The composition of the Part-B component is shown in Table 13.

TABLE 13

| Part-B Compositions | Level (weight %) |
|---|---|
| Water | 50.3 |
| EVA (on a solids basis) | 27.6 |
| Digested whey protein (pH = 6.5) | 4.3 |
| Digested and deaminated whey protein (lot 5-75) | 17.8 |

7.45 g of Part-A was mixed with 15 g of Part-B under ambient conditions (about 23° C.), which equates to a w/w ratio of B/A of approximately 1/1 (excluding the volatile water component). The viscosity of the resulting dispersion was observed to noticeably increase within the first 5 minutes after mixing. This rate of viscosity rise was faster than had been observed for the analogous 2-part systems made in Examples 10-12. In fact, after approximately 1 hour, the mixture had turned into a rigid solid in its container. It was only possible to prepare 1 group of block shear specimens (the wood used in this example was Lodgepole Pine). In addition, samples were also made by using the Part-B component alone as an adhesive—in the absence of the Part-A curative. The resulting average block-shear strength values are given in Table 14.

TABLE 14

| Sample | Average Bond Strength (peak load at failure in pounds) (+/−S.D.) |
|---|---|
| 50-1 (Part-B alone) | 520 (+/−250) |
| 50-2 (2-part mixture) | 3700 (+/−1700) |

In spite of the short pot-life, the initial bond strength of the two-part mixture was similar to the comparable one-part adhesive 1-17E (see Example 1). This is particularly surprising when one considers that the two-part system in its cured state had a sum total protein content of approximately 27% vs. 10% by weight protein in 1-17E.

The bond strength of Part-B alone was inferior to that of the two-part system. In a separate experiment, additional samples were pressed for the purpose of determining whether or not they could be pulled apart by hand immediately upon removal from the press (while hot). The samples made with the two-part system could not be pulled apart, and the excess material that squeezed out from the bondline was rigid. Conversely, while they were still hot, the samples made with Part-B alone were easily pulled apart. However, when they were pressed back together by hand (i.e., before they were allowed to cool), the Part-B specimens formed a stable bond, and the samples could not be pulled apart by hand under ambient conditions at 25° C. These results indicate that Part-B alone behaves like a reversible thermoplastic adhesive, whereas the two-part system behaves like a thermoset.

Thus, in addition to being water-based, low VOC, gap-filling, and tough when cured, this type of adhesive can optionally be used to yield a reversible thermoplastic adhesive (by omitting the Part-A curative). This could be beneficial in adhesive applications that either tolerate or mandate thermoplastic behavior.

Example 14

Two-Part Adhesive Based on Protein Derivatives from Whey and EVA

All sample preparation procedures in this Example were the same as those employed in Example 13. The Part-B component in the Example was also the same as that used in Example 13.

15 g of Part-B was mixed with 7.45 g the JM26-3 prepolymer (as Part-A), described in Example 2 (formulated with 0.1 phr FeAcAc) under ambient conditions (about 23° C.), which equates to a w/w ratio of B/A of approximately 1/1 (excluding the volatile water component). The viscosity of the resulting dispersion was observed to noticeably increase within the first 5 minutes after mixing. This rate of viscosity rise was faster than had been observed for the analogous two-part systems made in Examples 10-12. After approximately 1 hour, the mixture had turned into a rigid solid in its container. It was only possible to prepare 1 group of block shear specimens (the wood used in this example was Lodgepole Pine). The resulting average block-shear strength value (averaged from 6 specimens) was determined to be 3,400 (+/−1600) pounds. In spite of the short pot-life and higher protein content, the initial bond strength of the two-part mixture was nearly double that of the comparable one-part adhesive 52-1 (52-1 had a bond strength of approximately 1,300 pounds—see Example 2). This is surprising when one considers that the two-part system in its cured state had a sum total protein content of approximately 29% vs. 13% by weight protein in 52-1.

Example 15

Two-Part Adhesive Based on Protein Derivatives from Whey and EVA

All sample preparation procedures in this Example were the same as those employed in Example 13. The composition of the Part-B component is shown in Table 15.

TABLE 15

| Part-B Composition | Level (weight %) |
|---|---|
| Water | 54.6 |
| EVA (on a solids basis) | 25.2 |
| Digested and deaminated whey protein (lot 5-75) | 20.2 |

In one case (sample 53-1), 15 g of Part-B was mixed with 7.45 g of the JM26-3 prepolymer (as Part-A) from Example 2 (formulated with 0.1 phr FeAcAc) under ambient conditions (about 23° C.), which equates to a w/w ratio of B/A of approximately 1.4/1 (excluding the volatile water component). In a second case, the same mixture was created, but the FeAcAc was omitted from the formulation (sample 53-2).

The viscosities of the resulting dispersions were observed to increase noticeably within the first 5 minutes after mixing. This rate of viscosity rise was faster than had been observed for the analogous 2-part systems made in Examples 10 through 12. In fact, after approximately 1 hour, the mixtures had turned into rigid solids in their respective containers. For this reason, it was only possible to prepare 1 group of block shear specimens for each (the wood used in this example was Lodgepole Pine). The resulting average block-shear strength values are given in Table 16.

TABLE 16

| Sample | Average Bond Strength (peak load at failure in pounds) (+/−S.D.) |
|---|---|
| 53-1 | 4550 (+/−1280) |
| 53-2 | 3030 (+/−1360) |

In spite of the short pot-life, the initial bond strengths of the two-part mixtures were surprisingly higher than the comparable one-part adhesive 52-1 (see Example 2). This is surprising when one considers that the two-part system in its cured state had a sum total protein content of approximately 31% vs. 13% by weight protein in 52-1. Also surprising is the fact that even the sample without the FeAcAc catalyst cured sufficiently enough to achieve considerably higher bond strength than its 52-1 counterpart.

Example 16

Two-Part Adhesive Based on Protein Derivatives from Castor

The sample preparation procedures in this Example were identical to those employed in Example 13. The Part-A reactive component of this example was composed of the same adhesive used to prepare sample 61-2 in Example 6 (85/15 w/w Rubinate-M PMDI/digested castor protein with 0.1 phr FeAcAc). The composition of the Part-B component is shown in Table 17.

TABLE 17

| Part-B Composition | Level (weight %) |
|---|---|
| Water | 69.45 |
| Digested protein from castor (lot 5-83) | 1.98 |
| Digested and deaminated castor protein (lot 5-82) | 28.57 |

35.28 g of Part-B was mixed with 8.35 g Part-A under ambient conditions (about 23° C.), which equates to a w/w ratio of B/A of approximately 1.29/1 (excluding the volatile water component). The resulting dispersion had a considerably longer pot-life than the two-part systems from previous Examples (the viscosity did not noticeably change during a 1.5 hour period of observation). A single set of six SYP block shear specimens were prepared within 6 minutes after mixing the sample. The samples were pressed at a pressure of 250 psi in a Carver press for a dwell time of 30 minutes with platen temperatures set at 205° C. The resulting average block-shear strength of this set (60-1) was determined to be 4,060 (+/−600) pounds with 73% average wood failure.

The bond strength of this two-part mixture was significantly higher than the comparable one-part adhesive 61-2 (200 pounds; see Example 6). This is surprising when one considers that the 2-part system in its cured state had a sum total protein content of approximately 63% vs. 15% by weight protein in 61-2. Thus, in addition to being water-based (low VOC), gap-filling, and tough when cured, this type of two-part adhesive facilitates the use of a significantly higher level of protein than would otherwise be possible with a one-part system (based on limitations discussed in the previous Examples), while simultaneously providing enhanced bond strength to SYP.

Example 17

Two-Part Adhesive Based on Protein Derivatives from Castor with and without EVA

The sample preparation procedures in this Example were the same as those employed in Example 13 with two exceptions: the block shear specimens were made with SYP, and they were pressed at a pressure of 250 psi for 30 minutes using a Carver press with platen temperatures set at 208° C. (6 pairs per cycle). The "Part-A" curative components for this Example were chosen from the adhesives that were used as one-part adhesives in Examples 6 and 7 (the compositions are given in Tables 4, 5, and 6). The Part-A components were all formulated with 0.1 phr FeAcAc.

The Part-B component compositions for this Example are given in Table 18. Note that Part-B1 is the same as that used in Example 16, while Part-B2 contains an additional EVA ingredient. Both Part-B mixtures were formulated to have similar viscosities. The compositions of the resulting 2-part adhesives for this example (Part-A+Part-B) are provided in Table 19 together with average block shear strengths and wood-failure percentages for SYP block-shear specimens.

TABLE 18

| Part-B Composition | "Part-B1" (weight %) | "Part-B2" (weight %) |
|---|---|---|
| Water | 69.45 | 62.13 |
| Digested protein from castor (lot5-83) | 1.98 | 2.41 |
| Digested and deaminated castor protein (lot 5-82) | 28.57 | 25.03 |
| Airflex 426 EVA (solids basis) | 0 | 10.43 |

TABLE 19

| Sample ID | Part B1 level (g) | Part B2 level (g) | Part A Component and Level (g) | B/A ratio (solids basis excluding volatile water) | % protein by wt. in cured adhesive | % wood failure (+/−S.D.) | Average Bond Strength to SYP (peak load at failure, lbs.) (+/−S.D.) |
|---|---|---|---|---|---|---|---|
| 63-1 | 8.44 | 0 | 62-4 (90/10 (w/w) PMDI/PPG 2000), 2.0 g | 1.29/1 | 56.3 | 29 (+/−27) | 2400 (+/−2000) |

TABLE 19-continued

| Sample ID | Part B1 level (g) | Part B2 level (g) | Part A Component and Level (g) | B/A ratio (solids basis excluding volatile water) | % protein by wt. in cured adhesive | % wood failure (+/−S.D.) | Average Bond Strength to SYP (peak load at failure, lbs.) (+/−S.D.) |
|---|---|---|---|---|---|---|---|
| 63-2 | 0 | 8.44 | 62-4 (90/10 (w/w) PMDI/PPG 2000), 2.0 g | 1.6/1 | 44.6 | 70 (+/−26) | 4690 (+/−2000) |
| 63-4 | 8.44 | 0 | 62-2 (2-step synthesis; 76.5/8.5/15 w/w/w PMDI/PPG2000/digested castor), 2.0 g | 1.29/1 | 62.9 | 5 (+/−5) | 900 (+/−900) |
| 63-5 | 0 | 8.44 | 62-2 (2-step synthesis; 76.5/8.5/15 w/w/w PMDI/PPG2000/digested castor), 2.0 g | 1.6/1 | 50.35 | 38 (+/−24) | 570 (+/−280) |
| 65-1 | 6.55 | 0 | 64-1 (1-step synthesis; 76.5/8.5/15 w/w/w PMDI/PPG2000/digested castor), 2.0 g | 1/1 | 57.5 | 60 (+/−30) | 2350 (+/−1260) |
| 65-2 | 0 | 6.55 | 64-1 (1-step synthesis; 76.5/8.5/15 w/w/w PMDI/PPG2000/digested castor), 2.0 g | 1.24/1 | 46.8 | 84 (+/−14) | 4330 (+/−460) |
| 65-3 | 6.55 | 0 | 64-2, (1-step synthesis; 85/15 w/w PMDI/ digested castor), 2.0 g | 1/1 | 57.5 | 44 (+/−36) | 2640 (+/−1340) |
| 65-4 | 0 | 6.55 | 64-2, (1-step synthesis; 85/15 w/w PMDI/ digested castor), 2.0 g | 1.24/1 | 46.8 | 99 (+/−1) | 4300 (+/−520) |
| 65-5 | 6.55 | 0 | 64-3, (1-step synthesis; 85/15 w/w PMDI/ Digested and deaminated castor protein), 2.0 g | 1/1 | 57.5 | 52 (+/−18) | 2630 (+/−1240) |
| 65-6 | 0 | 6.55 | 64-3, (1-step synthesis; 85/15 w/w PMDI/ Digested and deaminated castor protein), 2.0 g | 1.24/1 | 46.8 | 73 (+/−20) | 3120 (+/−3000) |
| 65-7 | 6.55 | 0 | 64-4, (1-step synthesis; 76.5/4.25/4.25/15 w/w/w/w PMDI/PPG2000/castor oil/digested castor), 2.0 g | 1/1 | 57.5 | 17 (+/−5) | 740 (+/−17) |
| 65-8 | 0 | 6.55 | 64-4, (1-step synthesis; 76.5/4.25/4.25/15 w/w/w/w PMDI/PPG2000/castor oil/digested castor), 2.0 g | 1.24/1 | 46.8 | 79 (+/−13) | 3880 (+/−890) |

Analysis of these results leads to several observations. Viscosity and pot-life observations—like the castor-based two-part adhesive of Example 16, all of the two-part adhesives in this example had a considerably longer pot-life than those that were made with analogous whey proteins. Specifically, the viscosity did not qualitatively change during a 1.5 hour period of observation. Thus, unlike comparable adhesives that were prepared with the whey protein derivatives (e.g., see Examples 13, 14, and 15), the adhesives prepared with castor-based proteins were surprisingly stable. This enhanced stability would be beneficial during assembly operations that require longer "work times." Thus, when long work-times are desired, castor-based protein derivatives are the preferred protein components in two-part adhesive systems.

The performance of two-part system was compared against the one-part system when using identical reactive components. The performance of the analogous one-part and two-part systems containing castor proteins are compared in Table 20. As noted previously, one-part systems (containing castor protein derivatives) were observed to yield the best performance when they were made with either a digested castor-based prepolymer that was synthesized in a 2-step process, or when they were made with an digested and deaminated protein-containing prepolymer (from castor) that was synthesized in a 1-step process.

It was observed that, for the two-part systems, the worst performance was achieved when the digested castor-based prepolymer was synthesized in a 2-step process. In addition, the 2-part system that was made with a prepolymer containing digested and deaminated castor protein was observed to perform worse than its 1-part analog. Conversely, the best performance for two-part systems was achieved when the Part-A component was composed of a prepolymer that was synthesized with digested castor in a 1-step process (e.g. 65-2, 65-4, 65-8). In fact, all such two-part systems performed significantly better than their 1-part analogs—in spite of their higher protein contents (nearly 50% in the 2-part systems vs. 15% in the 1-part systems).

TABLE 20

| 1-Part Adhesive & referenced example (i.e., Part-A in present example) | Part A Synthesis Method | % wood failure & av. block shear strength (lbs.) for Part A alone (from previous examples) | Protein derivative contained in Part-A | % protein by wt. in Part-A alone | 2-Part Adhesive as made in the present example (i.e., Part-A + Part-B) | Use of EVA in 2-part system (Y/N) | % wood failure & av. block shear strength from 2-part adhesive (lbs.) | % protein by wt. in 2-part adhesive |
|---|---|---|---|---|---|---|---|---|
| 62-2 (ex. 6) | 2-step | 79/4710 | Digested castor | 15 | 63-4 (ex. 17) | N | 5/900 | 62.9 |
| 62-2 (ex. 6) | 2-step | 79/4710 | Digested castor | 15 | 63-5 (ex. 17) | Y | 38/570 | 50.35 |
| 64-1 (ex. 7) | 1-step | 21/870 | Digested castor | 15 | 65-1 (ex. 17) | N | 60/2350 | 57.5 |
| 64-1 (ex. 7) | 1-step | 21/865 | Digested castor | 15 | 65-2 (ex. 17) | Y | 84/4330 | 46.8 |
| 64-2 (ex. 7) | 1-step | 10/911 | Digested castor | 15 | 65-3 (ex. 17) | N | 44/2640 | 57.5 |
| 64-2 (ex. 7) | 1-step | 10/911 | Digested castor | 15 | 65-4 (ex. 17) | Y | 99/4300 | 46.8 |
| 64-3 (ex. 7) | 1-step | 84/4860 | Digested, deaminated protein | 15 | 65-5 (ex. 17) | N | 52/2630 | 57.5 |
| 64-3 (ex. 7) | 1-step | 84/4860 | Digested, deaminated protein | 15 | 65-6 (ex. 17) | Y | 73/3120 | 46.8 |
| 64-4 (ex. 7) | 1-step | 9/630 | Digested castor | 15 | 65-7 (ex. 17) | N | 17/740 | 57.5 |
| 64-4 (ex. 7) | 1-step | 9/630 | Digested castor | 15 | 65-8 (ex. 17) | Y | 79/3880 | 46.8 |

With regard to the EVA components, with the exception of sample 63-5, which employed a prepolymer that was synthesized in 2 steps, the use of EVA as an ingredient in the Part-B component led to an improvement in bond strength for all samples. In fact, the best performing sample (65-4 with 99% wood failure) contained approximately 46.8% protein, 37.9% PMDI, and 15.3% EVA. One of the most extreme improvements occurred when EVA was added to the two-part system containing a Part-A made with both castor oil and digested castor protein (compare 65-8 to 65-7). This two-part system was not only better than its 1-part analog, the percentage of wood failure increased from 17% to 79% when EVA was added. Thus, as demonstrated in this Example, it is possible to make predominantly protein-based adhesives with strengths that are surprisingly high enough to exceed the strength of the SYP wood itself.

Example 18

Effect of Enzyme Concentration on One-Part Adhesives Prepared with Digested Castor and with a Derivative Made Therefrom Adhesives in this Example included either an Everlase digested protein from castor (experimental sample lot 5-90), or a digested and deaminated castor protein derivative (experimental sample lot 5-92). Both materials were obtained from Prof. S. Braun, the Laboratory of the Department of Applied Biology at the Hebrew University of Jerusalem, Israel. The digested castor in this example was prepared and dried according to the procedures described in Example 6 with one exception: the Everlase 16L Type EX® (NOVOZYMES') was added at a ratio of 20 g per kg of castor meal protein (double the level used in Example 6). Similarly, the digested and deaminated protein derivative was prepared according to the procedures outlined in Example 7, but the enzyme concentration was doubled (lot 5-83). The doubling of the enzyme concentration was done in order to lower the relative molecular weights of the digested fractions so as to determine whether adhesives could be prepared with higher effective protein concentrations than those prepared in Examples 6 and 7, while simultaneously maintaining equivalent or lower relative viscosities. The relative viscosities of adhesives as reported in this example were qualitatively evaluated by means of visual observation (i.e., by judging the relative pourability from either an open container or from a closed container upon tilting), and by means of hand-stirring the adhesives with a spatula.

The adhesives in this example were prepared using the same procedures as reported in Examples 6 and 7. The adhesives were also used to prepare SYP block shear specimens in accord with the procedures outlined in Example 4. Comparative adhesives were also made with digested soy protein (lot 5-81 made via procedures outlined in Example 7). The compositions of the adhesives and resulting average block shear strengths are given in Table 21, together with % wood failure in accord with the D905 and D2559 ASTM standards.

Data from Examples 6 and 7 are also reproduced in Table 21 for comparative purposes. Qualitative viscosity comparisons are provided in Table 22.

TABLE 21

| Sample | Synth. Method | Protein Type and % by weight | PMDI-based component (% by weight) | Additional Catalyst (phr) | Average % wood failure (+/− S.D.) | Average Bond Strength (peak load at failure in pounds) (+/− S.D.) |
|---|---|---|---|---|---|---|
| 62-1-81-1 | 2-step | 15% digested castor (lot 5-90) | 85% 90/10 (w/w) PMDI/PPG 2000 | 0.13 DMDEE | 75 (30) | 3800 (1600) |
| 62-1 (ex. 6) | 2-step | 15% digested castor (lot 5-83) | 85% 90/10 (w/w) PMDI/PPG 2000 | 0.13 DMDEE | 97 (3) | 6070 (380) |
| 62-3-81-1 | 2-step | 15% digested castor (lot 5-90) | 85% JM62-2 90/10 (w/w) PMDI/PPG 2000 + 0.1% FeAcAc | 0.13 DMDEE | 30 (20) | 2540 (1080) |
| 62-3 (ex. 6) | 2-step | 15% digested castor (lot 5-83) | 85% JM62-2 90/10 (w/w) PMDI/PPG 2000 + 0.1% FeAcAc | 0.13 DMDEE | 100 (0) | 6000 (1050) |
| 64-4 (ex. 7) | 1-step | 15% digested castor (lot 5-83) | 85% 90/10 (w/w) PMDI/PPG 2000 + 0.1% FeAcAc | 0 | 9 (7) | 630 (470) |
| 83-3-83-1 | 1-step | 25% digested castor (lot 5-83) | 75% 90/10 (w/w) PMDI/PPG 2000 + 0.1% FeAcAc | 0.13 DMDEE | 30 (30) | 3270 (1570) |
| 83-2-83-1 | 1-step | 25% digested castor (lot 5-90) | 75% 90/10 (w/w) PMDI/PPG 2000 + 0.1% FeAcAc | 0.13 DMDEE | 9 (6) | 1630 (1400) |
| 83-8-84-1 | 1-step | 25% digested castor (lot 5-90) | 75% 90/10 (w/w) PMDI/PPG 2000 + 0.1% FeAcAc | 0 | 0 | 200 (80) |
| 83-4-83-1 | 1-step | 30% digested castor (lot 5-90) | 70% PMDI + 0.1% FeAcAc | 0.13 DMDEE | 6 (5) | 300 (270) |
| 64-3-81-1 | 1-step | 15% digested & deaminated castor protein (lot 5-92) | 85% PMDI + 0.1% FeAcAc | 0 | 80 (15) | 5130 (1030) |
| 64-3 (ex. 6) | 1-step | 15% digested & deaminated castor protein (lot 5-82) | 85% PMDI + 0.1% FeAcAc | 0 | 84 (15) | 4860 (1500) |
| 71-1-82-1 | 1-step | 15% digested & deaminated castor protein (lot 5-92) | 85% PMDI + 0.1% FeAcAc | 0.13 DMDEE | Not tested | Not tested |
| 71-3-82-1 | 1-step | 15% digested & deaminated castor protein (lot 5-92) | 85% JM62-2 90/10 (w/w) PMDI/PPG 2000 + 0.1% FeAcAc | 0 | 97 (3) | 5080 (650) |
| 71-4-82-1 | 1-step | 15% digested & deaminated castor protein (lot 5-92) | 85% JM62-2 90/10 (w/w) PMDI/PPG 2000 + 0.1% FeAcAc | 0.13 DMDEE | 90 (7) | 6190 (1100) |
| 83-5-84-1 | 1-step | 30% digested & deaminated castor protein (lot 5-92) | 70% PMDI + 0.1% FeAcAc | 0.13 DMDEE | 84 (13) | 5700 (1200) |
| 64-5 (ex. 7) | 1-step | 15% digested soy protein (lot 5-81) | 85% 90/10 (w/w) PMDI/PPG 2000 + 0.1% FeAcAc | 0 | 79 (18) | 4280 (1550) |
| 64-5-82-1 (repeat of ex. 7 64-5) | 1-step | 15% digested soy protein (lot 5-81) | 85% 90/10 (w/w) PMDI/PPG 2000 + 0.1% FeAcAc | 0 | 90 (8) | 4480 (690) |
| 71-2-82-1 | 1-step | 15% digested soy protein (lot 5-81) | 85% 90/10 (w/w) PMDI/PPG 2000 + 0.1% FeAcAc | 0.13 DMDEE | 90 (20) | 5400 (1400) |
| 64-2 (ex. 7) | 1-step | 15% digested castor (lot 5-83) | 85% PMDI + 0.1% FeAcAc | 0 | 10 (7) | 910 (570) |
| 65-4A-83-1 | 1-step | 15% digested castor (lot 5-90) | 85% PMDI + 0.1% FeAcAc | 0 | 7 (7) | 1190 (1270) |
| JM362-2 | 1-step | 25% digested castor (lot 5-90) | 75% PMDI + 0.1% FeAcAc | 0 | Not tested | Not tested |
| 83-6-84-2 | N/A | none | 100% PMDI + 0.1% FeAcAc | 0.13 DMDEE | 97 (3) | 5400 (980) |
| 83-7-84-1 | N/A | none | 100% PMDI + 0.1% FeAcAc | 0 | 98 (2) | 5060 (1040) |

The data in Table 21 reveal several trends. Consistent with prior Examples, results of one-part adhesives prepared with the castor protein derivative were found to perform better than the analogous adhesives prepared with otherwise equivalent weight percents of digested castor (via the 1-step synthetic method). This trend was independent of the enzyme concentration during the digestion process, and was also independent of the weight percent of the protein in the adhesive (over the range that was evaluated).

Adhesives that were prepared with a polyol and digested castor protein (synthesized via a 2-step synthetic process) were observed to perform the best when the digested castor was prepared with a lower enzyme concentration.

Unlike the adhesives prepared with digested castor, the bond-strength characteristics of analogous adhesives prepared with the castor derivative were found to be essentially unaffected by the use of a higher enzyme concentration during the digestion process.

Among the adhesives prepared with the castor derivative, bond strength performance was observed to be minimally affected by the concentration of the protein in the adhesive—at least over the range that was evaluated in this example (83-5-84-1 vs. 64-3-81-1 & 64-3).

Adhesives prepared with the castor derivative were observed to perform comparably to adhesives containing no protein at all, the bond strengths generally exceeded the strength of the wood itself (71-3-82-1, 71-4-82-1, 64-3-81-1, 64-3, and 83-5-84-1 versus 83-6-84-2 and 83-7-84-1).

Adhesives prepared with digested soy protein (synthesized via a 1-step synthetic process) were observed to perform better than analogous adhesives prepared with digested castor (also synthesized in a 1-step process), and on par with adhesives prepared with digested and deaminated castor protein.

Like the derivatized castor, digested soy that was used in this example also contains fewer free carboxylic acids, acid salts, and amine salts than the digested castor. When coupled with viscosity observations (to be discussed below), these results suggest that in preparing a one-part adhesive, it is desirable that the levels of free carboxylic acids, acid salts, and amine salts be controlled and/or minimized, particularly if it is desirable for the adhesive to contain higher levels of protein.

The relative viscosity trends as shown in Table 22, indicate that the use of a higher enzyme level during the digestion of castor facilitate the incorporation of higher levels of protein into the adhesive without adversely affecting viscosity. However, as mentioned previously, higher levels of digested castor were observed to have a negative impact on bond-strength performance. This problem was overcome with the use of derivatized castor (prepared from castor that was digested at a higher enzyme level), which not only facilitated the use of higher protein levels, but did so without adversely affecting bond-strength performance.

Qualitative viscosity comparisons of adhesives prepared in this Example with those reported in Examples 6 and 7 are set forth in Table 22.

TABLE 22

| Qualitative Viscosity Trend | Formulation Factor |
|---|---|
| 62-1-81-1 (not pourable, paste-like) < 62-1 (not pourable, paste-like); 62-3-81-1 (not pourable, paste-like) < 62-3 (not pourable, paste-like); 64-3-81-1 (pourable) < 64-3(pourable); 83-3-83-1 (not pourable, paste-like) > 83-2-83-1 (not pourable, paste-like) 65-4A-83-1 (pourable) < 64-2 (pourable) | Higher enzyme level during castor digestion led to a lower viscosity adhesive |
| 64-5-82-1, 64-5, and 71-2-82-1 (all not pourable, paste-like) > 64-4, 71-3-82-1, and 71-4-82-1 (all pourable) | Digested soy produced higher viscosity adhesives than digested castor and derivatized castor |
| 83-4-83-1 (not pourable, paste-like) > 65-4A-83-1 (pourable) | Higher levels of digested castor led to higher viscosity adhesives |
| 83-5-84-1 (thick but pourable) > 71-1-82-1 (pourable) | Higher levels of derivatized castor led to higher viscosity adhesives |
| 83-5-84-1 (thick but pourable) << 83-4-83-1 (not pourable, paste-like) | Derivatized castor led to lower viscosity adhesives than adhesives made with equal levels of digested castor |

The following procedure was used for obtaining FTIR spectra on protein samples. Spectra were acquired on solid samples (powders) using a Bruker ALPHA™ solid state FTIR spectrometer equipped with a diamond ATR cell (24 scans, 4 cm$^{-1}$ resolution). The spectra were vertically scaled to achieve equivalent absorbance intensities for the common bands centered near 1625-1640 cm$^{-1}$. Tentative absorption assignments were made based on literature assignments for similar compounds as reported in *Spectroscopic Identification of Organic Compounds,* 4$^{th}$ edition, R. M. Silverstein, G. C. Bassler, and T. C. Morrill, John Wiley & Sons, New York, N.Y., 1981; and in *Introduction to Infrared & Raman Spectroscopy,* 3$^{rd}$Edition, N. B. Colthup, L. H., Daly, and S. E. Wiberley, Academic Press, Inc., New York, N.Y., 1990. As shown in FIG. 4, the digested castor protein exhibits the presence of a well-defined carbonyl stretch centered near 1715 cm$^{-1}$, which is consistent with the presence of a carboxylic acid. The ratio of this absorbance to the common amide-I band centered near 1640 cm$^{-1}$ is higher in the digested castor protein than in both the digested and deaminated castor protein, and in the digested soy protein. In addition, the digested castor contains absorbance bands that are consistent with the presence of amine salts. These moieties are associated with the water-soluble fraction that is present in the digested castor (at a concentration of about 50% by weight).

Example 19

Effects of Enzyme Concentration and Post-Mix Time on the Performance of Two-Part Adhesives Prepared with Digested Castor and a Castor Derivative The sample preparation procedures in this Example were the same as those employed in Examples 13 and 17 with one exception: the block shear specimens (SYP) were pressed for 35 minutes using a Carver press with platen temperatures set at 208° C. (6 pairs per cycle).

Several different "Part-A" curative components were used in this Example, including: sample 65-4A-83-1 (from Example 18), sample 64-2 (from Example 7) which contained digested castor that was prepared with half the enzyme level of 65-4A-83-1, and sample JM362-2 (from Example 18). The Part-A components were all formulated with 0.1 phr FeAcAc. The Part-B component compositions for this example are given in Table 23.

TABLE 23

| Part-B Composition | 84-3B (weight %) | 85-2B (weight %) |
|---|---|---|
| Water | 62.13 | 62.13 |
| Digested protein from castor (lot 5-90) | 2.41 | 24.77 |
| Digested and deaminated castor protein (lot 5-92) | 25.03 | 0 |
| Airflex 426 EVA (solids basis) | 10.43 | 10.43 |
| % total solids | 37.87 | 37.87 |
| % protein (dry basis) | 72.46 | 72.46 |

Note that 84-3B in this Example, like the analogous "Part-B2" of Example 17, also employed digested castor and the digested and deaminated castor protein. However, the protein components in this example were digested with double the concentration of enzyme. The Part-B component labeled "85-2B" contained of only digested castor (lot 5-90). The digested castor itself was implicitly contained two fractions: a water-soluble fraction, and a water-insoluble/water dispersible fraction. This will be discussed in greater detail in Example 20.

The compositions of the resulting two-part adhesives for this example (Part-A+Part-B) are provided in Table 24 together with average block shear strengths and wood-failure percentages for SYP block-shear specimens. Note that in many cases, multiple sample sets were sequentially prepared from the same batch of adhesive as a function of time so that the pot-life could be evaluated after mixing.

Like the water-insoluble/water dispersible fraction from digested castor, the digested and deaminated derivative that was used in the Part-B component labeled 84-3B was also determined to be water-insoluble, and dispersible. These results demonstrate that in order to optimize the performance of two-part adhesives, it is desirable to maximize the use of protein components that are water-dispersible, and to minimize those components that are water-soluble. As noted in Example 18, the water-soluble components can be identified by means of solid state FTIR analysis. Further analysis

TABLE 24

| Sample ID | Part B level (g) & type | Part A Component and Level (g) | Time between mixing and pressing (min.) | B/A ratio (solids basis excluding volatile water) | % protein by wt. in cured adhesive | % wood failure (+/− S.D.) | Average Bond Strength to SYP (peak load at failure, lbs.) (+/− S.D.) |
|---|---|---|---|---|---|---|---|
| 65-4 (ex. 17) | Part-B2 (Ex. 17); 6.55 g | 64-2, (1-step synthesis; 85/15 w/w PMDI/digested castor - lot 5-83), 2.0 g | 6 | 1.24/1 | 46.8 | 99 (1) | 4300 (520) |
| 65-4-85-1 | 84-3B; 6.55 g | 65-4A-83-1, (1-step synthesis; 85/15 w/w PMDI/digested castor - lot 5-90), 2.0 g | 6 | 1.24/1 | 46.8 | 90 (10) | 5530 (680) |
| 65-4-85-2 | 84-3B; 6.55 g | 65-4A-83-1, (1-step synthesis; 85/15 w/w PMDI/digested castor - lot 5-90), 2.0 g | 30 | 1.24/1 | 46.8 | 90 (15) | 6120 (1090) |
| 85-1-1 | 84-3B; 6.55 g | JM362-2, (1-step synthesis; 75/25 w/w PMDI/digested castor - lot 5-90), 2.0 g | 6 | 1.24/1 | 51.3 | 80 (30) | 4840 (980) |
| 85-1-2 | 84-3B; 6.55 g | JM362-2, (1-step synthesis; 75/25 w/w PMDI/digested castor - lot 5-90), 2.0 g | 40 | 1.24/1 | 51.3 | 80 (10) | 5500 (1500) |
| 86-2-1 | 85-2B; 6.55 g | 64-2, (1-step synthesis; 85/15 w/w PMDI/digested castor - lot 5-83), 2.0 g | 6 | 1.24/1 | 46.8 | 80 (15) | 3780 (1620) |
| 87-1-1 | 85-2B; 6.55 g | 65-4A-83-1, (1-step synthesis; 85/15 w/w PMDI/digested castor - lot 5-90), 2.0 g | 6 | 1.24/1 | 46.8 | 50 (40) | 3100 (2600) |
| 87-1-2 | 85-2B; 6.55 g | 65-4A-83-1, (1-step synthesis; 85/15 w/w PMDI/digested castor - lot 5-90), 2.0 g | 35 | 1.24/1 | 46.8 | 70 (25) | 4200 (2000) |
| 65-4-85-3 | 84-3B; 6.55 g | 65-4A-83-1, (1-step synthesis; 85/15 w/w PMDI/digested castor - lot 5-90), 2.0 g | 6 | 1.24/1 | 46.8 | 97 (4) | 5920 (1450) |
| 65-4-85-4 | 84-3B; 6.55 g | 65-4A-83-1, (1-step synthesis; 85/15 w/w PMDI/digested castor - lot 5-90), 2.0 g | 35 | 1.24/1 | 46.8 | 93 (8) | 6080 (1430) |

Several observations were made during the mixing of the samples. In addition, the data in Table 24 reveal several trends. Upon comparing analogous formulas, it can be seen that the performance of two-part adhesives was not significantly affected by the use of a higher enzyme concentration during digestion (65-4 vs. 65-4-85-1, 65-4-85-2, 65-4-85-3, and 65-4-85-4). In each of these cases, the strength of the adhesive exceeded the strength of the wood itself.

The bond strength performance of two-part adhesives was adversely affected by the use of 85-2B as the Part-B component, which contained an excess of digested castor (86-2-1, 87-1-1, and 87-1-2). Conversely, when the level of digested castor was minimized, and when the digested and deaminated derivative was used in its place, the performance was dramatically improved (65-4-85-1, 65-4-85-2, 65-4-85-3, and 65-4-85-4). In a separate experiment (see Example 20), the digested castor was determined to contain about 50% by weight of a water-insoluble/water dispersible fraction, and about 50% by weight of an entirely water-soluble fraction (comprised of free carboxylic acids, acid salts, and amine salts). As will be discussed in Example 20, when this water-soluble fraction was removed, the performance of comparable two-part adhesives was dramatically improved.

is provided in Example 20. For the case of digested castor, these components were discovered to be typically comprised of free carboxylic acids, acid salts, and amine salts.

The presence of a high fraction of digested castor in the Part-B component (85-2B) was also observed to have an impact on the time required to achieve homogeneity during mixing, as well as on the ultimate bond strength. In comparing samples made with 85-2B containing digested castor with EVA (86-2-1, 87-1-1 and 87-1-2) to those made with 84-3B containing predominantly digested and deaminated castor protein (65-4-85-1, 65-4-85-2, 65-4-85-3, and 65-4-85-4), the later set was observed to be significantly more homogeneous upon mixing. For example, when the A and B parts of sample 86-2-1 were mixed, the part-A component was observed to form heterogeneous droplets that were difficult to disperse. When sample 87-1-1 was mixed, it exhibited similar behavior. In contrast, upon mixing the A and B parts of samples 65-4-85-1, 65-4-85-2, 65-4-85-3, and 65-4-85-4, homogeneity was immediately and easily achieved. In addition, these samples produced block shear specimens with superior bond strengths. These results demonstrate that bond strength performance can also be impacted by the homogeneity of the adhesive. Thus, in order to achieve optimal bond strength, it is desirable to achieve optimal homogeneity upon mixing. Given that the Part-A component is water-insoluble, homogeneity becomes increasingly difficult to achieve when the Part-B component is predominantly water-soluble. Thus, one method by which to achieve homogeneity is to maximize the use of the more hydrophobic, water-insoluble components like those that are present in both the digested and deaminated castor protein, and in the water-insoluble dispersible fraction that can be isolated directly from digested castor (Example 20).

The bond strengths were not significantly affected by pot-life over the time frame that was evaluated (t=6 minutes to 40 minutes after mixing).

Example 20

Effects of Fractionation and Post-Mix Time on the Performance of Two-Part Adhesives Prepared with Digested Castor (with and without EVA)

The sample preparation procedures in this Example were identical to those employed in Example 19. Again, the block shear specimens (SYP) were pressed for 35 minutes using a Carver press with platen temperatures set at 208° C. (6 pairs per cycle).

Two different "Part-A" curative components were used in this Example, including: sample 65-4A-83-1 (from Example 18), and PMDI. The part-A components were each formulated with 0.1 phr FeAcAc.

The Part-B components in this example contained extracts that were isolated from digested castor as described below.

Digested castor (lot 5-90) was fractionated to yield a water-soluble fraction, and a water-insoluble, dispersible fraction. In the first step, 300 g of digested castor was slurried into 1 liter of distilled water. The mixture was shaken by hand, and was then placed into a sonicator bath for a period of 30 minutes. The slurry then was removed and was allowed to set idle for a period of up to two days to allow the insoluble portion to settle (in separate experiments, it was found that centrifuging was equally adequate). At that point, the clear yellow/amber supernatant was pipetted away and was retained for future use. Fresh distilled water was then added to the sediment to bring the total volume back to the 1-Liter mark on the container. The process of shaking, sonicating, settling, supernatant extracting, and replenishing with fresh distilled water (washing) then was repeated (6 times in total). In the final step, the water was pipetted from the top of the grayish-black sediment, and the sediment was then dried in a vacuum oven at 45° C. Based on the sediment's dry weight, it was determined that the digested castor was comprised of approximately 50% by weight of this material, the water-insoluble/water dispersible fraction. Separately, the $1^{st}$ and $2^{nd}$ supernatants were combined and were then dried to yield a transparent yellow-colored water-soluble fraction.

Figure 5:
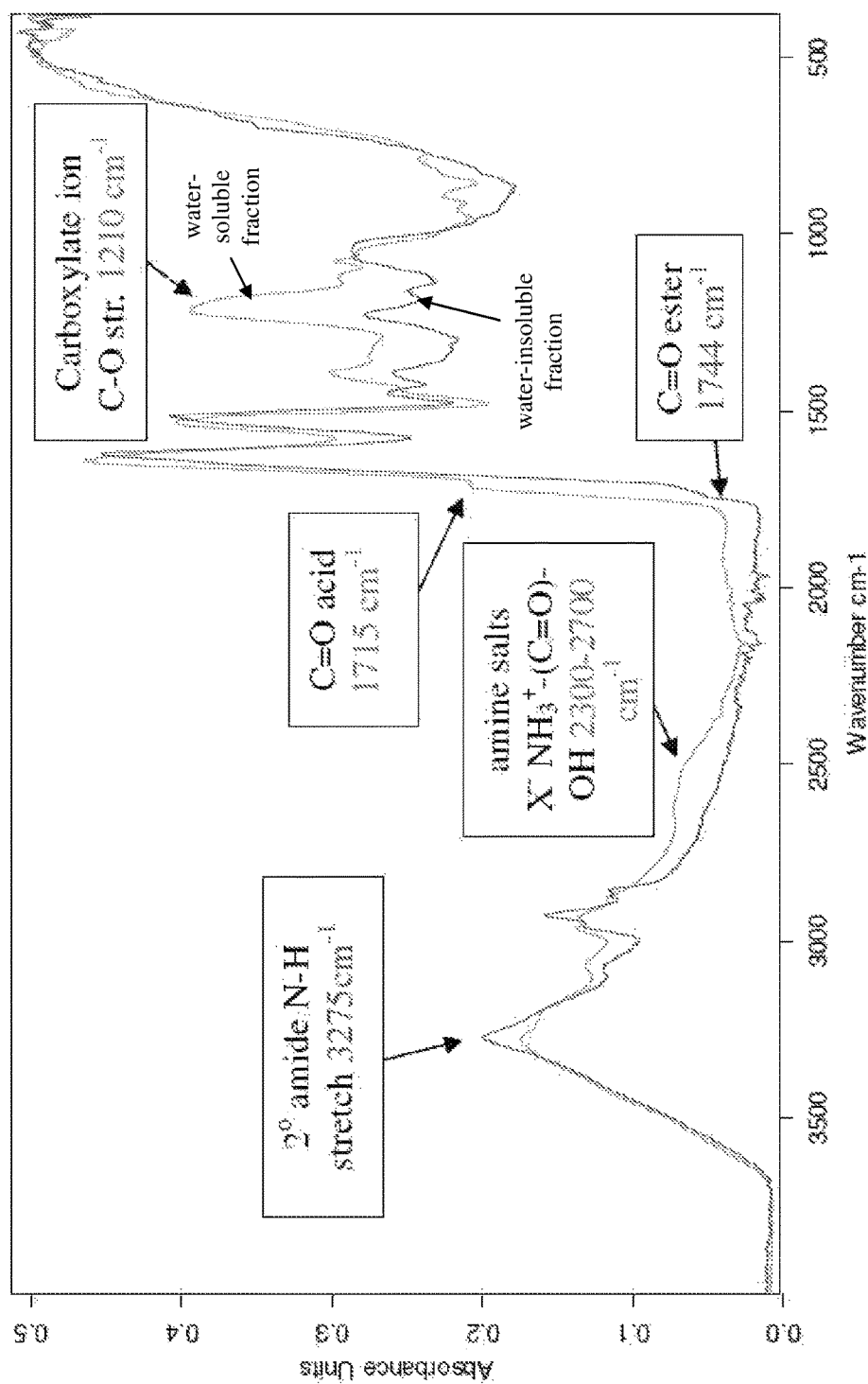
FIG. 5 shows overlaid solid state FTIR spectra for protein fractions isolated from digested castor lot 5-90, and then used to prepare adhesives reported in Example 20; namely, the water-soluble fraction, and the water-insoluble, dispersible fraction.
Figure 6:
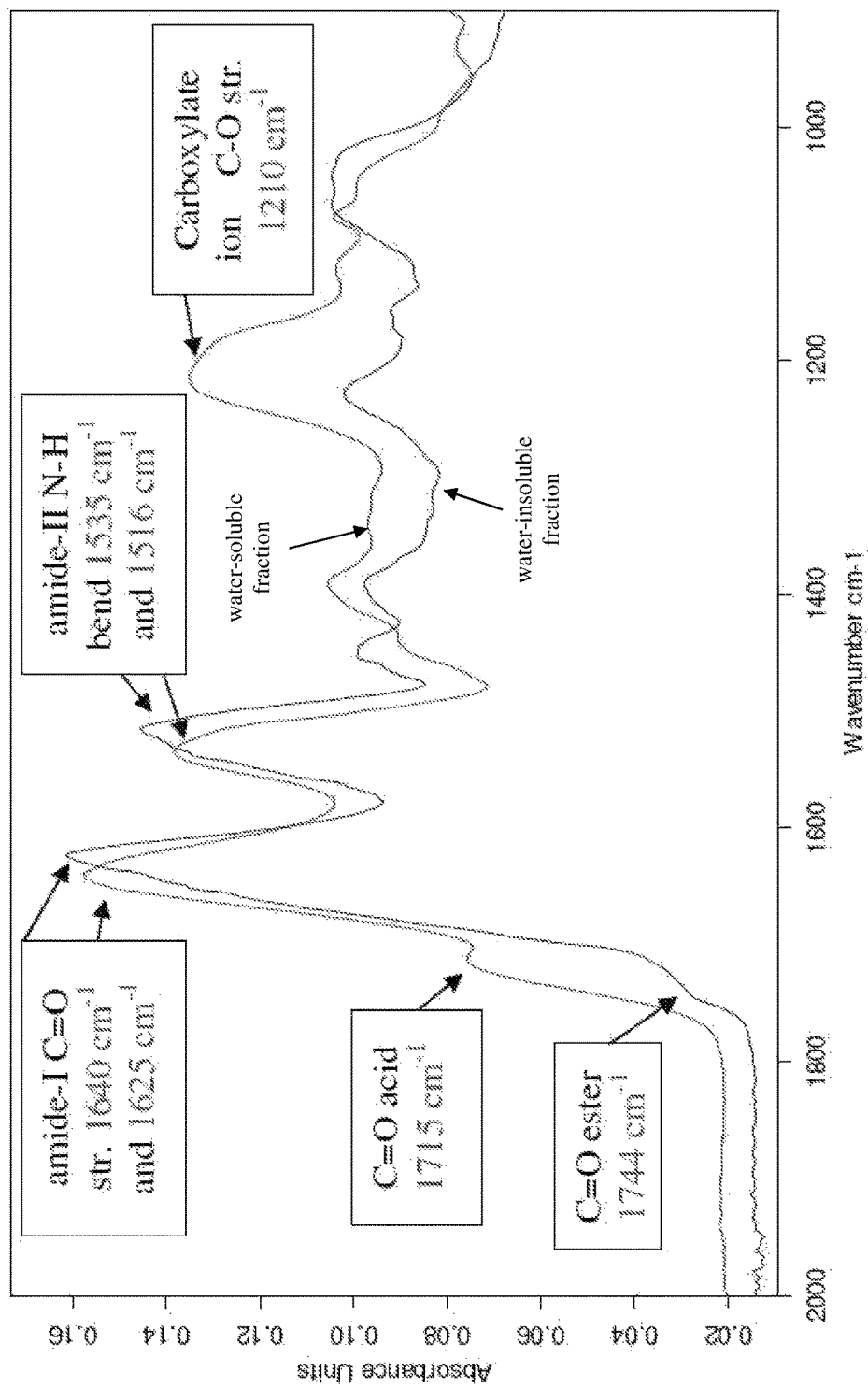
FIG. 6 shows solid state FTIR spectra of isolated water-soluble fraction, and water-insoluble/water dispersible fraction from digested castor, where the carbonyl amide region from FIG. 5 is expanded.

After drying the fractions, it was verified that the grayish-black sediment (the water-insoluble and dispersible fraction) could not be re-dissolved in water. On the other hand, the dried supernatant fraction (clear/amber, glassy solid) was completely soluble in water. The two extracts were separately analyzed by solid state FTIR (see FIGS. 5, 6, and 7). The spectra in FIG. 5 show that carboxylate and amine salt moieties are primarily associated with the water-soluble fraction. FIG. 6 shows that the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences also appear to be related to the presence of a higher fraction of primary amide groups in the water-soluble fraction, and to a higher fraction of secondary amide groups in the water-dispersible fraction (from the main-chain polypeptide chains). This is corroborated by the N—H stretching region depicted in FIG. 7.

Figure 7:
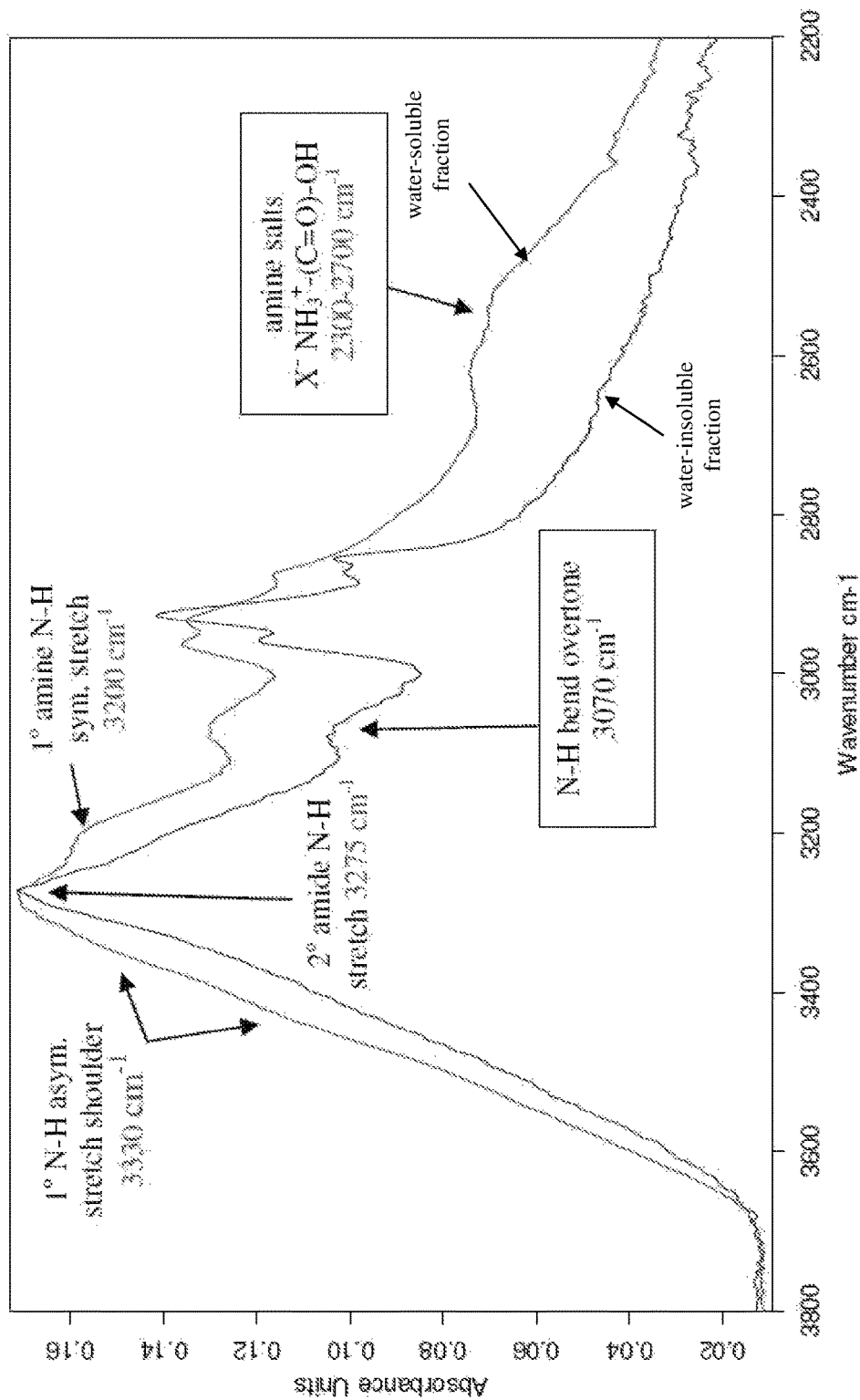
FIG. 7 shows solid state FTIR spectra of isolated water-soluble fraction, and water-insoluble, dispersible fraction from digested castor where the N—H stretching region from FIG. 5 is expanded.

FIG. 7 shows solid state FTIR spectra of isolated fraction from digested castor where the N—H stretching region from FIG. 5 is expanded. The spectra were vertically scaled to achieve equivalent absorbance intensities for the secondary amide N—H stretch band centered at 3275 cm$^{-1}$. FIG. 7 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively.

These spectra show that the water-soluble fraction combined a relatively high concentration of primary amides, free carboxylic acids, acid salts, and amine salts. Conversely, the water-insoluble/water dispersible fraction had a higher fraction of secondary amides. In addition, the amide-I carbonyl absorption band for the water-insoluble/dispersible fraction was observed to appear at a wavenumber of approximately 1625 cm$^{-1}$, whereas that of the water-soluble fraction was observed at approximately 1640 cm$^{-1}$. As will be discussed in other Examples, this feature is one of the distinguishing differences between the water-soluble and water-insoluble fractions; not only for castor proteins, but for soy proteins as well. As this and other Examples show, the most water-resistant two-part adhesives are those prepared with proteins comprising a high percentage of a water-insoluble/water dispersible fraction, wherein the amide carbonyl stretch of the water-insoluble/dispersible fraction has a characteristic solid state FTIR absorption band near 1625 cm$^{-1}$.

Collectively, the results of this Example show that the digested castor that was used to prepare the adhesives in prior examples was comprised of about 50% by weight of an entirely water-soluble fraction, which itself was comprised of residues containing free carboxylic acids, acid salts, and amine salts. By virtue of the relatively high concentration of these moieties, it follows that the digestion process produced a relatively high fraction of water-soluble amino acid species (via peptide chain-scission). Simultaneously, the digestion process as employed in the prior examples did not invoke complete backbone hydrolysis. Instead, a water-insoluble, dispersible fraction was also formed, which was comprised of a relatively high concentration of secondary amides—consistent with the presence of intact, hydrolysis-resistant, main-chain polypeptide units.

In order to prepare two-part adhesives with the water-insoluble/dispersible extract, a partial vacuum drying method was employed to yield an adhesive-ready Part-B component that was comprised of either the water-insoluble/water dispersible fraction alone, or the same in combination with EVA. Given that the Part-B component of these adhesives was water based, the vacuum oven drying process was not carried through to completion, but instead was stopped when the slurry reached a concentration of about 16% solids by weight. At that point, the water-insoluble/water dispersible fraction remained dispersed in water, and was ready for direct use as "Part-B" (88-2B) in preparing two-part adhesives. This creamy, grey-colored slurry was observed to be shelf-stable for a period of several weeks. It was also discovered that the slurry could be readily combined with water soluble polymers, and with water-dispersible polymer latexes. In this example, the slurry was combined with an EVA latex (Airflex 426) to yield a latex-modified Part-B component (88-1B). An analogous "Part-B" composition was also prepared with the dried water-soluble fraction (88-3B). The Part-B component compositions for this example are given in Table 25.

TABLE 25

| Part-B composition | 88-1B (weight %) | 88-2B (weight %) | 88-3B (weight %) | TP13-1 (weight %) | TP16-1 (weight %) |
|---|---|---|---|---|---|
| Water | 79.91 | 84.04 | 79.91 | 83.79 | 68.48 |
| Water-insoluble/dispersible extract from digested castor (lot 5-90) | 14.56 | 15.96 | 0 | 16.21 | 0 |
| Water-soluble extract from digested castor (lot 5-90) | 0 | 0 | 14.56 | 0 | 0 |
| Airflex 426 EVA (solids basis) | 5.53 | 0 | 5.53 | 0 | 0 |
| Digested castor | 0 | 0 | 0 | 0 | 31.52 |
| % total solids | 20.09 | 15.96 | 20.09 | 16.21 | 31.52 |
| % protein (dry basis) | 72.47 | 100.00 | 72.47 | 100.00 | 100.00 |

The compositions of the resulting two-part adhesives for this example (Part-A+Part-B) are provided in Table 26 together with average block shear strengths and wood-failure percentages for SYP block-shear specimens. Note that in many cases, multiple sample sets were sequentially prepared from the same batch of adhesive as a function of time so that the pot-life could be evaluated after mixing.

Selected sets of samples were also prepared for boil tests (Table 27). The samples were boiled in water for 2 hours, and were then oven dried for a period of 24 hours at 65° C. The specimens were then inspected for bondline failure, and were graded as either "P=pass" (no bondline failure); "PF=partial bondline failure," or "F=complete bondline failure."

TABLE 26

| Sample ID | Part B level (g) & type | Part A Component and Level (g) | Time between mixing and pressing (min.) | B/A ratio (solids basis excluding volatile water) | % protein by wt. in cured adhesive | % wood failure (+/− S.D.) | Average Bond Strength to SYP (peak load at failure, lbs.) (+/− S.D.) |
|---|---|---|---|---|---|---|---|
| 87-1-1 (Ex. 19) | 85-2B; 6.55 g | 65-4A-83-1, (1-step synthesis; 85/15 w/w PMDI/digested castor - lot 5-90), 2.0 g | 6 | 1.24/1 | 46.8 | 50 (40) | 3100 (2600) |
| 87-1-2 (Ex. 19) | 85-2B; 6.55 g | 65-4A-83-1, (1-step synthesis; 85/15 w/w PMDI/digested castor - lot 5-90), 2.0 g | 35 | 1.24/1 | 46.8 | 70 (25) | 4200 (2000) |
| 89-1-1 | 88-1B; 34.34 g | 65-4A-83-1, (1-step synthesis; 85/15 w/w PMDI/digested castor - lot 5-90), 5.56 g | 6 | 1.24/1 | 46.8 | 80 (30) | 4440 (1700) |
| 89-1-2 | 88-1B; 34.34 g | 65-4A-83-1, (1-step synthesis; 85/15 w/w PMDI/digested castor - lot 5-90), 5.56 g | 40 | 1.24/1 | 46.8 | 97 (4) | 5300 (1200) |
| 89-1-3 | 88-1B; 34.34 g | 65-4A-83-1, (1-step synthesis; 85/15 w/w PMDI/digested castor - lot 5-90), 5.56 g | 80 | 1.24/1 | 46.8 | 94 (7) | 4650 (620) |
| 89-1-4 | 88-1B; 34.34 g | 65-4A-83-1, (1-step synthesis; 85/15 w/w PMDI/digested castor - lot 5-90), 5.56 g | 24 hours | 1.24/1 | 46.8 | 20 (20) | 1400 (1500) |
| 90-1-1 | 88-2B; 15.66 g | 65-4A-83-1, (1-step synthesis; 85/15 w/w PMDI/digested castor - lot 5-90), 2.02 g | 6 min. | 1.24/1 | 62.1 | 30 (20) | 2600 (1500) |
| 90-1-2 | 88-2B; 15.66 g | 65-4A-83-1, (1-step synthesis; 85/15 w/w PMDI/digested castor - lot 5-90), 2.02 g | 40 | 1.24/1 | 62.1 | 28 (25) | 1800 (1900) |
| 90-1-3 | 88-2B; 15.66 g | 65-4A-83-1, (1-step synthesis; 85/15 w/w PMDI/digested castor - lot 5-90), 2.02 g | 80 | 1.24/1 | 62.1 | 70 (20) | 2400 (900) |
| 90-2-1 | 88-2B; 15.66 | PMDI + 0.1% FeAcAc; 2.02 g | 6 | 1.24/1 | 55.3 | 30 (30) | 2000 (2000) |
| 90-2-2 | 88-2B; 15.66 | PMDI + 0.1% FeAcAc; 2.02 g | 40 | 1.24/1 | 55.3 | 91 (6) | 4250 (1450) |
| 90-3-1 | 88-2B | NONE | N/A | N/A | 100 | 3 (4) | 700 (700) |
| TP13-1 | TP13-1 | NONE | N/A | N/A | 100 | 0 | 370 (550) |
| TP16-1 | TP16-1 | NONE | N/A | N/A | 100 | 5 (5) | 820 (1000) |
| TP14-1 | TP13-1; 16 g | PMDI + 0.1% FeAcAc; 0.288 g | 5 | 9/1 | 90 | 21 (9) | 2940 (440) |
| TP14-2 | TP13-1; 16 g | PMDI + 0.1% FeAcAc; 0.288 g | 40 | 9/1 | 90 | 18 (19) | 3060 (710) |
| TP14-3 | TP13-1; 16 g | PMDI + 0.1% FeAcAc; 0.288 g | 80 | 9/1 | 90 | 18 (17) | 2620 (540) |
| 380-1A (replicate of 91-3-1) | 88-1B; 17.17 g | PMDI + 0.1% FeAcAc; 2.78 g | 6 | 1.24/1 | 40.1 | 91 (9) | 6500 (1000) |
| 380-1B (replicate of 91-3-2) | 88-1B; 17.17 g | PMDI + 0.1% FeAcAc; 2.78 g | 60 | 1.24/1 | 40.1 | 97 (4) | 6500 (1200) |

TABLE 26-continued

| Sample ID | Part B level (g) & type | Part A Component and Level (g) | Time between mixing and pressing (min.) | B/A ratio (solids basis excluding volatile water) | % protein by wt. in cured adhesive | % wood failure (+/- S.D.) | Average Bond Strength to SYP (peak load at failure, lbs.) (+/- S.D.) |
|---|---|---|---|---|---|---|---|
| 380-1C (replicate of 91-3-3) | 88-1B; 17.17 g | PMDI + 0.1% FeAcAc; 2.78 g | 90 | 1.24/1 | 40.1 | 98 (2) | 5900 (1100) |
| 381-1A | 88-3B; 17.17 g | PMDI + 0.1% FeAcAc; 2.78 g | 6 | 1.24/1 | 40.1 | 100 (0) | 6000 (500) |
| 381-1B | 88-3B; 17.17 g | PMDI + 0.1% FeAcAc; 2.78 g | 60 | 1.24/1 | 40.1 | 91 (15) | 5300 (750) |
| 381-1C | 88-3B; 17.17 g | PMDI + 0.1% FeAcAc; 2.78 g | 90 | 1.24/1 | 40.1 | 96 (8) | 4900 (400) |

Several observations were made during the mixing of the samples. In addition, the data in Table 26 reveal several trends. The bond strength of the two-part adhesives was generally improved by virtue of removing the water-soluble components from the digested castor (87-1-1 & 87-1-2 vs. 89-1-1 & 89-1-2).

In many cases, the bond strength appeared to improve when the A+B mixture was aged for some period of time prior to making the block shear specimens (compare 89-1-1 to 89-1-2 & 89-1-3; compare 87-1-1 to 87-1-2, compare 90-1-1 & 90-1-2 to 90-1-3; and compare 90-2-1 to 90-2-2). When the A+B mixture was aged for too long of a period, the bond strength was observed to deteriorate (89-1-3 vs. 89-1-4). Excellent bond strengths were achieved even when the A+B mixture was aged for 80 minutes prior to the preparation of block shear specimens (89-1-3). In many cases, the strength of the adhesive was higher than the cohesive strength of the wood itself.

As observed in prior Examples, the absence of the Part-A curative (i.e., the use of Part-B alone) resulted in poor bond strength performance (90-3-1 vs. 90-2-2; and TP13-1 vs. TP14-1 through TP14-3).

The effect of aging on bond strength performance was mirrored by boil test results for several of the sets that were tested. Specifically, boil resistance for three of the sets (those with the highest effective fractions of water-insoluble/dispersible extract from digested castor) was observed to improve when the A+B mixture was aged for some period of time prior to making the block shear specimens.

The data in Table 27 show that the water-insoluble/water dispersible fraction from digested castor can be used to produce adhesives with excellent bond strengths, and with excellent hydrolytic stability. Moisture resistance was observed to improve with the incorporation of higher levels of water-insoluble/dispersible extract from digested castor. Thus, in making moisture-resistant adhesives of this type, it is preferred that the water-insoluble/dispersible fraction be used in excess of the water-soluble fraction.

During the mixing of the part A and part B components, extreme differences in homogeneity and dispersion stability were observed. Specifically, the Part-B containing the water-insoluble/dispersible extract from digested castor (88-1B) formed a homogeneous dispersion immediately upon mixing (with very little mixing effort), whereas the Part-B containing high levels of water-soluble material (88-2B & 88-3B) required extensive mixing to get even partial dispersion. Mixtures containing high levels of the water-soluble fraction were unable to accommodate high levels of the more non-polar PMDI as evidenced by the visible presence of PMDI droplets within the A+B mixture. Conversely, the A+B mixture made with 88-1B was homogeneous with no evidence of PMDI separation. Moreover, the mixture was observed to remain stable (with no PMDI phase separation) for a full 24 hours after mixing.

TABLE 27

| Sample ID | Part B level (g) & type | Part A Component and Level (g) | Time between mixing and pressing (min.) | % protein by wt. in cured adhesive | Boil test results: P = Pass; PF = partial failure; F = complete bondline failure | Comparable sample from Table 20-2 | % wood failure (+/- S.D.) | Average Bond Strength to SYP (peak load at failure, lbs.) (+/- S.D.) |
|---|---|---|---|---|---|---|---|---|
| 91-3-1 | 88-1B; 17.17 g | PMDI + 0.1% FeAcAc; 2.78 g | 6 | 40.1 | 2/6 P; 4/6 PF | N/A | Not tested | Not tested |
| 91-3-2 | 88-1B; 17.17 g | PMDI + 0.1% FeAcAc; 2.78 g | 60 | 40.1 | 6/6 P | N/A | Not tested | Not tested |
| 91-3-3 | 88-1B; 17.17 g | PMDI + 0.1% FeAcAc; 2.78 g | 90 | 40.1 | 6/6 P | N/A | Not tested | Not tested |
| 380-1A (replicate of 91-3-1) | 88-1B; 17.17 g | PMDI + 0.1% FeAcAc; 2.78 g | 6 | 40.1 | 5/6 P; 1/6 PF | 380-1A | 91 (9) | 6500 (1000) |
| 380-1B (replicate of 91-3-2) | 88-1B; 17.17 g | PMDI + 0.1% FeAcAc; 2.78 g | 45 | 40.1 | 6/6 P | 380-1B | 97 (4) | 6500 (1200) |
| 380-1C (replicate of 91-3-3) | 88-1B; 17.17 g | PMDI + 0.1% FeAcAc; 2.78 g | 90 | 40.1 | 4/6 P; 2/6 PF | 380-1C | 98 (2) | 5900 (1100) |
| 381-1A | 88-3B; 17.17 g | PMDI + 0.1% FeAcAc; 2.78 g | 6 | 40.1 | 1 P; 5/6 PF | 381-1A | 100 (0) | 6000 (500) |
| 381-1B | 88-3B; 17.17 g | PMDI + 0.1% FeAcAc; 2.78 g | 45 | 40.1 | 4/6 PF; 2/6 F | 381-1B | 91 (15) | 5300 (750) |

TABLE 27-continued

| Sample ID | Part B level (g) & type | Part A Component and Level (g) | Time between mixing and pressing (min.) | % protein by wt. in cured adhesive | Boil test results: P = Pass; PF = partial failure; F = complete bondline failure | Comparable sample from Table 20-2 | % wood failure (+/− S.D.) | Average Bond Strength to SYP (peak load at failure, lbs.) (+/− S.D.) |
|---|---|---|---|---|---|---|---|---|
| 381-1C | 88-3B; 17.17 g | PMDI + 0.1% FeAcAc; 2.78 g | 90 | 40.1 | 6/6 PF | 381-1C | 96 (8) | 4900 (400) |
| 91-4-1 | 88-2B; 15.66 g | 65-4A-83-1, (1-step synthesis; 85/15 w/w PMDI/ digested castor - lot 5-90), 2.02 g | 6 | 62.1 | 6/6 F | 90-1-1 | 30 (20) | 2600 (1500) |
| 91-4-2 | 88-2B; 15.66 g | 65-4A-83-1, (1-step synthesis; 85/15 w/w PMDI/ digested castor - lot 5-90), 2.02 g | 40 | 62.1 | 6/6 F | 90-1-2 | 28 (25) | 1800 (1900) |
| 90-2-3 | 88-2B; 15.66 | PMDI + 0.1% FeAcAc; 2.02 g | 6 | 55.3 | 6/6 F | 90-2-1 | 30 (30) | 2000 (2000) |
| 90-2-4 | 88-2B; 15.66 | PMDI + 0.1% FeAcAc; 2.02 g | 90 | 55.3 | 2/6 P; 4/6 PF | 90-2-2 | 91 (6) | 4250 (1450) |
| TP13-2 | TP13-1 | NONE | N/A | 100 | 6/6 F | TP13-1 | 0 | 370 (550) |
| TP16-2 | TP16-1 | NONE | N/A | 100 | 6/6 F | TP16-1 | 5 (5) | 820 (1000) |

Example 21

Water-Based Glass/Paper Adhesives

This example describes the preparation of several types of adhesives, including:

(1) Pressure sensitive adhesives (PSA)—those that incorporate water soluble plasticizers like glycerin, or water insoluble plasticizers such as adipate esters, sebacate esters, citrate esters, etc.;

(2) Water soluble adhesives—those that contain one or more of either a digested protein, a digested and deaminated protein solvated with a base (e.g., triethanolamine, NaOH, sodium carbonate), a water-soluble extract from a digested protein, an optional water soluble plasticizer (e.g., glycerin or 1,2 propane diol), and an optional water soluble polymer (e.g., polyvinylalcohol, poly(vinyl pyrrolidone));

(3) Water-based adhesives (type I)—any of the water-soluble options mentioned in items #1 or #2 above with the addition of a water-based latex dispersion such as EVA, or with the addition of a water dispersible protein such as a digested and deaminated protein, or with the addition of a water-insoluble/water dispersible fraction from a protein such as digested castor;

(4) Water-based adhesives (type II)—dispersion of one or more in any combination of a protein derivative such as a digested and deaminated protein from castor or whey, a water-insoluble/water dispersible fraction from any protein including a digested protein, and a latex polymer;

(5) Crosslinkable adhesives—any of the aforementioned types of adhesives (items #1 through #4) where additional additives are incorporated to impart crosslinking (e.g., amine-functional additives, acid-functional additives, hydroxyl functional additives, anhydride functional additives, hydrazine functional additives, isocyanate functional additives, organosilanes, and organotitanates).

Adhesives as described above can be formulated to yield physical properties ranging from: 1) transparent to opaque; 2) water-soluble to insoluble; 3) low Tg (below 10° C.) to high Tg (greater than 50° C.); 4) tack-free and glassy to tacky and pressure sensitive. These adhesives are capable of adhering to multiple substrates including paper, glass, wood, and metals.

In this Example, several formulations were prepared for the purpose of testing adhesion to glass and paper. Glass microscope slides were wet coated (via pipette) with a series of water-based adhesive formulations described in Table 28. In this table, "PVA" refers to poly(vinyl alcohol-co-vinyl acetate), 87-89% hydrolyzed; $M_n$=13,000-23,000, obtained from Aldrich Chemical. "AAPS" refers to N-(2-aminoethyl)-3-aminopropyltrimethoxysilane; SIA0591.0, obtained from Gelest, Inc. In some cases, a duplicate set of slides was also prepared, where the adhesive-wetted glass was press laminated with strips of corrugated paper in lap-shear type fashion. All samples were dried in a gravity oven for approximately 1-hour at approximately 80° C. The lap-shear specimens were tested for adhesion by hand-tearing the paper from the glass, and by determining whether or not the adhesive failed (cohesively or adhesively), and/or whether or not the corrugated paper failed (cohesively). The results of this experiment are provided in Table 29.

TABLE 28

| ID | Water | PVA | Glycerin | Airflex-426 EVA (% solids basis) | PPD (1,2 propane diol) | Digested and deaminated whey protein (lot 5-75 from Example 5) | Digested whey protein (lot 5-72; pH = 6.5 from Example 2) | Water-soluble extract from Castor lot 5-90 (from Example 20) | Water-insoluble/ dispersible extract from Castor lot 5-90 (from Example 20) | AAPS |
|---|---|---|---|---|---|---|---|---|---|---|
| 19-1 | 90 | 10 | — | — | — | — | — | — | — | — |
| 21-1A | 89.55 | 9.95 | — | — | — | — | — | — | — | 0.5 |
| 15-1 | 88.50 | 4.92 | — | — | — | 6.58 | — | — | — | — |
| 21-1 | 81.41 | 9.05 | — | — | — | 9.09 | — | — | — | 0.45 |

TABLE 28-continued

| ID | Water | PVA | Glycerin | Airflex-426 EVA (% solids basis) | PPD (1,2 propane diol) | Digested and deaminated whey protein (lot 5-75 from Example 5) | Digested whey protein (lot 5-72; pH = 6.5 from Example 2) | Water-soluble extract from Castor lot 5-90 (from Example 20) | Water-insoluble/dispersible extract from Castor lot 5-90 (from Example 20) | AAPS |
|---|---|---|---|---|---|---|---|---|---|---|
| 26-1 | 81.75 | 9.09 | — | — | — | — | 9.16 | — | — | — |
| 26-2 | 81.43 | 9.05 | — | — | — | — | 9.07 | — | — | 0.45 |
| 15-2 | 82.48 | 4.59 | — | — | — | 6.13 | — | — | — | 6.80 |
| 15-3 | ᵃ70.84 | 5.46 | 12.76 | — | — | 10.94 | — | — | — | — |
| 14-1 | ᵃ81.20 | 6.26 | — | — | — | 12.54 | — | — | — | — |
| 21-5 | 51.61 | — | — | 23.34 | — | 25.05 | — | — | — | — |
| 21-6 | — | — | — | — | 89.25 | 9.92 | — | — | — | 0.83 |
| 88-1B | 79.91 | — | — | 5.53 | — | — | — | — | 14.56 | — |

*The water that was used in these samples contained about 5% sodium carbonate; pH = 11.8.

TABLE 29

| Sample | Adhesive type | Characteristics | Failure mode(s) |
|---|---|---|---|
| 14-1 | Water-soluble | Orange/translucent solution; glassy opaque dried film | Cohesive in paper |
| 15-1 | Water-based adhesives (type I) | Orange dispersion; glassy opaque dried film | Cohesive in paper |
| 15-2 | Water-based adhesives (type I); crosslinkable | Orange dispersion; glassy dried film | Cohesive in paper |
| 15-3 | Water-soluble | Orange/translucent solution; soft/rubbery transparent dried film | Cohesive in paper |
| 21-1 | Water-based adhesives (type I); crosslinkable | Orange dispersion; glassy transparent dried film | Cohesive in paper |
| 21-5 | Water-based adhesives (type II) | Light yellow dispersion; tough transparent dried film | Cohesive in paper |
| 21-6 | Solution-based; crosslinkable | Amber solution; glassy transparent dried film | Cohesive in paper |
| 26-1 | Water soluble | Orange/translucent solution; glassy transparent dried film | Cohesive in paper |
| 26-2 | Water soluble; crosslinkable | Orange/translucent solution; glassy transparent dried film | Cohesive in paper |
| 88-1B (from Ex. 20) | Water-based adhesives (type II) | Light gray dispersion; tough, opaque dried film | Cohesive in paper |

In a second experiment, a group of adhesive-coated glass samples (no paper) were placed into warm tap water for a period of about 2 hours. The samples were then removed from water, and were evaluated to determine whether or not the adhesive remained adhered to the glass, and whether or not the paper remained adhered to the adhesive. The results of this experiment are provided in Table 30.

TABLE 30

| Sample | Solid state composition (w/w) | Soak time (min.) | Result |
|---|---|---|---|
| 19-1 | 100 PVA | 30 | dissolved |
| 21-1A | 95/5 PVA/AAPS | 30 | dissolved |
| 15-1 | 57/43 Digested and deaminated whey protein/PVA | 30 | Intact film |
| | | 60 | Intact film |
| | | 90 | Broken particulates, delaminated |
| 21-1 | 48.9/48.7/2.4 Digested and deaminated whey protein/PVA/AAPS | 30 | Intact film |
| | | 60 | Intact film |
| | | 90 | Intact film |
| 26-1 | 50.2/49.8 Digested whey/PVA | 30 | dissolved |
| 26-2 | 48.84/48.76/2.4 Digested whey/PVA/AAPS | 30 | dissolved |
| 88-1B | 72.5/27.5 Water-insoluble/dispersible extract from Castor/EVA | 30 | Intact |
| | | 60 | Intact |
| | | 90 | intact |

These results reveal that the best moisture resistance was achieved with samples containing a high fraction of a water-insoluble/water dispersible derivatized digested protein. Moisture resistance was also enhanced by means of incorporating an aminosilane, which can serve as both a crosslinking agent and as an adhesion promoter to glass. It is important to note that when the more water-soluble digested protein was used, the resulting adhesive had poor water-resistance, independent of the presence or absence of AAPS. This finding mirrors the results that were demonstrated in Example 20 for wood adhesives. Specifically, the moisture resistance of wood adhesives was also observed to improve upon removal of the more water-soluble protein components from the adhesive formulations. Thus, for applications requiring higher degrees of moisture resistance, it is preferable to incorporate a water-insoluble/dispersible protein into the adhesive—either a derivatized type, or an insoluble/dispersible extract from any protein, including a digested protein.

In a third experiment, paper/glass laminates were allowed to soak in water for a period of about 12 hours at 23° C. The samples were then removed from water, and were then evaluated to determine whether or not the adhesive remained adhered to the glass, and whether or not the paper remained adhered to the adhesive. The results of this experiment are provided in Table 31.

TABLE 31

| Sample | Solid state composition (w/w) | Soak time (hours.) | Result |
|---|---|---|---|
| 21-1 | 48.9/48.7/2.4 Digested and deaminated whey protein/PVA/AAPS | 12 | Intact film delaminated from the glass and settled to the bottom with the paper |

TABLE 31-continued

| Sample | Solid state composition (w/w) | Soak time (hours.) | Result |
|---|---|---|---|
| 21-5 | 50/50 Digested and deaminated whey protein/EVA | 12 | Paper and adhesive remained intact and adhered to glass |

In a separate experiment, sample 88-2B (from Example 20, Table 25, 84.04% water and 15.96% of the water-insoluble/dispersible fraction from digested castor), was tested as an adhesive for attaching paper to glass. In this case, the adhesive was allowed to dry at 23° C. (without baking). The protein paste was spread as a thin film on the surface of a glass jar and a piece of paper was then bonded to the surface. The jar was rolled on a hard surface to allow the adhesive to spread completely at the interface between the paper and the jar. The jar was then allowed to stand on the bench top for several hours to dry (23° C.).

In order to test moisture durability, the jar was placed in a bath of warm water (40° C.). After 15 minutes, the label was peeled and the paper was observed to cohesively fail while the adhesive layer remained intact. In addition, it was noted that the adhesive remained bonded to the glass, and that moderate to hard rubbing was required to remove it. The results of this experiment demonstrate that the water-insoluble/water dispersible fraction can be used to prepare moisture resistant adhesives for bonding substrates such as paper to glass. Moreover, if desired, these types of adhesives can be comprised of 100% protein (in the dry state).

In yet another experiment, a water-soluble pressure-sensitive adhesive (PSA) was prepared using the water-soluble fraction from digested castor (formulation 379-1). The dried glassy extract (as described earlier in this Example) was dissolved in a solution of water and glycerin (5 grams of the water-soluble extract, 15 grams of water, and 1.75 grams of glycerin). The translucent solution was deposited onto glass slides. Upon drying, the formulation became transparent and tacky. The adhesive was tested to determine if it could be used to bond paper to glass. A piece of notebook paper was cut and pressed onto the surface leaving one corner free so it could be peeled off. Upon peeling, the failure mode was observed to be partially-cohesive (within the paper), and partially adhesive (between the paper and the adhesive). When placed under water, the adhesive readily dissolved away from the glass surface. This results illustrates that it is possible to prepare water soluble pressure-sensitive adhesives by using the water-soluble extract from digested castor together with an appropriate water-soluble plasticizer (glycerin in this case).

If so desired, it is envisioned that moisture resistance could be imparted to this adhesive by means of either crosslinking (using a broad variety of crosslinking agents such as, amine compounds, silane compounds, epoxy compounds, or epichlorhydrin-type materials), by means of using water-insoluble plasticizers, by means of using reactive plasticizers, or by means of using some combination of these approaches. Further, it is also envisioned that a moisture-resistant pressure-sensitive adhesive could also be prepared by using the water-insoluble/water dispersible fraction blended in combination with a plasticizer, and/or together with a lower-$T_g$ polymer.

Example 22

Two-Part Adhesive Using PMDI with Castor Protein Extracted from Castor Meal (No Digestion)

Unlike prior Examples that employed enzyme digested proteins, this Example shows that enzyme digestion is not always necessary when the objective is to isolate a water-insoluble/water dispersible fraction. In fact, as this Example demonstrates, the good two-part adhesives (in terms of achieving PMDI dispersion, high bond strength, and excellent moisture resistance) are those that contain a protein containing a high percentage of a water-insoluble/water dispersible fraction, independent of whether or not the protein is enzyme-digested. The sample preparation procedures in this example were identical to those employed in Examples 19 and 20. Again, the block shear specimens (SYP) were pressed for 35 minutes using a Carver press with platen temperatures set at 208° C. (6 pairs per cycle).

The part-A components for this Example were formulated with Rubinate-M PMDI containing 0.1 phr FeAcAc. One of the Part-B components for this example included a protein that was extracted from castor meal (lot 5-94) using a procedure as described below.

Castor meal (4.0 kg containing 24.8% protein) was suspended in 0.1M NaOH at a 10:1 w/w meal to alkali ratio. The suspension was stirred for 18 hours at ambient temperature and the solids were then removed by centrifugation. The supernatant (about 32 liters) was acidified to pH 4.5 with 10 N HCl. The protein was allowed to sediment at about 10° C. for 12 hours, the clear supernatant solution was decanted, and the heavy precipitate (about 2 kg) was collected by centrifugation. The wet precipitate was freeze-dried yielding 670 g protein isolate.

The water-insoluble and water-soluble fractions were obtained by means of extraction with water. In the first step, 10 g of the castor protein isolate (lot 5-94) was slurried into 50 g of distilled water. The mixture was dispersed via mechanical stirring for 2 hours. Aliquots then were placed into centrifuge tubes, and the tubes were then spun at 3,400 rpm for a period of approximately 35 minutes. The centrifuged supernatant, which contained the water-soluble fraction, was decanted from the remaining water-insoluble sediment, and was poured into a separate container (this clear yellow supernatant was saved and dried at 37° C. for subsequent dispersion experiments and solid state FTIR analyses). After the first washing step, fresh distilled water was then added to the tubes, and the remaining sediment was dispersed into the water by means of hand-stirring with a spatula. The combined centrifugation, decanting, and re-dispersion procedures were performed for a total of 13 cycles. After the final cycle, the free liquid was decanted from the residual paste-like dispersion (the water-insoluble fraction from the starting castor protein). Upon drying, the paste was determined to contain 28.58% solids, and the total yield of the water-insoluble fraction was determined to be 62.87%. Thus, the starting castor protein itself contained 62.87% water-insoluble material, and 37.12% water-soluble material.

In a first experiment, a "Part-B" component was prepared directly with the freeze dried protein isolate (note that this protein was not digested). In analogous experiments, Part-B components were also prepared with water-insoluble and water-soluble fractions that were extracted from the castor protein. The "Part-B" compositions are given in Table 32.

TABLE 32

| Part-B Composition | JM448B1 (weight %) | JM448B2 (weight %) | JM449B1 (weight %) |
|---|---|---|---|
| Water | 77.22 | 77.22 | 79.55 |
| Water-insoluble/dispersible extract from castor protein isolate (5-94) | 22.78 | 0 | 0 |
| Castor protein isolate (5-94) | 0 | 0 | 20.45 |
| Water-soluble extract from castor protein isolate (5-94) | 0 | 22.78 | 0 |

TABLE 32-continued

| Part-B Composition | JM448B1 (weight %) | JM448B2 (weight %) | JM449B1 (weight %) |
|---|---|---|---|
| % total solids | 22.78 | 22.78 | 20.45 |
| % natural product (dry basis) | 100 | 100 | 100 |

The resulting dispersion of water-insoluble paste (gravimetrically determined be 28.58% solids by weight) was mixed with additional distilled water to yield a cream containing 22.78% solids, which was then used in preparing an adhesive for the present example. The starting dry castor protein (lot5-94; contained 62.87% water-insoluble components and 37.12% water-soluble components) was separately mixed with water to yield a cream containing 20.45% solids, which was also used in preparing an adhesive for the present example (Table 32). The compositions of the resulting 2-part adhesives (Part-A+Part-B) are provided in Table 33 together with average block shear strengths and wood-failure percentages for SYP block-shear specimens. Note that the water-soluble fraction (JM448B2) was not used to make block shear specimens because unlike the water-insoluble fraction, the water-soluble fraction did not yield a stabilized dispersion of PMDI in water.

Samples were also prepared for a boil test (Table 34). The samples were boiled in water for 2 hours, and were then oven dried for a period of 24 hours at 65° C. The specimens were then inspected for bondline failure, and were graded as either "P=pass" (no bondline failure); "PF=partial bondline failure," or "F=complete bondline failure."

Figure 9:
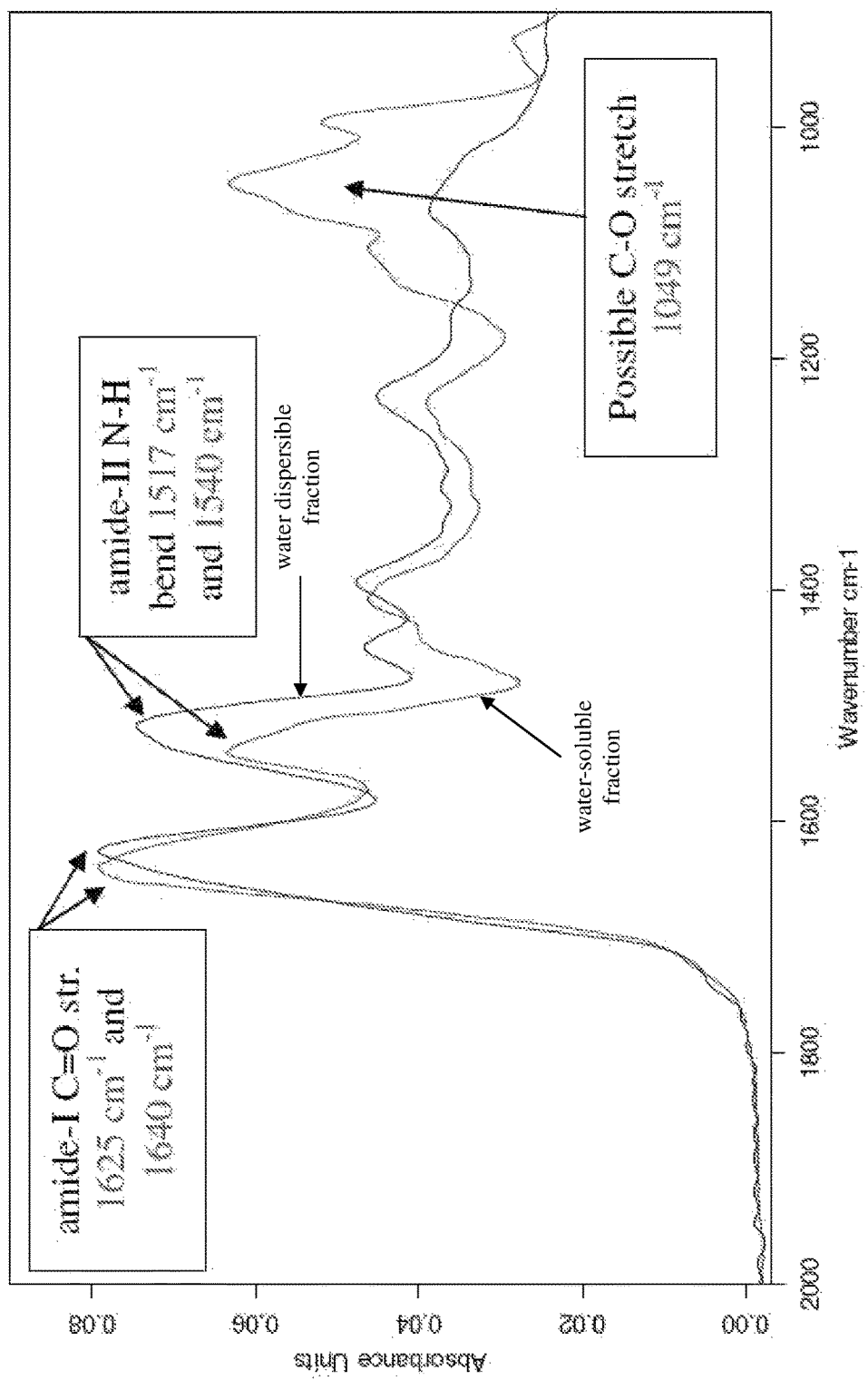
FIG. 9 shows overlaid solid state FTIR spectra of isolated water-soluble fraction, and water-insoluble/water dispersible fraction from castor protein (lot 5-94), showing an expansion of the carbonyl amide region.
Figure 10:
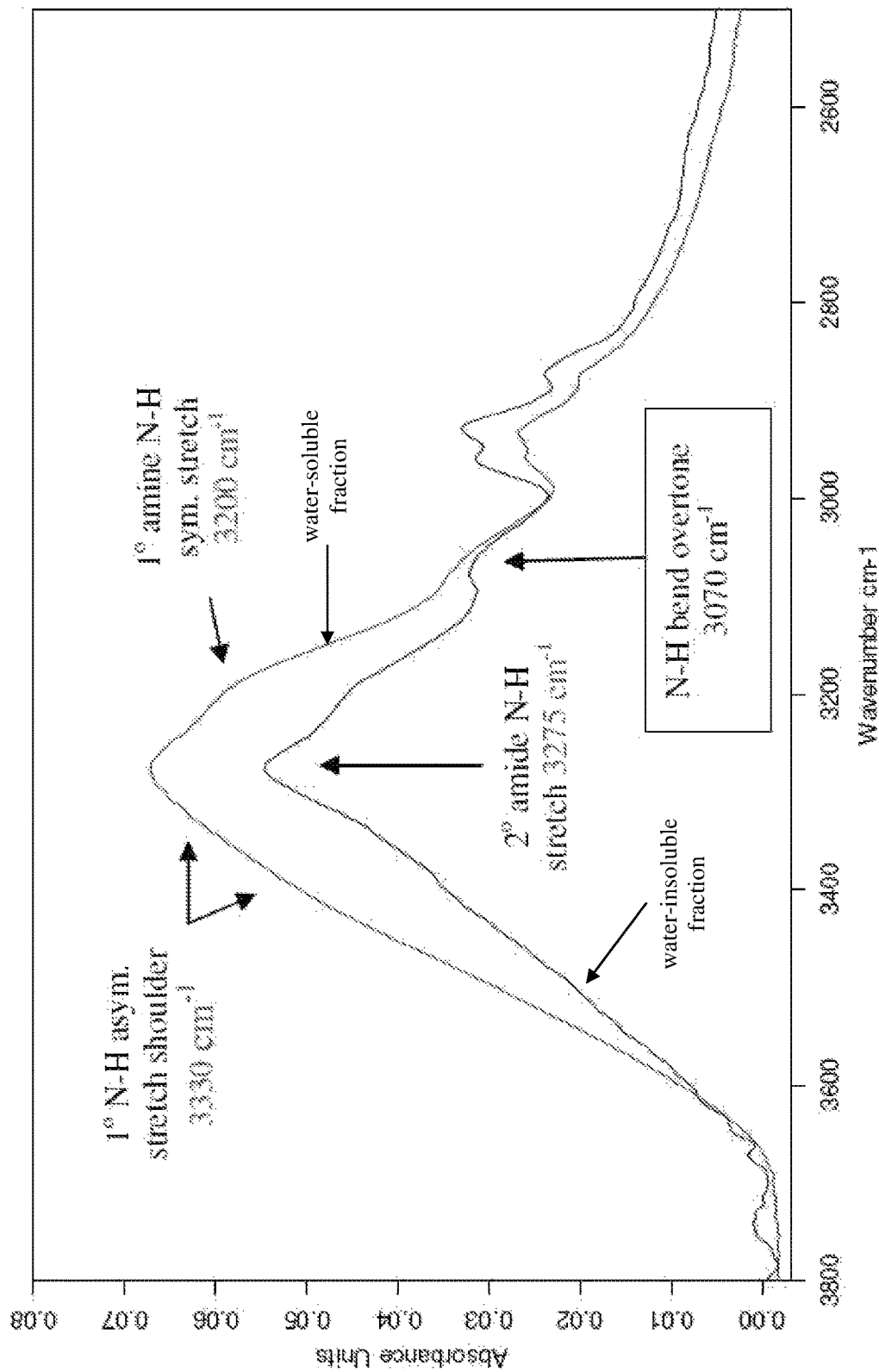
FIG. 10 shows the solid state FTIR spectra of isolated water-soluble fraction, and water-insoluble/water dispersible fraction from castor protein (lot 5-94), where the N—H and O—H stretch regions are expanded.
Figure 11:
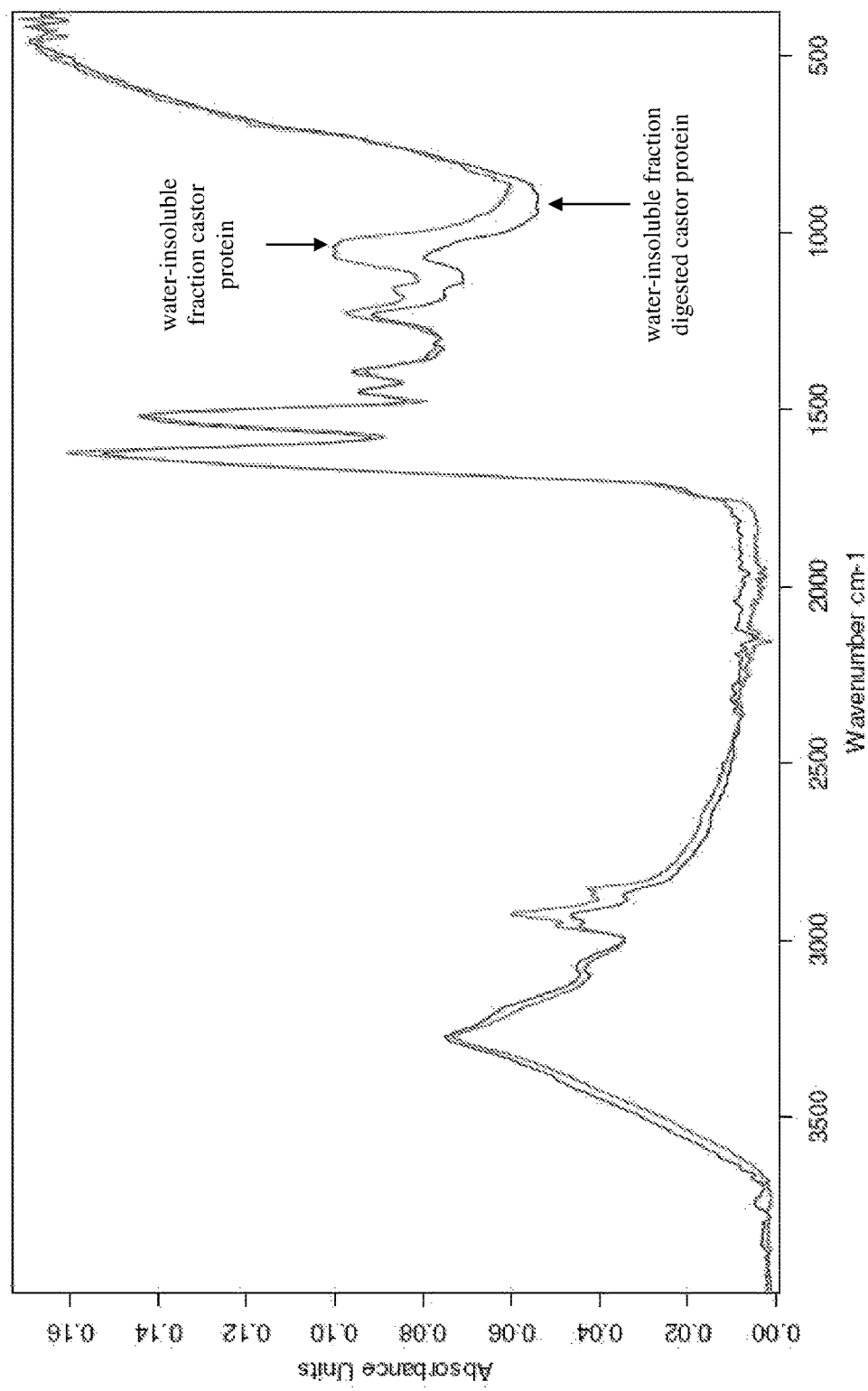
FIG. 11 shows overlaid solid state FTIR spectra of the isolated water-insoluble/water dispersible fractions from castor protein (lot 5-94) and from enzyme digested castor (lot 5-90)

The two dried extracts were separately analyzed by solid state FTIR (see FIGS. 9-11). FIG. 9 shows overlaid solid state FTIR spectra of isolated fractions from castor protein (lot 5-94), showing an expansion of the carbonyl amide region. The amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups in the water-soluble fraction. This is corroborated by the N—H stretching region depicted in FIG. 10. Unlike the analogous water-soluble extract from digested castor (FIG. 6), the water-soluble fraction from the castor protein isolate (lot 5-94) appears to contain less carboxylic acid and less amine-salt functionality. On the other hand, the water-insoluble extracts from both the digested castor and the castor protein isolate appear to be very similar to one another (see FIG. 11). FIG. 10 shows solid state FTIR spectra of isolated fractions from castor protein (lot 5-94) where the N—H and O—H stretch regions were expanded. The spectra were vertically scaled to achieve similar absorbance intensities for the secondary amide N—H stretch band centered at 3275 $cm^{-1}$. FIG. 10 shows that the predominant type of amide in the water-dispersible fraction is the secondary main-chain amide as evidenced by the highly symmetric band centered at 3275 $cm^{-1}$. Although the water-soluble fraction also contains this type of amide, it also contains significantly higher fractions of primary amides as evidenced by the breadth of the absorbance region owing to the presence of the two primary N—H stretching bands at approximately 3200 $cm^{-1}$ (symmetric) and at approximately 3300 $cm^{-1}$ (asymmetric), respectively.

Collectively, these spectra revealed that the water-soluble fraction (FIG. 9) was comprised of a relatively high concentration of primary amines. Conversely, the water-insoluble, dispersible fraction (FIG. 9) was comprised of a higher fraction of secondary amines. Moreover, the amide-I carbonyl absorption band for the water-insoluble/dispersible fraction was observed to appear at a characteristic wavenumber of approximately 1625 $cm^{-1}$, whereas that of the water-soluble fraction was observed at approximately 1640 $cm^{-1}$ (FIG. 9). As noted previously, this feature is one of the distinguishing differences between the water-soluble and water-insoluble fractions.

The water-insoluble/water dispersible fraction (JM-448B1) was readily compatible with PMDI (a stable PMDI dispersion was formed when PMDI was added to the slurry, and there was no evidence of PMDI phase separation, even after 24 hours). The dispersion of the starting castor protein in water (JM-449B1), which itself was comprised of a mixture of the water-soluble and water-insoluble components (the dry castor protein contained 62.87% water-insoluble components and 37.12% water-soluble components), was also readily compatible with PMDI (a stable dispersion was formed when PMDI was added to the slurry, and there was no evidence of PMDI phase separation, even after 24 hours). By contrast, a solution comprising 22.78% by weight of the water-soluble fraction dissolved in water (JM-448B2) was unable to form a stable dispersion with PMDI (this adhesive mixture was JM-450-1; see Table 33). Instead, the PMDI was observed to phase separate and coalesce into large droplets that sank to the bottom of the container.

TABLE 33

| Sample ID | Part B level (g) & type | Part A Component and Level (g) | Time between mixing and pressing (min.) | B/A ratio (solids basis excluding volatile water) | % protein by wt. in cured adhesive | % wood failure (+/− S.D.) | Average Bond Strength to SYP (peak load at failure, lbs.) (+/− S.D.) |
|---|---|---|---|---|---|---|---|
| JM-448-3 | JM-448B1; 7.83 g | PMDI + 0.1% FeAcAc; 1.435 g | 55 | 1.24/1 | 55.3 | 90 (10) | 5930 (300) |
| JM-449-3 | JM-449B1; 7.83 g | PMDI + 0.1% FeAcAc; 1.29 g | 55 | 1.24/1 | 55.3 | 99 (2) | 5340 (1010) |
| JM-450-1 | JM-448B2; 7.83 g | PMDI + 0.1% FeAcAc; 1.435 g | 55 | 1.24/1 | 55.3 | Not tested | Not tested |

TABLE 34

| Sample ID | Part B level (g) & type | Part A Component and Level (g) | Time between mixing and pressing (min.) | % protein by wt. in cured adhesive | Boil test results; P = Pass; PF = partial failure; F = complete bondline failure | Comparable sample from Table 33 | % wood failure (+/− S.D.) From Table 33 | Average Bond Strength to SYP (peak load at failure, lbs.) (+/− S.D.) from Table 33 |
|---|---|---|---|---|---|---|---|---|
| JM-448-2 | JM-448B1; 7.83 g | PMDI + 0.1% FeAcAc; 1.435 g | 55 | 55.3 | 6/6 P | JM-448-3 | 90 (10) | 5930 (300) |
| JM-449-2 | JM-449B1; 7.83 g | PMDI + 0.1% FeAcAc; 1.29 g | 55 | 55.3 | 6/6 P | JM-449-3 | 99 (2) | 5340 (1010) |

Thus, this Example demonstrates that the ability for the protein to disperse PMDI is dependent upon the presence or absence of the water-insoluble/water dispersible fraction. Since good PMDI-dispersability is a prerequisite for the preparation of homogeneous adhesives, the preferred protein for a two-part adhesive system is one which contains the water-insoluble fraction at a level which is sufficient to emulsify the PMDI dispersion. In order to prepare the best adhesives (in terms of PMDI dispersibility, bond strength, and moisture resistance), the preferred level of the water-insoluble/water dispersible fraction within a protein should not be less than approximately 10% to 50% by weight of the protein, and more preferably not less than 50% by weight.

Example 23

Plywood Samples Prepared with Two-Part Castor Based Adhesives

Plywood samples were prepared from adhesives similar to those described in Examples 18 through 20. The specific adhesive formulations are described below. The "A" component for each of the adhesives was PMDI with the FeAcAc catalyst as described previously. The "B" components are given in Table 35.

TABLE 35

| Part-B ingredient | 88-5B For Adhesive 391-1 (weight %) | 88-6B For Adhesive 401-1 (weight %) |
|---|---|---|
| Water | 65.71 | 65.07 |
| Digested Castor (Lot 5-108) | 28.75 | 28.11 |
| Airflex 426 EVA (solids basis) | 5.54 | 6.82 |
| % total solids | 34.29 | 34.93 |
| % protein (dry basis) | 83.84 | 80.48 |

Adhesive 391-1 (43.4% active ingredients) was mixed in the following proportions: Part B (88-5B)=46.98 g of a 31.52% solids digested castor paste in water (Lot #5-108)+ 4.53 g Airflex 426 water-based latex (63% solids). Part A=8.34 g PMDI/FeAcAc.

Adhesive 404-1 (50.57% active ingredients) was mixed in the following proportions: Part B (88-6B)=46.98 g of a 31.52% solids digested castor paste in water (Lot #5-108)+ 5.71 g Airflex 426 water-based latex (63% solids). Part A=16.68 g PMDI/FeAcAc.

Plywood Preparation

Plywood samples were prepared using southern yellow pine (SYP) and white fir (WF) veneers. The veneer thickness was approximately ⅛ inch thick for both the SYP and WF. 6-inch×6-inch veneer squares were cut (36 sq. in.). The veneers were conditioned to a wood moisture content of 12 percent. 7-ply plywood samples were prepared, which equates to 6 bond-lines between the veneers.

A net amount of 10.29 grams of "wet" adhesive 391-1 were applied to each of the six interfaces between the seven veneers (6 bond-lines). The grain direction of each ply was alternated by 90 degrees. This amount of wet adhesive per bondline was applied at an equivalent loading to the amount of wet adhesive that was applied to the 3.5 inch bondline for the block shear samples as described in previous examples (1 gram wet adhesive per 3.5 sq. in.). In this Example, this equates to a dry weight of approximately 0.12 g/square inch. Plywood Samples 391-1-P (SYP) and 391-1F (WF) were prepared by pressing under the same conditions used to prepare the block shear samples. Specifically, 250 psi for 30 minutes at a platen temperature of 208° C. After pressing, the plywood samples were trimmed to 4 in.×4 in. The resulting SYP plywood had a thickness of 0.5 inches and a density of 52 lbs/cu.ft. The WF plywood sample had a thickness of 0.5 inches and a density of 48 lbs/cu.ft.

Plywood samples 391-1P and 391-1F were subjected to a 2 hour boil test as described in previous Examples. A 1-inch strip was cut from the plywood sample and subjected to the same conditions as the block shear samples. All of the plywood samples passed with no evidence of delamination between the veneers. The thickness of the boiled plywood samples was measured after drying. The dried sample had increased in thickness to 0.75 inches.

Figure 8:
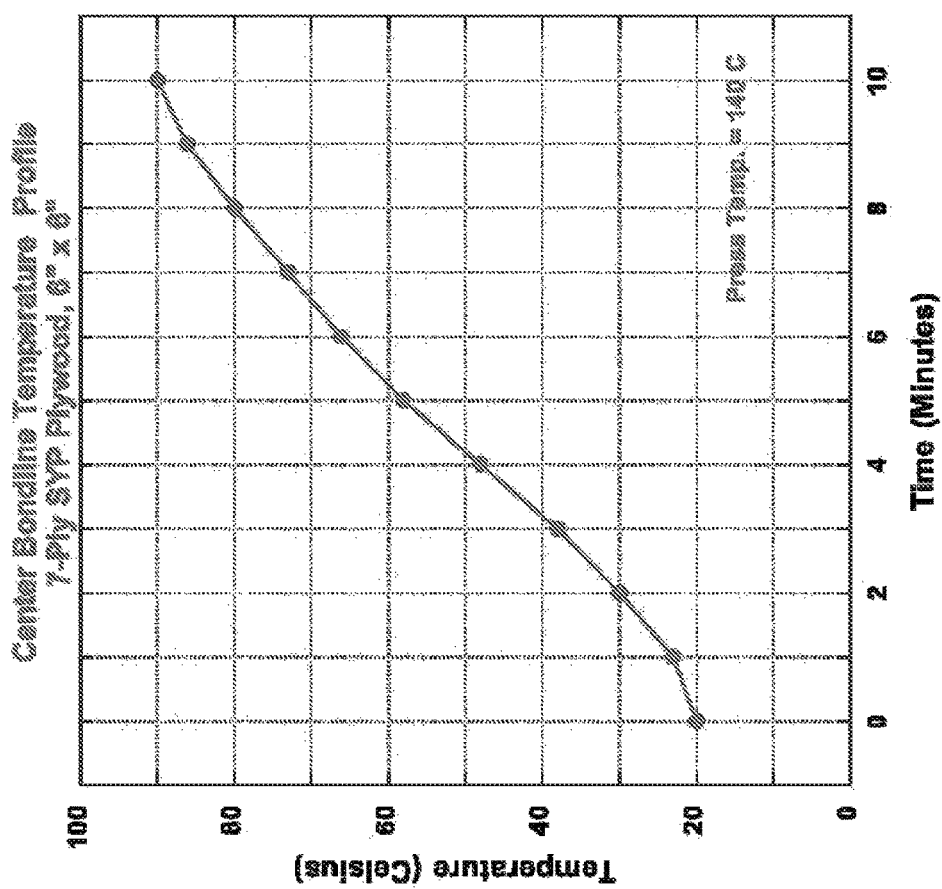
FIG. 8 shows the temperature of the center bond-line of the 7-ply composite 6×6" of Example 23.

A second set of SYP and WF plywood samples were prepared using adhesive 404-1. A net amount of 10.29 grams of "wet" adhesive 404-1 were applied to each of the six interfaces between the seven veneers (6 bond-lines). The grain direction of each ply was alternated by 90 degrees. This amount of wet adhesive per bondline was applied at an equivalent loading to the amount of wet adhesive that was applied to the 3.5 inch bondline for the block shear samples as described in previous examples (1 gram wet adhesive per 3.5 sq. in.). In this Example, this equates to a dry weight of approximately 0.14 g/square inch. Plywood samples 404-1P (SYP) and 404-1F (WF) were pressed using the following pressing conditions: 150 psi for 10 minutes at a press platen temperature of 140° C. These conditions are similar to those used to make hardwood plywood for furniture applications. The temperature of the center bond-line of the 7-ply composite was measures and found to reach a temperature of 90° C. after 10 minutes as can be seen in FIG. 8.

After pressing, the plywood samples were trimmed to 4 in.×4 in. The resulting SYP plywood had a thickness of 0.93 inches and a density of 34 lbs/cu.ft. The WF plywood sample had a thickness of 0.93 inches and a density of 30 lbs/cu.ft.

Plywood samples 404-1P and 404-1F were also wet tested using the 2-hour boil test. A 1-inch strip was cut from the plywood sample and subjected to the same conditions as described previously. Each of the plywood samples passed with no evidence of delamination between the veneers. The thickness of a boiled plywood sample was measured after drying. The dried sample had a thickness to 0.95 inches, very close to the original plywood thickness of 0.93 inches.

Example 24

Particle Board Samples

Particle board was prepared using 335 grams of SYP saw dust having a moisture content of approximately 12 percent and 67 grams of adhesive 404-1 from Example 23. This is a 16.66 percent loading of wet adhesive, which equates to approximately 9.1% percent adhesive on a dry solids composite basis (the adhesive itself was comprised of 43.12% digested castor, 8.30% EVA, and 48.58% PMDI on a cure-solids basis).

The adhesive was added to the sawdust slowly and mixed with a mechanical mixer used for kneading dough. After all the adhesive was added, the sample was further mixed and kneaded by hand to insure that the adhesive was efficiently mixed. A 7-inch×7-inch cardboard frame was centered on a 12"×12"×⅛" stainless steel plate, which was covered with aluminum foil. The sawdust was added slowly into the cardboard frame to try to get a uniform density of adhesive coated sawdust particles. After all the sawdust was added, the sawdust was compressed by hand with a 7"×7"×¼" plywood board and the cardboard frame were carefully removed so that the particle board matte would not be disturbed. The board was removed, a piece of aluminum foil was placed on the particle board matte, and another 12"×12"×⅛" stainless steel plate was placed on top. The particle board was pressed using the following conditions: 150 psi for 10 minutes at a press platen temperature of 140° C.

A strongly bound and densified particle board sample was produced. This illustrates the application of this type of adhesive technology for particle board and medium density fiber board applications. After pressing, the particle board was trimmed to 4"×4" and the sample had a thickness of 0.73 inches. The density of the particle board sample was calculated to be 36.36 lbs/cu.ft. In a subsequent step, a strip was cut from the particle board and was boiled for two hours. The sample was observed to remain intact, even while saturated with water. The wet sample was then dried in an oven, and was observed to remain intact with no evidence of dismemberment.

Note that the two components of the adhesive (Part-A and Part-B) were premixed in this Example before being added and blended with the sawdust particles. Premixing can be accomplished by means of conventional methods such as with a paddle mixer or static mixer. The premixed components then can be added to the sawdust via a spray or drip application method, followed by rigorous mixing. As an optional method, it is also possible to add each adhesive component to the sawdust sequentially ("sequential addition") or in tandem ("tandem addition") without premixing them, and then to rigorously blend the mixture. The addition of adhesive components can be accomplished via conventional methods include spray and drip methods. Blending can be achieved via any conventional mixing process including high speed paddle mixing (e.g., with a Littleford blender or a Henchel-type mixer), sigma-blade mixing, ribbon blending, etc. Optional materials could also be concurrently or sequentially blended with the mixture including fillers such as calcium carbonate, aluminosilicates, clays fumed silica, nano-sized inorganic particulates, latex polymers, antimicrobial compounds, etc. Moreover, the viscosity, sprayability, and spreadability of the adhesive components can be controlled by adjusting the amount of water that is added to the Part-B component before it is premixed with Part-A, or by adding water after the two components have been premixed. In the event that premixing is not employed (e.g., if tandem or sequential mixing is employed), water could be added to the mixture as needed for the purpose of influencing viscosity and sawdust-particle surface coverage.

Example 25

Effects of Fractionation and Post-Mix Time on the Performance of Two-Part Adhesives Prepared with Digested Soy (with and without EVA)

The sample preparation procedures in this example were identical to those employed in Examples 19 and 20. Again, the block shear specimens (SYP) were pressed for 35 minutes using a Carver press with platen temperatures set at 208° C. (6 pairs per cycle).

The Part-A components for this Example were formulated with Rubinate-M PMDI containing 0.1 phr FeAcAc. The Part-B components in this Example contained extracts that were isolated from digested soy (lot 5-81 made via procedures outlined in Example 7).

Digested soy (lot 5-81) was fractionated to yield a water-soluble fraction, and a water-insoluble, dispersible fraction. In the first step, 300 g of digested soy was slurried into 1 liter of distilled water. The mixture was shaken by hand, and was then placed into a sonicator bath for a period of 30 minutes. Aliquots were placed into centrifuge tubes, and the tubes were then spun at 3400 rpm for a period of approximately 35 minutes. The centrifuged supernatant, which contained the water-soluble fraction, was decanted off of the remaining water-insoluble sediment, and was poured into a separate container for later use (this clear yellow supernatant was placed into an open pan and was allowed to evaporate dry at a temperature of 37° C.). After the first washing step, fresh distilled water was then added to the tubes, and the remaining sediment was dispersed into the water by means of hand-stirring with a spatula. The combined centrifugation, decanting, and re-dispersion procedures were performed for a total of 5 cycles. After the final cycle, the free liquid was decanted from the residual paste-like dispersion (yellowish-peach in color). The resulting dispersion (gravimetrically determined be 16.24% solids by weight) was used in preparing the adhesives for this example.

The dispersion was observed to be stable for a period of several weeks. It was also discovered that the dispersion could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the digested soy, nor the digested soy itself was capable of stabilizing a dispersion of PMDI in water.

After drying aliquots of both fractions, it was verified that the yellow sediment (the water-insoluble/dispersible extract) could not be re-dissolved in water. On the other hand, the dried supernatant fraction (clear/yellow solid) was completely soluble in water. The two dried extracts were separately analyzed by solid state FTIR (see FIGS. 12-15). FIG. 13 shows overlaid solid state FTIR spectra of isolated fractions from digested soy, where the N—H region is expanded. The spectra were vertically scaled to achieve equivalent absorbance intensities for the secondary amide N—H stretch band centered at 3275 cm$^{-1}$. FIG. 13 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively. Collectively, these spectra revealed that the water-soluble fraction was comprised of a relatively high concentration of primary amines. Conversely, the water-insoluble, dispersible fraction was comprised of a higher fraction of secondary amines.

The Part-B component compositions for this Example are given in Table 36.

TABLE 36

| Part-B Compositions | TP3-1B (weight %) | TP3-2B (weight %) | TP3-3B (weight %) | TP3-4B (weight %) | TP3-5B (weight %) |
|---|---|---|---|---|---|
| Water | 79.91 | 83.76 | 79.91 | 85 | 68 |
| Water-insoluble/dispersible extract from digested soy (lot 5-81) | 14.56 | 16.24 | 0 | 0 | 0 |
| Water-soluble extract from digested soy (lot 5-81) | 0 | 0 | 0 | 15 | 0 |
| Airflex 426 EVA (solids basis) | 5.53 | 0 | 5.53 | 0 | 0 |
| Digested soy (lot 5-81) | 0 | 0 | 14.56 | 0 | 32.00 |
| % total solids | 20.09 | 16.24 | 20.09 | 15.00 | 32.00 |
| % protein (dry basis) | 72.47 | 100.00 | 72.47 | 100.00 | 100.00 |

The compositions of the resulting two-part adhesives for this example (Part-A+Part-B) are provided in Table 37 together with average block shear strengths and wood-failure percentages for SYP block-shear specimens. Note that in many cases, multiple sample sets were sequentially prepared from the same batch of adhesive as a function of time after mixing, so that the pot-life of the 2-part system could be evaluated.

Selected sets of samples were also prepared for boil tests (Table 38). The samples were boiled in water for 2 hours, and were then oven dried for a period of 24 hours. at 65° C. The specimens were then inspected for bondline failure, and were graded as either "P=pass" (no bondline failure); "PF=partial bondline failure," or "F=complete bondline failure."

TABLE 37

| Sample ID | Part B level (g) & type | Part A Component and Level (g) | Time between mixing and pressing (min.) | B/A ratio (solids basis excluding volatile water) | % protein by wt. in cured adhesive | Average Bond Strength to SYP (peak load at failure, lbs.) (+/− S.D.) | % wood failure (+/− S.D.) |
|---|---|---|---|---|---|---|---|
| TP4-1 | TP3-1B; 16 g | PMDI + 0.1% FeAcAc; 2.592 g | 5 | 1.24/1 | 46.8 | 6270 (740) | 100 (0) |
| TP4-2 | TP3-1B; 16 g | PMDI + 0.1% FeAcAc; 2.592 g | 40 | 1.24/1 | 46.8 | 6029 (820) | 97 (8) |
| TP4-3 | TP3-1B; 16 g | PMDI + 0.1% FeAcAc; 2.592 g | 80 | 1.24/1 | 46.8 | 5913 (990) | 90 (20) |
| TP6-1 | TP3-3B; 16 g | PMDI + 0.1% FeAcAc; 2.592 g | 5 | 1.24/1 | 46.8 | 553 (980) | 7 (11) |
| TP6-2 | TP3-3B; 16 g | PMDI + 0.1% FeAcAc; 2.592 g | 40 | 1.24/1 | 46.8 | 3430 (1600) | 71 (40) |
| TP6-3 | TP3-3B; 16 g | PMDI + 0.1% FeAcAc; 2.592 g | 80 | 1.24/1 | 46.8 | 5690 (640) | 93 (6) |
| TP97-4 | TP3-3B; 16 g | PMDI + 0.1% FeAcAc; 2.592 g | 5 | 1.24/1 | 46.8 | 180 (160) | 3 (3) |
| TP8-1 | TP3-2B; 16 g | PMDI + 0.1% FeAcAc; 2.095 g | 5 | 1.24/1 | 55.3 | 4092 (1063) | 84 (17) |
| TP8-2 | TP3-2B; 16 g | PMDI + 0.1% FeAcAc; 2.095 g | 40 | 1.24/1 | 55.3 | 4860 (830) | 70 (20) |
| TP8-3 | TP3-2B; 16 g | PMDI + 0.1% FeAcAc; 2.095 g | 80 | 1.24/1 | 55.3 | 5080 (830) | 98 (4) |
| TP9-1 | TP3-1B | NONE | N/A | N/A | 72.47 | Samples fell apart | N/A |
| TP11-1 | TP3-2B | NONE | N/A | N/A | 100 | 1120 (1070) | 3 (4) |
| TP12-1 | TP3-5B | NONE | N/A | N/A | 100 | 930 (870) | 3 (4) |
| TP15-1 | TP3-2B; 16 g | PMDI + 0.1% FeAcAc; 0.289 g | 5 | 9/1 | 90 | 3163 (1360) | 21 (18) |
| TP15-2 | TP3-2B; 16 g | PMDI + 0.1% FeAcAc; 0.289 g | 40 | 9/1 | 90 | 2770 (1050) | 52 (22) |
| TP15-3 | TP3-2B; 16 g | PMDI + 0.1% FeAcAc; 0.289 g | 80 | 9/1 | 90 | 3140 (1300) | 73 (33) |

TABLE 38

| Sample ID | Part B level (g) & type | Part A Component and Level (g) | Time between mixing and pressing (min.) | % protein by wt in cured adhesive | Boil test results: P = Pass; PF = partial failure; F = complete bondline failure | Comparable sample from Table 37 | Average Bond Strength to SYP (peak load at failure, lbs.) (+/− S.D.) from Table 37 | % wood failure (+/− S.D.) From Table 37 |
|---|---|---|---|---|---|---|---|---|
| TP4-4 | TP3-1B; 16 g | PMDI + 0.1% FeAcAc; 2.592 g | 5 | 46.8 | 3/6 P; 3/6 PF | TP4-1 | 6270 (740) | 100 (0) |
| TP4-5 | TP3-1B; 16 g | PMDI + 0.1% FeAcAc; 2.592 g | 40 | 46.8 | 4/6 P; 2/6 PF | TP4-2 | 6029 (820) | 97 (8) |
| TP4-6 | TP3-1B; 16 g | PMDI + 0.1% FeAcAc; 2.592 g | 80 | 46.8 | 2/6 P; 4/6 PF | TP4-3 | 5913 (990) | 90 (20) |
| TP6-4 | TP3-3B; 16 g | PMDI + 0.1% FeAcAc; 2.592 g | 5 | 46.8 | 6/6 F | TP6-1 | 553 (980) | 7 (11) |
| TP6-5 | TP3-3B; 16 g | PMDI + 0.1% FeAcAc; 2.592 g | 40 | 46.8 | 1/6 PF; 5/6 F | TP6-2 | 3430 (1600) | 71 (40) |
| TP6-6 | TP3-3B; 16 g | PMDI + 0.1% FeAcAc; 2.592 g | 80 | 46.8 | 2/6 P; 1/6 PF; 3/6 F | TP6-3 | 5690 (640) | 93 (6) |
| TP8-4 | TP3-2B; 16 g | PMDI + 0.1% FeAcAc; 2.095 g | 5 | 55.3 | 2/6 P; 2/6 PF; 3/6 F | TP8-1 | 4092 (1063) | 84 (17) |
| TP8-5 | TP3-2B; 16 g | PMDI + 0.1% FeAcAc; 2.095 g | 40 | 55.3 | 1/6 P; 3/6 PF; 1/6 F | TP8-2 | 4860 (830) | 70 (20) |
| TP8-6 | TP3-2B; 16 g | PMDI + 0.1% FeAcAc; 2.095 g | 80 | 55.3 | 1/6 P; 3/6 PF; 1/6 F | TP8-3 | 5080 (830) | 98 (4) |
| TP18-1 | TP3-4B; 15 g | PMDI + 0.1% FeAcAc; 1.81 g | 5 | 55.3 | 0/6 P; 2/6 PF; 4/6 F | Not tested | N/A | N/A |
| TP18-2 | TP3-4B; 15 g | PMDI + 0.1% FeAcAc; 1.81 g | 40 | 55.3 | 1/6 P; 0/6 PF; 5/6 F | Not tested | N/A | N/A |
| TP18-3 | TP3-4B; 15 g | PMDI + 0.1% FeAcAc; 1.81 g | 80 | 55.3 | 0/6 P; 0/6 PF; 6/6 F | Not tested | N/A | N/A |
| TP11-2 | TP3-2B | NONE | N/A | 100 | 6/6 F | TP11-1 | 1120 (1070) | 3 (4) |
| TP12-2 | TP3-5B | NONE | N/A | 100 | 6/6 F | TP12-1 | 930 (870) | 3 (4) |

Like the digested castor extracts of Example 20, the digested soy extracts in this Example also contained water-soluble and water-insoluble fractions. Moreover, like the analogous digested castor extracts, the best overall combination of bond strengths and water resistance characteristics were observed when the water-insoluble fraction was the primary protein component in the adhesive. In addition, like the water-insoluble digested castor extract, the water-insoluble digested soy extract facilitated the dispersion of PMDI into a water-based medium. A stable dispersion did not form when PMDI was added to mixtures containing high proportions of the water-soluble extract (including the digested soy itself). In addition, like the water-insoluble extract from digested castor, the water-insoluble extract from digested soy was itself readily dispersible in water, and was similarly comprised of a relatively high concentration of secondary amides—consistent with the presence of a relatively high fraction of intact, hydrolysis-resistant, main-chain polypeptide units. Moreover, the amide-I carbonyl absorption band for the water-insoluble/dispersible fraction was observed to appear at a wavenumber of approximately 1625 cm$^{-1}$, whereas that of the water-soluble fraction was observed at approximately 1640 cm$^{-1}$. As noted earlier, this feature is one of the distinguishing differences between the water-soluble and water-insoluble fractions; not only for castor proteins, but for soy proteins as well.

Figure 12:
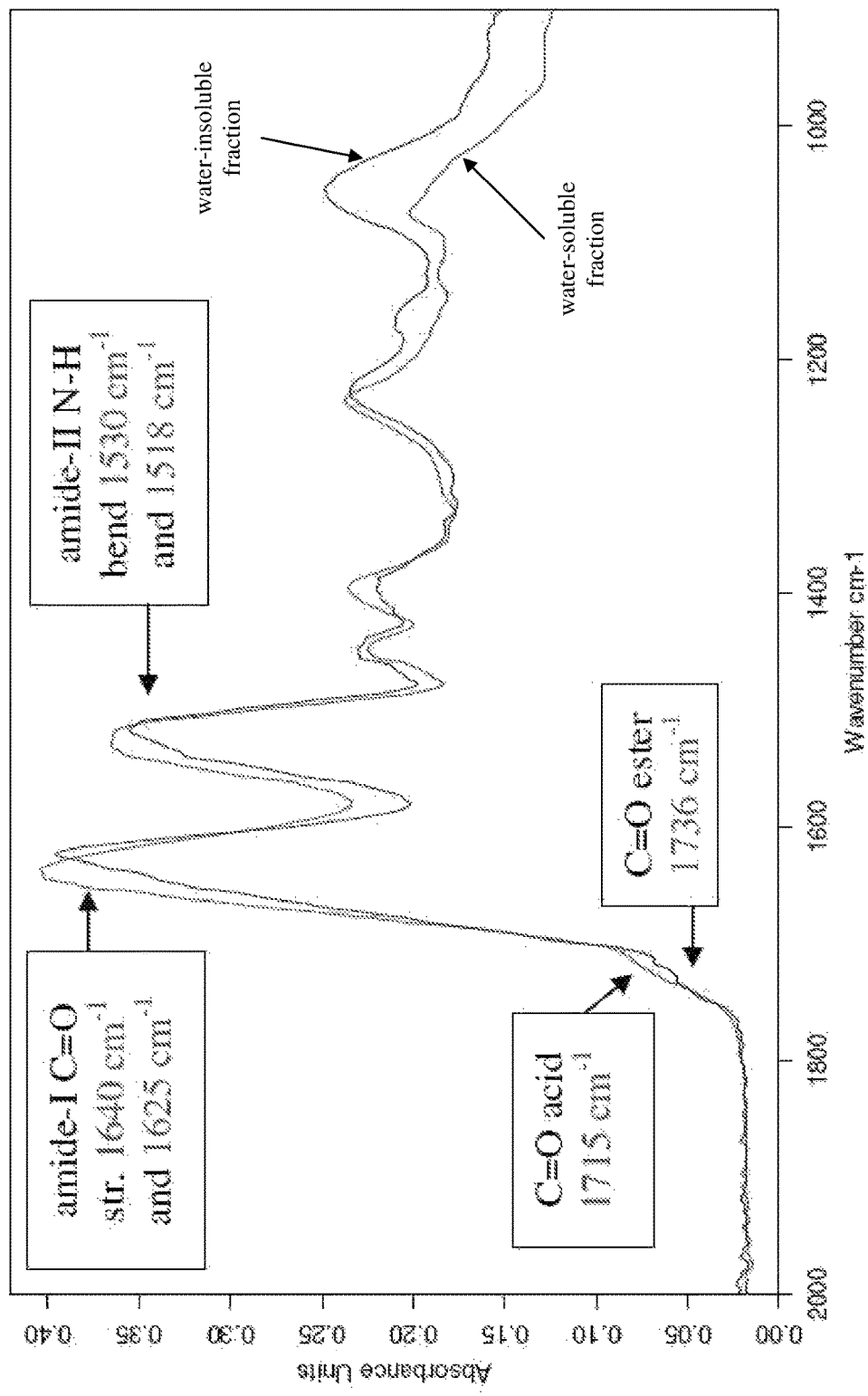
FIG. 12 shows overlaid solid state FTIR spectra of isolated water-soluble fraction, and water-insoluble, dispersible fraction from digested soy, where the carbonyl amide region is expanded, and where the spectra were vertically scaled to achieve equivalent absorbance intensities for the amide-I carbonyl stretch.
Figure 13:
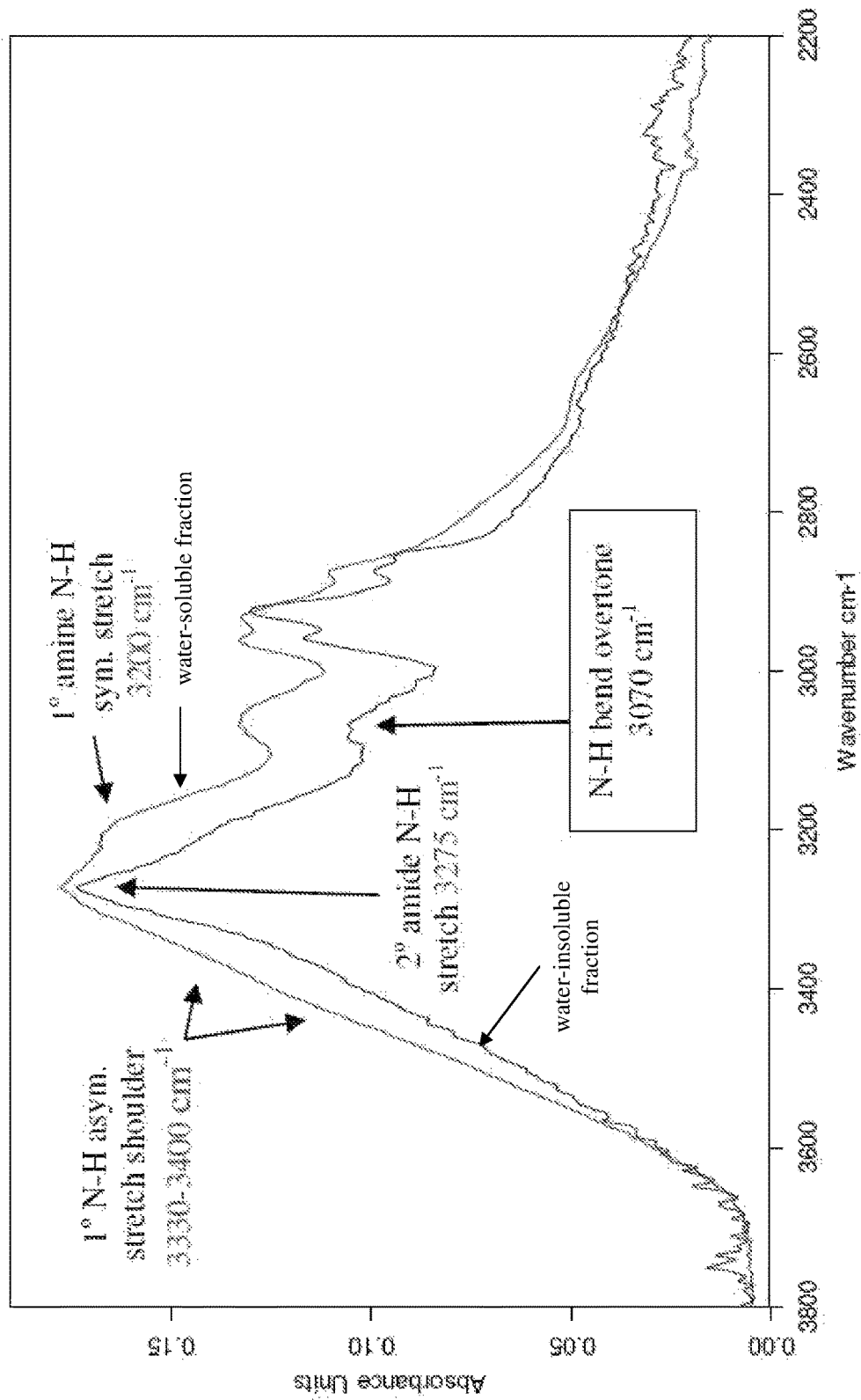
FIG. 13 shows overlaid solid state FTIR spectra of isolated water-soluble fraction, and water-insoluble/water dispersible fraction from digested soy, where the N—H stretching region is expanded.

Importantly, and as shown in FIG. 12, the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups (and/or primary amines) in the water-soluble fraction (from lower molecular weight amino acid fragments), and to a higher fraction of secondary amide groups in the water-dispersible fraction (from the main-chain polypeptide chains). This is supported by the N—H stretching region depicted in FIG. 13.

FIG. 13 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amides (presumably from amino acid fragments) as evidenced by the presence of the two primary N—H stretching bands at 3200 cm$^{-1}$ (symmetric) and at approximately 3300 cm$^{-1}$ (asymmetric), respectively.

Figure 14:
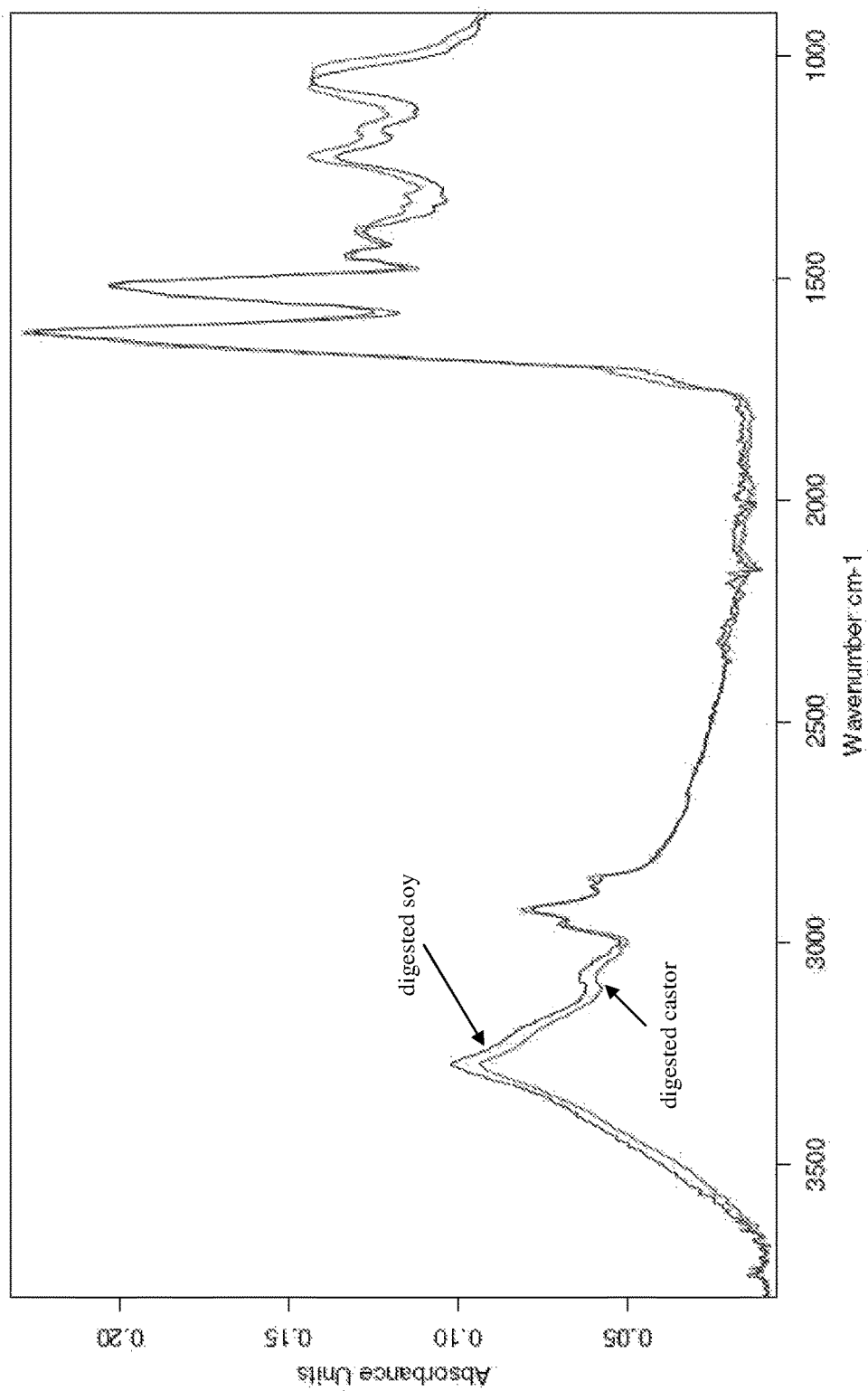
FIG. 14 shows overlaid solid state FTIR spectra of isolated water-insoluble polypeptide fractions from digested soy and digested castor.
Figure 15:
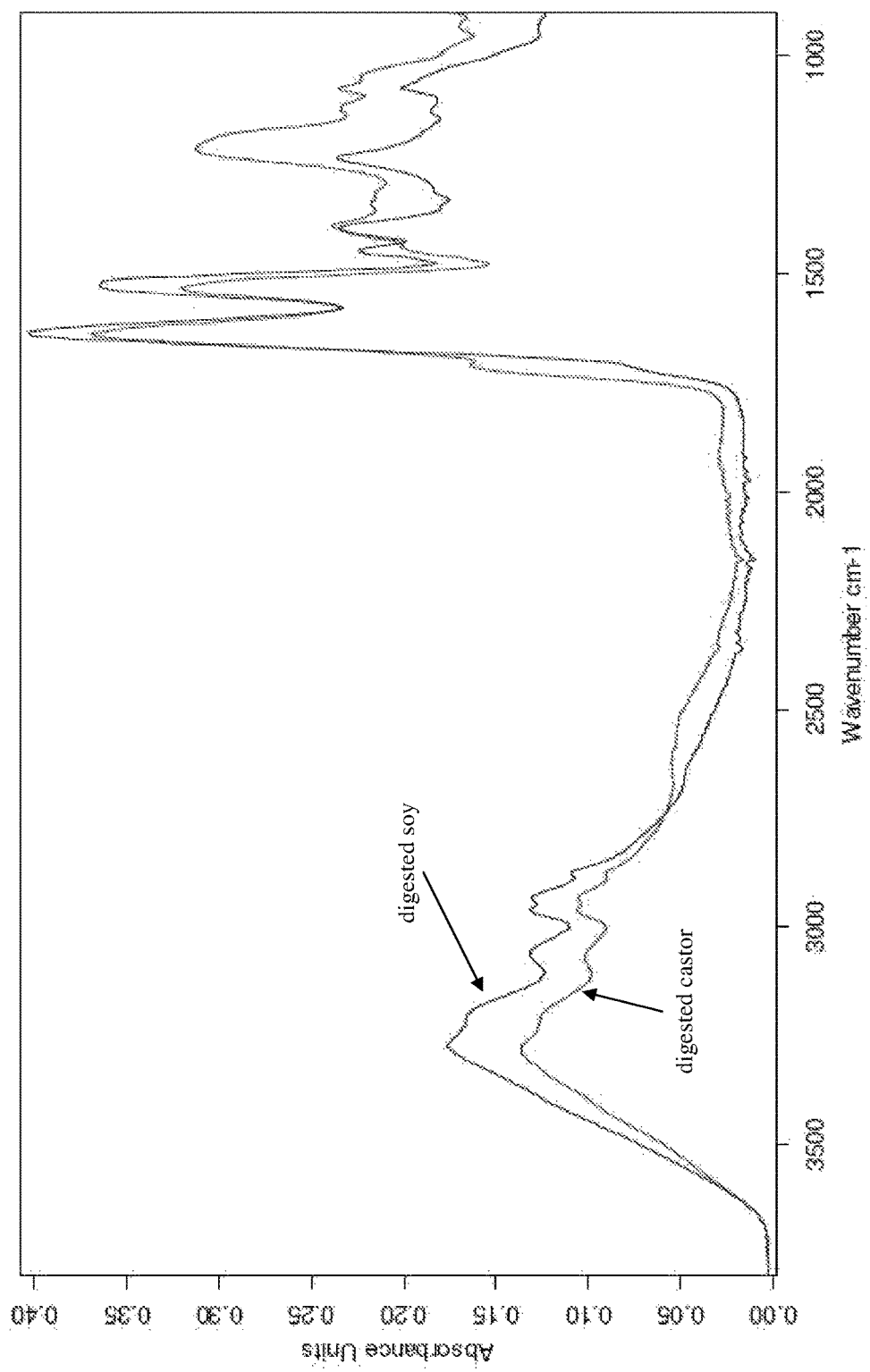
FIG. 15 shows overlaid solid state FTIR spectra of isolated water-soluble polypeptide fractions from digested soy and digested castor.
Figure 16:
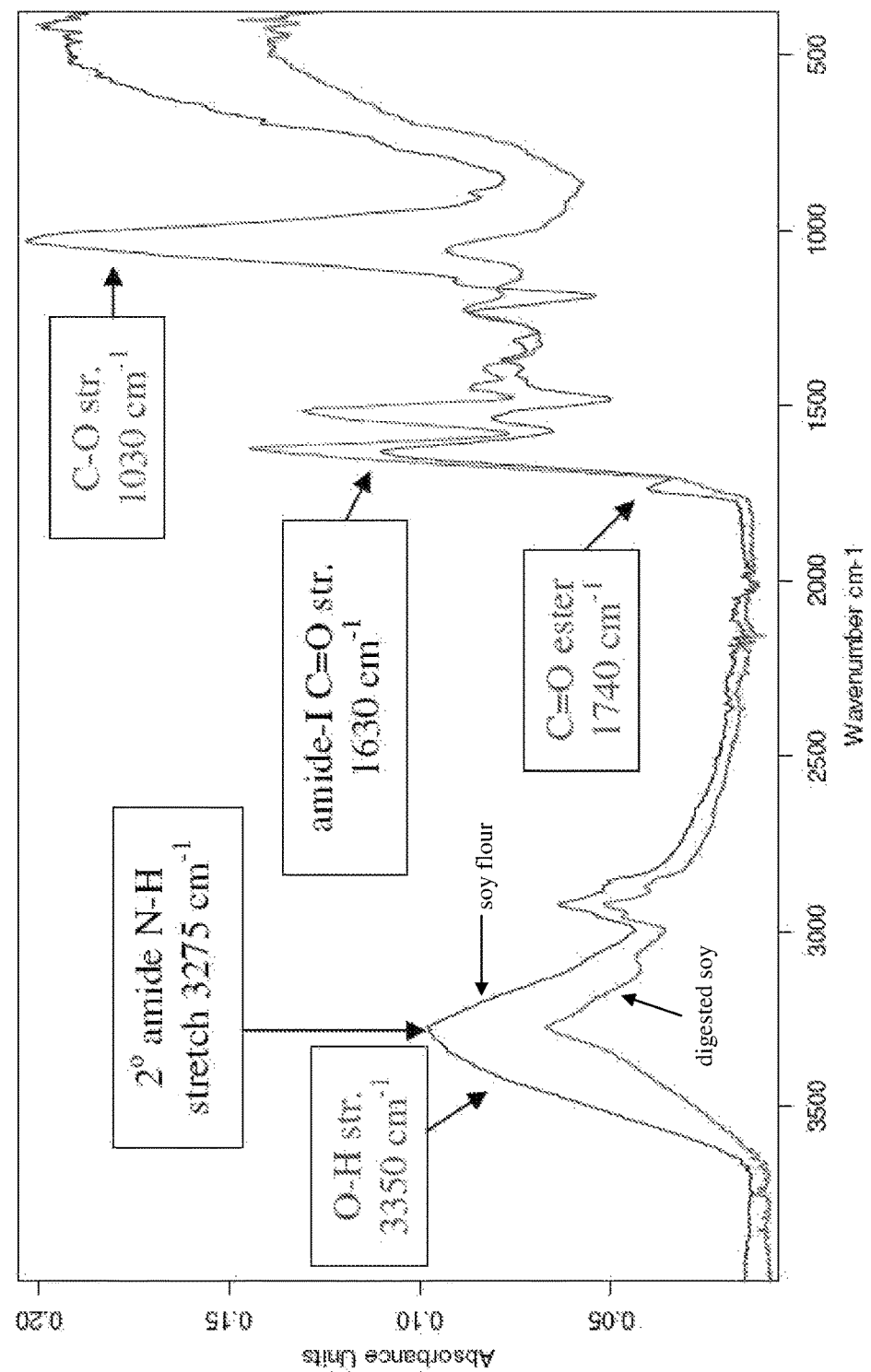
FIG. 16 shows overlaid solid state FTIR spectra of isolated water-insoluble fractions from digested soy and soy flour.
Figure 17:
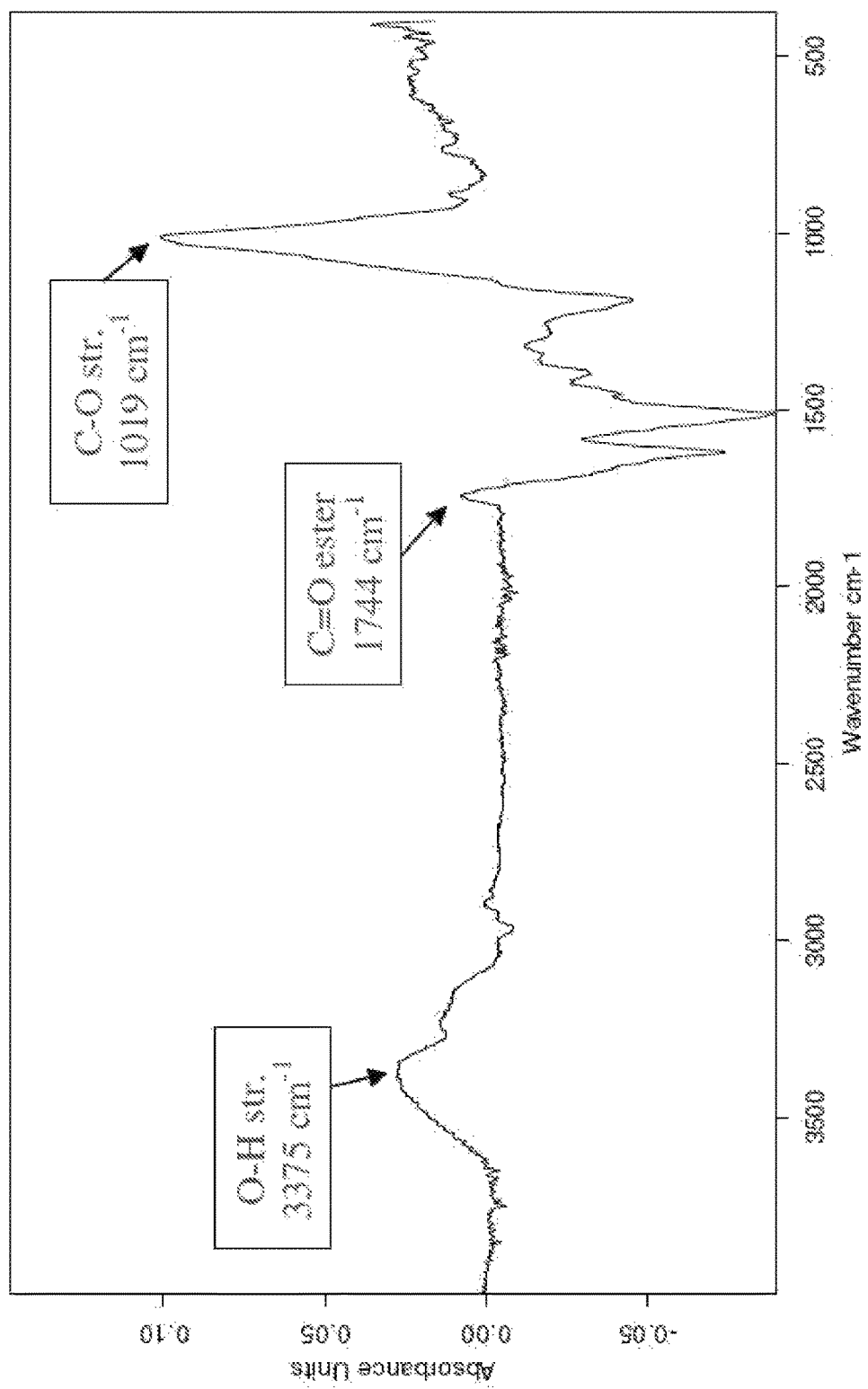
FIG. 17 shows an solid state FTIR subtraction spectrum—(spectrum of water-insoluble fraction from soy flour)–(spectrum of water-insoluble fraction from digested soy) illustrating the additional components that were observed to be present in the water-insoluble extract from soy flour.

In spite of being derived from different plant sources, the water-insoluble dispersible fractions from digested soy and digested castor are spectrally similar to one another (FIG. 14). Conversely, the water-soluble fractions appear to have different spectral characteristics (FIG. 15). The comonality between the two types of water-soluble fractions is that they both appear to contain primary amines/amides, a feature consistent with the presence of lower molecular weight peptide chains and amino acid fragments.

Example 26

Two-Part Adhesives Comprising PMDI with a Water-Insoluble Extract from Soy Flour The sample preparation procedures in this Example were the same as those used in Example 25. Again, the block shear specimens (SYP) were pressed for 35 minutes using a Carver press with platen temperatures set at 208° C. (6 pairs per cycle).

The part-A components for this Example were formulated with Rubinate-M PMDI containing 0.1 phr FeAcAc. The Part-B components in this example included soy flour (Prolia™ PDI-90 de-fatted soy flour from Cargill), and a water-insoluble extract that was isolated from the soy flour. Note that the soy flour used in this example was reportedly comprised of approximately 50-54% protein by weight. The soy flour was not digested prior to use.

The soy flour was fractionated to yield a water-soluble fraction, and a water-insoluble/water dispersible fraction. In the first step, 300 g of soy flour was slurried into 1 L of distilled water. The mixture was shaken by hand, and was then placed into a sonicator bath for a period of 30 minutes. Aliquots were placed into centrifuge tubes, and the tubes were then spun at 3400 rpm for a period of approximately 35 minutes. The centrifuged supernatant, which contained the water-soluble fraction, was decanted off of the remaining water-insoluble sediment, and was poured into a separate container. Fresh distilled water was then added to the tubes, and the remaining sediment was dispersed into the water by means of hand-stirring with a spatula. The combined centrifugation, decanting, and re-dispersion procedures were performed for a total of (15) cycles. After the final cycle, the free liquid was decanted from the residual paste-like dispersion (yellowish in color; gravimetrically determined to contain 10.25% solids by weight). The resulting dispersion was then matted with adsorbent paper towels to achieve a total solids content of approximately 18%. Distilled water was then added to adjust the solids level to 15.96% for use in the adhesive.

After drying aliquots of both fractions, it was verified that the sediment (the water-insoluble/water dispersible fraction) could not be re-dissolved in water. On the other hand, the dried supernatant fraction (clear/yellow solid) was completely soluble in water. In addition, it was also discovered that the water-insoluble/water dispersible fraction could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the soy flour, nor the soy flour itself was capable of stabilizing a dispersion of PMDI in water.

The Part-B component composition for this example is given in Table 39.

TABLE 39

| Part-B ingredient | JM-BI (weight %) |
|---|---|
| Water | 84.04 |
| Water-insoluble/dispersible extract from soy flour | 15.96% |
| % total solids | 15.96% |
| % natural product (dry basis) | 100 |

The composition of the resulting two-part adhesive for this example (Part-A+Part-B) is provided in Table 40 together with average block shear strengths and wood-failure percentages for SYP block-shear specimens. The samples were boiled in water for 2 hours, and then were oven dried for a period of 24 hours at 65° C. The specimens were inspected for bondline failure, and were graded as either "P"=pass (no bondline failure), "PF"=partial bondline failure, or "F"=complete bondline failure. Boil test results are provided in Table 41.

TABLE 40

| Sample ID | Part B level (g) & type | Part A Component and Level (g) | Time between mixing and pressing (min.) | B/A ratio (solids basis excluding volatile water) | % protein by wt. in cured adhesive | % wood failure (+/− S.D.) | Average Bond Strength to SYP (peak load at failure, lbs.) (+/− S.D.) |
|---|---|---|---|---|---|---|---|
| JM-442-1 | JM-B1; 7.83 g | PMDI + 0.1% FeAcAc; 1.01 g | 40 | 1.24/1 | 55.3 | 88 (15) | 5550 (1390) |

TABLE 41

| Sample ID | Part B level (g) & type | Part A Component and Level (g) | Time between mixing and pressing (min.) | % protein by wt. in cured adhesive | Boil test results | Comparable sample from Table 26-2 | % wood failure (+/− S.D.) From Table 26-2 | Average Bond Strength to SYP (peak load at failure, lbs.) (+/− S.D.) from Table 26-2 |
|---|---|---|---|---|---|---|---|---|
| JM-445-1 | JM-B1; 7.83 g | PMDI + 0.1% FeAcAc; 1.01 g | 6 | 55.3 | 5/6 P; 1/6 PF | N/A | Not tested | Not tested |
| JM-445-2 | JM-B1; 7.83 g | PMDI + 0.1% FeAcAc; 1.01 g | 40 | 55.3 | 6/6 P | JM442-1 | 88 (15) | 5550 (1390) |

Figure 18:
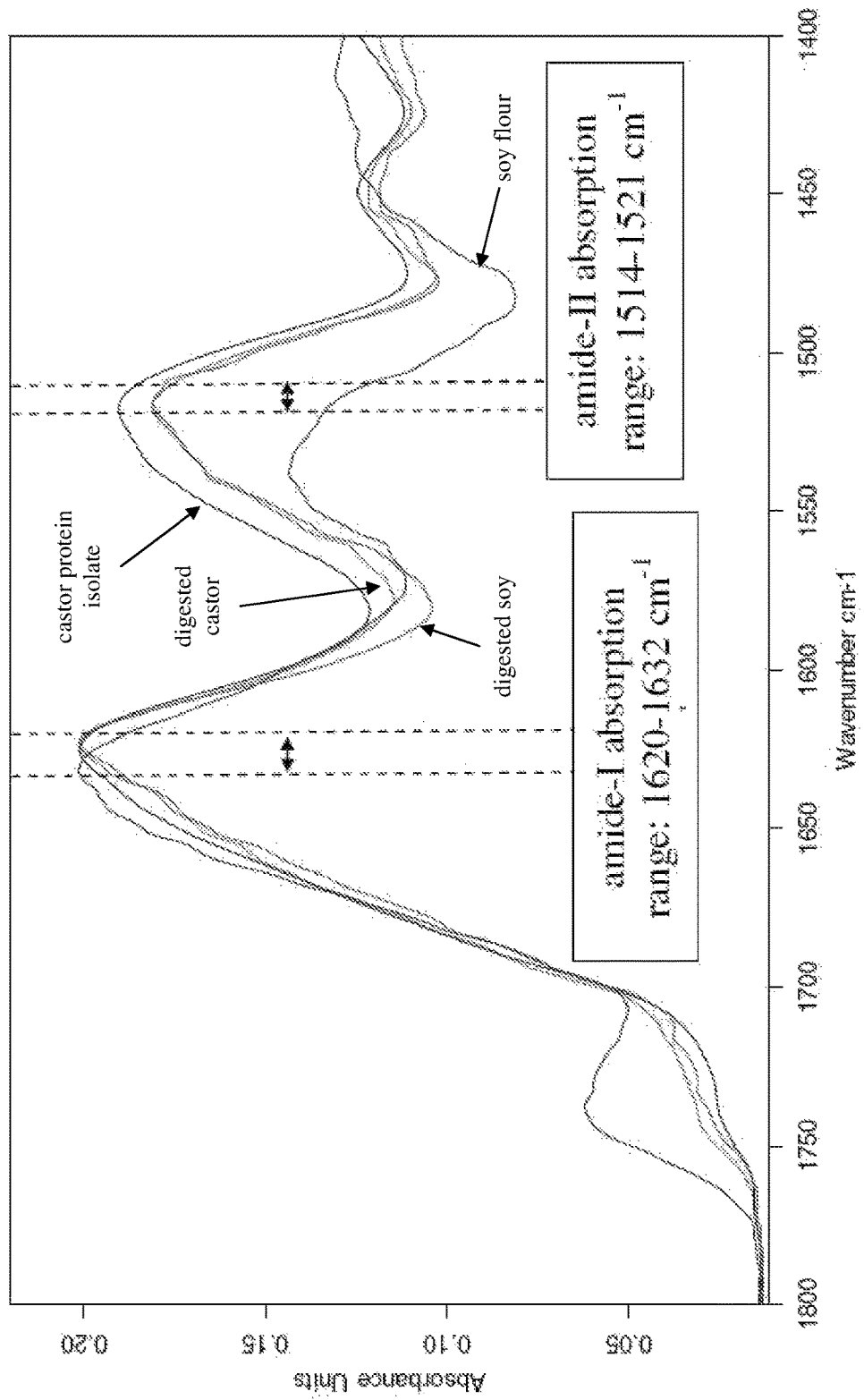
FIG. 18 shows overlaid solid state FTIR surface ATR spectra of the isolated water-insoluble/dispersible fractions from multiple protein samples (digested soy lot 5-81, soy flour, castor protein isolate lot 5-94, digested castor lot 5-90) where the carbonyl amide region is expanded.

As shown in FIG. 18, the commonality between the insoluble extracts from several different protein samples is that they all appear to contain absorption bands that are consistent with the presence of a specific type of secondary amide functionality. Importantly, the amide-I carbonyl stretch band and the amide-II N—H band are shifted to lower wavenumbers than the analogous absorption bands from their water-soluble counterparts. As noted earlier, the best performing two-part adhesives (i.e., those that are the most water resistant, those that most efficiently disperse PMDI in water, and those that exhibit the highest bond strength to wood) are those prepared with proteins comprising a high percentage of a water-insoluble/water dispersible fraction, wherein the amide carbonyl stretch of the water-insoluble/water dispersible fraction has a characteristic solid state FTIR absorption band near approximately 1625 cm$^{-1}$.

More specifically, as illustrated by FIG. 18, it is desirable that the water-insoluble/water dispersible fraction have a characteristic amide-I absorption band between approximately 1620 cm$^{-1}$ and 1632 cm$^{-1}$, and an amide-II band between approximately 1514 cm$^{-1}$ and 1521 cm$^{-1}$. In addition, it is also desirable that the water-insoluble/dispersible fraction contain a prominent 2° amide N—H stretch absorption band centered at approximately 3275 cm$^{-1}$. Proteins with these spectral characteristics are likely to exhibit the beneficial attributes that have been illustrated throughout the multiple Examples provided herein.

Example 27

Two-Part Adhesives Using PMDI with Digested Castor and Soy Proteins

This Example demonstrates the use of three types of digested samples in preparing two-part adhesive systems with PMDI. The three types of digested materials included: (1) digested whole castor meal (lot 6-9); (2) the water-insoluble fraction from digested castor protein in wet-paste form (lot 6-10-1); and (3) the water-insoluble fraction from digested soy protein in wet-paste form (lot 6-10-2). The protein preparation procedures are given below:

(1) Lot 6-9. Digested Whole Castor Meal: Castor meal (100 g, 40% protein) was blended with minimal amount of water (350 mL). NaOH (5 N, 4.4 mL) was added to bring the pH to 9.0. Calcium chloride was added to final concentration in water of 10 mM followed by Everlase® (0.2 g; in other words 2 g enzyme/Kg protein). The reaction was stirred by a mechanical stirrer for 4 hours at 55° C., cooled to room temperature, and the pH was lowered to 4.0 by the addition of concentrated HCl. The product was a viscous homogeneous paste (22.35% solids).

(2) Lot 6-10-1. Water-Insoluble Fraction From Digested Castor Protein in Wet-paste Form: Purified Castor Protein (25 g; lot#5-94—see Example 22) was suspended in water (250 mL). Calcium chloride was added to the final concentration of 10 mM and the pH was brought to 9.0 by addition of 5N NaOH. Everlase® (0.4 g; in other words 16 g enzyme/Kg protein), and the suspension was stirred at 55° C. for 4 hours. The reaction was cooled to ambient temperature; and the pH was adjusted to 4.0 by the addition of concentrated HCl. The reaction was maintained at a temperature of 8-10° C. for approximately 12 hours. The precipitate was removed by centrifugation at 15,000×g for 15 minutes; and it then was re-suspended in water (250 mL), and re-precipitated under the same conditions. The resulting wet-paste was collected without drying, and was labeled: Castor protein digest (water-insoluble fraction). The yield was approximately 32%, and the resulting paste was gravimetrically determined to contain 24.91% solids. The enzyme to protein ratio for 6-10-1 differed from that which was used in preparing lot 5-83 (Example 6) and lot 5-90 (Example 18).

(3) Lot 6-10-2. Water-insoluble Fraction from Digested Soy Protein in Wet-paste Form: Soy Protein (25 g) was suspended in water (250 mL). Calcium chloride was added to the final concentration of 10 mM, and the pH was brought to 9.0 by addition of 5N NaOH. Everlase® (0.4 g; in other words 16 g enzyme/Kg protein) was added and the suspension was stirred at 55° C. for 4 hours. The reaction was cooled to ambient temperature; and the pH was adjusted to 4.0 by the addition of concentrated HCl. The reaction was maintained at a temperature of 8-10° C. for approximately 12 hours. The precipitate was removed by centrifugation at 15,000×g for 15 min; and then it was re-suspended in water (250 mL), and re-precipitated under the same conditions. The resulting wet paste was collected without drying, and was labeled: Soy protein digest (insoluble fraction). The yield was approximately 39%, and the resulting paste was gravimetrically determined to contain 22.57% solids. Note that the type of enzyme used and the enzyme to protein ratio for 6-10-2 differed from that which was used in preparing lot 5-81 (Example 7).

Each of the wet paste dispersions was observed to be stable for a period of several weeks. It was also discovered that the dispersions could be readily combined with water-soluble polymers, and with water-dispersible polymer latexes.

The preparation procedures for the two-part adhesives and block shear specimens in this example were identical to those employed in Examples 19 and 20. Again, the block shear specimens (SYP) were pressed for 35 minutes using a Carver press with platen temperatures set at 208° C. (6 pairs per cycle). The part-A components were formulated with Rubinate-M PMDI containing 0.1 phr FeAcAc. The Part-B components included the three aforementioned digested protein pastes (the compositions are provided in Table 42). For comparative purposes, the percent solids of the wet pastes were adjusted to a level of 15.96% by adding distilled water.

TABLE 42

| Sample Number | Part B Sample Description | % Solids in the Sample |
|---|---|---|
| JM-438-1 | water-insoluble fraction from digested castor protein in wet-paste form; Lot # 6-10-1 | 15.96% |
| JM-438-2 | water-insoluble fraction from digested soy protein in wet-paste form; Lot # 6-10-2 | 15.96% |
| JM-438-3 | digested whole castor meal in wet-paste form; Lot # 6-9 | 15.96% |
| TP88-2B (from Example 20) | Water-insoluble fraction isolated from dried digested castor (lot 5-90) | 15.96% |
| TP3-2B (from Example 25) | Water-insoluble fraction isolated from dried digested soy (lot5-81) | 16.24% |

The compositions of the resulting 2-part adhesives for this example (Part-A+Part-B) are provided in Table 43 together with average block shear strengths and wood-failure percentages for SYP block-shear specimens. For comparative purposes, the compositions of the resulting two-part mixtures (Part-A+Part-B) were identical to those used in a previous example (see sample TP-90-2-2 and TP-90-2-1 in Example 20). Two sample sets were sequentially prepared from the same batch of adhesive so that the pot-life of the 2-part system could be evaluated (at t=6 minutes, and at t=40 minutes after mixing).

In addition, the dispersion characteristics of the two-part mixtures (Part-A+Part-B) were qualitatively evaluated upon mixing. The dispersion characteristics were qualitatively compared to those that were achieved with the water-insoluble extracts that were separately isolated from dried digested castor (sample TP90-2-1 & TP90-2-2 from Example 20), and from dried digested soy (TP8-1 & TP8-2 from Example 25). Each of the wet pastes was observed to be compatible with PMDI, but to varying degrees.

In the best cases, the PMDI was observed to readily disperse with no sign of phase separation. Examples of these types of adhesive formulations included the following:

TP90-2-1 (water-insoluble fraction isolated from dried digested castor lot 5-91), TP90-2-2 (water-insoluble fraction isolated from dried digested castor lot 5-91), TP8-1 (water-insoluble fraction isolated from dried digested soy lot 5-81), TP8-2 (water-insoluble fraction isolated from dried digested soy lot 5-81), JM441-1 (digested whole castor meal in wet-paste form; Lot #6-9), and JM441-2 (digested whole castor meal in wet-paste form; Lot #6-9).

In the other cases, a higher degree of mechanical agitation was required to achieve PMDI dispersion, and in some cases, the PMDI showed evidence of partial phase separation and coalescence. These types of samples included:

JM439-1 & JM439-2 (water-insoluble fraction from digested castor protein in wet-paste form; Lot #6-10-1), and JM440-1 & JM440-2 (water-insoluble fraction from digested soy protein in wet-paste form; Lot #6-10-2).

In spite of these differences, it was still possible to prepare SYP block-shear specimens. However, the best bond strengths were observed for the protein samples that exhibited the greatest ability to facilitate the dispersion of PMDI into water.

Example 28

Mass Spectrometric Analysis of Protein Fractions

This Example describes a characterization of the various protein samples described herein via MALDI Mass Spectrometry using an Ultraflex III instrument from Bruker.

The instrument was set in positive mode, in order to detect positive ions generated during the ionization process. The voltage applied to accelerate the ion into the TOF analyzer was set at 25 KV. The analysis was carried out by using the instrument in reflection mode which improves the resolution. Solid samples were dissolved in DMSO at a concentration of 10 mg/mL. Water-soluble supernatant fractions which were solvated in water.

Each sample solution was mixed with a matrix solution (for analytical purposes). The matrix was an inert compound of low molecular weight which absorbs at the same wavelength of the laser, Nd:YAG 355 nm. The matrices used were: +-CHCA, alpha-cyano-4-hydroxycinnamic acid, dissolved in a solution of $ACN/H_2O$ (70:30) with 0.1% of TFA at a concentration of 10 mg/mL; and DCTB, T-2-13-(4-t-Butyl-phenyl)-2-methyl-2-propenylidenelmalononitrile, dissolved in THF at a concentration of 10 mg/mL. The first matrix was mainly used for the analysis of peptides and proteins while the second one, DCTB, was suitable for the analysis of polymers.

The matrix solutions and the sample solutions were mixed at a 10:1 volume ratio respectively. For the analysis where DCTB was used as matrix, NaTFA (10 mg/mL in THF) was added to the solution matrix/sample as a cationizing agent at a ratio 10:2:1 by volume (matrix:sample:salt, respectively). 0.8 μL of the resulting solutions were spotted on a target plate made of polished steel, and only after the solvents were completely dried was the target loaded into the instrument. The spectra were collected and manipulated by using Flex-Analysis software released by Bruker Daltonics.

Relative fragment intensities were normalized and used to calculate number average (Mn), weight average (Mw), and z-average (Mz) molecular weight parameters for various samples. The results are summarized in Table 44.

TABLE 43

| Sample ID | Part B level (g) & type | Part A Component and Level (g) | Time between mixing and pressing (min.) | B/A ratio (solids basis excluding volatile water) | % protein by wt in cured adhesive | Average Bond Strength to SYP (peak load at failure, lbs.) (+/− S.D.) | % wood failure (+/− S.D.) |
|---|---|---|---|---|---|---|---|
| JM-439-1 | JM-438-1; 15.66 g | PMDI + 0.1% FeAcAc; 2.02 g | 6 | 1.24/1 | 55.3 | 480 (1450) | 8 (5) |
| JM-439-2 | JM-438-1; 15.66 g | PMDI + 0.1% FeAcAc; 2.592 g | 40 | 1.24/1 | 55.3 | 790 (1250) | 8 (10) |
| JM-440-1 | JM-438-2; 15.66 g | PMDI + 0.1% FeAcAc; 2.02 g | 6 | 1.24/1 | 55.3 | 570 (500) | 1 (2) |
| JM-440-2 | JM-438-2; 15.66 g | PMDI + 0.1% FeAcAc; 2.592 g | 40 | 1.24/1 | 55.3 | 1012 (1400) | 5 (8) |
| JM-441-1 | JM-438-3; 15.66 g | PMDI + 0.1% FeAcAc; 2.02 g | 6 | 1.24/1 | 55.3 | 4030 (1630) | 63 (34) |
| JM-441-2 | JM-438-3; 15.66 g | PMDI + 0.1% FeAcAc; 2.592 g | 40 | 1.24/1 | 55.3 | 4790 (1390) | 65 (12) |
| 90-2-1 (from Example 20) | 88-2B; 15.66 | PMDI + 0.1% FeAcAc; 2.02 g | 6 | 1.24/1 | 55.3 | 2000 (2000) | 30 (30) |
| 90-2-2 (From Example 20) | 88-2B; 15.66 | PMDI + 0.1% FeAcAc; 2.02 g | 40 | 1.24/1 | 55.3 | 4250 (1450) | 91 (6) |
| TP8-1 | TP3-2B; 16 g | PMDI + 0.1% FeAcAc; 2.095 g | 5 | 1.24/1 | 55.3 | 4092 (1063) | 84 (17) |
| TP8-2 | TP3-2B; 16 g | PMDI + 0.1% FeAcAc; 2.095 g | 40 | 1.24/1 | 55.3 | 4860 (830) | 70 (20) |

TABLE 44

| Sample ID | Mn | Mw | Mz | Mw/Mn |
|---|---|---|---|---|
| Castor protein isolate lot 5-94 | 1149 | 1162 | 1179 | 1.01 |
| Digested castor lot 5-83 | 951 | 1081 | 1250 | 1.13 |
| Digested Castor lot 5-108 | 897 | 1011 | 1169 | 1.12 |
| Digested Castor Water-insoluble/dispersible fraction (lot 5-108) | 1009 | 1371 | 1928 | 1.35 |
| Digested Castor Water-soluble fraction (lot 5-108) | 1532 | 1697 | 1894 | 1.10 |
| Soy Protein Isolate | 2023 | 2104 | 2161 | 1.03 |
| Digested Soy (lot 5-81) | 894 | 989 | 1104 | 1.10 |
| Digested Soy Water-insoluble/dispersible fraction (lot 5-81) | 910 | 1119 | 1512 | 1.22 |
| Digested Soy Water-soluble fraction (lot 5-81) | 837 | 888 | 941 | 1.06 |

The results indicate that the molecular weight characteristics (as determined by MALDI mass spectroscopy) of the polypeptide composition can depend on the process used to obtain the polypeptide composition. For example, castor protein isolate was observed to have a higher number average molecular weight than its digested counterpart. Further, upon digestion, the number average molecular weight was observed to decrease while the polydispersity increased. The same trend was observed for the soy protein isolate and its digested counterpart.

Other experimental results indicate that proteins in the water-soluble polypeptide composition from digested castor have a higher number average molecular weight than its parent protein isolate. However, proteins in the water-soluble polypeptide composition from digested soy had a lower number average molecular weight than its parent soy protein isolate.

Collectively, these results indicate that it is possible to prepare compositions that both i) have particular molecular weight features, and ii) have the ability to disperse an oil in water or water in oil, by selecting a particular procedure for preparing the polypeptide composition.

Example 29

Two-Part Adhesives Using PMDI with Polypeptide-Containing Dispersions Obtained by Extracting Whole Castor Meal This Example demonstrates the use of two types of extracted, whole, non-digested castor meal samples in preparing two-part adhesive systems with PMDI. The two types of extracted materials included: (1) non-digested whole castor meal obtained from Kopco Oil Products, Rajkot, India extracted under basic conditions using a 1.0% sodium hydroxide solution; and (2) non-digested whole castor meal obtained from Kopco Oil Products, Rajkot, India extracted under neutral conditions with water. The protein preparation procedures are as follows:

(1) Basic Condition Preparation: 100 grams of ground castor meal was added to 500 mL of a 1.0% sodium hydroxide solution having a pH of 13.35 at 22° C. The materials were stirred under ambient conditions (22° C.) for two hours. The pH was measured to be 13.03 at the end of the reaction. The pH was lowered to 4.0 by the addition of 1.0 N HCl. The product was a viscous homogeneous paste having a solids content of approximately 13.42%.

(2) Neutral Condition Preparation: 100 grams of ground castor meal was added to 500 mL of distilled water having a pH of 5.45 at 22° C. The materials were stirred under ambient conditions (22° C.) for two hours. The pH was 5.68 at the end of the reaction. The product was a viscous homogeneous paste having a solids content of approximately 16.66%.

The castor meal preparations described above were fractionated to yield a water-soluble fraction, and a water-insoluble/water dispersible fraction. Aliquots of each preparation were placed into centrifuge tubes, and the tubes then were centrifuged at 3400 rpm for a period of approximately 35 minutes. The centrifuged supernatant, a clear solution which contained the water-soluble fraction, was decanted off of the remaining water-insoluble sediment. Fresh distilled water then was added to the tubes, and the remaining sediment was dispersed into the water by means of hand-stirring with a spatula. The combined centrifugation, decanting, and re-dispersion procedures were performed for a total of (5) cycles. After the final cycle, the free liquid was decanted. For the case where the meal was extracted under basic conditions, the remaining water-insoluble/dispersible extract (a paste-like dispersion) had a solids content of approximately 25.98% (additional water was added to adjust the solids level to 15%). The water-insoluble extract from the neutral preparation had a solids content of approximately 15%. Analogous paste-like dispersions also were separately prepared with the non-fractionated, whole castor meal that was extracted with water under neutral conditions, and with the non-fractionated whole castor meal that was extracted under basic conditions. It is important to note that each of the polypeptide-containing dispersions also contained residual cellulosics and carbohydrate components that were inherent to the whole plant-based meal. Each of the dispersions was mixed with PMDI at a ratio of 1.24/1 (w/w) solids to PMDI for the purpose of testing PMDI dispersability in water.

The two dispersions containing the water-insoluble/dispersible fractions, (obtained under basic and neutral extraction conditions, respectively), were compared to the analogous dispersions that were prepared with extracted whole meal (these samples were not fractionated, and implicitly contained both the water-soluble and water-insoluble fractions). The dispersion characteristics of the two-part mixtures (Part-A=PMDI+Part-B=the water-based polypeptide dispersion) were qualitatively evaluated upon mixing using procedures described in Example 26 and 27. The results are provided in Table 45.

TABLE 45

| Sample | Whole meal extraction conditions | Description of polypeptide composition | PMDI Dispersibility |
|---|---|---|---|
| JM-453-1-A | Basic | Extracted, non-fractionated whole meal containing both water-soluble and water-insoluble, dispersible fractions | Does not disperse PMDI |
| JM-453-1-B | Basic | Extracted, fractionated whole meal containing water-insoluble/water dispersible fraction | Disperses PMDI |
| JM-454-1-A | Neutral | Extracted, non-fractionated whole meal containing both water-soluble and water-insoluble/water dispersible fractions | Does not disperse PMDI |
| JM-454-1-B | Neutral | Extracted, fractionated whole meal containing water-insoluble dispersible fraction | Disperses PMDI |

Each of the fractionated polypeptide-containing dispersions (solely comprised of the water-insoluble/water dispersible fraction together with other residual plant-based components) was observed to yield a stable emulsion of PMDI in water. These mixtures were desirable for use as two-part adhesives. Conversely, the non-fractionated polypeptide-containing dispersions (comprised of the additional water-soluble fraction) were unable to disperse PMDI in water.

Example 30

Particle Board Composites Prepared with Adhesive Binders Comprising Water-Insoluble/Dispersible Polypeptide-Containing Fractions Derived from Whole Castor Meal (Under Basic Conditions)

The water-insoluble/water dispersible polypeptide-containing composition for this Example was prepared under basic conditions (followed by acid addition) using the materials and procedures as outlined in Example 29. Whole castor meal (from Kopco Oil Products, Rajkot, India) was dispersed in a 1.0% sodium hydroxide solution, and was then mixed with a 1 Normal HCl solution to a final pH value of approximately 4 to 5. The dispersion then was centrifuged and washed with water (at pH approximately 6 to 7) to remove the water soluble components (yielding a paste-like slurry comprising approximately 16% solids by weight). The 16% solids slurry was used (at various dilutions) to disperse PMDI in water for the purpose of preparing two-part adhesive binders for the manufacture of particle board composites. Several adhesive compositions were prepared using a range of protein/PMDI ratios, and using a range of slurry dispersion concentrations as described in Table 46.

TABLE 46

| Adhesive Sample | Percent solids in Part-B (% water-insoluble/dispersible polypeptide-containing fraction by weight in water) | Part-B Weight Percent (liquid dispersion) | PMDI (Part-A) Weight Percent | Protein-containing fraction/ PMDI ratio (solids basis) |
|---|---|---|---|---|
| JM505-1 | 10 | 84.7458 | 15.2542 | 0.5556 |
| JM505-2 | 16 | 80.1924 | 19.8076 | 0.6478 |
| JM505-3 | 8 | 83.9589 | 16.0411 | 0.4187 |
| JM505-4 | 12 | 89.1359 | 10.8641 | 0.9846 |
| JM505-5 | 16 | 87.1974 | 12.8026 | 1.0897 |
| JM505-6 | 10 | 84.7458 | 15.2542 | 0.5556 |
| JM505-7 | 10 | 89.8779 | 10.1221 | 0.8879 |
| JM505-8 | 11 | 89.8156 | 10.1844 | 0.9701 |
| JM505-9 | 16 | 91.3978 | 8.6022 | 1.7000 |

As noted in prior Examples, water-insoluble/water dispersible polypeptide-containing fractions, like their more purified counterparts, are capable of dispersing oils in water, as long as one of the components of the mixtures includes a water-insoluble/water dispersible polypeptide fraction that when isolated, has the ability to disperse oil in water (see Example 34), and has specific solid state FTIR absorption characteristics (as described in FIG. 18 and in Example 26). The water-insoluble/dispersible polypeptide-containing fraction as prepared in this example was observed to disperse PMDI in water for each of the formulations described in Table 46.

The formulations in Table 46 were used to prepare particle board composites using the mixing and pressing procedures as outlined in Example 24. The wet adhesives were mixed with the wood particles at various ratios to yield composite compositions as described in Table 47. Samples from each of the resulting composites were subjected to boiling water for two hours (as described in Example 24), and were observed to remain completely intact, even after oven drying.

TABLE 47

| Sample | Parts of Liquid Adhesive Mixed with 100 parts of Wood | % Binder by weight in the cured composite | % PMDI by weight in the cured composite | % PMDI by weight of the total binder composition |
|---|---|---|---|---|
| JM505-1 | 14.9333 | 3.4222 | 2.2000 | 64.3 |
| JM505-2 | 11.2344 | 3.5370 | 2.1466 | 60.7 |
| JM505-3 | 14.7179 | 3.2409 | 2.2844 | 70.5 |
| JM505-4 | 14.4608 | 3.0235 | 1.5235 | 50.4 |
| JM505-5 | 15.6466 | 4.0179 | 1.9227 | 47.9 |
| JM505-6 | 14.9333 | 3.4222 | 2.2000 | 64.3 |
| JM505-7 | 13.9615 | 2.5987 | 1.3765 | 52.9 |
| JM505-8 | 15.4782 | 3.0120 | 1.5289 | 50.8 |
| JM505-9 | 20.4665 | 4.5378 | 1.6807 | 37.0 |

These formulations demonstrate the preparation of moisture-resistant cured particle board composites containing a total binder level ranging from approximately 2.5% by weight to 4.5% weight of the cured composite, where the binder includes a water-insoluble/water dispersible polypeptide fraction or a water-insoluble/water dispersible polypeptide-containing fraction and a PMDI fraction with an optional catalyst. The PMDI comprises from about 30% to about 70% (w/w) of the cured binder. The PMDI fraction comprises from about 1.3% to about 2.3% (w/w) of the cured composite. Particle boards prepared with these types of binder compositions are uniquely capable of withstanding boiling water and hence are extremely moisture resistant.

In the event that moisture-resistance is not a requirement for the end-use application, cured composites can also be prepared with a total binder level of less than about 5% by weight of the cured composite, wherein the binder includes a water-insoluble/water dispersible polypeptide fraction or a water-insoluble/dispersible polypeptide-containing fraction and a PMDI fraction with an optional catalyst. The PMDI fraction optionally comprises from about 0.05% to about 2.5% by weight of the cured composite.

The level of water that may be used to disperse the ingredients and to fabricate a composite can be adjusted for the specific application by virtue of controlling the % solids in the Part-B component, the weight ratio of the Part-B solids ingredients to PMDI, and the total binder level in the finished composite (on a solids basis). Depending on the level of water that is required to fabricate the composite, the % solids in the Part-B component can range from about 5% to about 30% by weight solids, or from about 9% to about 20% by weight solids. Similarly, the Part-B solids to PMDI weight ratio can range from approximately 20:1 to 1:20, and more preferably from about 10:1 to 1:10; and the total percentage of binder in the cured composite (on a solids basis) preferably can range from about 1% to about 15% by weight of the cured composite, and more preferably can range from about 2% to about 10% by weight.

Example 31

Particle Board Composites Prepared with Adhesive Binders Comprising Water-Insoluble/Dispersible Polypeptide Fractions Derived from Whole Castor Meal Under a Combination of Basic and Acidic Conditions The polypeptide composition for this Example was prepared according to the procedure provided below.

Materials: (1) Castor meal (Jayant Agro-Organics Limited, Mumbai, India); moisture 12% max, ash 12% max, acid insoluble ash+oil 3% max, protein 50% minimum; (2) tap water (municipal source); (3) 50/50 (w/w) NaOH concentrate in water; (4) Muriatic acid (37% w/w HCl in water) from Chem Central, CAS 7647-01-0; 4) PPG 400 polypropylene glycol, Mn=400, Aldrich Chemical, CAS#253-22-69-4.

A 60-gallon capacity batch reactor (equipped with a stir mixer) was charged with 240.2 pounds of a 0.978% (w/w) solution of NaOH in water. The reactor temperature was monitored throughout the course of the reaction and was observed to remain constant at approximately 21° C. Then, 47.1 pounds of castor meal was dispersed into the reactor while stirring. The pH was checked after 10 minutes of mixing and was determined to be 13. The reaction was allowed to proceed for 1 hour. The viscosity was qualitatively observed to increase during this time, and the pH was observed to remain constant (pH 13).

After approximately 1 hour of mixing under basic conditions, 33 pounds of acidic solution (1.2 M HCl) was added to the reactor. The pH was observed to be 11.5 (at this point, the total addition of HCL was 17.46 moles, which resulted in partial neutralization of the original 26.648 moles of NaOH). After approximately 10 minutes of mixing, an additional 71 pounds of the 1.2 M HCl was added, and the pH was observed to decrease to a value of 1.3 (this represented an incremental addition of 37.57 moles of HCl, for a cumulative addition of 55.03 moles). At this point in the reaction, the mole ratio of HCl to NaOH was approximately 2.06/1. The dispersion was mixed under acidic conditions for approximately 30 minutes. Then, 14 pounds of a 10% (w/w) NaOH solution in water was added to the reactor which represented an incremental addition of 15.875 moles of NaOH (for a cumulative total addition of 42.523 moles NaOH). The net cumulative additions of HCl and NaOH equated to a molar ratio of HCl/NaOH=1.29/1 to yield a final pH of 4.4. Then, the slurry was collected by passing it through a 1 micron mesh fiberglass filter bag. The filtrate was washed with copious amounts of municipal tap water (at pH approximately 6 to 7) for the purpose of removing a large proportion of the water-soluble protein fraction. The washing was continued until the yellow mother-liquor solution (water-soluble extracts) was observed to become water-white and clear. The resulting dispersion (water-insoluble fraction) was gravimetrically determined to contain approximately 19.3% solids.

Finally PPG 400 (Aldrich Chemical, CAS 253-22-69-4) (33.6 g of PPG 400 in 7.9 pounds of water was added to 38.5 pounds of the concentrated paste from step 6 (comprising 7.43 pounds solids+31.07 pounds water). The resulting slurry contained 7.43 pounds of water-insoluble/water dispersible protein-containing components, approximately 0.074 lbs. of PPG 400 (0.99% by weight protein solids), and 38.97 lbs. water. The percent solids of the resulting paste-like slurry was gravimetrically determined to be approximately 16% by weight (15.987% by weight water-insoluble/water dispersible polypeptide-containing extract plus 0.16% by weight PPG 400).

The 16% solids slurry was used (at various dilutions) to disperse PMDI in water for the purpose of preparing two-part adhesive binders for the manufacture of particle board composites. Several adhesive compositions were prepared using a range of protein/PMDI ratios, and using a range of slurry dispersion concentrations as described in Table 48.

TABLE 48

| Adhesive Sample | Percent solids in Part-B (% water-insoluble/dispersible polypeptide-containing fraction by weight in water) | Part-B Weight Percent (liquid dispersion) | PMDI (Part-A) Weight Percent | Protein-containing fraction/PMDI ratio (solids basis) |
|---|---|---|---|---|
| TPEX32-2 | 16 | 80.19 | 19.81 | 0.65 |
| TPEX32-5 | 16 | 87.19 | 12.80 | 1.09 |
| TPEX32-9 | 16 | 91.39 | 8.60 | 1.70 |
| TP12-22-09-1 | 9 | 92.32 | 7.68 | 1.08 |
| TP12-22-09-8 | 12 | 89.27 | 10.73 | 1.00 |

The water-insoluble/water dispersible polypeptide-containing fraction as prepared in this Example was observed to disperse PMDI in water for each of the formulations described in Table 48.

The formulations in Table 48 were used to prepare particle board composites using the mixing procedures as outlined in Example 24. The pressing conditions for curing the composites were similar to those used in Example 24. Each of the samples was pressed using a platen temperatures of 205° C. for a total press time of 15 minutes. In one case, an additional sample (TPEX32-2) was pressed at the same platen temperature for a total press time of 3.3 minutes. Thermocouples were placed into the composites during the press cycle for the purpose of monitoring the actual bulk composite temperature. These data revealed that the actual composite temperature reached 100° C. at t=3 minutes, and remained steady at approximately 105° C. until t=10 minutes, at which point the temperature slowly increased to a maximum of about 118° C. (by the end of the longest press cycle at t=15 minutes).

The wet adhesives were mixed with the wood particles at various ratios to yield the cured composite compositions as described in Table 49. Samples from each of the resulting composites were subjected to boiling water for two hours (as described in Example 24), and were observed to remain completely intact, even after oven drying. Even the sample that was pressed for a press time of 3 minutes remained intact (sample TPEX32-2).

TABLE 49

| Sample | Parts of Liquid Adhesive Mixed with 100 parts of Wood | % Binder by weight in the cured composite | % PMDI by weight in the cured composite | % PMDI by weight of the total binder composition |
|---|---|---|---|---|
| TPEX32-2 | 11.23 | 3.54 | 2.15 | 60.7 |
| TPEX32-5 | 15.65 | 4.02 | 1.92 | 47.7 |
| TPEX32-9 | 20.47 | 4.54 | 1.68 | 37.0 |
| TP12-22-09-1 | 12.76 | 2.00 | 0.96 | 48.0 |
| TP12-22-09-8 | 12.41 | 2.59 | 1.30 | 50.2 |

These formulations demonstrate the preparation of moisture-resistant cured particle board composites containing a total binder level ranging from approximately 2% by weight to 4.5% weight of the cured composite, wherein the binder includes a water-insoluble/water dispersible polypeptide-containing fraction and a PMDI fraction, wherein the PMDI comprises between approximately 10% and 65% by weight of the cured binder, and wherein the PMDI fraction comprises between approximately 0.9% and 2.2% by weight of the cured composite. Particle boards prepared with these types of binder compositions are uniquely capable of withstanding boiling water and hence are extremely moisture resistant. Similarly moisture resistant composites can be prepared with a total binder level ranging from approximately 1.2% by weight to 2.5% weight of the cured composite, wherein the binder comprises a water-insoluble/water dispersible polypeptide-containing fraction and a PMDI fraction, and wherein the PMDI fraction comprises between approximately 0.3% and 1.1% by weight of the cured composite.

Example 32

Particle Board Prepared with Adhesive Binders Comprising Optional Polymer Latex Together with Water-Insoluble/Dispersible Polypeptide Fractions Derived from Whole Castor Meal (Combination of Basic and Acidic Conditions)

Particle board composites were prepared using PMDI together with the same water-insoluble/water dispersible polypeptide-containing composition that was employed in Example 31 (16% solids dispersion). In addition, an EVA latex/emulsion polymer was used to demonstrate that binder compositions can be optionally prepared with additional components/additives. One particular advantage of latex polymers is that they facilitate the preparation of Part-B dispersions with higher percentages of dispersed solids ingredients. This can serve the purpose of reducing the amount of water that is required during the fabrication of composites, while simultaneously maintaining equivalent or reduced dispersion viscosities, and equivalent or higher binder levels in the cured composites. The disadvantage of many latex polymers is that they are incapable of dispersing PMDI in water by themselves. However, when a latex polymer is combined with a water-insoluble/water dispersible polypeptide-containing dispersion, the materials work together to yield dispersions that not only have higher percentages of dispersed solids at equivalent or lower viscosities, they also exhibit the unique ability to stabilize PMDI dispersions in water. This PMDI-stabilization function is uniquely facilitated by the presence of the water-insoluble/dispersible polypeptide-containing composition.

The various formulations used in this Example are set forth in Table 50. The combination of the EVA latex with the water-insoluble/dispersible polypeptide-containing fraction facilitated the formation of stable PMDI dispersions in water (macroscopic phase separation of PMDI was not observed, even after the mixtures were allowed to set for periods of up to one hour under static conditions). Samples JM539-8 and JM541-1 were prepared with PMDI that contained 0.1 phr of iron acetylacetonate catalyst.

TABLE 50

| Adhesive Sample | Percent total solids in Part-B (% water-insoluble/dispersible polypeptide-containing fraction plus % EVA by weight in water) | Wet weight of water-insoluble/dispersible polypeptide-containing dispersion (12% solids) | Wet weight of EVA latex | Part-B Total Weight % (protein-containing dispersion + EVA latex) | PMDI (Part-A) Weight Percent | (EVA + Protein fraction)/ PMDI ratio (solids basis) |
|---|---|---|---|---|---|---|
| JM-539-2 (TP12-22-09-2) | 17.1 | 81.94 | 9.10 | 91.04 | 8.96 | 1.74 |
| JM539-5 (TP12-22-09-5) | 20.0 | 81.41 | 15.15 | 96.56 | 3.44 | 5.61 |
| JM-539-8 (TP12-22-09-8) | 12.0 | 89.28 | 0 | 89.28 | 10.72 | 1.00 |
| JM-541-1 (TP12-22-09-1) | 15.0 | 84.41 | 5.28 | 89.69 | 10.31 | 1.31 |

The formulations in Table 50 were used to prepare particle board composites using the mixing procedures as outlined in Examples 24 and 31. The pressing conditions for curing the composites were similar to those used in Examples 24 and 31. Each of the samples was pressed using a platen temperature of 205° C. for a total press time of 15 minutes. The wet adhesives were mixed with the wood particles at various ratios to yield the cured composite compositions as described in Table 51.

TABLE 51

| Sample | Parts of Liquid Adhesive Mixed with 100 parts of Wood | % PMDI by wt. In cured composite | % polypeptide-containing fraction by wt. in cured composite | % EVA by wt. in cured composite | % total binder in cured composite | % PMDI by weight of the total binder composition | % EVA by weight of the total binder composition | % water addition |
|---|---|---|---|---|---|---|---|---|
| JM-539-2 (TP12-22-09-2) | 12.99 | 1.13 | 1.24 | 0.72 | 3.09 | 36.51 | 23.39 | 9.5 |
| JM539-5 (TP12-22-09-5) | 12.65 | 0.42 | 1.20 | 1.17 | 2.79 | 15.14 | 41.93 | 9.5 |
| JM-539-8 (TP12-22-09-8) | 12.41 | 1.30 | 1.29 | 0 | 2.59 | 50.0 | 0 | 9.5 |
| JM-541-1 (TP12-22-09-1) | 13.53 | 1.35 | 1.33 | 0.44 | 3.12 | 43.37 | 13.99 | 10.0 |

Samples from each of the resulting composites were subjected to boiling water for two hours (as described in Example 24), and were observed to remain completely intact, even after oven drying. The densities of the resulting composites after boiling are provided in Table 52.

TABLE 52

| Sample | Density (g/cu. cm) | Density (lb/cu. Ft) |
| --- | --- | --- |
| JM-539-2 (TP12-22-09-2) | 0.3858 | 24.09 |
| JM539-5 (TP12-22-09-5) | 0.3770 | 23.54 |
| JM-539-8 (TP12-22-09-8) | 0.3852 | 24.05 |
| JM-541-1 (TP12-22-09-1) | 0.3753 | 23.43 |

These formulations demonstrate the preparation of moisture-resistant cured particle board composites containing a total binder level ranging from about 2.5% to about 3.1% by weight of the cured composite, wherein the binder comprises a water-insoluble/water dispersible polypeptide fraction or a water-insoluble/water dispersible polypeptide-containing fraction, an optional polymer latex fraction, and a PMDI fraction with optional catalyst. The PMDI comprises from about 5% to about 65% by weight of the cured binder and from about 0.3% to about 2% by weight of the cured composite. The optional polymer latex is an EVA latex polymer comprising from about 0% to about 45% by weight of the cured binder and from about 0% to about 1.2% by weight of the cured composite.

Particle boards prepared with these types of binder compositions are capable of withstanding boiling water and hence are extremely moisture resistant. Similarly moisture resistant composites can be prepared with a total binder level ranging from about 1.2% to about 2.5% by weight of the cured composite. The binder comprises a water-insoluble/water dispersible polypeptide fraction or a water-insoluble/water dispersible polypeptide-containing fraction, an optional polymer latex fraction, and a PMDI fraction with optional catalyst. The PMDI fraction comprises from about 0.1% to about 1.1% by weight of the cured composite.

Similar formulation considerations also apply to the fabrication and manufacture of plywood composites. For example, moisture-resistant cured plywood assemblies can be laminated with bondline adhesive levels ranging from approximately 0.008 pounds/ft.$^2$ up to approximately 0.056 pounds/ft.$^2$, wherein the adhesive comprises a water-insoluble/dispersible polypeptide-fraction or a water-insoluble/dispersible polypeptide-containing fraction, an optional polymer latex fraction, and a PMDI fraction with an optional catalyst. The PMDI comprises between approximately 20% and 70% by weight of the cured adhesive. The optional polymer latex is an EVA latex polymer comprising from about 0% to about 45% by weight of the cured binder. It is expected that plywood composites prepared with these types of adhesive compositions will be capable of withstanding boiling water and hence will be extremely moisture resistant.

Although the EVA latex used in this Example effectively increased the % solids of the Part-B component, other types of additives can be used as well, including water-dispersible types as well as water-soluble types of additives. Water soluble additives can include hydroxyl-functional or amine-functional compounds that are capable of reacting with PMDI such as glycerin, urea, propylene glycol, polypropylene glycol, polyethylene glycol, trimethylol propane and its adducts, etc.; and the water-soluble polypeptide fractions that are obtained via the process set forth in FIG. 2. The maximum tolerable level of a water-soluble polypeptide fraction will be dictated first by the resulting dispersion stability of the curative (e.g., PMDI), and secondly by the resulting moisture resistance of the composite (as dictated by end-use requirements).

It is contemplated that it is possible to use mixtures of water-insoluble/water dispersible polypeptide or polypeptide-containing compositions that have been derived from different plant sources (e.g., mixtures derived from different plant sources such as soy, canola, and castor, and in any combination).

Example 33

Dispersion of Oil in Water with an Isolated Water-Insoluble/Water Dispersible Protein Fraction from Digested Soy Protein The protein materials for this Example were the same as those that were used in Example 25. Several of the previous Examples demonstrated the unique ability of a water-insoluble/water dispersible polypeptide fraction to disperse PMDI in water. In order to demonstrate the generality of this finding, an oil-in-water dispersion was prepared with a water-insoluble/water dispersible polypeptide composition that was isolated from a digested soy protein. The isolated water-dispersible fraction was dispersed in water at a level of 16.59% solids, and 1 gram of the resulting paste-like dispersion was weighed into a small glass vial. Then, 0.2 grams of Castrol Syntec, 5W-50 motor oil was added, and the mixture was stirred with a spatula. The resulting mixture was a very homogenous cream. The cream was still homogeneous after one hour. In the next step, an additional 0.3 grams of motor oil was added to bring the total amount of motor oil to 0.5 grams. The viscosity increased slightly, but the mixture remained very homogeneous. The sample was checked 15 days after mixing and no phase separation was observed. By contrast, neither the water soluble extract from the digested soy, nor the digested soy itself was capable of stabilizing a dispersion of the oil-in-water.

Example 34

Dispersion of Oils in Water Using a Water-Insoluble/Water Dispersible Polypeptide Composition This Example further demonstrates that a water-insoluble/water dispersible polypeptide fraction can be used to disperse a broad spectrum of oils in water.

A water-insoluble/water dispersible polypeptide fraction was isolated from enzyme digested castor (lot 5-108) using the isolation procedures as reported in Example 20 (the procedure for enzyme digestion is given in Example 6). The MALDI fragmentation molecular weight characteristics of the isolated fraction are provided in Example 28 (Table 44). The solid state FTIR spectroscopic absorption characteristics for the isolated water-insoluble/dispersible polypeptide fraction conform with those as described in FIGS. 6, 7, 9, 10, 11, 14, 16, 18, 19, 20, and 21 (amide-I absorption range: 1620-1632 cm$^{-1}$; amide-II absorption range: 1514-1521 cm$^{-1}$). Solution state two-dimensional proton-nitrogen coupled NMR characteristics for the isolated water-insoluble/dispersible polypeptide fraction conform with those as described in Example 38 (two protonated nitrogen clusters enveloped by $^{15}$N chemical shift boundaries at approximately 86.2 ppm and 87.3 ppm; and with $^1$H chemical shift boundaries at approximately 7.14 and 7.29 ppm for the first cluster; and at approximately 6.66 and 6.81 ppm for the second cluster).

Surprisingly, water-insoluble/water dispersible polypeptide fractions with these spectral characteristics (unlike their water soluble counterparts) exhibit the unique ability to emulsify and stabilize dispersions of oil in water and water in oil. This unique oil-dispersing capability is observed with water insoluble/water dispersible polypeptide compositions that are extracted and isolated from multiple sources, including but not limited to (1) whole meals or protein-isolates from either soy, canola, or castor that are extracted of their water-soluble polypeptide components at or near pH-neutral conditions; (2) whole meals or protein-isolates from soy, canola or castor that are subjected to base catalyzed hydrolysis followed by acid addition and subsequent extraction of water-soluble polypeptide components; (3) whole meals or protein-isolates from soy, canola or castor that are subjected to acid catalyzed hydrolysis followed by base addition and subsequent extraction of their water-soluble polypeptide components; (4) whole meals or protein-isolates from soy, castor, or canola that are subjected to combinations of base catalyzed hydrolysis with enzyme digestion followed by acid addition and subsequent extraction of water-soluble polypeptide components.

It is understood that the stabilization of an oil-in-water or water-in-oil emulsion/dispersion depends on several factors, including but not limited to the presence or absence of a stabilizing entity such as a surfactant or a dispersant; the nature of the oil (i.e., its polarity, hydrophilicity, hydrophobicity, solubility parameter, etc.); the nature of the surfactant or dispersant (i.e., HLB value, charge characteristics, molecular weight, water solubility, oil solubility, etc.); the ionic strength of the water-phase; the presence or absence of additives and impurities in either the oil or water phases; the concentration of the oil (i.e., its weight percent in water); and the concentration of the stabilizing entity. It is further understood that the efficiency of a stabilizing entity (a "stabilizing entity" being a dispersant, an emulsifier, a surfactant, or the water-insoluble/dispersible polypeptide composition of the present invention) is often judged according to its ability stabilize an emulsion for some specified period of time (i.e., to prevent the macroscopic phase separation of immiscible oil and water components under shear or under static conditions).

In the present invention, the water insoluble/water dispersible polypeptide composition is most efficient when it is isolated in its purest form (i.e., it is capable of stabilizing the most oil in water when it is fractionated from protein-isolates or from digested protein isolates as noted above, where substantially all of the water-soluble components and non-protein components have been removed). However, stable oil-in-water or water-in-oil dispersions can be facilitated when the water-insoluble/water dispersible polypeptide composition are mixed with impurities, including water soluble components (e.g., water-soluble protein fractions), and non-protein based components (e.g., sugars, cellulosics) such as those that may be present in extracts obtained from digested or partially digested whole meals (see Examples 26, 30, 33, and 37).

Several of the previous Examples demonstrated the unique ability of a water-insoluble/dispersible polypeptide fraction to disperse PMDI in water. In order to further demonstrate the generality of this finding, several oil-in-water dispersions were prepared with a water-insoluble/water dispersible polypeptide composition that was isolated from a digested castor protein. The water-insoluble/water dispersible fraction was isolated as a paste-like dispersion in water. The paste was diluted with water to 16% solids, and separately to 14% solids. In the next step, 3-gram aliquots of each paste were separately weighed into 15 mL plastic beakers. Next, aliquots of the oils shown in Table 53 were separately added to individual paste aliquots at a ratio of 1 part oil to 1 part solid water-insoluble/water dispersible polypeptide composition on a weight basis (20 mixtures in total). The mixtures were stirred by hand with a spatula, and were observed to form homogenous creams. The creams remained homogeneous with no visible signs of macroscopic phase separation for prolonged periods of time after mixing including periods ranging from 1 minute after mixing, 5 minutes after mixing, 10 minutes after mixing, 15 minutes after mixing, 30 minutes after mixing, 1 hour after mixing, and 2 hours after mixing. By contrast, the analogous water-soluble extract from the digested castor was incapable of stabilizing dispersions of the oils in water.

TABLE 53

| Oil type | Source |
| --- | --- |
| PMDI | Rubinate-M from Huntsman Corporation |
| Mineral oil | Drakeol 35 from Penreco |
| Soybean oil | RBD from ADM Processing Co. |
| Motor oil | Castrol Syntec, 5W-50 |
| Castor oil | Pale Pressed Castor Oil from Alnor Oil Company, Inc. |
| Dibutyl Phthalate | 99% from Acros |
| Epoxidized soybean oil | From Aldrich |
| Caprylic triglyceride | Neobee M-5 from Stepan Co. |
| Eucalyptus oil | From Aromas Unlimited |
| Tributyl o-acetylcitrate | 98% from Aldrich |

The unique ability for the water-insoluble/water dispersible polypeptide composition to stabilize dispersions of oil-in-water or water-in-oil is not only useful in adhesive applications, it is useful for any application where dispersion stabilization is important including oil recovery operations (e.g., oil spills, crude oil drilling and subterranean sequestering), cosmetics applications, pharmaceutical applications, food applications, polymer additive applications, and polymer processing applications.

The above list of oils is not intended to be limiting. Instead, it is intended to illustrate the general ability of the water-insoluble/water dispersible polypeptide fraction to stabilize emulsions of water-in oil or oil-in water. As such, it is contemplated that many other types of oils not included in this list can be similarly emulsified and stabilized in water with a stabilizing entity comprising the preferred water-insoluble/water dispersible polypeptide fraction of the present invention.

Protein compositions not enriched for the water-insoluble/water dispersible fractions are unable to disperse oils. For example, a 16% solids dispersion of soy protein isolate, Lot 5-81, (Soy protein isolate SOLPRO 958® Solbar Industries Ltd, POB 2230, Ashdod 77121, Israel; protein content approximately 90%) was prepared by adding 32 grams of soy protein isolate to 168 grams of water at a pH of approximately 4 to 6 (JM-570-1). Seven 10 gram aliquots of JM-570-1 were weighed into 20 mL disposable beakers. A 10 gram aliquot contained 1.6 grams of soy protein isolate and 8.4 grams of water. Seven different oils (namely, PMDI, mineral oil, soybean oil, motor oil, castor oil, dibutyl phthalate and epoxidized soybean oil, see Table 53) were added separately at a w/w ratio of 1 part oil to 1 part protein solids (1.6 grams oil was added to each 10 gram aliquot). The mixtures were stirred by hand with a spatula. None of the oils was observed to be dispersible in the 16% solids dispersion of the soy protein isolate.

In a separate experiment, the soy protein isolate was washed with water (pH approximately 6 to 7) and was centrifuged to remove and discard the supernatant (the water-soluble polypeptide fraction). The remaining paste-like slurry (the water-insoluble/water dispersible polypeptide fraction; about. 16% solids in water) was then used in an analogous experiment to disperse the same oils. All of the oils were successfully dispersed at a 1/1 w/w ratio of oil to solids with no visible sign of macroscopic phase separation. This demonstrates that the water insoluble/water dispersible polypeptide fraction can be isolated from soy protein isolate after washing to remove the water soluble component.

Example 35

Thermoplastic Compositions Comprising Water-Insoluble/Water Dispersible Polypeptide Fractions Derived from Digested Castor This Example illustrates the use of a water-insoluble/water dispersible polypeptide composition in preparing thermoplastic materials. In so doing, a water-insoluble/water dispersible polypeptide fraction can be used alone (isolated and dried) or in combination with other materials. In one experiment, a dried powder of a water-insoluble/water dispersible polypeptide-containing composition (enzyme digested castor) was used to prepare a thermoplastic blend with polyvinylchloride (PVC).

The digested castor was prepared as described in Example 6 (it contained approximately 50/50 w/w of the water-insoluble/water dispersible polypeptide faction together with a water soluble fraction). Although thermoplastic blends can conceivably be prepared by one of many methods (e.g., melt blending via extrusion, dry-blending followed by Banbury mixing, calendering, etc.), the unique ability for the water-insoluble/water dispersible fraction to disperse in oil proved to be advantageous in preparing a plastisol, so a plastisol-processing approach was used in the present illustration.

The formulations shown in Table 54 were mixed to yield stable liquid plastisol-dispersions. Small 6.5 g aliquots of the dispersions were weighed into aluminum pans, and were subsequently fused at 180° C. for 15 minutes in a static gravity oven to yield solid, flexible thermoplastic pucks.

TABLE 54

| Material | 25-1 | 25-2 | 25-3 |
| --- | --- | --- | --- |
| PVC (Geon 120, series 120 × 400, DP = 1270) | 100 | 100 | 100 |
| Dibutylphthalate (DBP, Acros) | 80 | 80 | 181 |
| Epoxidized soy oil (ESO, Aldrich) | 8 | 8 | 1.23 |
| Calcium Stearate/Zinc Stearate (separately from Aldrich, blended 50/50 w/w) | 2 | 2 | 0.77 |
| Digested Castor lot 5-110C | 30 | 0 | 100 |

In a second experiment, an isolated and dried water-insoluble/water dispersible polypeptide fraction (extracted and dried from digested castor with water-soluble components removed) was mixed with glycerin at a weight ratio of approximately 1/1 to yield a powdered dry blend. Powdered dry-blends of this type can conceivably be prepared with other liquids, including but not limited to plasticizers such as dibutylphthalate and tributylyacetylcitrate, propanediol, polypropylene glycol, soy oil, castor oil, linseed oil, and the like. Once formed, a dry blend of this type can conceivably be used in a number of ways to fabricate material objects, films, sheets, etc. The dry blends can conceivably be pelletized, thermoformed, and/or blended with other materials to fabricate various objects for a variety of uses.

In the present Example, the dry blend comprising approximately 50/50 (w/w) glycerin with the water-insoluble/dispersible polypeptide fraction was subsequently mixed with water at a 0.5/1 (w/w) ratio to yield a liquid dispersion. The dispersion then was coated onto a glass slide, and was then oven dried at 150° C. for 17 minutes to yield a film. The resulting translucent film was observed to be tough and moisture resistant.

In another experiment, a 1/1 (w/w) dry-blend of glycerin with the water-insoluble/dispersible polypeptide fraction was spread separately onto a glass slide and onto aluminum foil, and was then baked in an oven at 150° C. for 30 minutes. The resulting films were observed to be translucent, rigid, and moisture resistant.

Example 36

Fiberglass Composites Prepared from a Water-Insoluble/Water Dispersible Polypeptide-Containing Fraction Derived from Whole Castor Meal The adhesives of the present invention can be used as binders for the preparation of fiber mats as well as reinforcing binders for fiber composites.

In this Example, fiberglass composites were prepared using PMDI together with the same water-insoluble/water dispersible polypeptide-containing composition that was employed in Example 31 (16% solids dispersion in water derived from castor meal). The polypeptide-containing composition was diluted with water (pH 6 to 7) from 16% solids to 12% solids, and was then blended with PMDI to yield the homogeneously dispersed composition TP12-22-09-8 (see Table 48 in Example 31).

A 50 g quantity of chopped E-glass fiber strands (Advantex™ 983-10C sized E-glass from Owens Corning, 10-13 micrometer diameter, chopped to 4 mm nominal length) was weighed into a plastic beaker. Next, 58.3 g of binder formula TP12-22-09-8 was blended with the strands using a spatula to yield a thick paste, and then the mixture was gently kneaded by hand to achieve thorough wetting of the fibers. The resulting mixture was nominally comprised of 50 parts by weight glass fiber, 6.25 parts by weight PMDI, 6.25 parts by weight of the water-insoluble/dispersible polypeptide-containing composition, and 45.8 parts water (the theoretical binder content in the cured composite was targeted to be 20% by weight). The mixture was removed from the beaker and was matted by hand over an 8 square-inch section of silicone treated release paper. The wet mat (approximately 3 mm thick) was covered with a second piece of silicone coated release paper, and was then pressed in a Carver press for a dwell time of 10 minutes using platen temperatures of 200° C., and 700 pounds pressure (approximately 11 psi).

The cured composite was qualitatively observed to be rigid and tough (average thickness=0.018 cm, approximate density=7 to 10 g/cm$^3$). In order to illustrate the moisture resistance of the composite, a 2.5 g sample of the mat was placed into a 30 mL beaker of water and was soaked for a period of seven days at 23° C. There was no visual evidence of disintegration/deterioration over the entire test period. Moreover, when the sample was removed from the water, it was observed to remain intact and qualitatively tough/rigid. The sample was blotted dry with a paper towel and was observed to weigh approximately 2.9 g within half an hour of removal from the water, and it returned to its original weight within 6 hours.

In a second experiment, a laminated wood composite was prepared by means of laminating 3"×3" sections of the cured fiberglass mat from the present example (noted above) to both sides of a 3"×3" particle board specimen that was prepared with the same TP12-22-09-8 binder composition (sample number JM539-8, containing 2.59% binder by weight as described in Example 32, Table 50). Formulation TP12-22-09-8 was also used as the adhesive to adhere the fiberglass composite mat sheets to both faces of the particle board. Approximately 2.5 g of the wet adhesive composition was spread over each surface of the particle board, and a cured fiberglass mat sheet was affixed to each side. The 3-layer construction was pressed in a Carver press for a dwell time of 10 minutes under approximately 1100 pounds of pressure (approximately 122 psi) with platen temperatures set at 205° C.

The resulting laminated composite was qualitatively observed to be flat, and dimensionally stable after soaking in water for 24 hours at 23° C. Laminated composites of this type can be used in construction applications where dimensional stability and moisture resistance are important (e.g., flooring).

In addition to the type of laminated composite noted above, it is also possible to prepare composites comprising mixtures of fibers with other materials. One particularly useful example of this type of composite includes a particle board composite comprising adhesives of the present invention as the binder (e.g., formula TP12-22-09-8) wherein a fraction of the wood furnish (ranging from about 0.1% to 10% by weight) is replaced with other types of fibers (e.g., glass fibers as used in this example). Although the particle board as described in prior examples already has superior dimensional stability when compared to conventional boards prepared with conventional UF and PF binders, the incorporation of other types of fibers can improve the dimensional stability to an even greater degree, thereby facilitating the creation of composites with even higher degrees of moisture resistance. It is contemplated that such composites would be particularly useful in flooring, roofing, countertops, and in other applications requiring superior moisture resistance. Composites of this type (with or without fiber reinforcement) may also be compression molded during the curing step to form dimensional impressions so as to render them useful in applications such as siding, paneling, flooring tiles, wall tiles, etc.

Example 37

Adhesives Derived from Canola Meal

The water-insoluble/water dispersible polypeptide-containing composition for this Example was prepared under basic conditions (followed by acid addition, and subsequent extraction of water-soluble polypeptide components) using the materials and procedures as outlined in Examples 29 and 30, except that castor meal was replaced by canola meal.

Whole canola meal (Canola Meal MA Viterra 00200, reported to contain approximately 37% protein by weight, obtained from Viterra Canola Processing, Ste Agatha, MB) was dispersed in a 1.0% sodium hydroxide solution, and was then mixed with a 1 M HCl solution to a final pH value of approximately 4 to 5. The dispersion then was centrifuged and washed with water (pH approximately 6 to 7) to remove the water soluble components (yielding a paste-like slurry comprising approximately 16% solids by weight). The 16% solids slurry, comprising the water-insoluble/dispersible polypeptide-containing fraction, was used in a subsequent test to disperse PMDI, and then to prepare a particle board composite. The supernatant from the washing step (the water-soluble polypeptide-containing fraction) was collected and retained for comparative purposes.

In order to assess PMDI dispersability, the 16% solids slurry (the water-insoluble/water dispersible polypeptide-containing fraction) was diluted with pH neutral water to 12% solids. PMDI (containing 1 phr dissolved FeAcAc) then was mixed with the protein-containing dispersion at a weight ratio of 1 part PMDI to 1-part slurry solids on a weight basis (this mixture is referred to herein as Formula 37-1); this mixture was proportionally identical to formulation TP12-22-09-8 in Table 48). The PMDI was observed to readily disperse into the water phase of the slurry with no visible sign of PMDI phase separation (within a 2 hour observation period).

In an analogous experiment, a 12% solids solution comprising the water soluble polypeptide-containing fraction was similarly mixed with PMDI (containing 1 phr dissolved FeAcAc) at a weight ratio of 1 part PMDI to 1-part solids on a weight basis (Formula 37-2). Unlike, the mixture that was prepared with the water-insoluble/water dispersible polypeptide-containing fraction (Formula 37-1), the mixture comprising the water-soluble polypeptide fraction (Formula 37-2) was incapable of dispersing PMDI, and the mixture was observed to immediately phase separate.

Using the procedures as reported in Example 31, a particle board specimen comprising 2.59% binder by weight in its dry-cured state was prepared using Formula 37-1 as the binder (the composition of the resulting particle board composite was proportionally analogous to sample TP12-22-09-8 as reported in Table 49, except that castor meal was replaced by canola meal as the source for the water-insoluble/water dispersible polypeptide-containing fraction). The density of the resulting composite board was measured to be 43.2 lbs/cubic foot. A sample was cut from the composite board and was subjected to boiling water for two hours (as described in Examples 24 and 30). The sample was observed to remain completely intact, even after oven drying.

As noted in prior Examples with other plant-derived products, the highest degree of moisture resistance and the most efficient degree of PMDI dispersion is achieved when the Part-B component comprises substantially all water-insoluble/water dispersible polypeptide components, or water-insoluble/water dispersible polypeptide-containing components (in other words, the water-insoluble/dispersible polypeptide component may be present together with other water-insoluble components such as cellulosic components that remain when whole meal is used as the starting material). However, the presence of water-soluble polypeptide components can also be tolerated so long as the dispersability of the PMDI is not adversely affected, and as long as the finished article has sufficient moisture resistance for the end-use application. For example, composites may be prepared with Part-B components comprising mixtures of water-insoluble/dispersible polypeptide components with water-soluble polypeptide components at weight ratios ranging from about 30/70 to 99/1, recognizing that the lower limit for the water-insoluble/dispersible polypeptide component will be dictated by dispersion stability, and by end-use performance (e.g., moisture resistance). A more preferred range is from 50/50 to 99/1, and still more preferred is 60/40 to 99/1, and most preferred is greater than 90/10.

Example 38

Two-Dimensional Proton-Nitrogen NMR Correlation Spectra and Characterization of a Water-Insoluble/Water Dispersible Polypeptide Fraction The water-insoluble/water dispersible polypeptide fraction from digested castor (lot 5-83 as prepared in Example 6) was washed and collected with water (pH 6 to 7) as reported in Example 20, and was then allowed to air-dry at 23° C. The dried powder was dissolved in d6-DMSO (6.8% by weight) to yield a red homogeneous solution (Sample A). An aliquot of the as-made dried digested castor was also dissolved in d6-DMSO (6.8% solids by weight) to yield a comparative homogeneous red solution (Sample B). As noted in previous Examples, solid-state FTIR analyses of the same dried powders revealed distinct differences in both the N—H stretching and carbonyl stretching regions of the solid state FTIR spectra. These spectral differences were attributed to differences in bonding environments for the polypeptide N—H moieties, possibly resulting from differences in secondary and tertiary structure. One of the specific differences involved a shift to lower wavenumbers for the amide-I carbonyl band in the water-insoluble/water dispersible fraction. In order to further characterize these types of differences, a two-dimensional NMR technique was employed for the purpose of characterizing a very specific subset of bonded atomic nuclei; namely, protons bonded to nitrogens.

The samples were dissolved in DMSO-d6 and were placed into 5 mm NMR tubes. All $^1$H NMR spectra were recorded on a Varian INOVA 750 MHz spectrometer equipped with an HCN-PFG (pulsed field gradient) triple resonance Cryo Probe at 30° C. For one-dimensional (1D) $^1$H NMR spectra, a spectral window of 10000 Hz was used with an acquisition time of 3 seconds and relaxation delay of 5 seconds. The spectra were signal averaged for 16 transients using a proton 90° pulse width of 8.6 microseconds. The spectral data were zero filled to 132 k points and were processed with 1 Hz line broadening, then baseline corrected and referenced to an internal residual solvent DMSO-d6 peak at 2.50 ppm before integrating and making plots.

Phase sensitive two-dimensional (2D) $^1$H-$^{15}$N gradient-HSQC (heteronuclear single quantum coherence) data were collected with 2048 acquisition points in the F2 dimension and 768 points in the F1 dimension (90° pulse widths of 6.3 microseconds, and 33.5 microseconds were used for proton and nitrogen, respectively) 48 transients were collected for each increment, with a repetition delay of 1.2 seconds and acquisition time of 0.124 seconds with GARP decoupling during acquisition. The acquired data were processed with sine bell weighting and zero filled to 8196×8196 points in F2 and F1 dimensions before final transformation to produce the 2D correlation data.

Figure 19:
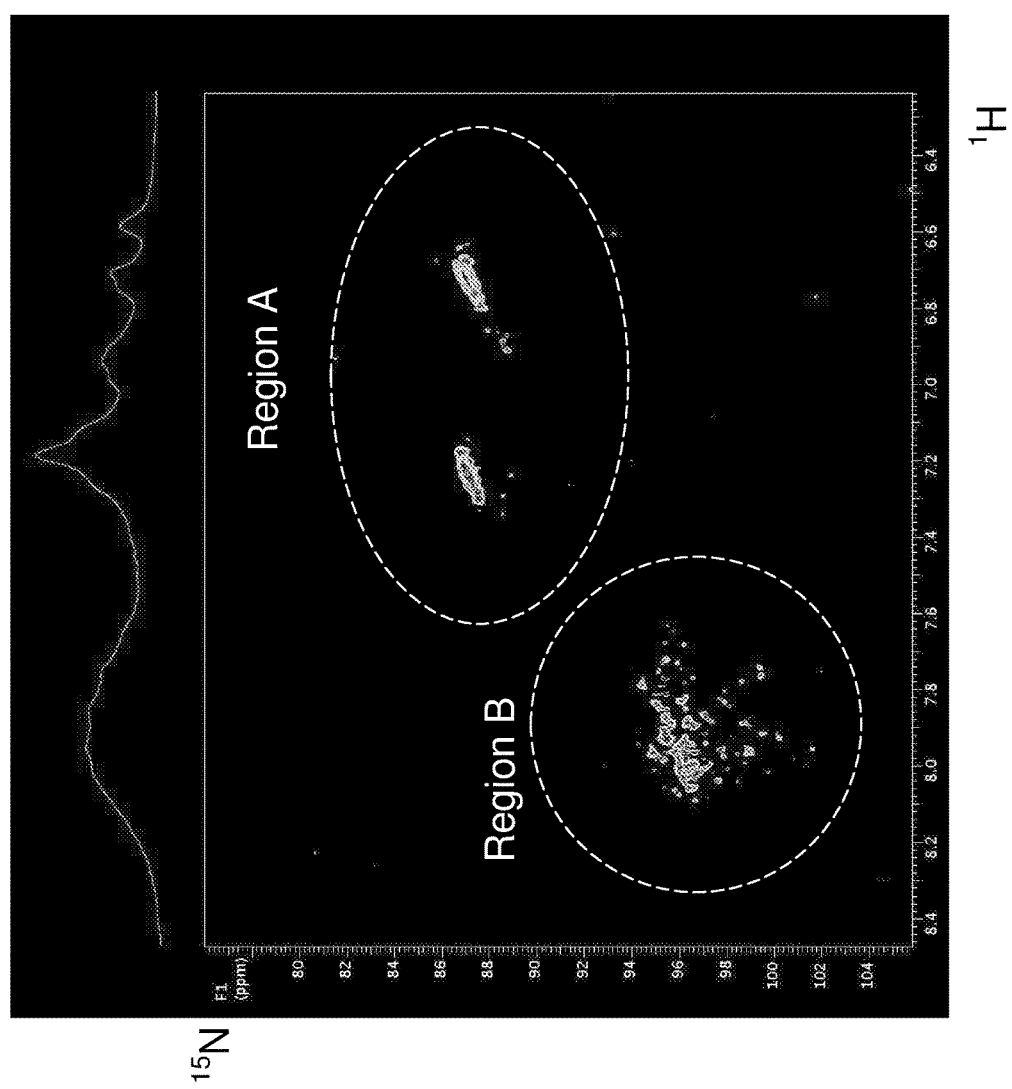
FIG. 19 is a two-dimensional HSQC $^1$H-$^{15}$N NMR spectrum for digested castor (lot 5-83) in d6-DMSO, showing two regions of interest denoted Region A and Region B.
Figure 20:
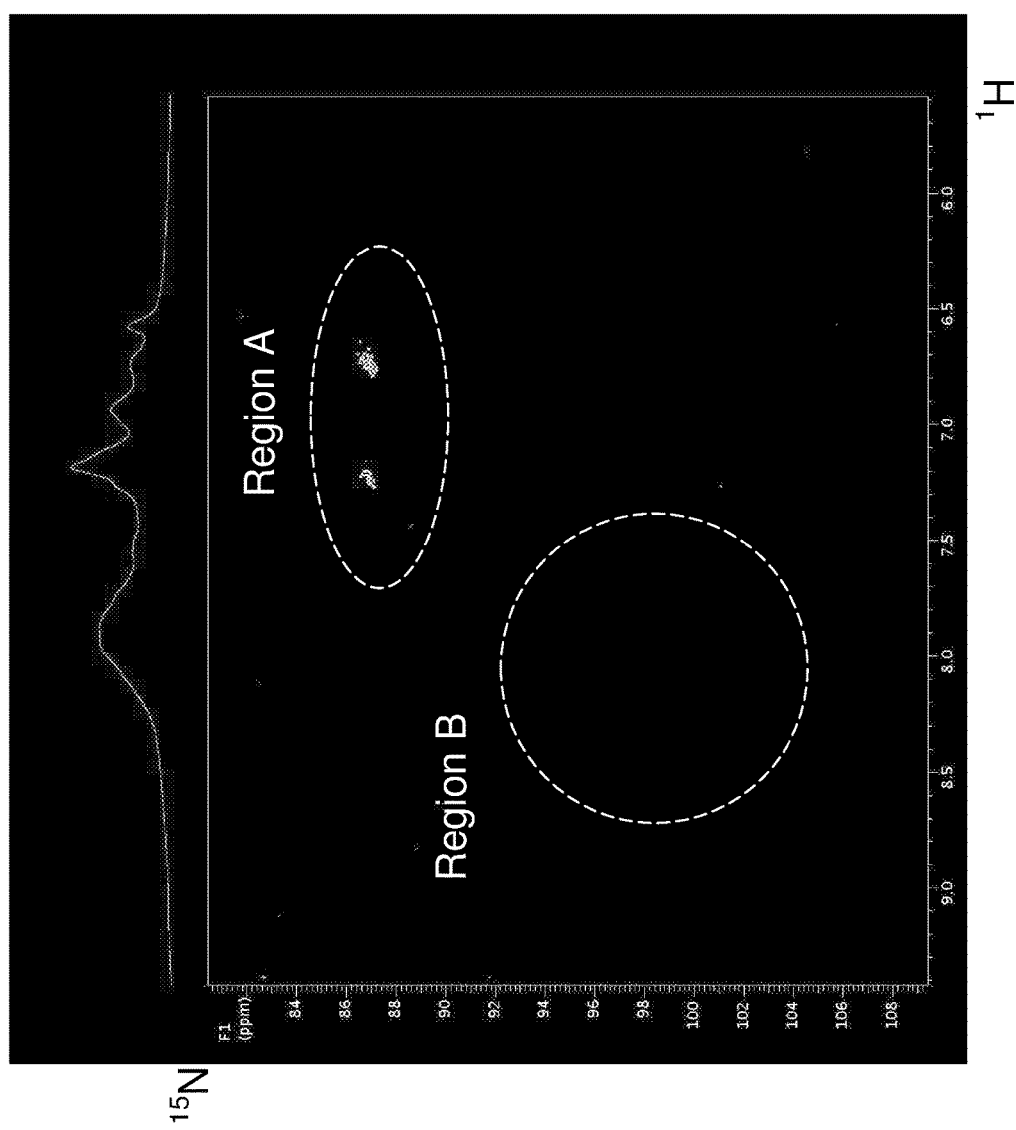
FIG. 20 is a two-dimensional HSQC $^1$H-$^{15}$N NMR spectrum for water-insoluble/dispersible polypeptide fraction derived from digested castor (lot 5-83) in d6-DMSO, again showing Region A and Region B.
Figure 21:
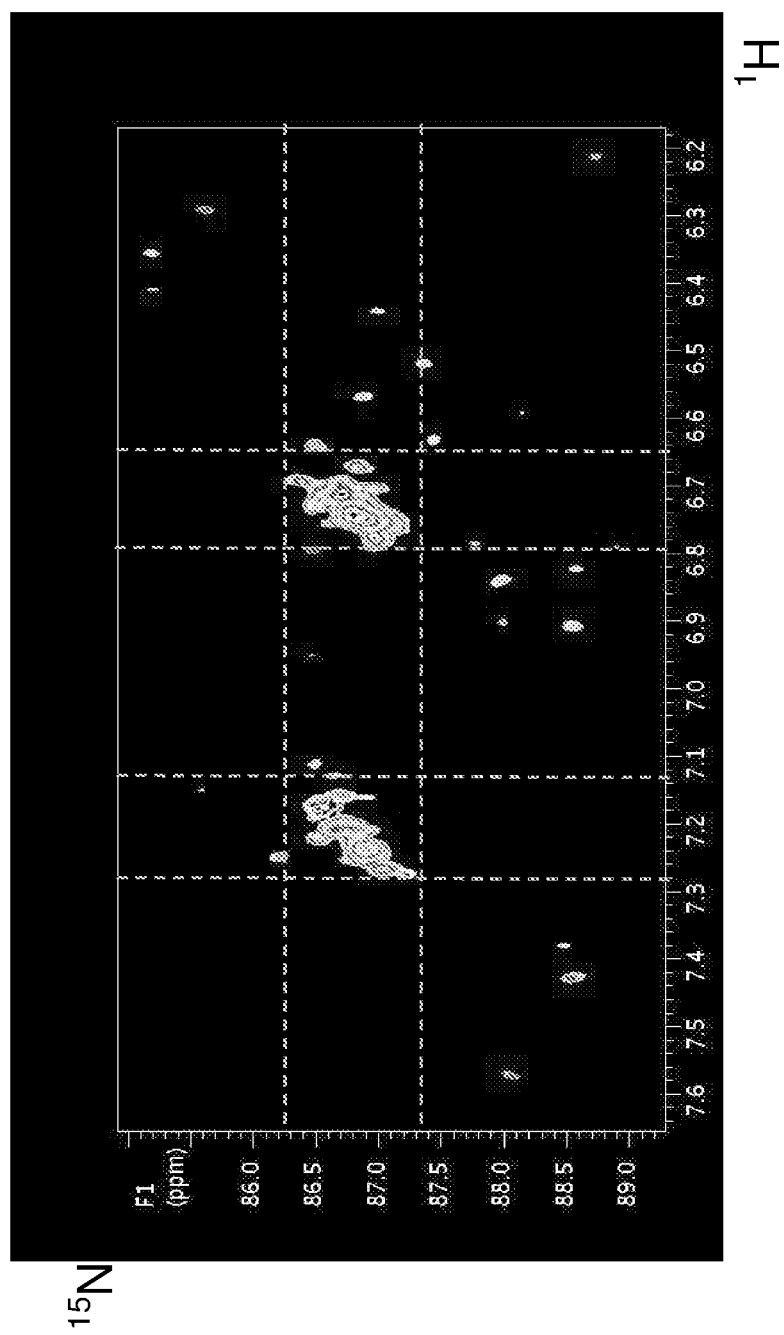
FIG. 21 is a two-dimensional HSQC $^1$H-$^{15}$N NMR spectrum, where Region A from FIG. 20 has been magnified.

The results are presented in FIGS. 19-21. FIG. 19 represents the two-dimensional HSQC $^1$H-$^{15}$N NMR spectrum for digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from all of the fractions that were present within the as-made digested castor (i.e., the water-insoluble/water dispersible polypeptide fractions plus the water-soluble polypeptide fractions). The multiple peaks in region B were observed to disappear upon removal of the water-soluble fractions (see FIG. 20). This indicates that these protonated nitrogens are specific to the water-soluble polypeptide fractions, whereas the peaks in region A are specific to the water-insoluble/water dispersible fraction.

FIG. 20 represents the two-dimensional HSQC $^1$H-$^{15}$N NMR spectrum for the water-insoluble/dispersible polypeptide extract from digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from the water-insoluble/water dispersible polypeptide fraction. The peaks within Region B were observed to be very weak in comparison to the analogous peaks within the digested castor before extraction (see FIG. 19). Conversely, the remaining peaks were predominantly from the protonated nitrogens in Region A. This indicates that these particular protonated nitrogens are specific to the water-insoluble polypeptide fractions. A magnified view of this region is provided in FIG. 21.

In FIG. 21, the peaks within the spectrum represent protonated nitrogen atoms that are specific to the water-insoluble/water dispersible polypeptide fraction. Upon expansion, the two "peaks" appear as narrow clusters that can be readily defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

The results of these studies revealed that while the water-soluble polypeptide fraction was composed of multiple types of protonated nitrogen atoms (FIG. 19), the water-insoluble/water dispersible fraction contained significantly fewer types of protonated nitrogens, and was predominantly characterized by the presence of two major proton-nitrogen cross peak clusters (FIGS. 20 and 21). These differences, like those as seen by solid state FTIR, illustrate that the chemical bonding environments within the water-soluble polypeptide fraction are distinctly different from those that exist within the water-insoluble/dispersible fraction.

Together, the solid state FTIR and NMR data reveal that the most preferred protein fraction for creating adhesives and binders with the unique ability to disperse PMDI (or other oils), and to yield moisture resistant wood composites (or fiber composites) is a water-insoluble/dispersible polypeptide or polypeptide-containing fraction wherein said fraction has a solid-state infrared amide-I absorption band between 1620-1632 cm$^{-1}$; a solid-state infrared amide-II absorption band between 1514-1521 cm$^{-1}$; and a solution-state pair of protonated nitrogen clusters as determined by a $^1$H-$^{15}$N nuclear magnetic resonance correlation technique. More specifically, when the pair of protonated nitrogen clusters is observed by means of NMR with deuterated d6-DMSO as the solvent using a two-dimensional HSQC $^1$H-$^{15}$N NMR technique, the clusters are defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. An adhesive composition comprising:
   (a) from about 5% to about 90% (w/w) of a reactive prepolymer;
   (b) from about 10% to about 99% (w/w) of an isolated polypeptide composition capable of dispersing the reactive prepolymer in an aqueous medium, wherein the isolated polypeptide composition is derived from corn, wheat, sunflower, cotton, rapeseed, canola, castor, soy, camelina, flax, jatropha, mallow, peanuts, tobacco, whey, or a combination thereof; and
   (c) one or more additives.

2. The composition of claim 1, wherein the reactive prepolymer is a polyisocyanate-based prepolymer, an epoxy-based prepolymer, a latex prepolymer, or a combination thereof.

3. A two-part adhesive composition comprising:
   (a) a first part (Part A) comprising from about 5% to about 90% (w/w) of a reactive prepolymer, wherein the reactive prepolymer is a polyisocyanate-based prepolymer, an epoxy-based prepolymer, or a combination thereof;
   (b) a second part (Part B) comprising from about 10% to about 99% (w/w) of an isolated polypeptide composition capable of dispersing the reactive prepolymer in an aqueous medium, wherein the isolated polypeptide composition is derived from corn, wheat, sunflower, cotton, rapeseed, canola, castor, soy, camelina, flax, jatropha, mallow, peanuts, tobacco, whey, or a combination thereof; and
   (c) one or more additives.

4. The composition of claim 1, further comprising a catalyst.

5. An adhesive composition comprising:
   (a) from about 5% to about 90% (w/w) of a reactive prepolymer selected from the group consisting of an organic polyisocyanate, and a reaction product between an organic polyisocyanate and a polypeptide, a polyol, an amine based polyol, an amine containing compound, a hydroxy containing compound, or a combination thereof;
   (b) from about 10% to about 99% (w/w) of an isolated polypeptide composition capable of dispersing the reactive prepolymer in an aqueous medium, wherein the isolated polypeptide composition is derived from corn, wheat, sunflower, cotton, rapeseed, canola, castor, soy, camelina, flax, jatropha, mallow, peanuts, tobacco, whey, or a combination thereof;
   (c) one or more additives; and
   (d) an optional catalyst.

6. An adhesive composition comprising:
   (a) from about 5% to about 90% (w/w) of a reactive prepolymer; and
   (b) from about 10% to about 90% (w/w) of an isolated water-soluble polypeptide composition, wherein the isolated water-soluble polypeptide composition is derived from corn, wheat, sunflower, cotton, rapeseed, canola, castor, soy, camelina, flax, jatropha, mallow, peanuts, tobacco, whey, or a combination thereof, comprising one or more of the following features:
      (a) an amide-I absorption band between about 1633 $cm^{-1}$ and 1680 $cm^{-1}$, as determined by solid state FTIR;
      (b) an amide-II band between approximately 1522 $cm^{-1}$ and 1560 $cm^{-1}$, as determined by solid state FTIR;
      (c) two prominent 1° amide N—H stretch absorption bands centered at about 3200 $cm^{-1}$, and at about 3300 $cm^{-1}$, as determined by solid state FTIR;
      (d) a prominent cluster of protonated nitrogen nuclei defined by $^{15}N$ chemical shift boundaries at about 94 ppm and at about 100 ppm, and $^{1}H$ chemical shift boundaries at about 7.6 ppm and at about 8.1 ppm, as determined by solution state, two-dimensional proton-nitrogen coupled NMR;
      (e) an average molecular weight of between about 600 and about 2,500 Daltons;
      (f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing; and
   (c) one or more additives.

7. The adhesive of claim 6, further comprising a catalyst.

8. The adhesive of claim 6, wherein the reactive prepolymer is a polyisocyanate-based prepolymer, an epoxy-based prepolymer, a latex-based prepolymer, a latex prepolymer, or a combination thereof.

9. The composition of claim 2, wherein the polyisocyanate-based prepolymer is an organic polyisocyanate; or a reaction product between an organic polyisocyanate and a polypeptide, a polyol, an amine based polyol, an amine containing compound, a hydroxy containing compound, or a combination thereof.

10. The composition of claim 1, wherein the polypeptide composition is derived from corn, wheat, sunflower, cotton, rapeseed, canola, soy, camelina, whey, or a combination thereof.

11. The composition of claim 4, wherein the catalyst is a primary amine, a secondary amine, a tertiary amine, an organometallic compound, or a combination thereof.

12. The composition of claim 2, wherein the polyisocyanate-based reactive prepolymer is a polymer comprising a terminal reactive isocyanate group.

13. The composition of claim 2, wherein the epoxy-based prepolymer is an epoxide containing compound, or is a reaction product between an epoxy and a polypeptide, a polyol, an amine based polyol, an amine containing compound, a hydroxy containing compound, or a combination thereof.

14. The composition of claim 13, wherein the epoxy is selected from the group consisting of a diglycidyl ether of bisphenol-A, a diglycidyl ether of bisphenol-A alkoxylate, an epoxy novolac resin, expoxidized soy oil, epoxidized linseed oil, epichlorohydrin, a glycidyl ether-type epoxy resin derived from a polyphenol by reaction with epichlorohydrin, and a combination thereof.

15. The composition of claim 9, wherein the polyol is amine alkoxylate, polyoxypropylene glycol, propylene glycol, propane diol, glycerin, or a mixture thereof.

16. The composition of claim 1, wherein the prepolymer is an organic polyisocyanate selected from the group consisting of polymeric diphenylmethane diisocyanate (PMDI), 4,4'-methylenediphenyl, diisocyanate (4,4'-MDI), 2,4-methylenediphenyl, diisocyanate (2,4-MDI), or a combination thereof.

17. A method of bonding a first article to a second article comprising:
 (a) depositing on a surface of the first article the adhesive composition of claim 1 thereby to create a binding area; and
 (b) contacting the binding surface with a surface of the second article thereby to bond the first surface to the second surface.

18. An article comprising two or more components bonded together using the adhesive composition of claim 1.

19. The article of claim 18, wherein the bonded components are selected from the group consisting of paper, wood, glass, metal, fiberglass, wood fiber, ceramic, ceramic powder, plastic, and a combination thereof.

20. The composition of claim 1, wherein the additive comprises a viscosifying agent.

21. The composition of claim 2, wherein the additive comprises a viscosifying agent.

22. The composition of claim 1, wherein the additive is an amine-functional compound.

23. The composition of claim 2, wherein the additive is an amine-functional compound.

24. The two-part adhesive composition of claim 3, wherein the additive comprises a viscosifying agent.

25. The adhesive composition of claim 5, wherein the additive comprises a viscosifying agent.

26. The adhesive composition of claim 6, wherein the additive comprises a viscosifying agent.

27. The two-part adhesive composition of claim 3, wherein the additive is an amine-functional compound.

28. The adhesive composition of claim 5, wherein the additive is an amine-functional compound.

29. The adhesive composition of claim 6, wherein the additive is an amine-functional compound.

30. The adhesive composition of claim 1, wherein the additive is urea.

31. The adhesive composition of claim 2, wherein the additive is urea.

32. The two-part adhesive composition of claim 3, wherein the additive is urea.

33. The adhesive composition of claim 5, wherein the additive is urea.

34. The adhesive composition of claim 6, wherein the additive is urea.

35. The adhesive composition of claim 1, wherein the aqueous medium is water.

36. The method of claim 17, further comprising the step of, after step (b), permitting the adhesive composition to cure.

37. The method of claim 36, wherein curing comprises applying pressure, heat or both pressure and heat.

38. The method of claim 17, wherein the first article, the second article, or both the first and second articles are lignocellulosic materials, or composite materials containing lignocellulosic material.

39. An article produced by the method of claim 17.

40. An article produced using the adhesive composition of claim 1.

41. The article of claim 40, wherein the article is a composite.

42. The article of claim 40, wherein the article comprises a lignocellulosic component.

43. The article of claim 40, wherein the adhesive comprises from about 30% to about 70% (w/w) of an organic polyisocyanate.

44. The article of claim 41, wherein the composite is chip board, particle board, fiber board, plywood, laminated veneer lumber, glulam, laminated whole lumber, laminated composite lumber, composite wooden I-beans, medium density fiberboard, high density fiberboard, extruded wood, or fiberglass.

* * * * *